(12) United States Patent
Cartwright et al.

(10) Patent No.: US 10,516,782 B2
(45) Date of Patent: Dec. 24, 2019

(54) CONFERENCE SEARCHING AND PLAYBACK OF SEARCH RESULTS

(71) Applicant: DOLBY LABORATORIES LICENSING CORPORATION, San Francisco, CA (US)

(72) Inventors: Richard J. Cartwright, Killara (AU); Shen Huang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 103 days.

(21) Appl. No.: 15/548,245

(22) PCT Filed: Feb. 3, 2016

(86) PCT No.: PCT/US2016/016283
§ 371 (c)(1),
(2) Date: Aug. 2, 2017

(87) PCT Pub. No.: WO2016/126769
PCT Pub. Date: Aug. 11, 2016

(65) Prior Publication Data
US 2018/0027123 A1 Jan. 25, 2018

Related U.S. Application Data

(60) Provisional application No. 62/170,214, filed on Jun. 3, 2015.

(30) Foreign Application Priority Data

Feb. 3, 2015 (WO) ................ PCT/CN2015/072171

(51) Int. Cl.
*H04M 3/42* (2006.01)
*H04M 3/56* (2006.01)
(Continued)

(52) U.S. Cl.
CPC ............. *H04M 3/568* (2013.01); *G10L 25/48* (2013.01); *H04M 3/42221* (2013.01);
(Continued)

(58) Field of Classification Search
CPC ............... H04M 3/56; H04M 3/42221; H04M 2201/40; H04M 3/567; H04M 3/568;
(Continued)

(56) References Cited

U.S. PATENT DOCUMENTS 6,850,496 B1 * 2/2005 Knappe .................. H04M 3/56
370/260
7,966,327 B2 6/2011 Li
(Continued)

FOREIGN PATENT DOCUMENTS

| WO | 2010/000914 | 1/2010 |
| WO | 2013/086301 | 6/2013 |

(Continued)

OTHER PUBLICATIONS

Can D. et al., "Lattice Indexing for Spoken Term Detection", IEEE Transactions on Audio, Speech and Language Processing, vol. 19. No. 8, pp. 2338-2347, Nov. 2011.
(Continued)

*Primary Examiner* — Quynh H Nguyen
*Assistant Examiner* — Kharye Pope

(57) ABSTRACT

Various disclosed implementations involve processing and/or playback of a recording of a conference involving a plurality of conference participants. Some implementations disclosed herein involve receiving audio data corresponding to a recording of at least one conference involving a plurality of conference participants. The audio data may include conference participant speech data from multiple endpoints, recorded separately and/or conference participant speech data from a single endpoint corresponding to multiple con-
(Continued)

ference participants and including spatial information for each conference participant of the multiple conference participants. A search of the audio data may be based on one or more search parameters. The search may be a concurrent search for multiple features of the audio data. Instances of conference participant speech may be rendered to at least two different virtual conference participant positions of a virtual acoustic space.

18 Claims, 58 Drawing Sheets

(51) Int. Cl.
*G10L 25/48* (2013.01)
*G10L 15/26* (2006.01)
*H04L 12/16* (2006.01)

(52) U.S. Cl.
CPC ....... *G10L 15/26* (2013.01); *H04M 2203/305* (2013.01); *H04S 2400/11* (2013.01)

(58) Field of Classification Search
CPC ......... H04M 2201/42; H04M 3/42042; H04M 7/0027; H04M 3/563; H04M 2201/41; H04M 2203/2038; H04M 2203/352; H04M 2242/30; H04M 3/562; H04M 2203/305; H04M 2203/301; H04M 2203/6045; G10L 17/00; G10L 17/005; G10L 17/06; G06F 21/32; G06F 17/279; G06F 17/30023; G06F 17/30684; G06F 3/167; G06F 17/30867; G06F 2221/2111; H04L 65/403; H04L 12/1827; H04L 12/1831; H04L 12/1822; H04L 67/306; H04L 63/0861
USPC .................. 379/202.01, 93.21, 68; 370/352
See application file for complete search history.

(56) References Cited

U.S. PATENT DOCUMENTS

| | | | |
|---|---|---|---|
| 8,224,087 B2 | 7/2012 | Bronstein | |
| 9,001,178 B1* | 4/2015 | Leske | H04N 7/155 348/14.08 |
| 9,544,704 B1* | 1/2017 | John | H04S 7/302 |
| 2007/0071206 A1* | 3/2007 | Gainsboro | H04M 3/2281 379/168 |
| 2007/0106646 A1 | 5/2007 | Stern | |
| 2007/0263823 A1 | 11/2007 | Jalava | |
| 2008/0008458 A1* | 1/2008 | Gudipaty | G11B 27/034 386/240 |
| 2008/0046406 A1 | 2/2008 | Seide | |
| 2008/0162151 A1* | 7/2008 | Cho | G10L 21/04 704/503 |
| 2008/0221876 A1 | 9/2008 | Holdrich | |
| 2009/0164217 A1* | 6/2009 | Arrowood | G10L 15/14 704/254 |
| 2010/0158232 A1* | 6/2010 | Sylvain | H04M 3/42221 379/202.01 |
| 2010/0316232 A1* | 12/2010 | Acero | H04M 3/568 381/92 |
| 2011/0072350 A1 | 3/2011 | Bachtiger | |
| 2011/0085018 A1* | 4/2011 | Culbertson | H04L 12/1827 348/14.08 |
| 2011/0154405 A1 | 6/2011 | Isaias | |
| 2011/0161074 A1* | 6/2011 | Pance | G10L 21/028 704/201 |
| 2011/0267419 A1 | 11/2011 | Quinn | |
| 2012/0131060 A1 | 5/2012 | Heidasch | |
| 2012/0233155 A1 | 9/2012 | Gallmeier | |
| 2012/0323579 A1* | 12/2012 | Gibbon | G10L 15/1822 704/270 |
| 2014/0078938 A1* | 3/2014 | Lachapelle | A61B 18/245 370/260 |
| 2014/0161423 A1 | 6/2014 | Tesch | |
| 2014/0195675 A1* | 7/2014 | Silver | H04L 65/1083 709/224 |
| 2015/0058013 A1* | 2/2015 | Pakhomov | G10L 25/78 704/243 |
| 2015/0145945 A1* | 5/2015 | Salfati | H04N 5/765 348/14.06 |
| 2016/0171100 A1* | 6/2016 | Fujita | G06F 17/30 707/722 |

FOREIGN PATENT DOCUMENTS

WO WO-2013142668 A1 * 9/2013
WO 2016/126813 8/2016

OTHER PUBLICATIONS

Burkhardt F., "Yu Seem Aggressive! Monitoring Anger in a Practical Application", Deutsche Telekom Laboratories, Berlin Germany, pp. 1-5.
Bachorowski J. et al., "Vocal Expressions of Emotion", from Handbook of Emotions by Michael Lewis, et al., Third Edition, The Guilford Press, 2008, pp. 196-210.
Yap T., "Speech production under cognitive load: Effects and classification", Dissertation, The University of New South Wales, pp. 1-206, May 2012.
Miller G., "WordNet: A Lexical Database for English", Communications of the ACM vol. 38, No. 11, pp. 39-41, Nov. 1995.

* cited by examiner

CONFERENCE SEARCHING AND PLAYBACK OF SEARCH RESULTS

CROSS-REFERENCE TO RELATED APPLICATIONS

This application claims the benefit of priority to International Patent Application No. PCT/CN2015/072171 filed 3 Feb. 2015; and U.S. Provisional Patent Application No. 62/170,214 filed 3 Jun. 2015, the contents of which are hereby incorporated by reference.

TECHNICAL FIELD

This disclosure relates to the processing of audio signals. In particular, this disclosure relates to processing audio signals related to conferencing, including but not limited to processing audio signals for teleconferencing or video conferencing.

BACKGROUND

In the field of teleconferencing, it is customary to provide a facility to allow the recording of the teleconference for playback after the teleconference has finished. This can allow those who were unable to attend to hear what happened in the conference. It can also allow those who were present to refresh their memory of what occurred during the teleconference. Recording facilities are sometimes used to ensure regulatory compliance in some industries, such as banking.

A typical teleconference recording is a single monophonic stream containing a mix of all parties onto a recording medium. This is often implemented by connecting a "dummy" client or phone to the teleconferencing bridge or server which appears to the bridge to be an ordinary client or phone but which, in reality, may be a machine which simply records its downlink. In such a system, the experience of listening to playback of the recording is identical, or substantially identical, to the experience of listening passively on a phone or client during the original teleconference.

SUMMARY

According to some implementations disclosed herein, a method may involve processing audio data. Some such methods may involve receiving audio data corresponding to a recording of a conference involving a plurality of conference participants. In some examples, the conference may be a teleconference. However, in some examples the conference may be an in-person conference.

According to some examples, the audio data may include audio data from multiple endpoints. The audio data for each of the multiple endpoints may have been recorded separately. Alternatively, or additionally, at least some of the audio data may be from a single endpoint corresponding to multiple conference participants. The audio data may include spatial information for each conference participant of the multiple conference participants.

In some implementations, the method may involve analyzing the audio data to determine conversational dynamics data. In some examples, the conversational dynamics data may include data indicating the frequency and duration of conference participant speech, data indicating instances of conference participant doubletalk during which at least two conference participants are speaking simultaneously and/or data indicating instances of conference participant conversations.

Some disclosed methods may involve applying the conversational dynamics data as one or more variables of a spatial optimization cost function of a vector describing a virtual conference participant position for each of the conference participants in a virtual acoustic space. Some such methods may involve applying an optimization technique to the spatial optimization cost function to determine a locally optimal solution and assigning the virtual conference participant positions in the virtual acoustic space based, at least in part, on the locally optimal solution.

In some implementations, the virtual acoustic space may be determined relative to a position of a virtual listener's head in the virtual acoustic space. According to some such implementations, the spatial optimization cost function may apply a penalty for placing conference participants who are involved in conference participant doubletalk at virtual conference participant positions that are on, or within a predetermined angular distance from, a "cone of confusion" defined relative to the position of the virtual listener's head. Circular conical slices through the cone of confusion may have identical inter-aural time differences. In some examples, the spatial optimization cost function may apply a penalty for placing conference participants who are involved in a conference participant conversation with one another at virtual conference participant positions that are on, or within a predetermined angular distance from, a cone of confusion.

According to some examples, analyzing the audio data may involve determining which conference participants, if any, have perceptually similar voices. In some such examples, the spatial optimization cost function may apply a penalty for placing conference participants with perceptually similar voices at virtual conference participant positions that are on, or within a predetermined angular distance from, a cone of confusion.

In some examples, the spatial optimization cost function may apply a penalty for placing conference participants who speak frequently at virtual conference participant positions that are beside, behind, above, or below the position of the virtual listener's head. In some instances, the spatial optimization cost function may apply a penalty for placing conference participants who speak frequently at virtual conference participant positions that are farther from the position of the virtual listener's head than the virtual conference participant positions of conference participants who speak less frequently. In some implementations, the spatial optimization cost function may apply a penalty for placing conference participants who speak infrequently at virtual conference participant positions that are not beside, behind, above or below the position of the virtual listener's head.

According to some examples, the optimization technique may involve a gradient descent technique, conjugate gradient technique, Newton's method, the Broyden-Fletcher-Goldfarb-Shanno algorithm; a genetic algorithm, an algorithm for simulated annealing, an ant colony optimization method and/or a Monte Carlo method. In some examples, assigning a virtual conference participant position may involve selecting a virtual conference participant position from a set of predetermined virtual conference participant positions.

In some instances, the audio data may include output of a voice activity detection process. According to some examples, analyzing the audio data may involve identifying speech corresponding to individual conference participants.

In some examples, the audio data may correspond to a recording of a complete or substantially complete conference. Some examples may involve receiving and processing audio data from more than one conference.

Some disclosed methods may involve receiving (e.g., via an interface system) teleconference audio data during a teleconference. In some examples, the teleconference audio data may include a plurality of individual uplink data packet streams. Each uplink data packet stream may correspond to a telephone endpoint used by one or more teleconference participants. The method may involve sending (e.g., via the interface system) the teleconference audio data to a memory system as individual uplink data packet streams.

Some methods may involve determining that a late data packet of an incomplete uplink data packet stream has been received from a telephone endpoint after a late packet time threshold. The late packet time threshold may be greater than or equal to a mouth-to-ear latency time threshold of the teleconference. In some examples, the mouth-to-ear latency time threshold may be greater than or equal to 100 milliseconds (ms). In some instances, the mouth-to-ear latency time threshold may be 150 ms or less. In some examples, the late packet time threshold may be 200 ms, 400 ms, 500 ms or more. In some implementations, the late packet time threshold may be greater than or equal to 1 second. Some such methods may involve adding the late data packet to the incomplete uplink data packet stream.

Some methods may involve determining that a missing data packet of an incomplete uplink data packet stream has not been received from a telephone endpoint within a missing packet time threshold that is greater than the late packet time threshold. Some such methods may involve transmitting a request to the telephone endpoint (e.g., via the interface system) to re-send the missing data packet. If the telephone endpoint re-sends the missing data packet, such methods may involve receiving the missing data packet and adding the missing data packet to the incomplete uplink data packet stream.

In some examples, the individual uplink data packet streams may be individual encoded uplink data packet streams. At least one of the uplink data packet streams may include at least one data packet that was received after a mouth-to-ear latency time threshold of the teleconference and was therefore not used for reproducing audio data during the teleconference. In some instances, at least one of the uplink data packet streams may correspond to multiple teleconference participants and may include spatial information regarding each of the multiple participants.

Some disclosed methods may involve receiving (e.g., via an interface system) recorded audio data for a teleconference. The recorded audio data may include an individual uplink data packet stream corresponding to a telephone endpoint used by one or more teleconference participants. Some such methods may involve analyzing sequence number data of data packets in the individual uplink data packet stream. The analyzing process may involve determining whether the individual uplink data packet stream includes at least one out-of-order data packet. Such methods may involve re-ordering the individual uplink data packet stream according to the sequence number data if the uplink data packet stream includes at least one out-of-order data packet. In some instances, at least one data packet of the individual uplink data packet stream may have been received after a mouth-to-ear latency time threshold of the teleconference.

Some such methods may involve receiving (e.g., via the interface system) teleconference metadata and indexing the individual uplink data packet stream based, at least in part, on the teleconference metadata. In some instances, the recorded audio data may include a plurality of individual encoded uplink data packet streams. Each of the individual encoded uplink data packet streams may correspond to a telephone endpoint used by one or more teleconference participants. Such methods may involve decoding the plurality of individual encoded uplink data packet streams and analyzing the plurality of individual uplink data packet streams.

Some methods may involve recognizing speech in one or more individual decoded uplink data packet streams and generating speech recognition results data. Some such methods may involve identifying keywords in the speech recognition results data and indexing keyword locations.

Some disclosed methods may involve identifying speech of each of multiple teleconference participants in an individual decoded uplink data packet stream. Some such methods may involve generating a speaker diary indicating times at which each of the multiple teleconference participants were speaking.

According to some examples, analyzing the plurality of individual uplink data packet streams may involve determining conversational dynamics data. The conversational dynamics data may include data indicating the frequency and duration of conference participant speech, data indicating instances of conference participant doubletalk during which at least two conference participants are speaking simultaneously and/or data indicating instances of conference participant conversations.

Some methods may involve receiving audio data corresponding to a recording of a conference involving a plurality of conference participants. In some examples, the conference may be a teleconference. However, in some examples the conference may be an in-person conference.

According to some examples, the audio data may include audio data from multiple endpoints. The audio data for each of the multiple endpoints may have been recorded separately. Alternatively, or additionally, at least some of the audio data may be from a single endpoint corresponding to multiple conference participants. The audio data may include spatial information for each conference participant of the multiple conference participants.

Some such methods may involve rendering the conference participant speech data in a virtual acoustic space such that each of the conference participants has a respective different virtual conference participant position. Such methods may involve scheduling the conference participant speech for playback such that an amount of playback overlap between at least two output talkspurts of the conference participant speech is different from (e.g., greater than) an amount of original overlap between two corresponding input talkspurts of the conference recording. The amount of original overlap may be zero or non-zero.

In some examples, the scheduling may be performed, at least in part, according to a set of perceptually-motivated rules. Various types of perceptually-motivated rules are disclosed herein. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero.

According to some implementations, the set of perceptually-motivated rules may include a rule allowing the concurrent playback of entire presentations from different conference participants. In some implementations, a presentation may correspond with a time interval of the conference participant speech during which a speech density metric is greater than or equal to a silence threshold, a doubletalk ratio is less than or equal to a discussion threshold and a dominance metric is greater than a presentation threshold. The doubletalk ratio may indicate a fraction of speech time in the time interval during which at least two conference participants are speaking simultaneously. The speech density metric may indicate a fraction of the time interval during which there is any conference participant speech. The dominance metric may indicate a fraction of total speech uttered by a dominant conference participant during the time interval. The dominant conference participant may be a conference participant who spoke the most during the time interval.

In some examples, at least some of the conference participant speech may be scheduled to be played back at a faster rate than the rate at which the conference participant speech was recoded. According to some such examples, scheduling the playback of the speech at the faster rate may be accomplished by using a WSOLA (Waveform Similarity Based Overlap Add) technique.

Some disclosed methods may involve analyzing the audio data to determine conversational dynamics data. The conversational dynamics data may include data indicating the frequency and duration of conference participant speech, data indicating instances of conference participant doubletalk during which at least two conference participants are speaking simultaneously and/or data indicating instances of conference participant conversations. Some such methods may involve applying the conversational dynamics data as one or more variables of a spatial optimization cost function of a vector describing the virtual conference participant position for each of the conference participants in the virtual acoustic space. Such methods may involve applying an optimization technique to the spatial optimization cost function to determine a locally optimal solution and assigning the virtual conference participant positions in the virtual acoustic space based, at least in part, on the locally optimal solution.

In some examples, the audio data may include output of a voice activity detection process. Some implementations may involve identifying speech corresponding to individual conference participants. In some implementations, the audio data corresponds to a recording of at least one complete or substantially complete conference.

Some methods may involve receiving (e.g., by a conversational dynamics analysis module) audio data corresponding to a recording of a conference involving a plurality of conference participants. In some examples, the conference may be a teleconference. However, in some examples the conference may be an in-person conference.

According to some examples, the audio data may include audio data from multiple endpoints. The audio data for each of the multiple endpoints may have been recorded separately. Alternatively, or additionally, at least some of the audio data may be from a single endpoint corresponding to multiple conference participants. The audio data may include information for identifying conference participant speech for each conference participant of the multiple conference participants.

Some such methods may involve analyzing conversational dynamics of the conference recording to determine conversational dynamics data. Some methods may involve searching the conference recording to determine instances of each of a plurality of segment classifications. Each of the segment classifications may be based, at least in part, on the conversational dynamics data. Some implementations may involve segmenting the conference recording into a plurality of segments. Each of the segments may correspond with a time interval and at least one of the segment classifications.

In some examples, the analyzing, searching and segmenting processes may be performed by the conversational dynamics analysis module. The searching and segmenting processes may, in some implementations, be recursive processes. In some implementations, the searching and segmenting processes may be performed multiple times at different time scales.

According to some implementations, the searching and segmenting processes may be based, at least in part, on a hierarchy of segment classifications. In some examples, the hierarchy of segment classifications may be based a level of confidence with which segments of a particular segment classification may be identified, a level of confidence with which a start time of a segment may be determined, a level of confidence with which an end time of a segment may be determined and/or a likelihood that a particular segment classification includes conference participant speech corresponding to a conference topic.

In some implementations, instances of the segment classifications may be determined according to a set of rules. The rules may, for example, be based on one or more conversational dynamics data types such as a doubletalk ratio indicating a fraction of speech time in a time interval during which at least two conference participants are speaking simultaneously, a speech density metric indicating a fraction of the time interval during which there is any conference participant speech and/or a dominance metric indicating a fraction of total speech uttered by a dominant conference participant during the time interval. The dominant conference participant may be a conference participant who spoke the most during the time interval.

In some examples, the set of rules may include a rule that classifies a segment as a Mutual Silence segment if the speech density metric is less than a mutual silence threshold. According to some examples, the set of rules may include a rule that classifies a segment as a Babble segment if the speech density metric is greater than or equal to the mutual silence threshold and the doubletalk ratio is greater than a babble threshold. In some implementations, the set of rules may include a rule that classifies a segment as a Discussion segment if the speech density metric is greater than or equal to the silence threshold and if the doubletalk ratio is less than or equal to the babble threshold but greater than a discussion threshold.

According to some implementations, the set of rules may include a rule that classifies a segment as a Presentation segment if the speech density metric is greater than or equal to the silence threshold, if the doubletalk ratio is less than or equal to the discussion threshold and if the dominance metric is greater than a presentation threshold. In some examples, the set of rules may include a rule that classifies a segment as a Question and Answer segment if the speech density metric is greater than or equal to the silence threshold, if the doubletalk ratio is less than or equal to the discussion threshold and if the dominance metric is less than or equal to the presentation threshold but greater than a question and answer threshold.

As noted above, in some implementations the searching and segmenting processes may be based, at least in part, on a hierarchy of segment classifications. According to some such implementations, a first hierarchical level of the searching process may involve searching the conference recording to determine instances of Babble segments. In some examples, a second hierarchical level of the searching process may involve searching the conference recording to determine instances of Presentation segments.

According to some examples, a third hierarchical level of the searching process may involve searching the conference recording to determine instances of Question and Answer segments. According to some implementations, a fourth hierarchical level of the searching process may involve searching the conference recording to determine instances of Discussion segments.

However, in some alternative implementations, instance of the segment classifications may be determined according to a machine learning classifier. In some examples, the machine learning classifier may be an adaptive boosting technique, a support vector machine technique, a Bayesian network model technique, a neural networks technique, a hidden Markov model technique or a conditional random fields technique.

Some disclosed methods may involve receiving (e.g., by a topic analysis module) speech recognition results data for at least a portion of a recording of a conference involving a plurality of conference participants. The speech recognition results data may include a plurality of speech recognition lattices and a word recognition confidence score for each of a plurality of hypothesized words of the speech recognition lattices. The word recognition confidence score may correspond with a likelihood of a hypothesized word correctly corresponding with an actual word spoken by a conference participant during the conference. In some examples, receiving the speech recognition results data may involve receiving speech recognition results data from two or more automatic speech recognition processes.

Some such methods may involve determining a primary word candidate and one or more alternative word hypotheses for each of a plurality of hypothesized words in the speech recognition lattices. The primary word candidate may have a word recognition confidence score indicating a higher likelihood of correctly corresponding with the actual word spoken by the conference participant during the conference than a word recognition confidence score of any of the one or more alternative word hypotheses.

Some methods may involve calculating a term frequency metric of the primary word candidates and the alternative word hypotheses. The term frequency metric may be based, at least in part, on a number of occurrences of a hypothesized word in the speech recognition lattices and the word recognition confidence score. According to some implementations, calculating the term frequency metric may be based, at least in part, on a number of word meanings. Some such methods may involve sorting the primary word candidates and alternative word hypotheses according to the term frequency metric, including the alternative word hypotheses in an alternative hypothesis list and re-scoring at least some hypothesized words of the speech recognition lattices according to the alternative hypothesis list.

Some implementations may involve forming a word list. The word list may include primary word candidates and a term frequency metric for each of the primary word candidates. In some examples, the term frequency metric may be inversely proportional to a document frequency metric. The document frequency metric may correspond to an expected frequency with which a primary word candidate will occur in the conference. According to some examples, the expected frequency may correspond to a frequency with which the primary word candidate has occurred in two or more prior conferences or a frequency with which the primary word candidate occurs in a language model.

According to some examples, the word list also may include one or more alternative word hypotheses for each primary word candidate. In some instances, alternative word hypotheses may be generated according to multiple language models.

Some methods may involve generating a topic list of conference topics based, at least in part, on the word list. In some examples, generating the topic list may involve determining a hypernym of at least one word of the word list. According to some such examples, generating the topic list may involve determining a topic score. In some examples, the topic score may include a hypernym score. According to some such examples, the including process may involve including alternative word hypotheses in the alternative hypothesis list based, at least in part, on the topic score.

In some implementations, two or more iterations of at least the determining, calculating, sorting, including and re-scoring processes may be performed. According to some examples, the iterations may involve generating the topic list and determining the topic score. In some examples, the alternative hypothesis list may be retained after each iteration.

Some implementations may involve reducing at least some hypothesized words of a speech recognition lattice to a canonical base form. For example, the reducing may involve reducing nouns of the speech recognition lattice to the canonical base form. The canonical base form may be a singular form of a noun. Alternatively, or additionally, the reducing may involve reducing verbs of the speech recognition lattice to the canonical base form. The canonical base form may be an infinitive form of a verb.

According to some examples, the conference recording may include conference participant speech data from multiple endpoints, recorded separately. Alternatively, or additionally, the conference recording may include conference participant speech data from a single endpoint corresponding to multiple conference participants, which may include information for identifying conference participant speech for each conference participant of the multiple conference participants.

Some disclosed methods may involve receiving audio data corresponding to a recording of at least one conference involving a plurality of conference participants. The audio data may include conference participant speech data from multiple endpoints, recorded separately and/or conference participant speech data from a single endpoint corresponding to multiple conference participants, which may include spatial information for each conference participant of the multiple conference participants.

Such methods may involve determining search results based on a search of the audio data. The search may be, or may have been, based on one or more search parameters. The search results may correspond to at least two instances of conference participant speech in the audio data. The instances of conference participant speech may, for example, include talkspurts and/or portions of talkspurts. The instances of conference participant speech may include a first instance of speech uttered by a first conference participant and a second instance of speech uttered by a second conference participant.

Some such methods may involve rendering the instances of conference participant speech to at least two different virtual conference participant positions of a virtual acoustic space, such that the first instance of speech is rendered to a first virtual conference participant position and the second instance of speech is rendered to a second virtual conference participant position. Such methods may involve scheduling at least a portion of the instances of conference participant speech for simultaneous playback, to produce playback audio data.

According to some implementations, determining the search results may involve receiving search results. For example, determining the search results may involve receiving the search results resulting from a search performed by another device, e.g., by a server.

However, in some implementations determining the search results may involve performing a search. According to some examples, determining the search results may involve performing a concurrent search of the audio data regarding multiple features. According to some implementations, the multiple features may include two or more features selected from a set of features. The set of features may include words, conference segments, time, conference participant emotion, endpoint location and/or endpoint type. In some implementations, determining the search results may involve performing a search of audio data that corresponds to recordings of multiple conferences. In some examples, the scheduling process may involve scheduling the instances of conference participant speech for playback based, at least in part, on a search relevance metric.

Some implementations may involve modifying a start time or an end time of at least one of the instances of conference participant speech. In some examples, the modifying process may involve expanding a time interval corresponding to an instance of conference participant speech. According to some examples, the modifying process may involve merging two or more instances of conference participant speech, corresponding with a single conference endpoint, that overlap in time after the expanding.

In some examples, the scheduling process may involve scheduling an instance of conference participant speech that did not previously overlap in time to be played back overlapped in time. Alternatively, or additionally, some methods may involve scheduling an instance of conference participant speech that was previously overlapped in time to be played back further overlapped in time.

According to some implementations, the scheduling may be performed according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero.

Some disclosed methods may involve analyzing the audio data to determine conversational dynamics data. The conversational dynamics data may include data indicating the frequency and duration of conference participant speech, data indicating instances of conference participant double-talk during which at least two conference participants are speaking simultaneously and/or data indicating instances of conference participant conversations. Some such methods may involve applying the conversational dynamics data as one or more variables of a spatial optimization cost function of a vector describing the virtual conference participant position for each of the conference participants in the virtual acoustic space. Such methods may involve applying an optimization technique to the spatial optimization cost function to determine a locally optimal solution and assigning the virtual conference participant positions in the virtual acoustic space based, at least in part, on the locally optimal solution.

Some implementations may involve providing instructions for controlling a display to provide a graphical user interface. According to some implementations, the instructions for controlling the display may include instructions for making a presentation of conference participants. The one or more features for performing the search may, for example, include an indication of a conference participant.

In some examples, the instructions for controlling the display may include instructions for making a presentation of conference segments. The one or more features for performing the search may, for example, include an indication of a conference segment.

In some instances, the instructions for controlling the display may include instructions for making a presentation of a display area for search features. The one or more features for performing the search may, for example, include words, time, conference participant emotion, endpoint location and/or endpoint type.

Some such implementations may involve receiving input corresponding to a user's interaction with the graphical user interface and processing the audio data based, at least in part, on the input. In some examples, the input may correspond to one or more features for performing a search of the audio data. Some such methods may involve providing the playback audio data to a speaker system.

According to some implementations, determining the search results may involve searching a keyword spotting index. In some examples, the keyword spotting index may have a data structure that includes pointers to contextual information. According to some such examples, the pointers may be, or may include, vector quantization indices.

In some examples, determining the search results may involve a first stage of determining one or more conference(s) for searching, e.g., according to one or more time parameters. Some such methods may involve a second stage of retrieving search results according to other search parameters.

Some disclosed methods may involve receiving audio data corresponding to a recording of a conference. The audio data may include data corresponding to conference participant speech of each of a plurality of conference participants. Such methods may involve selecting only a portion of the conference participant speech as playback audio data.

According to some implementations, the selecting process may involve a topic selection process of selecting conference participant speech for playback according to estimated relevance of the conference participant speech to one or more conference topics. In some implementations, the selecting process may involve a topic selection process of selecting conference participant speech for playback according to estimated relevance of the conference participant speech to one or more topics of a conference segment.

In some instances, the selecting process may involve removing input talkspurts having an input talkspurt time duration that is below a threshold input talkspurt time duration. According to some examples, the selecting process may involve a talkspurt filtering process of removing a portion of input talkspurts having an input talkspurt time duration that is at or above the threshold input talkspurt time duration.

Alternatively, or additionally, the selecting process may involve an acoustic feature selection process of selecting conference participant speech for playback according to at least one acoustic feature. In some examples, the selecting may involve an iterative process. Some such implementations may involve providing the playback audio data to a speaker system for playback.

Some methods may involve receiving an indication of a target playback time duration. According to some such examples, the selecting process may involve making a time duration of the playback audio data within a threshold time difference and/or or a threshold time percentage of the target playback time duration. In some examples, the time duration of the playback audio data may be determined, at least in part, by multiplying a time duration of at least one selected portion of the conference participant speech by an acceleration coefficient.

According to some examples, the audio data may include conference participant speech data from multiple endpoints, recorded separately or conference participant speech data from a single endpoint corresponding to multiple conference participants, which may include spatial information for each conference participant of the multiple conference participants. Some such methods may involve rendering the playback audio data in a virtual acoustic space such that each of the conference participants whose speech is included in the playback audio data has a respective different virtual conference participant position.

According to some implementations, the selecting process may involve a topic section process. According to some such examples, the topic section process may involve receiving a topic list of conference topics and determining a list of selected conference topics. The list of selected conference topics may be a subset of the conference topics.

Some methods may involve receiving topic ranking data, which may indicate an estimated relevance of each conference topic on the topic list. Determining the list of selected conference topics may be based, at least in part, on the topic ranking data.

According to some implementations, the selecting process may involve a talkspurt filtering process. The talkspurt filtering process may, for example, involve removing an initial portion of an input talkspurt. The initial portion may be a time interval from an input talkspurt start time to an output talkspurt start time. Some methods may involve calculating an output talkspurt time duration based, at least in part, on an input talkspurt time duration.

Some such methods may involve determining whether the output talkspurt time duration exceeds an output talkspurt time threshold. If it is determined that the output talkspurt time duration exceeds an output talkspurt time threshold, the talkspurt filtering process may involve generating multiple instances of conference participant speech for a single input talkspurt. According to some such examples, at least one of the multiple instances of conference participant speech may have an end time that corresponds with an input talkspurt end time.

According to some implementations, the selecting process may involve an acoustic feature selection process. In some examples, the acoustic feature selection process may involve determining at least one acoustic feature, such as pitch variance, speech rate and/or loudness.

Some implementations may involve modifying a start time or an end time of at least one of the instances of conference participant speech. In some examples, the modifying process may involve expanding a time interval corresponding to an instance of conference participant speech. According to some examples, the modifying process may involve merging two or more instances of conference participant speech, corresponding with a single conference endpoint, that overlap in time after the expanding.

In some examples, the scheduling process may involve scheduling an instance of conference participant speech that did not previously overlap in time to be played back overlapped in time. Alternatively, or additionally, some methods may involve scheduling an instance of conference participant speech that was previously overlapped in time to be played back further overlapped in time.

According to some implementations, the scheduling may be performed according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero. Some implementations may involve scheduling instances of conference participant speech for playback based, at least in part, on a search relevance metric.

Some disclosed methods may involve analyzing the audio data to determine conversational dynamics data. The conversational dynamics data may include data indicating the frequency and duration of conference participant speech, data indicating instances of conference participant double-talk during which at least two conference participants are speaking simultaneously and/or data indicating instances of conference participant conversations. Some such methods may involve applying the conversational dynamics data as one or more variables of a spatial optimization cost function of a vector describing the virtual conference participant position for each of the conference participants in the virtual acoustic space. Such methods may involve applying an optimization technique to the spatial optimization cost function to determine a locally optimal solution and assigning the virtual conference participant positions in the virtual acoustic space based, at least in part, on the locally optimal solution.

Some implementations may involve providing instructions for controlling a display to provide a graphical user interface. According to some implementations, the instructions for controlling the display may include instructions for making a presentation of conference participants. In some examples, the instructions for controlling the display may include instructions for making a presentation of conference segments.

Some such implementations may involve receiving input corresponding to a user's interaction with the graphical user interface and processing the audio data based, at least in part, on the input. In some examples, the input may correspond to an indication of a target playback time duration. Some such methods may involve providing the playback audio data to a speaker system.

At least some aspects of the present disclosure may be implemented via apparatus. For example, one or more devices may be capable of performing, at least in part, the methods disclosed herein. In some implementations, an apparatus may include an interface system and a control system. The interface system may include a network interface, an interface between the control system and a memory system, an interface between the control system and another device and/or an external device interface. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components.

The control system may be capable of performing, at least in part, the methods disclosed herein. In some implementations, the control system may be capable of receiving teleconference audio data during a teleconference, via the interface system. The teleconference audio data may include a plurality of individual uplink data packet streams. Each uplink data packet stream may correspond to a telephone endpoint used by one or more teleconference participants. In some implementations, the control system may be capable of sending to a memory system, via the interface system, the teleconference audio data as individual uplink data packet streams.

According to some examples, the control system may be capable of determining that a late data packet of an incomplete uplink data packet stream has been received from a telephone endpoint after a late packet time threshold. The late packet time threshold may be greater than or equal to a mouth-to-ear latency time threshold of the teleconference. The control system may be capable of adding the late data packet to the incomplete uplink data packet stream.

In some examples, the control system may be capable of determining that a missing data packet of an incomplete uplink data packet stream has not been received from a telephone endpoint within a missing packet time threshold. The missing packet time threshold may, in some examples, be greater than the late packet time threshold. The control system may be capable of transmitting a request to the telephone endpoint, via the interface system, to re-send the missing data packet, of receiving the missing data packet and of adding the missing data packet to the incomplete uplink data packet stream.

In some implementations, the individual uplink data packet streams may be individual encoded uplink data packet streams. Some such implementations may involve sending the teleconference audio data to the memory system as individual encoded uplink data packet streams.

The interface system may include an interface between the control system and at least part of the memory system. According to some implementations, at least part of the memory system may be included in one or more other devices, such as local or remote storage devices. In some implementations, the interface system may include a network interface and the control system may be capable of sending the teleconference audio data to the memory system via the network interface. According to some examples, however, the apparatus may include at least part of the memory system.

In some examples, at least one of the uplink data packet streams may include at least one data packet that was received after a mouth-to-ear latency time threshold of the teleconference and was therefore not used for reproducing audio data during the teleconference. According to some examples, at least one of the uplink data packet streams may correspond to multiple teleconference participants and may include spatial information regarding each of the multiple participants. According to some implementations, the control system may be capable of providing teleconference server functionality.

In some alternative implementations, an apparatus also may include an interface system such as those described above. The apparatus also may include a control system such as those described above. According to some such implementations, the control system may be capable of receiving, via the interface system, recorded audio data for a teleconference. The recorded audio data may include an individual uplink data packet stream that corresponds to a telephone endpoint used by one or more teleconference participants.

According to some examples, the control system may be capable of analyzing sequence number data of data packets in the individual uplink data packet stream. According to some such examples, the analyzing process may involve determining whether the individual uplink data packet stream includes at least one out-of-order data packet. The control system may be capable of re-ordering the individual uplink data packet stream according to the sequence number data if the uplink data packet stream includes at least one out-of-order data packet.

In some instances, the control system may determine that at least one data packet of the individual uplink data packet stream has been received after a mouth-to-ear latency time threshold of the teleconference. According to some such examples, the control system may be capable of receiving (e.g., via the interface system) teleconference metadata and indexing the individual uplink data packet stream based, at least in part, on the teleconference metadata.

In some examples, the recorded audio data may include a plurality of individual encoded uplink data packet streams. Each of the individual encoded uplink data packet streams may correspond to a telephone endpoint used by one or more teleconference participants. According to some implementations, the control system may include a joint analysis module capable of analyzing a plurality of individual uplink data packet streams. According to some such examples, the control system may be capable of decoding the plurality of individual encoded uplink data packet streams and providing a plurality of individual decoded uplink data packet streams to the joint analysis module.

In some implementations, the control system may include a speech recognition module capable of recognizing speech. The speech recognition module capable of generating speech recognition results data. According to some examples, the control system may be capable of providing one or more individual decoded uplink data packet streams to the speech recognition module. According to some such examples, the speech recognition module may be capable of providing the speech recognition results data to the joint analysis module.

According to some implementations, the joint analysis module may be capable of identifying keywords in the speech recognition results data. In some examples, the joint analysis module may be capable of indexing keyword locations.

According to some examples, the control system may include a speaker diarization module. In some instances, the control system may be capable of providing an individual decoded uplink data packet stream to the speaker diarization module. The speaker diarization module may, for example, be capable of identifying speech of each of multiple teleconference participants in an individual decoded uplink data packet stream. In some examples, the speaker diarization module may be capable of generating a speaker diary indicating times at which each of the multiple teleconference participants were speaking. The speaker diarization module may be capable of providing the speaker diary to the joint analysis module.

In some implementations, the joint analysis module may be capable of determining conversational dynamics data. For example, the conversational dynamics data may include data indicating the frequency and duration of conference participant speech, data indicating instances of conference participant doubletalk during which at least two conference participants are speaking simultaneously and/or data indicating instances of conference participant conversations.

In some alternative implementations, an apparatus also may include an interface system such as those described above. The apparatus also may include a control system such as those described above. According to some such implementations, the control system may be capable of receiving, via the interface system, audio data corresponding to a recording of a conference involving a plurality of conference participants. The audio data may include audio data from multiple endpoints. The audio data for each of the multiple endpoints may have been recorded separately. Alternatively, or additionally, the audio data may include audio data from a single endpoint corresponding to multiple conference participants. The audio data may include spatial information for each conference participant of the multiple conference participants.

In some implementations, the control system may be capable of analyzing the audio data to determine conversational dynamics data. In some examples, the conversational dynamics data may include data indicating the frequency and duration of conference participant speech, data indicating instances of conference participant doubletalk during which at least two conference participants are speaking simultaneously and/or and data indicating instances of conference participant conversations.

According to some examples, the control system may be capable of applying the conversational dynamics data as one or more variables of a spatial optimization cost function of a vector describing a virtual conference participant position for each of the conference participants in a virtual acoustic space. The control system may, for example, be capable of applying an optimization technique to the spatial optimization cost function to determine a locally optimal solution. The control system may be capable of assigning the virtual conference participant positions in the virtual acoustic space based, at least in part, on the locally optimal solution.

According to some implementations, the virtual acoustic space may be determined relative to a position of a virtual listener's head in the virtual acoustic space. In some such implementations, the spatial optimization cost function may apply a penalty for placing conference participants who are involved in conference participant doubletalk at virtual conference participant positions that are on, or within a predetermined angular distance from, a cone of confusion. The cone of confusion may be defined relative to the position of the virtual listener's head. Circular conical slices through the cone of confusion may have identical inter-aural time differences.

In some examples, the spatial optimization cost function may apply a penalty for placing conference participants who are involved in a conference participant conversation with one another at virtual conference participant positions that are on, or within a predetermined angular distance from, a cone of confusion. According to some examples, the spatial optimization cost function may apply a penalty for placing conference participants who speak frequently at virtual conference participant positions that are beside, behind, above, or below the position of the virtual listener's head. In some implementations, the spatial optimization cost function may apply a penalty for placing conference participants who speak frequently at virtual conference participant positions that are farther from the position of the virtual listener's head than the virtual conference participant positions of conference participants who speak less frequently. However, according to some implementations, assigning a virtual conference participant position may involve selecting a virtual conference participant position from a set of predetermined virtual conference participant positions.

In some alternative implementations, an apparatus also may include an interface system such as those described above. The apparatus also may include a control system such as those described above. According to some such implementations, the control system may be capable of receiving, via the interface system, audio data corresponding to a recording of a conference involving a plurality of conference participants. The audio data may include audio data from multiple endpoints. The audio data for each of the multiple endpoints may have been recorded separately. Alternatively, or additionally, the audio data may include audio data from a single endpoint corresponding to multiple conference participants. The audio data may include spatial information for each conference participant of the multiple conference participants.

According to some implementations, the control system may be capable of rendering the conference participant speech data for each of the conference participants to a separate virtual conference participant position in a virtual acoustic space. In some implementations, the control system may be capable of scheduling the conference participant speech for playback such that an amount of playback overlap between at least two output talkspurts of the conference participant speech is greater than an amount of original overlap between two corresponding input talkspurts of the conference recording.

In some examples, the scheduling may be performed, at least in part, according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero.

According to some examples, the control system may be capable of analyzing the audio data to determine conversational dynamics data. The conversational dynamics data may include data indicating the frequency and duration of conference participant speech, data indicating instances of conference participant doubletalk during which at least two conference participants are speaking simultaneously and/or data indicating instances of conference participant conversations.

In some examples, the control system may be capable of applying the conversational dynamics data as one or more variables of a spatial optimization cost function of a vector describing the virtual conference participant position for each of the conference participants in the virtual acoustic space. In some implementations, the control system may be capable of applying an optimization technique to the spatial optimization cost function to determine a locally optimal solution. According to some implementations, the control system may be capable of assigning the virtual conference participant positions in the virtual acoustic space based, at least in part, on the locally optimal solution.

In some alternative implementations, an apparatus also may include an interface system such as those described above. The apparatus also may include a control system such as those described above. According to some such implementations, the control system may be capable of receiving, via the interface system, audio data corresponding to a recording of a conference involving a plurality of conference participants. The audio data may include audio data from multiple endpoints. The audio data for each of the multiple endpoints may have been recorded separately. Alternatively, or additionally, the audio data may include audio data from a single endpoint corresponding to multiple conference participants. The audio data may include information for identifying conference participant speech for each conference participant of the multiple conference participants.

According to some implementations, the control system may be capable of analyzing conversational dynamics of the conference recording to determine conversational dynamics data. In some examples, the control system may be capable of searching the conference recording to determine instances of each of a plurality of segment classifications. Each of the segment classifications may be based, at least in part, on the conversational dynamics data.

According to some such examples, the control system may be capable of segmenting the conference recording into a plurality of segments. Each of the segments may correspond with a time interval and at least one of the segment classifications. In some examples, the control system may be capable of performing the searching and segmenting processes multiple times at different time scales.

In some implementations, the searching and segmenting processes may be based, at least in part, on a hierarchy of segment classifications. According to some such implementations, the hierarchy of segment classifications may be based upon one or more criteria, such as a level of confidence with which segments of a particular segment classification may be identified, a level of confidence with which a start time of a segment may be determined, a level of confidence with which an end time of a segment may be determined and/or a likelihood that a particular segment classification includes conference participant speech corresponding to a conference topic.

In some examples, the control system may be capable of determining instances of the segment classifications according to a set of rules. According to some such examples, the rules may be based on one or more conversational dynamics data types, such as a doubletalk ratio indicating a fraction of speech time in a time interval during which at least two conference participants are speaking simultaneously, a speech density metric indicating a fraction of the time interval during which there is any conference participant speech and/or a dominance metric indicating a fraction of total speech uttered by a dominant conference participant during the time interval. The dominant conference participant may be a conference participant who spoke the most during the time interval.

In some alternative implementations, an apparatus also may include an interface system such as those described above. The apparatus also may include a control system such as those described above. According to some such implementations, the control system may be capable of receiving (e.g., via the interface system) speech recognition results data for at least a portion of a recording of a conference involving a plurality of conference participants. In some examples, the speech recognition results data may include a plurality of speech recognition lattices and a word recognition confidence score for each of a plurality of hypothesized words of the speech recognition lattices. The word recognition confidence score may, for example, correspond with a likelihood of a hypothesized word correctly corresponding with an actual word spoken by a conference participant during the conference.

In some implementations, the control system may be capable of determining a primary word candidate and one or more alternative word hypotheses for each of a plurality of hypothesized words in the speech recognition lattices. The primary word candidate may have a word recognition confidence score indicating a higher likelihood of correctly corresponding with the actual word spoken by the conference participant during the conference than a word recognition confidence score of any of the one or more alternative word hypotheses.

According to some examples, the control system may be capable of calculating a term frequency metric of the primary word candidates and the alternative word hypotheses. In some instances, the term frequency metric may be based, at least in part, on a number of occurrences of a hypothesized word in the speech recognition lattices. Alternatively, or additionally, the term frequency metric may be based, at least in part, on the word recognition confidence score.

According to some implementations, the control system may be capable of sorting the primary word candidates and alternative word hypotheses according to the term frequency metric. According to some examples, the control system may be capable of including the alternative word hypotheses in an alternative hypothesis list. According to some such examples, the control system may be capable of re-scoring at least some hypothesized words of the speech recognition lattices according to the alternative hypothesis list.

In some examples, the control system may be capable of forming a word list. The word list may include primary word candidates and a term frequency metric for each of the primary word candidates. According to some examples, the control system may be capable of generating a topic list of conference topics based, at least in part, on the word list. In some implementations, generating the topic list may involve determining a hypernym of at least one word of the word list. Generating the topic list may involve determining a topic score that includes a hypernym score.

In some alternative implementations, an apparatus also may include an interface system such as those described above. The apparatus also may include a control system such as those described above. According to some such implementations, the control system may be capable of receiving (e.g., via the interface system) audio data corresponding to a recording of at least one conference involving a plurality of conference participants. The audio data may include conference participant speech data from multiple endpoints, recorded separately and/or conference participant speech data from a single endpoint corresponding to multiple conference participants, which may include spatial information for each conference participant of the multiple conference participants.

According to some implementations, the control system may be capable of determining search results corresponding to a search of the audio data based on one or more search parameters. The search results may correspond to at least two instances of conference participant speech in the audio data. The at least two instances of conference participant speech may include at least a first instance of speech uttered by a first conference participant and at least a second instance of speech uttered by a second conference participant.

In some examples, the control system may be capable of rendering the instances of conference participant speech to at least two different virtual conference participant positions of a virtual acoustic space, such that the first instance of speech is rendered to a first virtual conference participant position and the second instance of speech is rendered to a second virtual conference participant position. According to some such examples, the control system may be capable of scheduling at least a portion of the instances of conference participant speech for simultaneous playback, to produce playback audio data.

In some alternative implementations, an apparatus also may include an interface system such as those described above. The apparatus also may include a control system such as those described above. According to some such implementations, the control system may be capable of receiving (e.g., via the interface system) audio data corresponding to a recording of a conference. The audio data may include data corresponding to conference participant speech of each of a plurality of conference participants.

According to some examples, the control system may be capable of selecting only a portion of the conference participant speech as playback audio data. According to some such examples, the control system may be capable of providing (e.g., via the interface system) the playback audio data to a speaker system for playback.

According to some implementations, the selecting process may involve a topic selection process of selecting conference participant speech for playback according to estimated relevance of the conference participant speech to one or more conference topics. In some implementations, the selecting process may involve a topic selection process of selecting conference participant speech for playback according to estimated relevance of the conference participant speech to one or more topics of a conference segment.

In some instances, the selecting process may involve removing input talkspurts having an input talkspurt time duration that is below a threshold input talkspurt time duration. According to some examples, the selecting process may involve a talkspurt filtering process of removing a portion of input talkspurts having an input talkspurt time duration that is at or above the threshold input talkspurt time duration.

Alternatively, or additionally, the selecting process may involve an acoustic feature selection process of selecting conference participant speech for playback according to at least one acoustic feature. In some examples, the selecting may involve an iterative process.

According to some examples, the control system may be capable of receiving (e.g., via the interface system) an indication of a target playback time duration. According to some such examples, the selecting process may involve making a time duration of the playback audio data within a threshold time difference and/or or a threshold time percentage of the target playback time duration. In some examples, the time duration of the playback audio data may be determined, at least in part, by multiplying a time duration of at least one selected portion of the conference participant speech by an acceleration coefficient.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as those disclosed herein.

According to some examples, the software may include instructions for receiving teleconference audio data during a teleconference. The teleconference audio data may include a plurality of individual uplink data packet streams. Each uplink data packet stream may correspond to a telephone endpoint used by one or more teleconference participants. In some implementations the software may include instructions for sending the teleconference audio data to a memory system as individual uplink data packet streams.

In some examples, the individual uplink data packet streams may be individual encoded uplink data packet streams. According to some examples, at least one of the uplink data packet streams may include at least one data packet that was received after a mouth-to-ear latency time threshold of the teleconference and was therefore not used for reproducing audio data during the teleconference. According to some such examples, at least one of the uplink data packet streams may correspond to multiple teleconference participants and may include spatial information regarding each of the multiple participants.

In some implementations, the software may include instructions for receiving audio data corresponding to a recording of a conference involving a plurality of conference participants. According to some examples, the audio data may include audio data from multiple endpoints. The audio data for each of the multiple endpoints may have been recorded separately. Alternatively, or additionally, the audio data may include audio data from a single endpoint corresponding to multiple conference participants and may include spatial information for each conference participant of the multiple conference participants.

According to some implementations, the software may include instructions for analyzing the audio data to determine conversational dynamics data. The conversational dynamics data may, for example, include data indicating the frequency and duration of conference participant speech, data indicating instances of conference participant doubletalk during which at least two conference participants are speaking simultaneously and/or data indicating instances of conference participant conversations.

In some instances, the software may include instructions for applying the conversational dynamics data as one or more variables of a spatial optimization cost function of a vector describing a virtual conference participant position for each of the conference participants in a virtual acoustic space. According to some examples, the software may include instructions for applying an optimization technique to the spatial optimization cost function to determine a locally optimal solution. According to some such examples, the software may include instructions for assigning the virtual conference participant positions in the virtual acoustic space based, at least in part, on the locally optimal solution.

In some implementations, the virtual acoustic space may be determined relative to a position of a virtual listener's head in the virtual acoustic space. According to some such implementations, the spatial optimization cost function may apply a penalty for placing conference participants who are involved in conference participant doubletalk at virtual conference participant positions that are on, or within a predetermined angular distance from, a cone of confusion defined relative to the position of the virtual listener's head. Circular conical slices through the cone of confusion may have identical inter-aural time differences. In some examples, the spatial optimization cost function may apply a penalty for placing conference participants who are involved in a conference participant conversation with one another at virtual conference participant positions that are on, or within a predetermined angular distance from, a cone of confusion.

According to some examples, analyzing the audio data may involve determining which conference participants, if any, have perceptually similar voices. In some such examples, the spatial optimization cost function may apply a penalty for placing conference participants with perceptually similar voices at virtual conference participant positions that are on, or within a predetermined angular distance from, a cone of confusion.

In some examples, the spatial optimization cost function may apply a penalty for placing conference participants who speak frequently at virtual conference participant positions that are beside, behind, above, or below the position of the virtual listener's head. In some instances, the spatial optimization cost function may apply a penalty for placing conference participants who speak frequently at virtual conference participant positions that are farther from the position of the virtual listener's head than the virtual conference participant positions of conference participants who speak less frequently. In some implementations, the spatial optimization cost function may apply a penalty for placing conference participants who speak infrequently at virtual conference participant positions that are not beside, behind, above or below the position of the virtual listener's head.

According to some examples, the optimization technique may involve a gradient descent technique, conjugate gradient technique, Newton's method, the Broyden-Fletcher-Goldfarb-Shanno algorithm; a genetic algorithm, an algorithm for simulated annealing, an ant colony optimization method and/or a Monte Carlo method. In some examples, assigning a virtual conference participant position may involve selecting a virtual conference participant position from a set of predetermined virtual conference participant positions.

In some implementations, the software may include instructions for receiving audio data corresponding to a recording of a conference involving a plurality of conference participants. According to some examples, the audio data may include audio data from multiple endpoints. The audio data for each of the multiple endpoints may have been recorded separately. Alternatively, or additionally, the audio data may include audio data from a single endpoint corresponding to multiple conference participants and may include spatial information for each conference participant of the multiple conference participants.

According to some implementations, the software may include instructions for rendering the conference participant speech data in a virtual acoustic space such that each of the conference participants has a respective different virtual conference participant position. In some examples, the software may include instructions for scheduling the conference participant speech for playback such that an amount of playback overlap between at least two output talkspurts of the conference participant speech is different from (e.g., greater than) an amount of original overlap between two corresponding input talkspurts of the conference recording.

According to some examples, the software may include instructions for performing the scheduling process, at least in part, according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero.

According to some implementations, the set of perceptually-motivated rules may include a rule allowing the concurrent playback of entire presentations from different conference participants. In some implementations, a presentation may correspond with a time interval of the conference participant speech during which a speech density metric is greater than or equal to a silence threshold, a doubletalk ratio is less than or equal to a discussion threshold and a dominance metric is greater than a presentation threshold. The doubletalk ratio may indicate a fraction of speech time in the time interval during which at least two conference participants are speaking simultaneously. The speech density metric may indicate a fraction of the time interval during which there is any conference participant speech. The dominance metric may indicate a fraction of total speech uttered by a dominant conference participant during the time interval. The dominant conference participant may be a conference participant who spoke the most during the time interval.

In some examples, at least some of the conference participant speech may be scheduled to be played back at a faster rate than the rate at which the conference participant speech was recoded. According to some such examples, scheduling the playback of the speech at the faster rate may be accomplished by using a WSOLA (Waveform Similarity Based Overlap Add) technique.

According to some implementations, the software may include instructions for analyzing the audio data to determine conversational dynamics data. The conversational dynamics data may include data indicating the frequency and duration of conference participant speech, data indicating instances of conference participant doubletalk during which at least two conference participants are speaking simultaneously and/or data indicating instances of conference participant conversations. In some examples, the software may include instructions for applying the conversational dynamics data as one or more variables of a spatial optimization cost function of a vector describing the virtual conference participant position for each of the conference participants in the virtual acoustic space. In some implementations, the software may include instructions for applying an optimization technique to the spatial optimization cost function to determine a locally optimal solution and assigning the virtual conference participant positions in the virtual acoustic space based, at least in part, on the locally optimal solution.

In some implementations, the software may include instructions for receiving audio data corresponding to a recording of a conference involving a plurality of conference participants. According to some examples, the audio data may include audio data from multiple endpoints. The audio data for each of the multiple endpoints may have been recorded separately. Alternatively, or additionally, the audio data may include audio data from a single endpoint corresponding to multiple conference participants and may include information for identifying conference participant speech for each conference participant of the multiple conference participants.

According to some examples, the software may include instructions for analyzing conversational dynamics of the conference recording to determine conversational dynamics data. In some examples, the software may include instructions for searching the conference recording to determine instances of each of a plurality of segment classifications. Each of the segment classifications may be based, at least in part, on the conversational dynamics data. According to some such examples, the software may include instructions for segmenting the conference recording into a plurality of segments. Each of the segments may correspond with a time interval and at least one of the segment classifications. According to some implementations, the software may include instructions for performing the searching and segmenting processes multiple times at different time scales.

In some examples, the searching and segmenting processes may be based, at least in part, on a hierarchy of segment classifications. According to some such examples, the hierarchy of segment classifications may be based, at least in part, upon a level of confidence with which segments of a particular segment classification may be identified, a level of confidence with which a start time of a segment may be determined, a level of confidence with which an end time of a segment may be determined and/or a likelihood that a particular segment classification includes conference participant speech corresponding to a conference topic.

According to some implementations, the software may include instructions for determining instances of the segment classifications according to a set of rules. In some such implementations, the rules may be based on one or more conversational dynamics data types, such as a doubletalk ratio indicating a fraction of speech time in a time interval during which at least two conference participants are speaking simultaneously, a speech density metric indicating a fraction of the time interval during which there is any conference participant speech and/or a dominance metric indicating a fraction of total speech uttered by a dominant conference participant during the time interval. The dominant conference participant may be a conference participant who spoke the most during the time interval.

In some implementations, the software may include instructions for receiving speech recognition results data for at least a portion of a conference recording of a conference involving a plurality of conference participants. In some examples, the speech recognition results data may include a plurality of speech recognition lattices. The speech recognition results data may include a word recognition confidence score for each of a plurality of hypothesized words of the speech recognition lattices. According to some such examples, the word recognition confidence score may correspond with a likelihood of a hypothesized word correctly corresponding with an actual word spoken by a conference participant during the conference.

According to some examples, the software may include instructions for determining a primary word candidate and one or more alternative word hypotheses for each of a plurality of hypothesized words in the speech recognition lattices. The primary word candidate may have a word recognition confidence score indicating a higher likelihood of correctly corresponding with the actual word spoken by the conference participant during the conference than a word recognition confidence score of any of the one or more alternative word hypotheses.

According to some implementations, the software may include instructions for calculating a term frequency metric of the primary word candidates and the alternative word hypotheses. In some such implementations, the term frequency metric may be based, at least in part, on a number of occurrences of a hypothesized word in the speech recognition lattices and the word recognition confidence score.

In some examples, the software may include instructions for sorting the primary word candidates and alternative word hypotheses according to the term frequency metric. According to some such examples, the software may include instructions for including the alternative word hypotheses in an alternative hypothesis list. In some such implementations, the software may include instructions for re-scoring at least some hypothesized words of the speech recognition lattices according to the alternative hypothesis list.

According to some examples, the software may include instructions for forming a word list. The word list may, for example, include primary word candidates and a term frequency metric for each of the primary word candidates. According to some such examples, the software may include instructions for generating a topic list of conference topics based, at least in part, on the word list.

In some implementations, generating the topic list may involve determining a hypernym of at least one word of the word list. According to some such implementations, generating the topic list may involve determining a topic score that includes a hypernym score.

In some implementations, the software may include instructions for receiving audio data corresponding to a recording of at least one conference involving a plurality of conference participants. The audio data may include conference participant speech data from multiple endpoints, recorded separately and/or conference participant speech data from a single endpoint corresponding to multiple conference participants, which may include spatial information for each conference participant of the multiple conference participants.

According to some examples, the software may include instructions for determining search results based on a search of the audio data. The search may be, or may have been, based on one or more search parameters. The search results may correspond to at least two instances of conference participant speech in the audio data. The instances of conference participant speech may, for example, include talkspurts and/or portions of talkspurts. The instances of conference participant speech may include a first instance of speech uttered by a first conference participant and a second instance of speech uttered by a second conference participant.

In some examples, the software may include instructions for rendering the instances of conference participant speech to at least two different virtual conference participant positions of a virtual acoustic space, such that the first instance of speech is rendered to a first virtual conference participant position and the second instance of speech is rendered to a second virtual conference participant position. According to some such examples, the software may include instructions for scheduling at least a portion of the instances of conference participant speech for simultaneous playback, to produce playback audio data.

According to some implementations, determining the search results may involve receiving search results. For example, determining the search results may involve receiving the search results resulting from a search performed by another device, e.g., by a server.

However, in some implementations determining the search results may involve performing a search. According to some examples, determining the search results may involve performing a concurrent search of the audio data regarding multiple features. According to some implementations, the multiple features may include two or more features selected from a set of features. The set of features may include words, conference segments, time, conference participant emotion, endpoint location and/or endpoint type. In some implementations, determining the search results may involve performing a search of audio data that corresponds to recordings of multiple conferences. In some examples, the scheduling process may involve scheduling the instances of conference participant speech for playback based, at least in part, on a search relevance metric.

According to some examples, the software may include instructions for modifying a start time or an end time of at least one of the instances of conference participant speech. In some examples, the modifying process may involve expanding a time interval corresponding to an instance of conference participant speech. According to some examples, the modifying process may involve merging two or more instances of conference participant speech, corresponding with a single conference endpoint, that overlap in time after the expanding.

In some examples, the software may include instructions for scheduling an instance of conference participant speech that did not previously overlap in time to be played back overlapped in time. Alternatively, or additionally, the software may include instructions for scheduling an instance of conference participant speech that was previously overlapped in time to be played back further overlapped in time.

According to some implementations, the scheduling may be performed according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero.

In some implementations, the software may include instructions for receiving audio data corresponding to a recording of a conference. The audio data may include data corresponding to conference participant speech of each of a plurality of conference participants. In some examples, the software may include instructions for selecting only a portion of the conference participant speech as playback audio data.

According to some implementations, the selecting process may involve a topic selection process of selecting conference participant speech for playback according to estimated relevance of the conference participant speech to one or more conference topics. In some implementations, the selecting process may involve a topic selection process of selecting conference participant speech for playback according to estimated relevance of the conference participant speech to one or more topics of a conference segment.

In some instances, the selecting process may involve removing input talkspurts having an input talkspurt time duration that is below a threshold input talkspurt time duration. According to some examples, the selecting process may involve a talkspurt filtering process of removing a portion of input talkspurts having an input talkspurt time duration that is at or above the threshold input talkspurt time duration.

Alternatively, or additionally, the selecting process may involve an acoustic feature selection process of selecting conference participant speech for playback according to at least one acoustic feature. In some examples, the selecting may involve an iterative process. Some such implementations may involve providing the playback audio data to a speaker system for playback.

According to some implementations, the software may include instructions for receiving an indication of a target playback time duration. According to some such examples, the selecting process may involve making a time duration of the playback audio data within a threshold time difference and/or or a threshold time percentage of the target playback time duration. In some examples, the time duration of the playback audio data may be determined, at least in part, by multiplying a time duration of at least one selected portion of the conference participant speech by an acceleration coefficient.

According to some examples, the audio data may include conference participant speech data from multiple endpoints, recorded separately or conference participant speech data from a single endpoint corresponding to multiple conference participants, which may include spatial information for each conference participant of the multiple conference participants. According to some such examples, the software may include instructions for rendering the playback audio data in a virtual acoustic space such that each of the conference participants whose speech is included in the playback audio data has a respective different virtual conference participant position.

According to some implementations, the selecting process may involve a topic section process. According to some such examples, the topic section process may involve receiving a topic list of conference topics and determining a list of selected conference topics. The list of selected conference topics may be a subset of the conference topics.

In some examples, the software may include instructions for receiving topic ranking data, which may indicate an estimated relevance of each conference topic on the topic list. Determining the list of selected conference topics may be based, at least in part, on the topic ranking data.

According to some implementations, the selecting process may involve a talkspurt filtering process. The talkspurt filtering process may, for example, involve removing an initial portion of an input talkspurt. The initial portion may be a time interval from an input talkspurt start time to an output talkspurt start time. In some instances, the software may include instructions for calculating an output talkspurt time duration based, at least in part, on an input talkspurt time duration.

According to some such examples, the software may include instructions for determining whether the output talkspurt time duration exceeds an output talkspurt time threshold. If it is determined that the output talkspurt time duration exceeds an output talkspurt time threshold, the talkspurt filtering process may involve generating multiple instances of conference participant speech for a single input talkspurt. According to some such examples, at least one of the multiple instances of conference participant speech may have an end time that corresponds with an input talkspurt end time.

According to some implementations, the selecting process may involve an acoustic feature selection process. In some examples, the acoustic feature selection process may involve determining at least one acoustic feature, such as pitch variance, speech rate and/or loudness.

In some implementations, the software may include instructions for modifying a start time or an end time of at least one of the instances of conference participant speech. In some examples, the modifying process may involve expanding a time interval corresponding to an instance of conference participant speech. According to some examples, the modifying process may involve merging two or more instances of conference participant speech, corresponding with a single conference endpoint, that overlap in time after the expanding.

In some examples, the software may include instructions for scheduling an instance of conference participant speech that did not previously overlap in time to be played back overlapped in time. Alternatively, or additionally, the software may include instructions for scheduling an instance of conference participant speech that was previously overlapped in time to be played back further overlapped in time.

According to some examples, the scheduling may be performed according to a set of perceptually-motivated rules. In some implementations, the set of perceptually-motivated rules may include a rule indicating that two output talkspurts of a single conference participant should not overlap in time. The set of perceptually-motivated rules may include a rule indicating that two output talkspurts should not overlap in time if the two output talkspurts correspond to a single endpoint.

According to some implementations, given two consecutive input talkspurts A and B, A having occurred before B, the set of perceptually-motivated rules may include a rule allowing the playback of an output talkspurt corresponding to B to begin before the playback of an output talkspurt corresponding to A is complete, but not before the playback of the output talkspurt corresponding to A has started. The set of perceptually-motivated rules may include a rule allowing the playback of an output talkspurt corresponding to B to begin no sooner than a time T before the playback of an output talkspurt corresponding to A is complete. In some such examples, T may be greater than zero. Some implementations may involve scheduling instances of conference participant speech for playback based, at least in part, on a search relevance metric.

According to some implementations, the software may include instructions for analyzing the audio data to determine conversational dynamics data. The conversational dynamics data may, for example, include data indicating the frequency and duration of conference participant speech, data indicating instances of conference participant double-talk during which at least two conference participants are speaking simultaneously and/or data indicating instances of conference participant conversations.

In some instances, the software may include instructions for applying the conversational dynamics data as one or more variables of a spatial optimization cost function of a vector describing a virtual conference participant position for each of the conference participants in a virtual acoustic space. According to some examples, the software may include instructions for applying an optimization technique to the spatial optimization cost function to determine a locally optimal solution. According to some such examples, the software may include instructions for assigning the virtual conference participant positions in the virtual acoustic space based, at least in part, on the locally optimal solution.

In some implementations, the software may include instructions for controlling a display to provide a graphical user interface. According to some implementations, the instructions for controlling the display may include instructions for making a presentation of conference participants. In some examples, the instructions for controlling the display may include instructions for making a presentation of conference segments.

In some examples, the software may include instructions for receiving input corresponding to a user's interaction with the graphical user interface and processing the audio data based, at least in part, on the input. In some examples, the input may correspond to an indication of a target playback time duration. According to some implementations, the software may include instructions for providing the playback audio data to a speaker system.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 27, which includes

FIG. 28, which includes

FIG. 29, which includes

Like reference numbers and designations in the various drawings indicate like elements.

DESCRIPTION OF EXAMPLE EMBODIMENTS

Figure 1A:
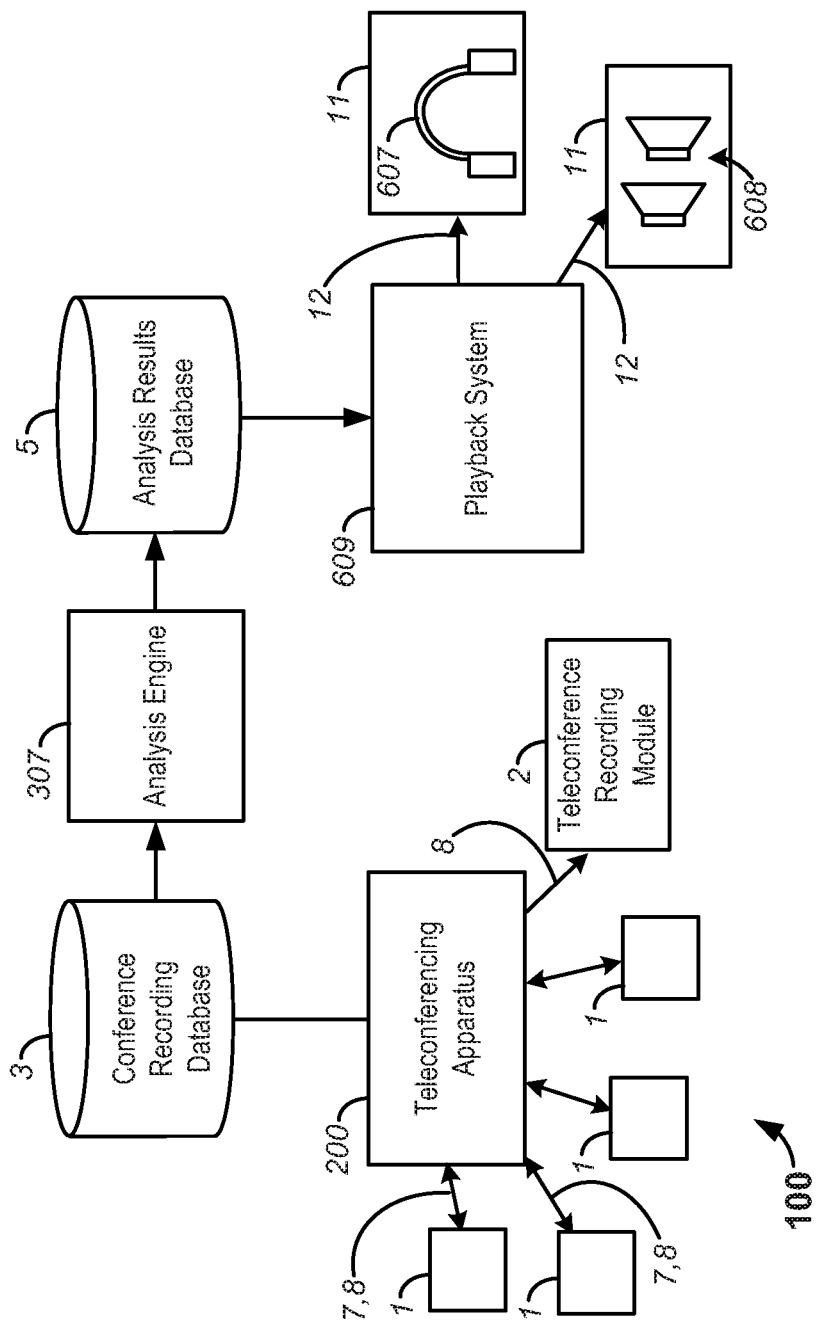
FIG. 1A shows examples of components of a teleconferencing system.

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular examples of audio data processing in the teleconferencing context, the teachings herein are widely applicable to other known audio data processing contexts, such as processing audio data corresponding to in-person conferences. Such conferences may, for example, include academic and/or professional conferences, stock broker calls, doctor/client visits, personal diarization (e.g., via a portable recording device such as a wearable recording device), etc.

Moreover, the described embodiments may be implemented in a variety of hardware, software, firmware, etc. For example, aspects of the present application may be embodied, at least in part, in an apparatus (a teleconferencing bridge and/or server, an analysis system, a playback system, a personal computer, such as a desktop, laptop, or tablet computer, a telephone, such as a desktop telephone, a smart phone or other cellular telephone, a television set-top box, a digital media player, etc.), a method, a computer program product, in a system that includes more than one apparatus (including but not limited to a teleconferencing system), etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

Some aspects of the present disclosure involve the recording, processing and playback of audio data corresponding to conferences, such as teleconferences. In some teleconference implementations, the audio experience heard when a recording of the conference is played back may be substantially different from the audio experience of an individual conference participant during the original teleconference. In some implementations, the recorded audio data may include at least some audio data that was not available during the teleconference. In some examples, the spatial and/or temporal characteristics of the played-back audio data may be different from that of the audio heard by participants of the teleconference.

FIG. 1A shows examples of components of a teleconferencing system. The components of the teleconferencing system 100 may be implemented via hardware, via software stored on non-transitory media, via firmware and/or by combinations thereof. The types and numbers of components shown in FIG. 1A are merely shown by way of example. Alternative implementations may include more, fewer and/or different components.

In this example, the teleconferencing system 100 includes a teleconferencing apparatus 200 that is capable of providing the functionality of a teleconferencing server according to a packet-based protocol, which is a VoIP (Voice over Internet Protocol) in this implementation. At least some of the telephone endpoints 1 may include features that allow conference participants to use a software application running on a desktop or laptop computer, a smartphone, a dedicated VoIP telephone device or another such device to act as a telephony client, connecting to the teleconferencing server over the Internet.

However, some of the telephone endpoints 1 may not include such features. Accordingly, the teleconferencing system 100 may provide access via the PSTN (Public Switched Telephone Network), e.g., in the form of a bridge that transforms the traditional telephony streams from the PSTN into VoIP data packet streams.

In some implementations, during a teleconference the teleconferencing apparatus 200 receives a plurality of individual uplink data packet streams 7 and transmits a plurality of individual downlink data packet streams 8 to and from a plurality of telephone endpoints 1. The telephone endpoints 1 may include telephones, personal computers, mobile electronic devices (e.g., cellular telephones, smart phones, tablets, etc.) or other appropriate devices. Some of the telephone endpoints 1 may include headsets, such as stereophonic headsets. Other telephone endpoints 1 may include a traditional telephone handset. Still other telephone endpoints 1 may include teleconferencing speaker phones, which may be used by multiple conference participants. Accordingly, the individual uplink data packet streams 7 received from some such telephone endpoints 1 may include teleconference audio data from multiple conference participants.

In this example, one of the telephone endpoints includes a teleconference recording module 2. Accordingly, the teleconference recording module 2 receives a downlink data packet stream 8 but does not transmit an uplink data packet stream 7. Although shown as a separate apparatus in FIG. 1A, teleconference recording module 2 may be implemented as hardware, software and/or firmware. In some examples, the teleconference recording module 2 may be implemented via a hardware, software and/or firmware of a teleconferencing server. However, the teleconference recording module 2 is purely optional. Other implementations of the teleconferencing system 100 do not include the teleconference recording module 2.

Voice transmission over packet networks is subject to delay variation, commonly known as jitter. Jitter may, for example, be measured in terms of inter-arrival time (IAT) variation or packet delay variation (PDV). IAT variation may be measured according to the receive time difference of adjacent packets. PDV may, for example, be measured by reference to time intervals from a datum or "anchor" packet receive time. In Internet Protocol (IP)-based networks, a fixed delay can be attributed to algorithmic, processing and propagation delays due to material and/or distance, whereas a variable delay may be caused by the fluctuation of IP network traffic, different transmission paths over the Internet, etc.

Teleconferencing servers generally rely on a "jitter buffer" to counter the negative impact of jitter. By introducing an additional delay between the time a packet of audio data is received and the time that the packet is reproduced, a jitter buffer can transform an uneven flow of arriving packets into a more regular flow of packets, such that delay variations will not cause perceptual sound quality degradation to the end users. However, voice communication is highly delay-sensitive. According to ITU Recommendation G.114, for example, one-way delay (sometimes referred to herein as a "mouth-to-ear latency time threshold") should be kept below 150 milliseconds (ms) for normal conversation, with above 400 ms being considered unacceptable. Typical latency targets for teleconferencing are lower than 150 ms, e.g., 100 ms or below.

The low latency requirement may place an upper limit on how long the teleconferencing apparatus 200 may wait for an expected uplink data packet to arrive without annoying conference participants. Uplink data packets that arrive too late for reproduction during a teleconference will not be provided to the telephone endpoints 1 or the teleconference recording module 2. Instead, the corresponding downlink data packet streams 8 will be provided to the telephone endpoints 1 and the teleconference recording module 2 with missing or late data packets dropped. In the context of this disclosure, a "late" data packet is a data packet that arrived too late to be provided to the telephone endpoints 1 or the teleconference recording module 2 during a teleconference.

However, in various implementations disclosed herein, the teleconferencing apparatus 200 may be capable of recording more complete uplink data packet streams 7. In some implementations, the teleconferencing apparatus 200 may be capable of including late data packets in the recorded uplink data packet streams 7 that were received after a mouth-to-ear latency time threshold of the teleconference and therefore were not used for reproducing audio data to conference participants during the teleconference. In some such implementations, the teleconferencing apparatus 200 may be capable of determining that a late data packet of an incomplete uplink data packet stream has not been received from a telephone endpoint within a late packet time threshold. The late packet time threshold may be greater than or equal to a mouth-to-ear latency time threshold of the teleconference. For example, in some implementations the late packet time threshold may be greater than or equal to 200 ms, 400 ms, 500 ms, 1 second or more.

In some examples, the teleconferencing apparatus 200 may be capable of determining that a data packet of an incomplete uplink data packet stream has not been received from a telephone endpoint within a missing packet time threshold, greater than the late packet time threshold. In some such examples, the teleconferencing apparatus 200 may be capable of transmitting a request, to the telephone endpoint, to re-send a missing data packet. Like the late data packets, the missing data packets would not have been recorded by the teleconference recording module 2. The missing packet time threshold may, in some implementations, be hundreds of milliseconds or even several seconds, e.g., 5 seconds, 10 seconds, 20 seconds, 30 seconds, etc. In some implementations, the missing packet time threshold may be one minute or longer, e.g., 2, minutes, 3 minutes, 4, minutes, 5 minutes, etc.

In this example, the teleconferencing apparatus 200 is capable of recording the individual uplink data packet streams 7 and providing them to the conference recording database 3 as individual uplink data packet streams. The conference recording database 3 may be stored in one or more storage systems, which may or may not be in the same location as the teleconferencing apparatus 200, depending on the particular implementation. Accordingly, in some implementations the individual uplink data packet streams that are recorded by the teleconferencing apparatus 200 and stored in the conference recording database 3 may be more complete than the data packet streams available during the teleconference.

In the implementation shown in FIG. 1A, the analysis engine 307 is capable of analyzing and processing the recorded uplink data packet streams to prepare them for playback. In this example, the analysis results from the analysis engine 307 are stored in the analysis results database 5, ready for playback by the playback system 609. In some examples, the playback system 609 may include a playback server, which may be capable of streaming analysis results over a network 12 (e.g., the Internet). In FIG. 1A, the playback system 609 is shown streaming analysis results to a plurality of listening stations 11 (each of which may include one or more playback software applications running on a local device, such as a computer). Here, one of the listening stations 11 includes headphones 607 and the other listening station 11 includes a speaker array 608.

As noted above, due to latency issues the playback system 609 may have a more complete set of data packets available for reproduction than were available during the teleconference. In some implementations, there may be other differences and/or additional differences between the teleconference audio data reproduced by the playback system 609 and the teleconference audio data available for reproduction during the teleconference. For example, a teleconferencing system generally limits the data rates for uplink and downlink data packets to a rate that can be reliably maintained by the network. Furthermore, there is often a financial incentive to keep the data rate down, because the teleconference service provider may need to provision more expensive network resources if the combined data rate of the system is too high.

In addition to data rate constraints, there may be practical constraints on the number of IP packets that can be reliably handled each second by network components such as switches and routers, and also by software components such as the TCP/IP stack in the kernel of a teleconferencing server's host operating system. Such constraints may have implications for how the data packet streams corresponding to teleconferencing audio data are encoded and partitioned into IP packets.

A teleconferencing server needs to process data packets and perform mixing operations, etc., quickly enough to avoid perceptual quality degradation to conference participants, and generally must do so with an upper bound on computational resources. The smaller the computational overhead that is required to service a single conference participant, the larger the number of conference participants that can be handled in real time by a single piece of server equipment. Therefore keeping the computational overhead relatively small provides economic benefits to teleconference service providers.

Most teleconference systems are so-called "reservationless" systems. This means that the teleconferencing server does not "know" ahead of time how many teleconferences it will be expected to host at once, or how many conference participants will connect to any given teleconference. At any time during a teleconference, the server has neither an indication of how many additional conference participants may subsequently join the teleconference nor an indication of how many of the current conference participants may leave the teleconference early.

Moreover, a teleconferencing server will generally not have meeting dynamics information prior to a teleconference regarding of what kind of human interaction is expected to occur during a teleconference. For example, it will not be known in advance whether one or more conference participants will dominate the conversation, and if so, which conference participant(s). At any instant in time, the teleconferencing server must decide what audio to provide in each downlink data packet stream based only on what has occurred in the teleconference until that instant.

However, the foregoing set of constraints will generally not apply when the analysis engine 307 processes the individual uplink data packet streams that are stored in the conference recording database 3. Similarly, the foregoing set of constraints will generally not apply when the playback system 609 is processing and reproducing data from the analysis results database 5, which has been output from the analysis engine 307.

For example, assuming that analysis and playback occur after the teleconference is complete, the playback system 609 and/or the analysis engine 307 may use information from the entire teleconference recording in order to determine how best to process, mix and/or render any instant of the teleconference for reproduction during playback. Even if the teleconference recording only corresponds to a portion of the teleconference, data corresponding to that entire portion will be available for determining how optimally to mix, render and otherwise process the recorded teleconference audio data (and possibly other data, such as teleconference metadata) for reproduction during playback.

In many implementations, the playback system 609 may be providing audio data, etc., to a listener who is not trying to interact with those in the teleconference. Accordingly, the playback system 609 and/or the analysis engine 307 may have seconds, minutes, hours, days, or even a longer time period in which to analyze and/or process the recorded teleconference audio data and make the teleconference available for playback. This means that computationally-heavy and/or data-heavy algorithms, which can only be performed slower than real time on the available hardware, may be used by the analysis engine 307 and/or the playback system 609. Due to these relaxed time constraints, some implementations may involve queueing up teleconference recordings for analysis and analyzing them when resources permit (e.g., when analysis of previously-recorded teleconferences is complete or at "off-peak" times of day when electricity or cloud computing resources are less expensive or more readily available).

Assuming that analysis and playback occur after a teleconference is complete, the analysis engine 307 and the playback system 609 can have access to a complete set of teleconference participation information, e.g., information regarding which conference participants were involved in the teleconference and the times at which each conference participant joined and left the teleconference. Similarly, assuming that analysis and playback occur after the teleconference is complete, the analysis engine 307 and the playback system 609 can have access to a complete set of teleconference audio data and any associated metadata from which to determine (or at least to estimate) when each participant spoke. This task may be referred to herein as "speaker diarization." Based on speaker diarization information, the analysis engine 307 can determine conversational dynamics data such as which conference participant(s) spoke the most, who spoke to whom, who interrupted whom, how much doubletalk (times during which at least two conference participants are speaking simultaneously) occurred during the teleconference, and potentially other useful information which the analysis engine 307 and/or the playback system 609 can use in order to determine how best to mix and render the conference during playback. Even if the teleconference recording only corresponds to a portion of the teleconference, data corresponding to that entire portion will be available for determining teleconference participation information, conversational dynamics data, etc.

The present disclosure includes methods and devices for recording, analyzing and playing back teleconference audio data such that the teleconference audio data presented during playback may be substantially different from what would have been heard by conference participants during the original teleconference and/or what would have been recorded during the original teleconference by a recording device such as the teleconference recording device 2 shown in FIG. 1A. Various implementations disclosed herein make use of one or more of the above-identified constraint differences between the live teleconference and the playback use-cases to produce a better user experience during playback. Without loss of generality, we now discuss a number of specific implementations and particular methods for recording, analyzing and playing back teleconference audio data such that the playback can be advantageously different from the original teleconference experience.

Figure 1B:
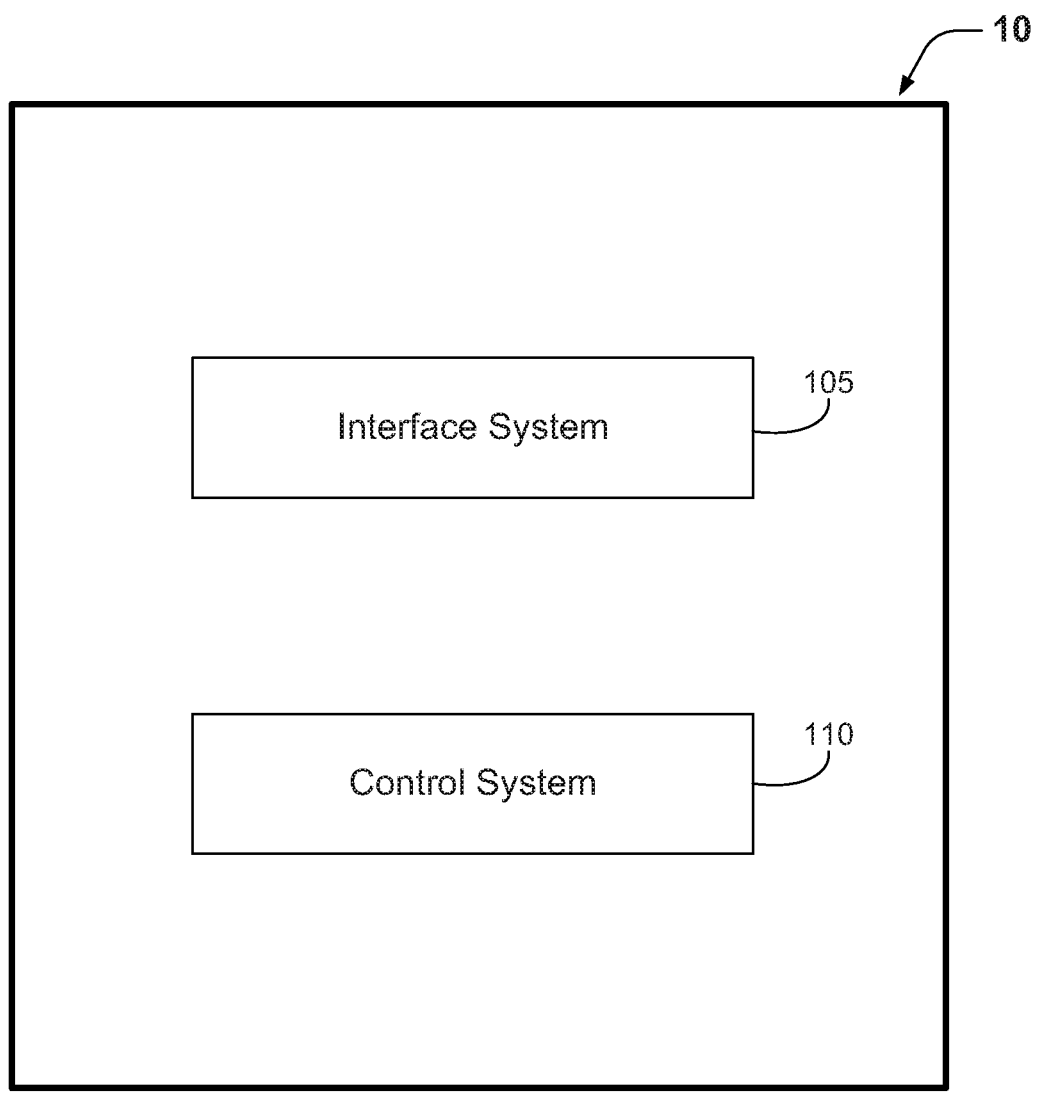
FIG. 1B is a block diagram that shows examples of components of an apparatus capable of implementing various aspects of this disclosure.

FIG. 1B is a block diagram that shows examples of components of an apparatus capable of implementing various aspects of this disclosure. The types and numbers of components shown in FIG. 1B are merely shown by way of example. Alternative implementations may include more, fewer and/or different components. The apparatus 10 may, for example, be an instance of a teleconferencing apparatus 200. In some examples, the apparatus 10 may be a component of another device. For example, in some implementations the apparatus 10 may be a component of a teleconferencing apparatus 200, e.g., a line card.

In this example, the apparatus 10 includes an interface system 105 and a control system 110. The interface system 105 may include one or more network interfaces, one or more interfaces between the control system 110 and a memory system and/or one or more an external device interfaces (such as one or more universal serial bus (USB) interfaces). The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 110 may be capable of providing teleconference server functionality.

Figure 1C:
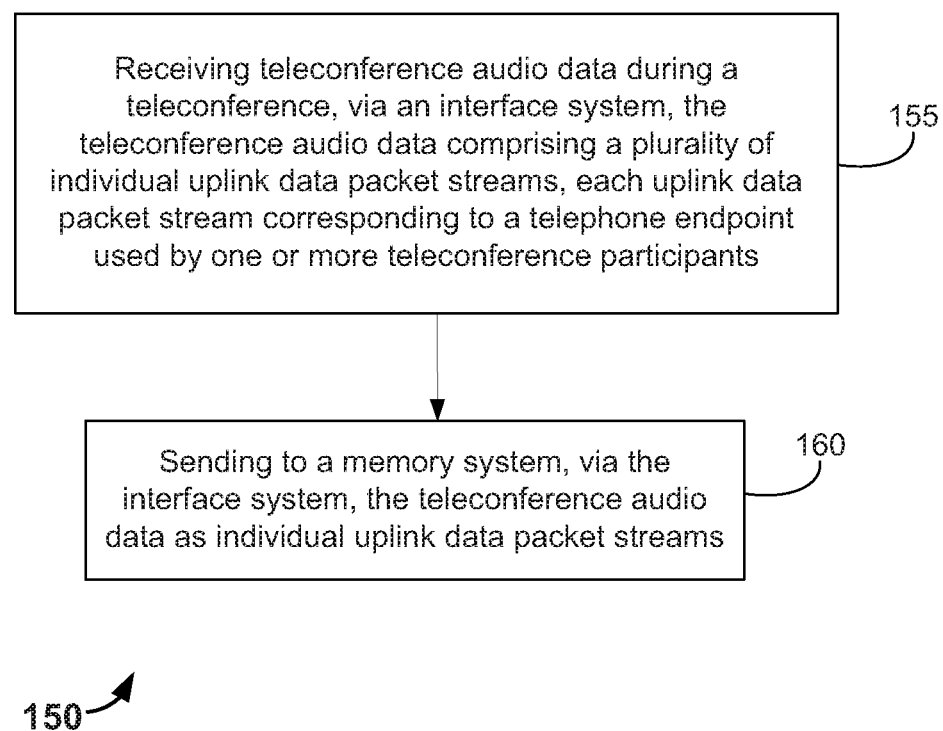
FIG. 1C is a flow diagram that outlines one example of a method that may be performed by the apparatus of FIG. 1B.

FIG. 1C is a flow diagram that outlines one example of a method that may be performed by the apparatus of FIG. 1B. The blocks of method 150, like other methods described herein, are not necessarily performed in the order indicated. Moreover, such methods may include more or fewer blocks than shown and/or described.

In this implementation, block 155 involves receiving teleconference audio data during a teleconference, via an interface system. For example, the teleconference audio data may be received by the control system 110 via the interface system 105 in block 155. In this example, the teleconference audio data includes a plurality of individual uplink data packet streams, such as the uplink data packet streams 7 shown in FIG. 1A. Accordingly, each uplink data packet stream corresponds to a telephone endpoint used by one or more conference participants.

In this example, block 160 involves sending to a memory system, via the interface system, the teleconference audio data as individual uplink data packet streams. Accordingly, instead of being recorded as mixed audio data received as one of the downlink data packet streams 8 shown in FIG. 1A, such as the downlink data packet stream 8 that is recorded by the teleconference recording device 2, the packets received via each of the uplink data packet streams 7 are recorded and stored as as individual uplink data packet streams.

However, in some examples at least one of the uplink data packet streams may correspond to multiple conference participants. For example, block 155 may involve receiving such an uplink data packet stream from a spatial speakerphone used by multiple conference participants. Accordingly, in some instances the corresponding uplink data packet stream may include spatial information regarding each of the multiple participants.

In some implementations, the individual uplink data packet streams received in block 155 may be individual encoded uplink data packet streams. In such implementations, block 160 may involve sending the teleconference audio data to the memory system as individual encoded uplink data packet streams.

As noted above, in some examples the interface system 105 may include a network interface. In some such examples, block 160 may involve sending the teleconference audio data to a memory system of another device via the network interface. However, in some implementations the apparatus 10 may include at least part of the memory system. The interface system 105 may include an interface between the control system and at least part of the memory system. In some such implementations, block 160 may involve sending the teleconference audio data to a memory system of the apparatus 10.

Due at least in part to the teleconferencing latency issues described above, at least one of the uplink data packet streams may include at least one data packet that was received after a mouth-to-ear latency time threshold of the teleconference and was therefore not used for reproducing audio data during the teleconference. The mouth-to-ear latency time threshold may differ from implementation to implementation, but in many implementations the mouth-to-ear latency time threshold may be 150 ms or less. In some examples, the mouth-to-ear latency time threshold may be greater than or equal to 100 ms.

In some implementations, the control system 110 may be capable of determining that a late data packet of an incomplete uplink data packet stream has not been received from a telephone endpoint within a late packet time threshold. In some implementations, the late packet time threshold may be greater than or equal to a mouth-to-ear latency time threshold of the teleconference. For example, in some implementations the late packet time threshold may be greater than or equal to 200 ms, 400 ms, 500 ms, 1 second or more. In some examples, the control system 110 may be capable of determining that a data packet of an incomplete uplink data packet stream has not been received from a telephone endpoint within a missing packet time threshold, greater than the late packet time threshold. In some implementations, the control system 110 may be capable of transmitting a request to the telephone endpoint, via the interface system 105, to re-send the missing data packet. The control system 110 may be capable of receiving the missing data packet and of adding the missing data packet to the incomplete uplink data packet stream.

FIG. 2 shows additional examples of components of a teleconferencing system. The types and numbers of components shown in FIG. 2 are merely shown by way of example. Alternative implementations may include more, fewer and/or different components. In this example, the teleconferencing apparatus 200 includes a VoIP teleconferencing bridge. In this example, there are five telephone endpoints being used by the conference participants, including two headset endpoints 206, a spatial speakerphone endpoint 207, and two PSTN endpoints 208. The spatial speakerphone endpoint 207 may be capable of providing spatial information corresponding to positions of each of multiple conference participants. Here, a PSTN bridge 209 forms a gateway between an IP network and the PSTN endpoints 208, converting PSTN signals to IP data packet streams and vice versa.

Figure 2A:
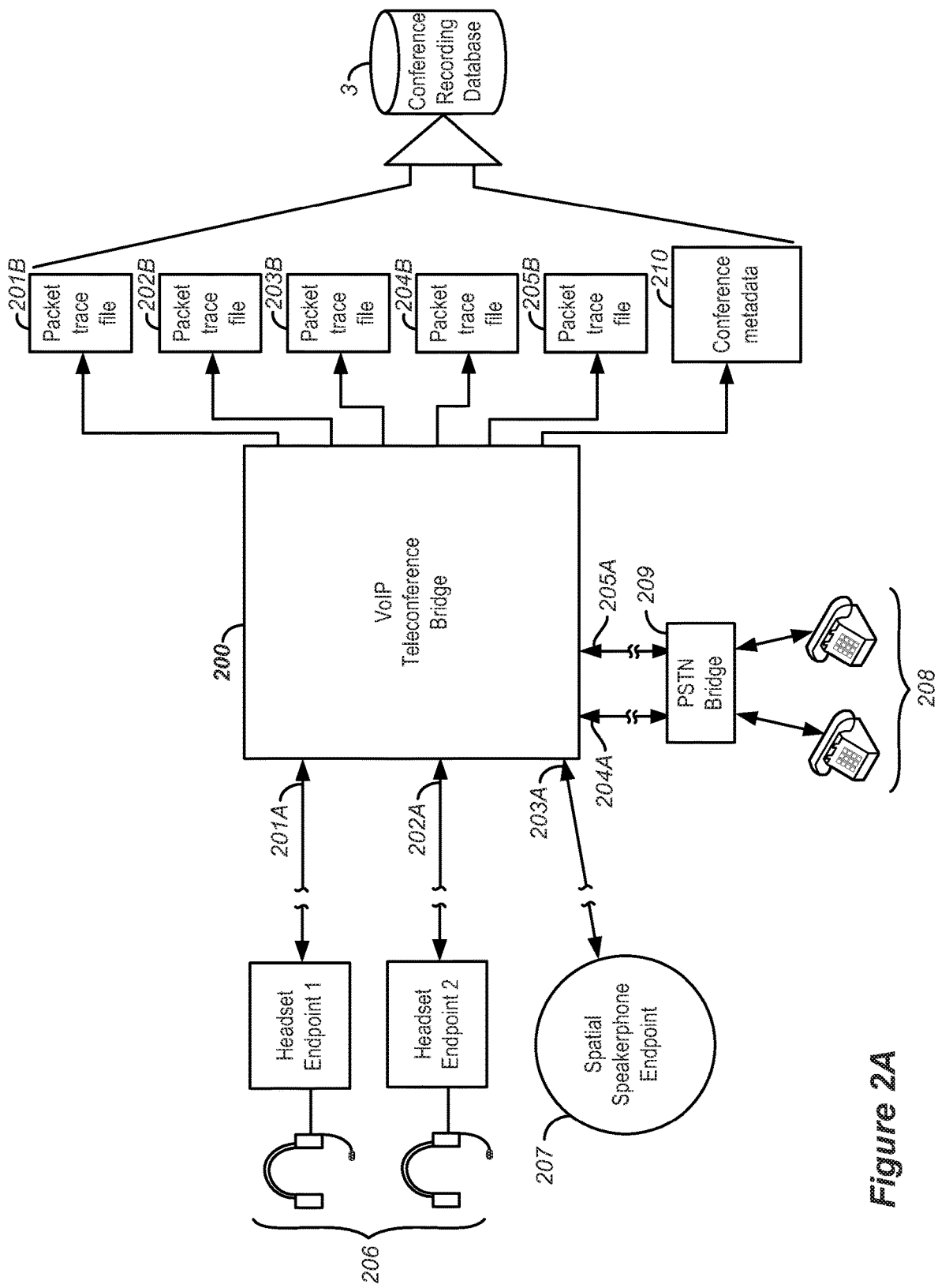
FIG. 2A shows additional examples of components of a teleconferencing system.

FIG. 2A shows additional examples of components of a teleconferencing system. The types and numbers of components shown in FIG. 2A are merely shown by way of example. Alternative implementations may include more, fewer and/or different components. In this example, the teleconferencing apparatus 200 includes a VoIP teleconferencing bridge. In this example, there are five telephone endpoints being used by the conference participants, including two headset endpoints 206, a spatial speakerphone endpoint 207, and two PSTN endpoints 208. The spatial speakerphone endpoint 207 may be capable of providing spatial information corresponding to positions of each of multiple conference participants. Here, a PSTN bridge 209 forms a gateway between an IP network and the PSTN endpoints 208, converting PSTN signals to IP data packet streams and vice versa.

In FIG. 2A, uplink data packet streams 201A-205A, each corresponding to one of the five telephone endpoints, are being received by the teleconferencing apparatus 200. In some instances, there may be multiple conference participants participating in the teleconference via the spatial speakerphone endpoint 207. If so, the uplink data packet stream 203A may include audio data and spatial information for each of the multiple conference participants.

In some implementations, each of the uplink data packet streams 201A-205A may include a sequence number for each data packet, as well as a data packet payload. In some examples, each of the uplink data packet streams 201A-205A may include a talkspurt number corresponding with each talkspurt included in an uplink data packet stream. For example, each telephone endpoint (or a device associated with a telephone endpoint such as the PSTN bridge 209) may include a voice activity detector that is capable detecting instances of speech and non-speech. The telephone endpoint or associated device may include a talkspurt number in one or more data packets of an uplink data packet stream corresponding with such instances of speech, and may increment the talkspurt number each time that the voice activity detector determines that speech has recommenced after a period of non-speech. In some implementations, the talkspurt number may be a single bit that toggles between 1 and 0 at the start of each talkspurt.

In this example, the teleconferencing apparatus 200 assigns a "receive" timestamp to each received uplink data packet. Here, the teleconferencing apparatus 200 sends packet trace files 201B-205B, each of which corresponds to one of the uplink data packet streams 201A-205A, to the conference recording database 3. In this implementation, the packet trace files 201B-205B include a receive timestamp for each received uplink data packet, as well as the received sequence number, talkspurt number and data packet payloads.

In this example, the teleconferencing apparatus 200 also sends conference metadata 210 to the conference recording database 3. The conference metadata 210 may, for example, include data regarding individual conference participants, such as conference participant name, conference participant location, etc. The conference metadata 210 may indicate associations between individual conference participants and one of the packet trace files 201B-205B. In some implementations, the packet trace files 201B-205B and the conference metadata 210 may together form one teleconference recording in the conference recording database 3.

Figure 2B:
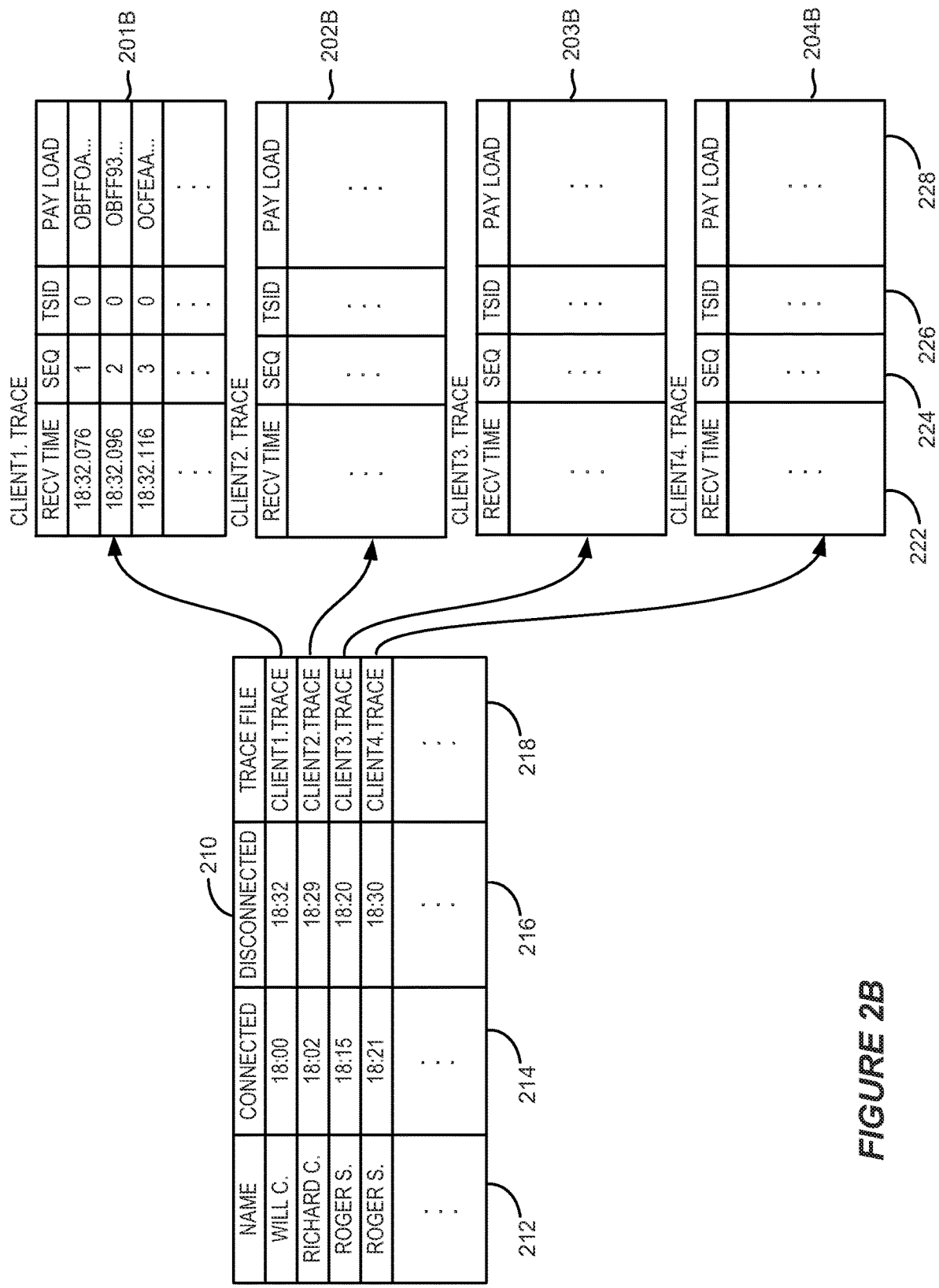
FIG. 2B shows examples of packet trace files and conference metadata.

FIG. 2B shows examples of packet trace files and conference metadata. In this example, the conference metadata 210 and the packet trace files 201B-204B have data structures that are represented as tables that include four columns, also referred to herein as fields. The particular data structures shown in FIG. 2B are merely made by way of example; other examples may include more or fewer fields. As described elsewhere herein, in some implementations the conference metadata 210 may include other types of information that are not shown in FIG. 2B.

In this example, the conference metadata 210 data structure includes a conference participant name field 212, a connection time field 214 (indicating when the corresponding conference participants joined the conference), a disconnection time field 216 (indicating when the corresponding conference participants left the conference) and a packet trace file field 218. It may be seen in this example that the same conference participant may be listed multiple times in the conference metadata 210 data structure, once for every time he or she joins or rejoins the conference. The packet trace file field 218 includes information for identifying a corresponding packet trace file.

Accordingly, the conference metadata 210 provides a summary of some events of a conference, including who participated, for how long, etc. In some implementations, the conference metadata 210 may include other information, such as the endpoint type (e.g., headset, mobile device, speaker phone, etc.).

In this example, each of the packet trace files 201B-204B also includes four fields, each field corresponding to a different type of information. Here, each of the packet trace files 201B-204B includes a received time field 222, a sequence number field 224, a talkspurt identification field 226 and a payload data field 228. The sequence numbers and talkspurt numbers, which may be included in packet payloads, enable the payloads to be arranged in the correct order. In this example, each instance of payload data indicated by the payload data field 228 corresponds to the remainder of the payload of a packet after the sequence number and talkspurt number have been removed, including the audio data corresponding to the corresponding conference participant. Each of the packet trace files 201B-204B may, for example, contain the payload data of packets originating from an endpoint such as those shown in FIG. 2A. One packet trace file may include payload data from a large number of packets.

Although not shown in FIG. 2B, the conference metadata 210 corresponds to a particular conference. Accordingly, the metadata and packet trace files 201B-204B for a conference, including the payload data, may be stored for later retrieval according to, e.g., a conference code.

The packet trace files 201B-204B and the conference metadata 210 may change over the duration of a conference, as more information is added. According to some implementations, such changes may happen locally, with the final packet trace files and the conference metadata 210 being sent to the conference recording database 3 after the conference has ended. Alternatively, or additionally, the packet trace files 201B-204B and/or the conference metadata 210 can be created, and then updated, on the conference recording database 3.

Figure 3A:
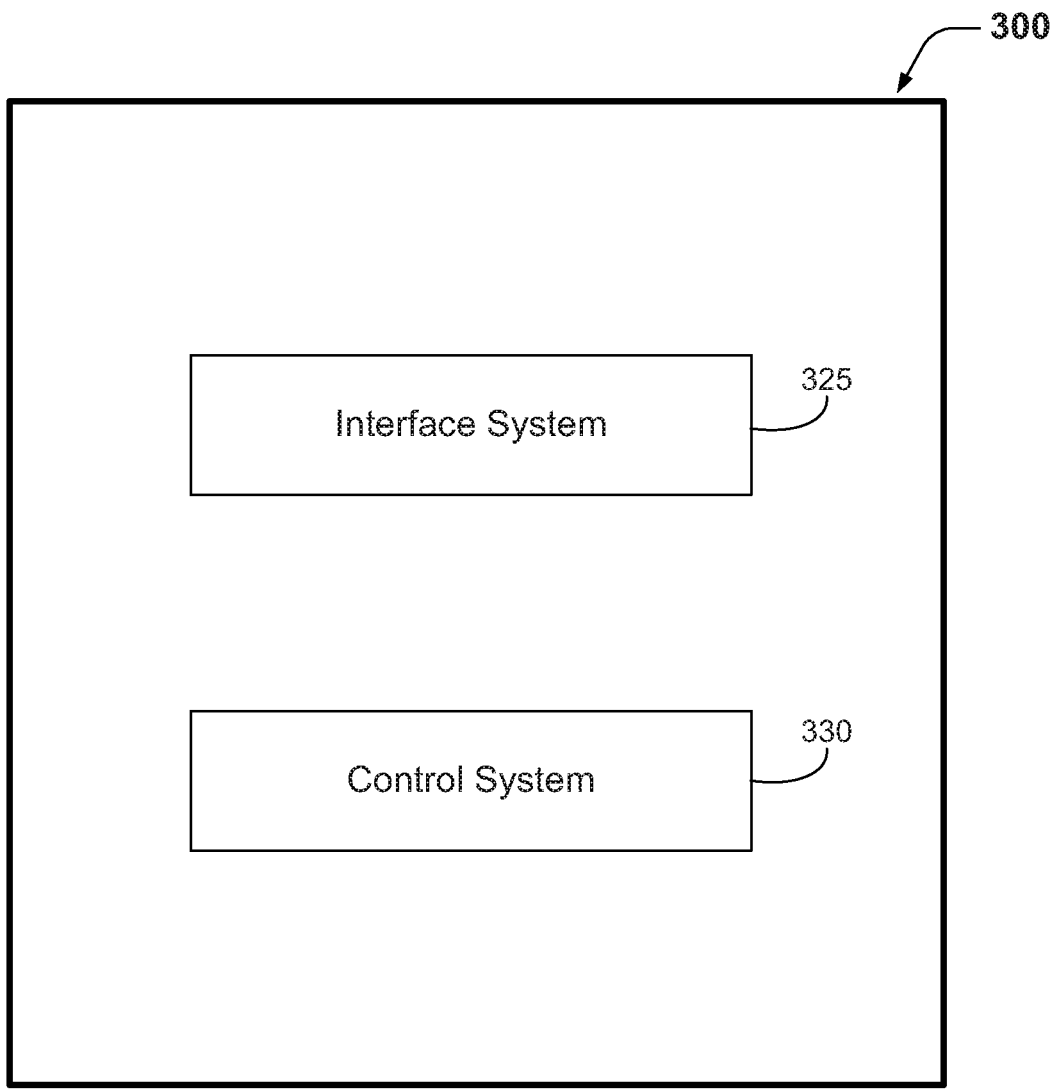
FIG. 3A is a block diagram that shows examples of components of an apparatus capable of implementing various aspects of this disclosure.

FIG. 3A is a block diagram that shows examples of components of an apparatus capable of implementing various aspects of this disclosure. The types and numbers of components shown in FIG. 3A are merely shown by way of example. Alternative implementations may include more, fewer and/or different components. The apparatus 300 may, for example, be an instance of an analysis engine 307. In some examples, the apparatus 300 may be a component of another device. For example, in some implementations the apparatus 300 may be a component of an analysis engine 307, e.g., an uplink analysis module described elsewhere herein.

In this example, the apparatus 300 includes an interface system 325 and a control system 330. The interface system 325 may include one or more network interfaces, one or more interfaces between the control system 330 and a memory system and/or one or more an external device interfaces (such as one or more universal serial bus (USB) interfaces). The control system 330 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

Figure 3B:
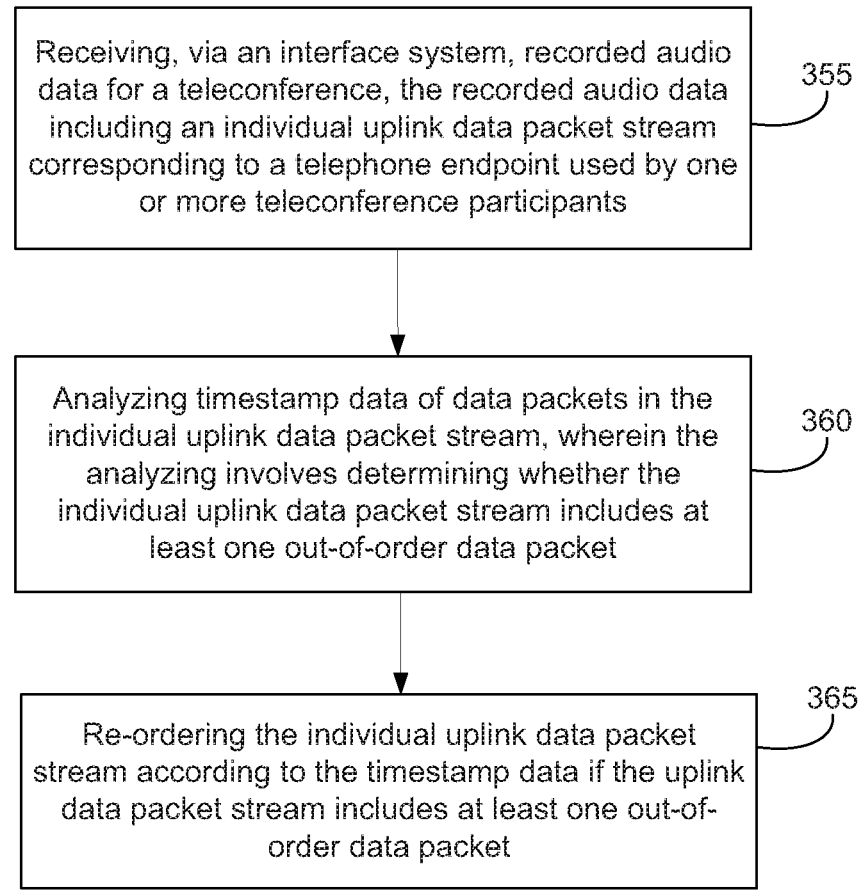
FIG. 3B is a flow diagram that outlines one example of a method that may be performed by the apparatus of FIG. 3A.

FIG. 3B is a flow diagram that outlines one example of a method that may be performed by the apparatus of FIG. 3A. The blocks of method 350, like other methods described herein, are not necessarily performed in the order indicated. Moreover, such methods may include more or fewer blocks than shown and/or described.

In this implementation, block 355 involves receiving previously stored audio data, also referred to herein as recorded audio data, for a teleconference, via an interface system. For example, the recorded audio data may be received by the control system 330 via the interface system 325 in block 355. In this example, the recorded audio data includes at least one individual uplink data packet stream corresponding to a telephone endpoint used by one or more conference participants.

Here, the received individual uplink data packet stream includes timestamp data corresponding to data packets of the individual uplink data packet stream. As noted above, in some implementations a teleconferencing apparatus 200 may assign a receive timestamp to each received uplink data packet. A teleconferencing apparatus 200 may store, or may cause to be stored, time-stamped data packets in the order they were received by the teleconference server 200. Accordingly, in some implementations block 355 may involve receiving the recorded audio data, including the individual uplink data packet stream that includes timestamp data, from a conference recording database 3 such as that shown in FIG. 1A, above.

In this example, block 360 involves analyzing timestamp data of data packets in the individual uplink data packet stream. Here, the analyzing process of block 360 involves determining whether the individual uplink data packet stream includes at least one out-of-order data packet. In this implementation, if the individual uplink data packet stream includes at least one out-of-order data packet, the individual uplink data packet stream will be re-ordered according to the timestamp data, in block 365.

In some implementations, at least one data packet of the individual uplink data packet stream may have been received after a mouth-to-ear latency time threshold of the teleconference. If so, the individual uplink data packet stream includes data packets that would not have been available for including in downlink data packet streams for reproduction to conference participants or for recording at a telephone endpoint. Data packets received after the mouth-to-ear latency time threshold may or may not have been received out of order, depending on the particular circumstance.

The control system 330 of FIG. 3A may be capable of various other functionality. For example, the control system 330 may be capable of receiving, via the interface system 325, teleconference metadata and of indexing the individual uplink data packet stream based, at least in part, on the teleconference metadata.

The recorded audio data received by the control system 330 may include a plurality of individual encoded uplink data packet streams, each of the individual encoded uplink data packet streams corresponding to a telephone endpoint used by one or more conference participants. In some implementations, as described in more detail below, the control system 330 may include a joint analysis module capable of analyzing a plurality of individual uplink data packet streams. The joint analysis module may be capable of determining conversational dynamics data, such as data indicating the frequency and duration of conference participant speech, data indicating instances of conference participant doubletalk during which at least two conference participants are speaking simultaneously and/or data indicating instances of conference participant conversations.

The control system 330 may be capable of decoding each of the plurality of individual encoded uplink data packet streams. In some implementations, the control system 330 may be capable of providing one or more decoded uplink data packet streams to a speech recognition module capable of recognizing speech and generating speech recognition results data. The speech recognition module may be capable of providing the speech recognition results data to the joint analysis module. In some implementations, the joint analysis module may be capable of identifying keywords in the speech recognition results data and of indexing keyword locations.

In some implementations, the control system 330 may be capable of providing one or more decoded uplink data packet streams to a speaker diarization module. The speaker diarization module may be capable of identifying speech of each of multiple conference participants in an individual decoded uplink data packet stream. The speaker diarization module may be capable of generating a speaker diary indicating times at which each of the multiple conference participants were speaking and of providing the speaker diary to the joint analysis module. In some implementations, the control system 330 may be capable of providing a plurality of individual decoded uplink data packet streams to the joint analysis module.

Figure 3C:
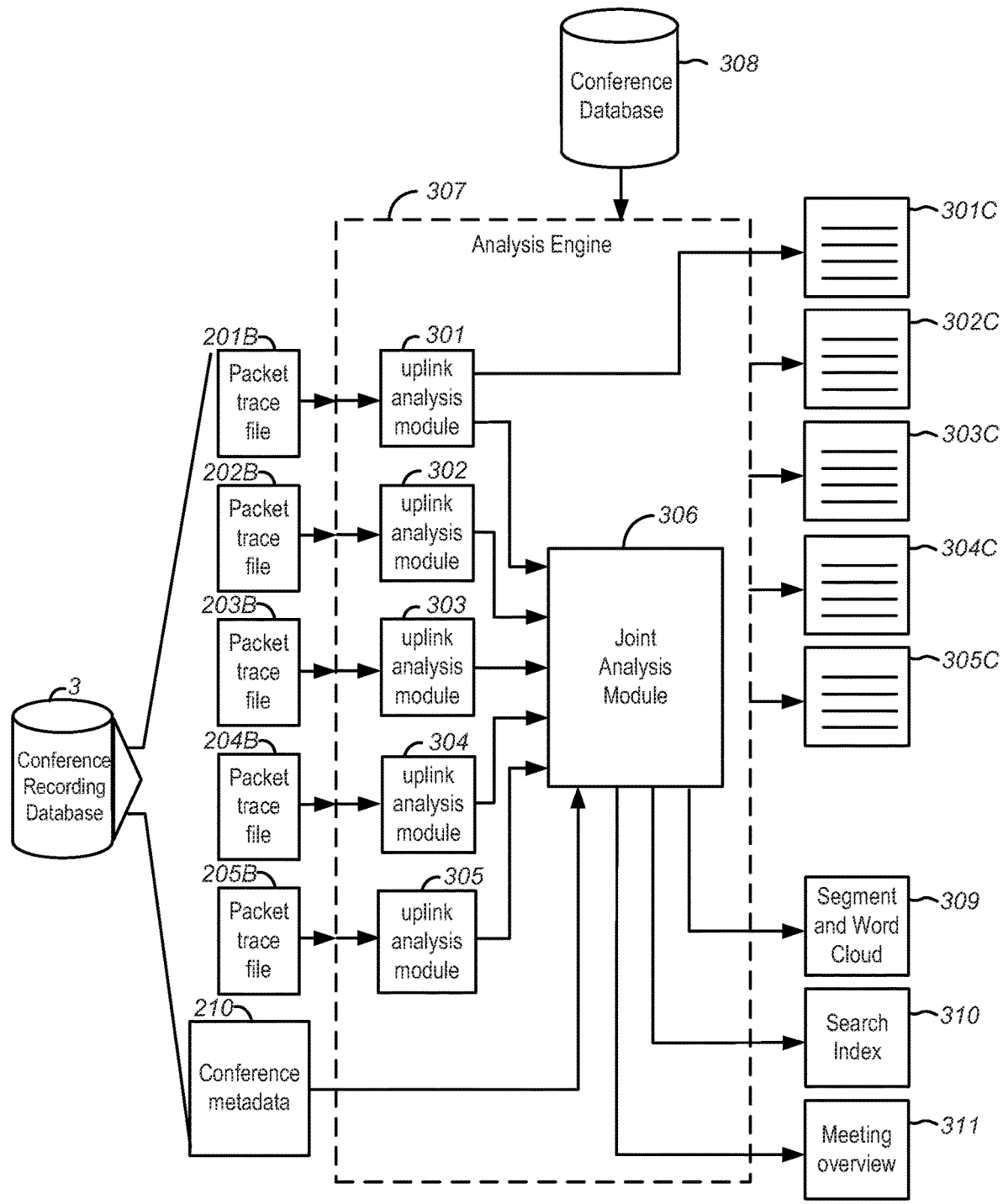
FIG. 3C shows additional examples of components of a teleconferencing system.

FIG. 3C shows additional examples of components of a teleconferencing system. The types and numbers of components shown in FIG. 3C are merely shown by way of example. Alternative implementations may include more, fewer and/or different components. In this implementation, various files from a conference recording database 3 and information from a conference database 308 are being received by an analysis engine 307. The analysis engine 307 and its components may be implemented via hardware, via software stored on non-transitory media, via firmware and/or by combinations thereof. The information from the conference database 308 may, for example, include information regarding which conference recordings exist, regarding who has permission to listen to and/or modify each conference recording, regarding which conferences were scheduled and/or regarding who was invited to each conference, etc.

In this example, the analysis engine 307 is receiving packet trace files 201B-205B from the conference recording database 3, each of which corresponds to one of the uplink data packet streams 201A-205A that had previously been received by the teleconferencing apparatus 200. The packet trace files 201B-205B may, for example, include a receive timestamp for each received uplink data packet, as well as a received sequence number, talkspurt number and data packet payloads. In this example, each of the packet trace files 201B-205B is provided to a separate one of the uplink analysis modules 301-305 for processing. In some implementations, the uplink analysis modules 301-305 may be capable of re-ordering data packets of a packet trace file, e.g., as described above with reference to FIG. 3B. Some additional examples of uplink analysis module functionality are described below with reference to FIG. 4.

In this example, each of the uplink analysis modules 301-305 outputs a corresponding one of the per-uplink analysis results 301C-305C. In some implementations, the per-uplink analysis results 301C-305C may be used by the playback system 609 for playback and visualization. Some examples are described below with reference to FIG. 6.

Here, each of the uplink analysis modules 301-305 also provides output to the joint analysis module 306. The joint analysis module 306 may be capable of analyzing data corresponding to a plurality of individual uplink data packet streams.

In some examples, the joint analysis module 306 may be capable of analyzing conversational dynamics and determining conversational dynamics data. These and other examples of joint analysis module functionality are described in more detail below with reference to FIG. 5.

In this example, the joint analysis module 306 outputs meeting overview information 311, which may include the time of a conference, names of participants, etc. In some implementations, the meeting overview information 311 may include conversational dynamics data. Here, the joint analysis module 306 also outputs segment and word cloud data 309 and a search index 310, both of which are described below with reference to FIG. 5.

Here, the analysis engine 307 is also receiving conference metadata 210. As noted elsewhere herein, the conference metadata 210 may include data regarding individual conference participants, such as conference participant name and/or conference participant location, associations between individual conference participants and one of the packet trace files 201B-205B, etc. In this example, the conference metadata 210 are provided to the the joint analysis module 306.

Figure 4:
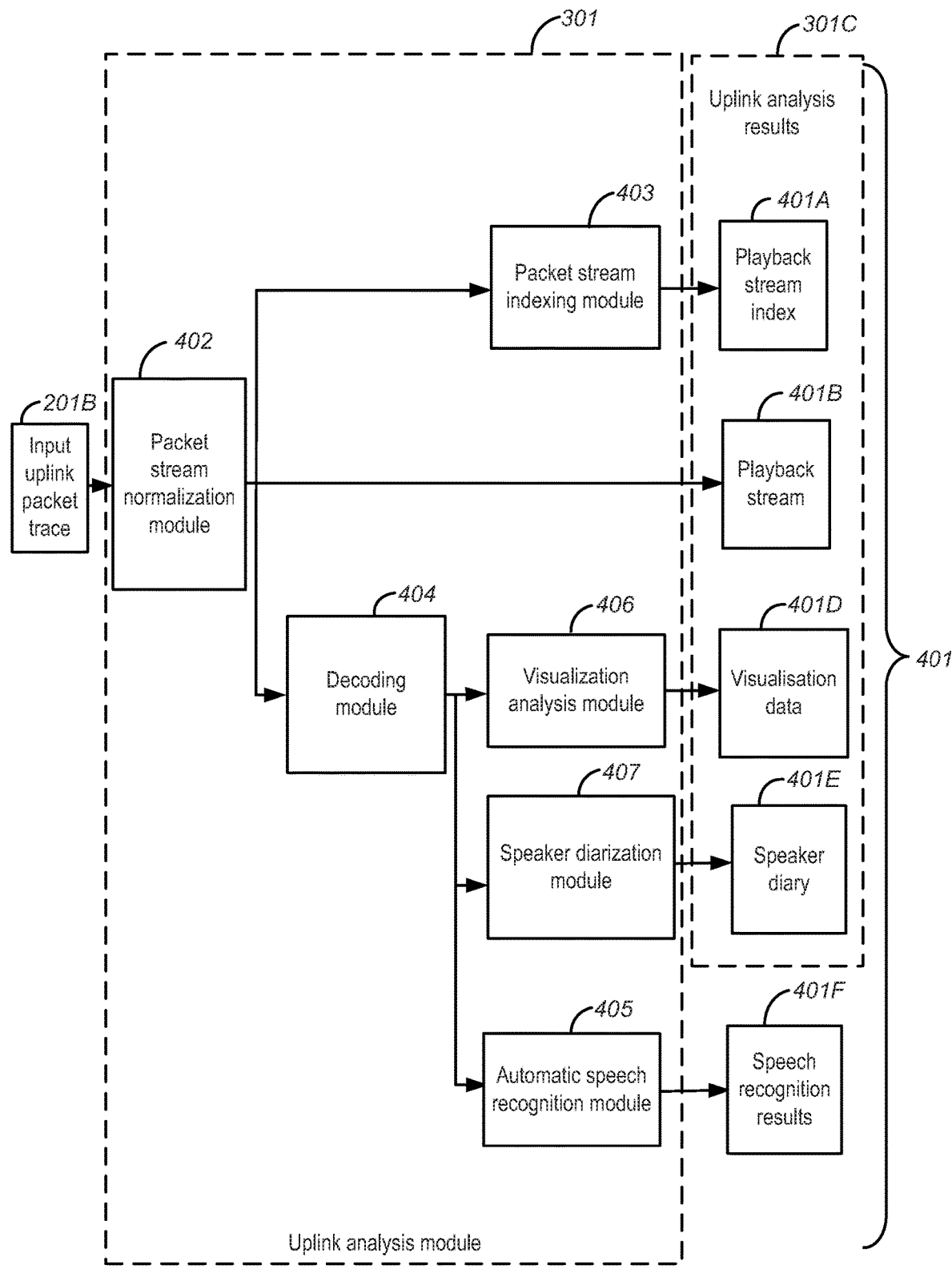
FIG. 4 shows examples of components of an uplink analysis module.

FIG. 4 shows examples of components of an uplink analysis module. The uplink analysis module 301 and its components may be implemented via hardware, via software stored on non-transitory media, via firmware and/or by combinations thereof. The types and numbers of components shown in FIG. 4 are merely shown by way of example. Alternative implementations may include more, fewer and/or different components.

In this implementation, the uplink analysis module 301 is shown receiving the packet trace file 201B. Here, the packet trace file 201B, corresponding to an individual uplink data packet stream, is received and processed by the packet stream normalization module 402. In this example, the packet stream normalization module 402 is capable of analyzing sequence number data of data packets in the packet trace file 201B and determining whether the individual uplink data packet stream includes at least one out-of-order data packet. If the packet stream normalization module 402 determines that the individual uplink data packet stream includes at least one out-of-order data packet, in this example the packet stream normalization module 402 will re-order the individual uplink data packet stream according to the sequence numbers.

In this implementation, the packet stream normalization module 402 outputs an ordered playback stream 401B as one component of the uplink analysis results 301C output by the uplink analysis module 301. In some implementations, the packet stream normalization module 402 may include a playback timestamp and a data packet payload corresponding to each data packet of the ordered playback stream 401B. Here, the ordered playback stream 401B includes encoded data, but in alternative implementations the ordered playback stream 401B may include decoded data or transcoded data. In this example, the playback stream index 401A, output by the packet stream indexing module 403, is another component of the uplink analysis results 301C. The playback stream index 401A may facilitate random access playback by the playback system 609.

The packet stream indexing module 403 may, for example, determine instances of talkspurts of conference participants (e.g., according to talkspurt numbers of the input uplink packet trace) and include corresponding index information in the playback stream index 401A, in order to facilitate random access playback of the conference participant talkspurts by the playback system 609. In some implementations, the packet stream indexing module 403 may be capable of indexing according to time. For example, in some examples the packet stream indexing module 403 may be capable of forming a packet stream index that indicates the byte offset within the playback stream of the encoded audio for a corresponding playback time. In some such implementations, during playback the playback system 609 may look up a particular time in the packet stream index (for example, according to a time granularity, such as a 10-second granularity) and the packet stream index may indicate a byte offset within the playback stream of the encoded audio for that playback time. This is potentially useful because the encoded audio may have a variable bit rate or because there may be no packets when there is silence (so called "DTX" or "discontinuous transmission"). In either case, the packet stream index can facilitate fast seeking during a playback process, at least in part because there may often be a non-linear relationship between time and byte offset within the playback stream.

In the example shown in FIG. 4, the decoding module 404 also receives an ordered playback stream 401B from the packet stream normalization module 402. In this implementation, the decoding module 404 decodes the encoded ordered playback stream 401B and provides the automatic speech recognition module 405, the visualization analysis module 406 and the speaker diarization module 407 with a decoded playback stream. In some examples, the decoded playback stream may be a pulse code modulation (PCM) stream.

According to some implementations, the decoding module 404 and/or the playback system 609 may apply a different decoding process from the decoding process used during the original teleconference. Due to time, computational and/or bandwidth constraints, the same packet of audio may be decoded in low fidelity with minimal computational requirements during the teleconference, but decoded in higher fidelity with higher computational requirements by the decoding module 404. Higher-fidelity decoding by the decoding module 404 may, for example, involve decoding to a higher sample rate, switching on spectral bandwidth replication (SBR) for better perceptual results, running more iterations of an iterative decoding process, etc.

In the example shown in FIG. 4, the automatic speech recognition module 405 analyzes audio data in the decoded playback stream provided by the decoding module 404 to determine spoken words in the teleconference portion corresponding to the decoded playback stream. The automatic speech recognition module 405 outputs speech recognition results 401F to the joint analysis module 306.

In this example, the visualization analysis module 406 analyzes audio data in the decoded playback stream to determine the occurrences of talkspurts, the amplitude of the talkspurts and/or the frequency content of the talkspurts, etc., and outputs visualization data 401D. The visualization data 401D may, for example, provide information regarding waveforms that the playback system 609 may display when the teleconference is played back.

In this implementation, the speaker diarization module 407 analyzes audio data in the decoded playback stream to identify and record occurrences of speech from one or more conference participants, depending on whether a single conference participant or multiple conference participants were using the same telephone endpoint that corresponds to the input uplink packet trace 201B. The speaker diarization module 407 outputs speaker diary 401E which, along with the visualization data 401D, is included as part of the uplink analysis results 301C output by the analysis engine 307 (see FIG. 3C). In essence, the speaker diary 401E indicates which conference participant(s) spoke and when the conference participant(s) spoke.

The uplink analysis results 301C, together with the speech recognition results 401F, are included in the uplink analysis results available for joint analysis 401 provided to the joint analysis module 306. Each of a plurality of uplink analysis modules may output an instance of the uplink analysis results available for joint analysis to the joint analysis module 306.

Figure 5:
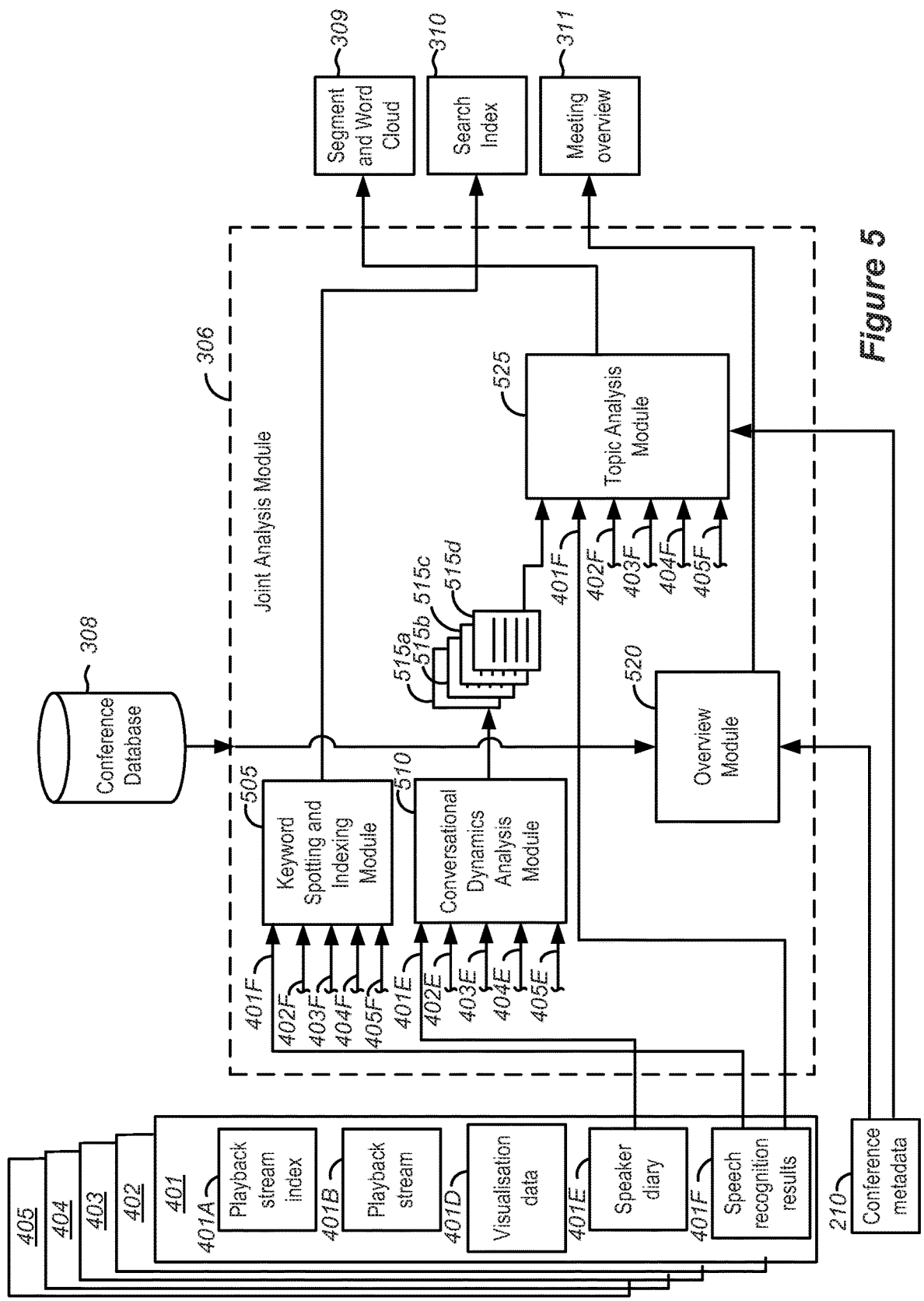
FIG. 5 shows examples of components of a joint analysis module.

FIG. 5 shows examples of components of a joint analysis module. The joint analysis module 306 and its components may be implemented via hardware, via software stored on non-transitory media, via firmware and/or by combinations thereof. The types and numbers of components shown in FIG. 5 are merely shown by way of example. Alternative implementations may include more, fewer and/or different components.

In this example, each of the uplink analysis modules 301-305 shown in FIG. 3C has output a corresponding one of the uplink analysis results available for joint analysis 401-405, all of which are shown in FIG. 5 as being received by the joint analysis module 306. In this implementation, the speech recognition results 401F-405F, one of which is from each of the uplink analysis results available for joint analysis 401-405, are provided to the keyword spotting and indexing module 505 and to the topic analysis module 525. In this example, the speech recognition results 401F-405F correspond to all conference participants of a particular teleconference. The speech recognition results 401F-405F may, for example, be text files.

In this example, the keyword spotting and indexing module 505 is capable of analyzing the speech recognition results 401F-405F, of identifying frequently-occurring words that were spoken by all conference participants during the teleconference and of indexing occurrences of the frequently-occurring words. In some implementations, the keyword spotting and indexing module 505 may determine and record the number of instances of each keyword. In this example, the keyword spotting and indexing module 505 outputs the search index 310.

In the example shown in FIG. 5, the conversational dynamics analysis module 510 receives the speaker diaries 401E-405E, one of which is from each of the uplink analysis results available for joint analysis 401-405. The conversational dynamics analysis module 510 may be capable of determining conversational dynamics data, such as data indicating the frequency and duration of conference participant speech, data indicating instances of conference participant "doubletalk" during which at least two conference participants are speaking simultaneously, data indicating instances of conference participant conversations and/or data indicating instances of one conference participant interrupting one or more other conference participants, etc.

In this example, the conversational dynamics analysis module 510 outputs conversational dynamics data files 515a-515d, each of which corresponds to a different timescale. For example, the conversational dynamics data file 515a may correspond to a timescale wherein segments of the conference (presentation, discussion, etc.) are approximately 1 minute long, the conversational dynamics data file 515b may correspond to a timescale wherein segments of the conference are approximately 3 minutes long, the conversational dynamics data file 515c may correspond to a timescale wherein segments of the conference are approximately 5 minutes long, and the conversational dynamics data file 515d may correspond to a timescale wherein segments of the conference are approximately 7 minutes long or longer. In other implementations, the conversational dynamics analysis module 510 may output more or fewer of the conversational dynamics data files 515. In this example, the conversational dynamics data files 515a-515d are output only to the topic analysis module 525, but in other implementations the conversational dynamics data files 515a-515d may be output to one or more other modules and/or output from the entire analysis engine 307. Accordingly, in some implementations the conversational dynamics data files 515a-515d may be made available to the playback system 609.

In some implementations, the topic analysis module 525 may be capable of analyzing the speech recognition results 401F-405F and of identifying potential conference topics. In some examples, as here, the topic analysis module 525 may receive and process the conference metadata 210. Various implementations of the topic analysis module 525 are described in detail below. In this example, the topic analysis module 525 outputs the segment and word cloud data 309, which may include with topic information for each of a plurality of conversation segments and/or topic information for each of a plurality of time intervals.

In the example shown in FIG. 5, the joint analysis module includes an overview module 520. In this implementation, the overview module 520 receives the conference metadata 210 as well as data from the conference database 308. The conference metadata 210 may include data regarding individual conference participants, such as conference participant name and conference participant location, data indicating the time and date of a conference, etc. The conference metadata 210 may indicate associations between individual conference participants and telephone endpoints. For example, the conference metadata 210 may indicate associations between individual conference participants and one of the analysis results 301C-305C output by the analysis engine (see FIG. 3C). The conference database 308 may provide data to the overview module 520 regarding which conferences were scheduled, regarding meeting topics and/or regarding who was invited to each conference, etc. In this example, the overview module 520 outputs meeting overview information 311, which may include a summary of the conference metadata 210 and of the data from the conference database 308.

In some implementations, the analysis engine 307 and/or other components of the teleconferencing system 100 may be capable of other functionality. For example, in some implementations the analysis engine 307, the playback system 609 or another component of the teleconferencing system 100 may be capable of assigning virtual conference participant positions in a virtual acoustic space based, at least in part, on conversational dynamics data. In some examples, the conversational dynamics data may be based on an entire conference.

Figure 6:
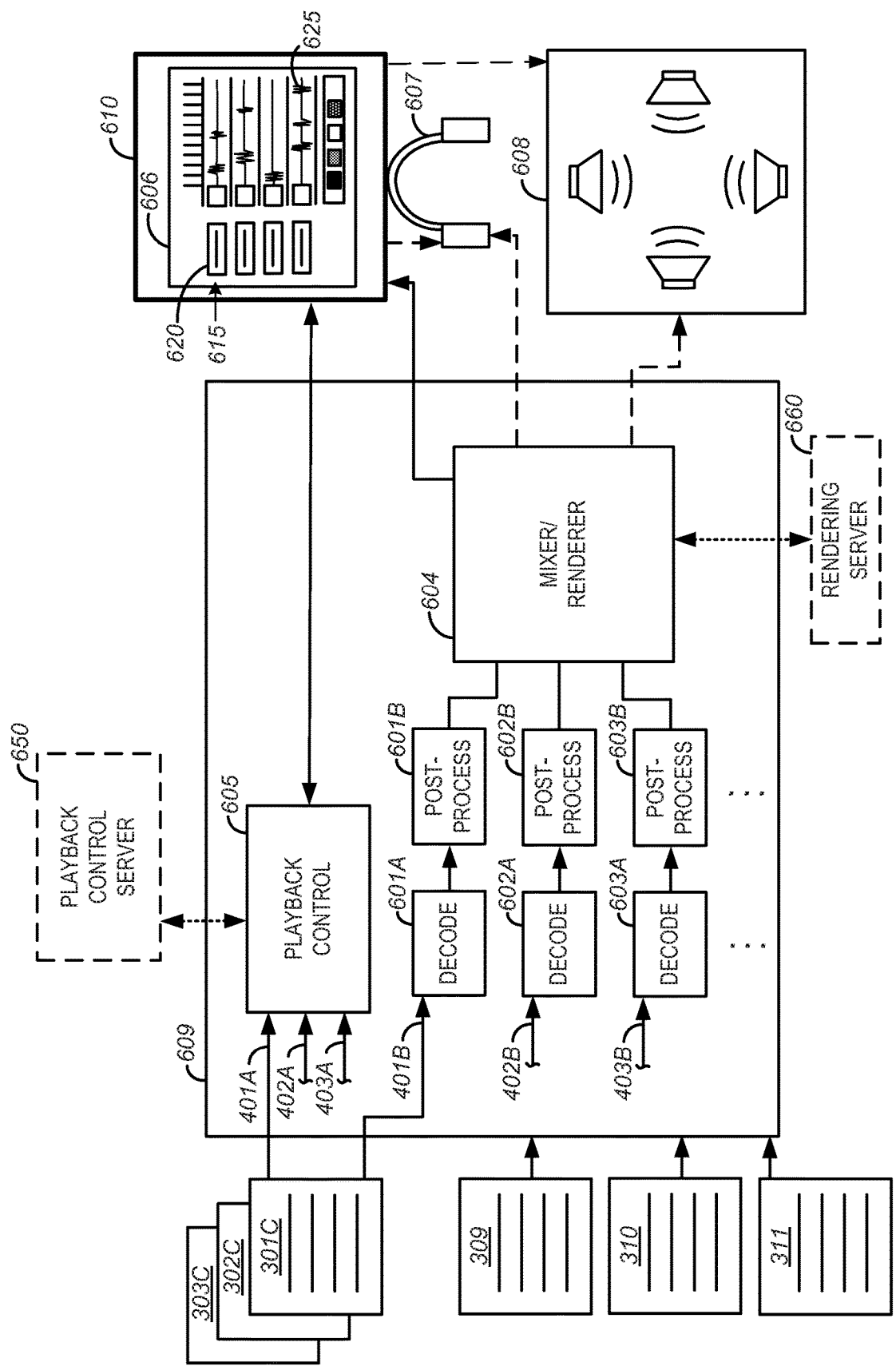
FIG. 6 shows examples of components of a playback system and associated equipment.

FIG. 6 shows examples of components of a playback system and associated equipment. The playback system 609 and its components may be implemented via hardware, via software stored on non-transitory media, via firmware and/or by combinations thereof. The types and numbers of components shown in FIG. 6 are merely shown by way of example. Alternative implementations may include more, fewer and/or different components.

In this example, the playback system 609 is receiving data corresponding to a teleconference that included three telephone endpoints, instead of a teleconference that included five telephone endpoints as described above. Accordingly, the playback system 609 is shown receiving analysis results 301C-303C, as well as the segment and word cloud data 309, the search index 310 and the meeting overview information 311.

In this implementation, the playback system 609 includes a plurality of decoding units 601A-603A. Here, decoding units 601A-603A are receiving ordered playback streams 401B-403B, one from each of the analysis results 301C-303C. In some examples, the playback system 609 may invoke one decoding unit per playback stream, so the number of decoding units may change depending on the number of playback streams received.

According to some implementations, the decoding units 601A-603A may apply a different decoding process from the decoding process used during the original teleconference. As noted elsewhere herein, during the original teleconference audio data may be decoded in low fidelity with minimal computational requirements, due to time, computational and/or bandwidth constraints. However, the ordered playback streams 401B-403B may be decoded in higher fidelity, potentially with higher computational requirements, by the decoding units 601A-603A. Higher-fidelity decoding by the decoding units 601A-603A may, for example, involve decoding to a higher sample rate, switching on spectral bandwidth replication (SBR) for better perceptual results, running more iterations of an iterative decoding process, etc.

In this example, a decoded playback stream is provided by each of the decoding units 601A-603A to a corresponding one of the post-processing modules 601B-603B. As discussed in more detail below, in some implementations the post-processing modules 601B-603B may be capable of one or more types of processing to speed up the playback of the ordered playback streams 401B-403B. In some such examples, the post-processing modules 601B-603B may be capable of removing silent portions from the ordered playback streams 401B-403B, overlapping portions of the ordered playback streams 401B-403B that were not previously overlapping, changing the amount of overlap of previously overlapping portions of the ordered playback streams 401B-403B and/or other processing to speed up the playback of the ordered playback streams 401B-403B.

In this implementation, a mixing and rendering module 604 receives output from the post-processing modules 601B-603B. Here, the mixing and rendering module 604 is capable of mixing the individual playback streams received from the post-processing modules 601B-603B and rendering the resulting playback audio data for reproduction by a speaker system, such as the headphones 607 and/or the speaker array 608. In some examples, the mixing and rendering module 604 may provide the playback audio data directly to a speaker system, whereas in other implementations the mixing and rendering module 604 may provide the playback audio data to another device, such as the display device 610, which may be capable of communication with the speaker system. In some implementations, the mixing and rendering module 604 may be capable of rendering the mixed audio data according to spatial information determined by the analysis engine 307. For example, the mixing and rendering module 604 may be capable of rendering the mixed audio data for each conference participant to an assigned virtual conference participant position in a virtual acoustic space based on such spatial information. In some alternative implementations, the mixing and rendering module 604 also may be capable of determining such spatial information. In some instances, the mixing and rendering module 604 may render teleconference audio data according to different spatial parameters than were used for rendering during the original teleconference.

In some implementations, some functionality of the playback system 609 may be provided, at least in part, according to "cloud-based" systems. For example, in some implementations the playback system 609 may be capable of communicating with one or more other devices, such as one or more servers, via a network. In the example shown in FIG. 6, the playback system 609 is shown communicating with an optional playback control server 650 and an optional rendering server 660, via one or more network interfaces (not shown). According to some such implementations, at least some of the functionality that could, in other implementations, be performed by the mixing and rendering module 604 may be performed by the rendering server 660. Similarly, in some implementations at least some of the functionality that could, in other implementations, be performed by the playback control module 605 may be performed by the playback control server 650. In some implementations, the functionality of the decoding units 601A-603A and/or the post-processing modules 601B-603B may be performed by one or more servers. According to some examples, the functionality of the entire playback system 609 may be implemented by one or more servers. The results may be provided to a client device, such as the display device 610, for playback.

In this example, a playback control module 605 is receiving the playback stream indices 401A-403A, one from each of the analysis results 301C-303C. Although not shown in FIG. 6, the playback control module 605 also may receive other information from the the analysis results 301C-303C, as well as the segment and word cloud data 309, the search index 310 and the meeting overview information 311. The playback control module 605 may be capable of controlling a playback process (including reproduction of audio data from the mixing and rendering module 604) based, at least in part, on user input (which may be received via the display device 610 in this example), on the analysis results 301C-303C, on the segment and word cloud data 309, the search index 310 and/or on the meeting overview information 311.

In this example, the display device 610 is shown providing a graphical user interface 606, which may be used for interacting with playback control module 605 to control playback of audio data. The display device 610 may, for example, be a laptop computer, a tablet computer, a smart phone or another type of device. In some implementations, a user may be able to interact with the graphical user interface 606 via a user interface system of the display device 610, e.g., by touching an overlying touch screen, via interaction with an associated keyboard and/or mouse, by voice command via a microphone and associated software of the display device 610, etc.

In the example shown in FIG. 6, each row 615 of the graphical user interface 606 corresponds to a particular conference participant. In this implementation, the graphical user interface 606 indicates conference participant information 620, which may include a conference participant name, conference participant location, conference participant photograph, etc. In this example, waveforms 625, corresponding to instances of the speech of each conference participant, are also shown the graphical user interface 606. The display device 610 may, for example, display the waveforms 625 according to instructions from playback control module 605. Such instructions may, for example be based on visualization data 410D-403D that is included in the analysis results 301C-303C. In some examples, a user may be able to change the scale of the graphical user interface 606, according to a desired time interval of the conference to be represented. For example, a user may be able to "zoom in" or enlarge at least a portion of the graphical user interface 606 to show a smaller time interval or "zoom out" at least a portion of the graphical user interface 606 to show a larger time interval. According to some such examples, the playback control module 605 may access a different instance of the conversational dynamics data files 515, corresponding with the changed time interval.

In some implementations a user may be able to control the reproduction of audio data not only according to typical commands such as pause, play, etc., but also according to additional capabilities based on a richer set of associated data and metadata. For example, in some implementations a user may be able to select for playback only the speech of a selected conference participant. In some examples, a user may be able to select for playback only those portions of a conference in which a particular keyword and/or a particular topic is being discussed.

In some implementations the graphical user interface 606 may display one or more word clouds based, at least in part, on the segment and word cloud data 309. In some implementations the displayed word clouds may be based, at least in part, on user input and/or on a particular portion of the conference that is being played back at a particular time. Various examples are disclosed herein.

Although various examples of audio data processing have been described above primarily in the teleconferencing context, the present disclosure is more broadly applicable to other known audio data processing contexts, such as processing audio data corresponding to in-person conferences. Such in-person conferences may, for example, include academic and/or professional conferences, doctor/client visits, personal diarization (e.g., via a portable recording device such as a wearable recording device), etc.

Figure 7:
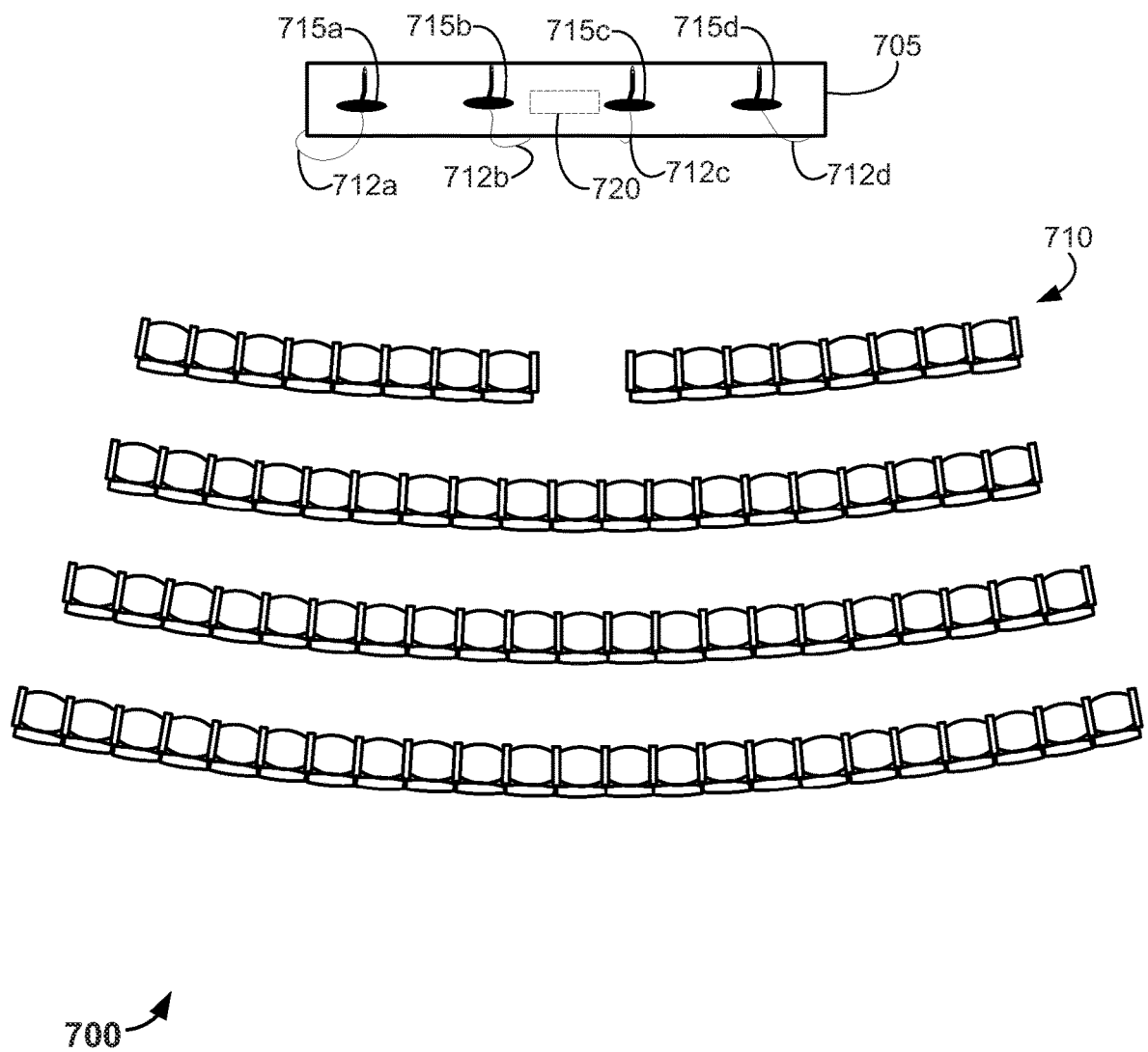
FIG. 7 shows an example of an in-person conference implementation.

FIG. 7 shows an example of an in-person conference implementation. The types and numbers of components shown in FIG. 7 are merely shown by way of example.

Alternative implementations may include more, fewer and/ or different components. In this example, a conference location 700 includes a conference participant table 705 and a listener seating area 710. In this implementation, microphones 715*a*-715*d* are positioned on the conference participant table 705. Accordingly, the conference participant table 705 is set up such that each of four conference participants will have his or her separate microphone.

In this implementation, each of the cables 712*a*-712*d* convey an individual stream of audio data from a corresponding one of the microphones 715*a*-715*d* to a recording device 720, which is located under the conference participant table 705 in this instance. In alternative examples, the microphones 715*a*-715*d* may communicate with the recording device 720 via wireless interfaces, such that the cables 712*a*-712*d* are not required. Some implementations of the conference location 700 may include additional microphones 715, which may or may not be wireless microphones, for use in the listener seating area 710 and/or use in the area between the listener seating area 710 and the conference participant table 705.

In this example, the recording device 720 does not mix the individual streams of audio data, but instead records each individual stream of audio data separately. In some implementations, either the recording device 720 or each of the microphones 715*a*-715*d* may include an analog-to-digital converter, such that the streams of audio data from the microphones 715*a*-715*d* may be recorded by the recording device 720 as individual streams of digital audio data.

The microphones 715*a*-715*d* may sometimes be referred to as examples of "endpoints," because they are analogous to the telephone endpoints discussed above in the teleconferencing context. Accordingly, the implementation shown in FIG. 7 provides another example in which the audio data for each of multiple endpoints, represented by the microphones 715*a*-715*d* in this example, will be recorded separately.

In alternative implementations, the conference participant table 705 may include a microphone array, such as a soundfield microphone. The soundfield microphone may, for example, be capable of producing Ambisonic signals in A-format or B-format (such as the Core Sound TetraMic™), a Zoom H4n™, an MH Acoustics Eigenmike™, or a spatial speakerphone such as a Dolby Conference Phone™. The microphone array may be referred to herein as a single endpoint. However, audio data from such a single endpoint may correspond to multiple conference participants. In some implementations, the microphone array may be capable of detecting spatial information for each conference participant and of including the spatial information for each conference participant in the audio data provided to the the recording device 720.

In view of the foregoing, the present disclosure encompasses various implementations in which audio data for conference involving a plurality of conference participants may be recorded. In some implementations, the conference may be a teleconference whereas in other implementations the conference may be an in-person conference. In various examples, the audio data for each of multiple endpoints may be recorded separately. Alternatively, or additionally, recorded audio data from a single endpoint may correspond to multiple conference participants and may include spatial information for each conference participant.

Various disclosed implementations involve processing and/or playback of data recorded in either or both of the foregoing manners. Some such implementations involve determining a virtual conference participant position for each of the conference participants in a virtual acoustic space. Positions within the virtual acoustic space may be determined relative to a virtual listener's head. In some examples, the virtual conference participant positions may be determined, at least in part, according to the psychophysics of human sound localization, according to spatial parameters that affect speech intelligibility and/or according to empirical data that reveals what talker locations listeners have found to be relatively more or less objectionable, given the conversational dynamics of a conference.

In some implementations, audio data corresponding to an entire conference, or at least a substantial portion of a teleconference, may be available for determining the virtual conference participant positions. Accordingly, a complete or substantially complete set of conversational dynamics data for the conference may be determined. In some examples, the virtual conference participant positions may be determined at least in part, according to a complete or substantially complete set of conversational dynamics data for a conference.

For example, the conversational dynamics data may include data indicating the frequency and duration of conference participant speech. It has been found in listening exercises that many people object to a primary speaker in a conference being rendered to a virtual position behind, or beside the listener. When listening to a long section of speech from one talker (e.g., during a business presentation) many listeners report that they would like a sound source corresponding to the talker to be positioned in front of the listener, just as if the listener were present in a lecture or seminar. For long sections of speech from one talker, positioning behind or beside often evokes the comment that it seems unnatural, or, in some cases, that the listener's personal space is being invaded. Accordingly, the frequency and duration of conference participant speech may be useful input to a process of assigning and/or rendering virtual conference participant positions for a playback of an associated conference recording.

In some implementations, the conversational dynamics data may include data indicating instances of conference participant conversations. It has been found that rendering conference participants engaged in a conversation to substantially different virtual conference participant positions can improve a listener's ability to distinguish which conference participant is talking at any given time and can improve the listener's ability to understand what each conference participant is saying.

The conversational dynamics data may include instances of so-called "doubletalk" during which at least two conference participants are speaking simultaneously. It has been found that rendering conference participants engaged in doubletalk to substantially different virtual conference participant positions can provide the listener an advantage, as compared with rendering conference participants engaged in doubletalk to the same virtual position. Such differentiated positioning provides the listener with better cues to selectively attend to one of the conference participants engaged in doubletalk and/or to understand what each conference participant is saying.

In some implementations, the conversational dynamics data may be applied as one or more variables of a spatial optimization cost function. The cost function may be a function of a vector describing a virtual conference participant position for each of a plurality of conference participants in a virtual acoustic space.

Figure 8:
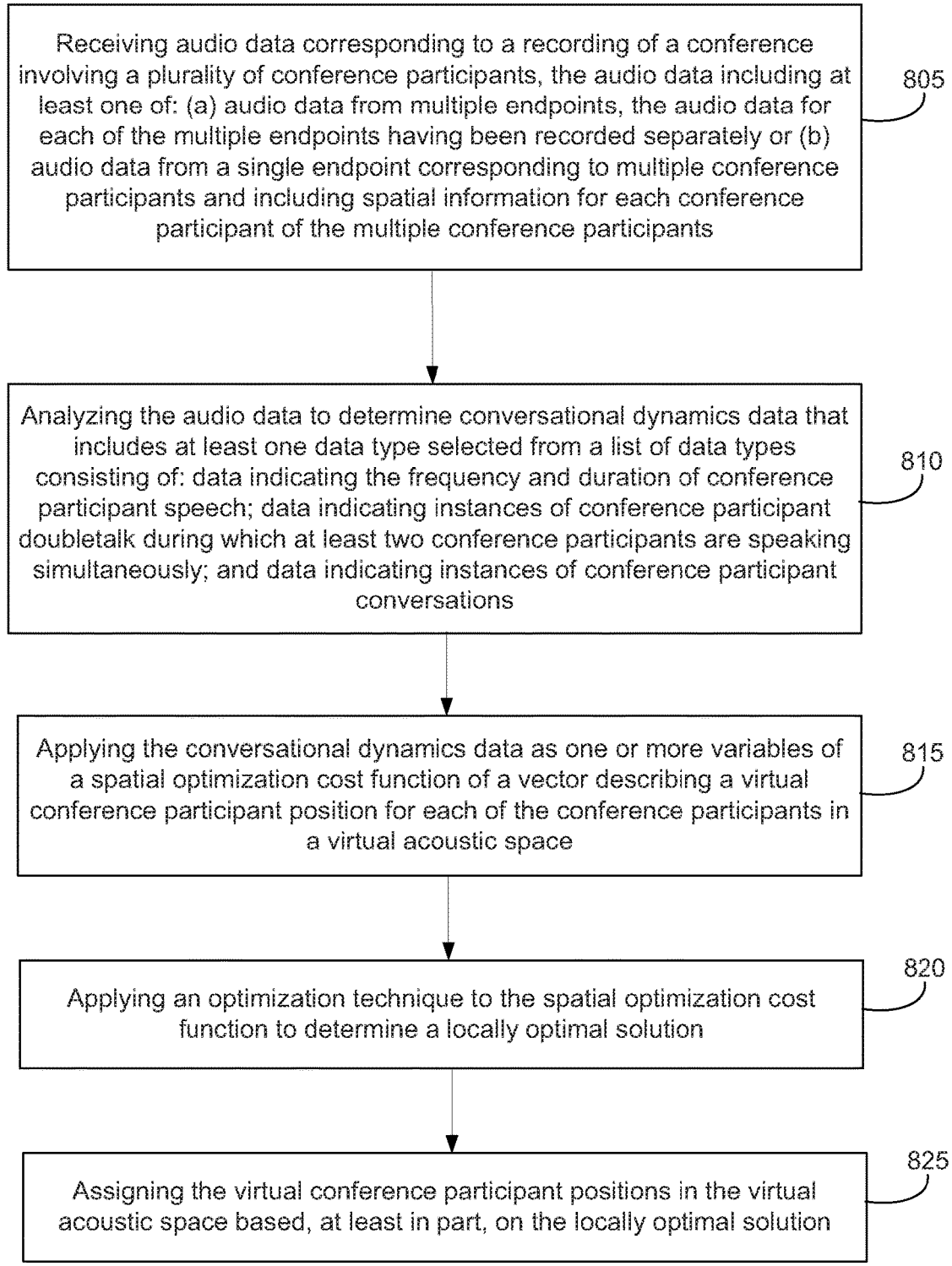
FIG. 8 is a flow diagram that outlines one example of a method according to some implementations of this disclosure.

FIG. 8 is a flow diagram that outlines one example of a method according to some implementations of this disclosure. In some examples, the method 800 may be performed by an apparatus, such as the apparatus of FIG. 3A. The blocks of method 800, like other methods described herein, are not necessarily performed in the order indicated. Moreover, such methods may include more or fewer blocks than shown and/or described.

In this implementation, block 805 involves receiving audio data corresponding to a recording of a conference involving a plurality of conference participants. According to some examples, the audio data may correspond to a recording of a complete or a substantially complete conference. In some implementations, in block 805 a control system, such as the control system 330 of FIG. 3A, may receive the audio data via the interface system 325.

In some implementations, the conference may be a teleconference, whereas in other implementations the conference may be an in-person conference. In this example, the audio data may include audio data from multiple endpoints, recorded separately. Alternatively, or additionally, the audio data may include audio data from a single endpoint corresponding to multiple conference participants and including spatial information for each conference participant of the multiple conference participants. For example, the single endpoint may be a spatial speakerphone endpoint.

In some implementations, the audio data received in block 805 may include output of a voice activity detection process. In some alternative implementations, method 800 may include a voice activity detection process. For example, method 800 may involve identifying speech corresponding to individual conference participants.

In this example, block 810 involves analyzing the audio data to determine conversational dynamics data. In this instance, the conversational dynamics data includes one or more of the following: data indicating the frequency and duration of conference participant speech; data indicating instances of conference participant doubletalk during which at least two conference participants are speaking simultaneously; and data indicating instances of conference participant conversations.

In this implementation, block 815 involves applying the conversational dynamics data as one or more variables of a spatial optimization cost function. Here, the spatial optimization cost function is a function of a vector describing a virtual conference participant position for each of the conference participants in a virtual acoustic space. Positions within the virtual acoustic space may be defined relative to the position of a virtual listener's head. Some examples of suitable cost functions are described below. During playback, the position of the virtual listener's head may correspond with that of an actual listener's head, particularly if the actual listener is wearing headphones. In the following discussion, the terms "virtual listener's head" and "listener's head" may sometimes be used interchangeably. Likewise, the terms "virtual listener" and "listener" may sometimes be used interchangeably.

In this example, block 820 involves applying an optimization technique to the spatial optimization cost function to determine a solution. In this implementation, the solution is a locally optimal solution. Block 820 may, for example, involve applying a gradient descent technique, a conjugate gradient technique, Newton's method, the Broyden-Fletcher-Goldfarb-Shanno algorithm; a genetic algorithm, an algorithm for simulated annealing, an ant colony optimization method and/or a Monte Carlo method. In this implementation, block 825 involves assigning the virtual conference participant positions in the virtual acoustic space based, at least in part, on the locally optimal solution.

For example, a variable of the cost function may be based, at least in part, on conversational dynamics data indicating the frequency and duration of conference participant speech. As noted above, when listening to a long speech from one conversational participant (e.g., during a business presentation) many listeners have indicated that they prefer that conversational participant to be positioned in front of them, just as if they were present in a lecture or seminar. Accordingly, in some implementations, the spatial optimization cost function may include a weighting factor, a penalty function, a cost or another such term (any and all of which may be referred to herein as a "penalty") that tends to place conversational participants who speak frequently in front of the listener. For example, the spatial optimization cost function may apply a penalty for placing conference participants who speak frequently at virtual conference participant positions that are beside, behind, above, or below the virtual listener's head.

Alternatively, or additionally, a variable of the cost function may be based, at least in part, on conversational dynamics data indicating conference participants who are involved in conference participant doubletalk. It has been previously noted that rendering conference participants engaged in doubletalk to substantially different virtual conference participant positions can provide the listener an advantage, as compared with rendering conference participants engaged in doubletalk to the same virtual positions.

In order to quantify such differentiated positioning, some implementations of the spatial optimization cost function may involve applying a penalty for placing conference participants who are involved in conference participant doubletalk at virtual conference participant positions that are on, or close to lying on, a so-called "cone of confusion" defined relative to the virtual listener's head.

Figure 9:
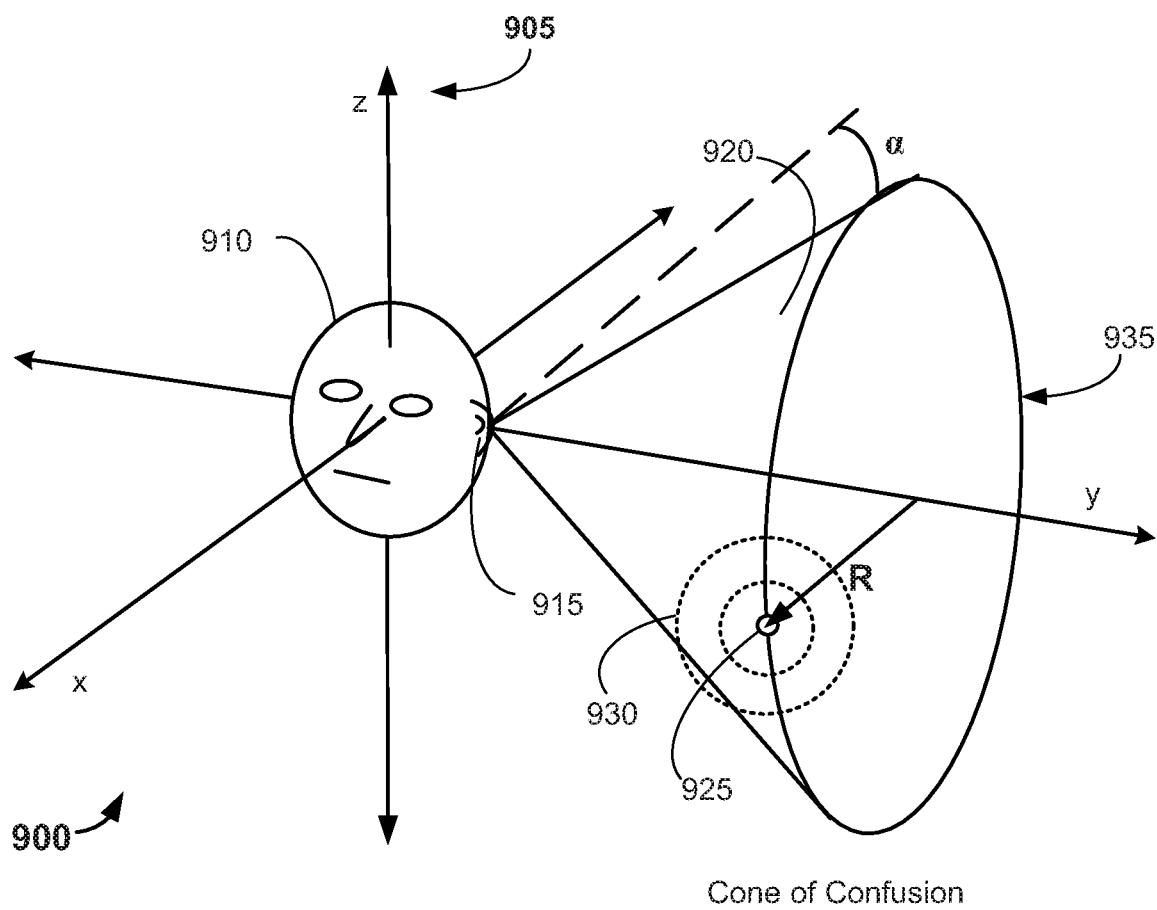
FIG. 9 shows an example of a virtual listener's head and a cone of confusion in a virtual acoustic space.

FIG. 9 shows an example of a virtual listener's head and a cone of confusion in a virtual acoustic space. In this example, a coordinate system 905 is defined relative to the position of a virtual listener's head 910 within the virtual acoustic space 900. In this example, the y axis of the coordinate system 905 coincides with the inter-aural axis that passes between the ears 915 of the virtual listener's head 910. Here, the z axis is a vertical axis that passes through the center of the virtual listener's head 910 and the x axis is positive in the direction that the virtual listener's head 910 is facing. In this example, the origin is midway between the ears 915.

FIG. 9 also shows an example of a cone of confusion 920, which is defined relative to the inter-aural axis and the sound source 925 in this example. Here, the sound source 925 is positioned at a radius R from the inter-aural axis and is shown emitting sound waves 930. In this example, the radius R is parallel to the x and z axes and defines the circular conical slice 935. Accordingly, all points along the circular conical slice 935 are equidistant from each of the ears 915 of the virtual listener's head 910. Therefore, the sound from a sound source located anywhere on the circular conical slice 935, or any other circular conical slice through the cone of confusion 920, will produce identical inter-aural time differences. Such sounds also will produce very similar, though not necessarily identical, inter-aural level differences.

Because of the identical inter-aural time differences, it can be very challenging for a listener to distinguish the locations of sound sources that are on, or close to, a cone of confusion. A sound source position in the virtual acoustic space corresponds with a position to which the speech of a conference participant will be rendered. Accordingly, because a source position in the virtual acoustic space corresponds with a virtual conference participant position, the terms "source" and "virtual conference participant position" may be used interchangeably herein. If the voices of two different conference participants are rendered to virtual conference participant positions that are on, or close to, a cone of confusion, the virtual conference participant positions may seem to be the same, or substantially the same.

In order to sufficiently differentiate the virtual conference participant positions of at least some conference participants (such as those who are engaged in doubletalk), it may be advantageous to define a predetermined angular distance from a cone of confusion, such as the angle α from the cone of confusion 920 that is shown in FIG. 9. The angle α may define a conical annulus, inside and/or outside the cone of confusion 920, that has the same axis (here, the y axis) as the cone of confusion 920. Accordingly, some implementations of the spatial optimization cost function may involve applying a penalty for placing conference participants who are involved in conference participant doubletalk at virtual conference participant positions that are on, or within a predetermined angular distance from, a cone of confusion defined relative to the virtual listener's head. In some implementations, the penalty may be inversely proportional to the angular distance between the cones of confusion on which sources A and B lie. In other words, in some such implementations, the closer the two sources are to lying on a common cone of confusion, the larger the penalty. In order to avoid abrupt changes and/or discontinuities, the penalty may vary smoothly.

Alternatively, or additionally, a variable of the cost function may be based, at least in part, on conversational dynamics data indicating instances of conference participant conversations. As noted above, rendering conference participants engaged in a conversation to substantially different virtual conference participant positions can improve a listener's ability to distinguish which conference participant is talking at any given time and can improve the listener's ability to understand what each conference participant is saying. Accordingly, some implementations of the spatial optimization cost function may involve applying a penalty for placing conference participants who are involved in a conference participant conversation with one another at virtual conference participant positions that are on, or within a predetermined angular distance from, a cone of confusion defined relative to the virtual listener's head. For example, the penalty may increase smoothly the closer that the virtual conference participant positions are to a common cone of confusion.

For conference participants who only make (or who principally make) short interjections during a conference, it may be acceptable, or even desirable, to render the corresponding virtual conference participant positions behind or beside the listener. A placement beside or behind the listener evokes the metaphor of a question or comment from a fellow audience member.

Therefore, in some implementations the spatial optimization cost function may include one or more terms that tend to avoid rendering the virtual conference participant positions corresponding to conference participants who only make (or who principally make) short interjections during a conference to positions in front of the listener. According to some such implementations, the spatial optimization cost function may apply a penalty for placing conference participants who speak infrequently at virtual conference participant positions that are not beside, behind, above or below the virtual listener's head.

When conversing in a group setting, a listener may tend to move closer to a speaker to whom he or she wants to listen, instead of remaining at a distance. There may be social as well as acoustic reasons for such behaviour. Some implementations disclosed herein may emulate such behaviour by rendering the virtual conference participant positions of conference participants who talk more frequently relatively closer to the virtual listener than those who talk less frequently. For example, in some such implementations the spatial optimization cost function may apply a penalty for placing conference participants who speak frequently at virtual conference participant positions that are farther from the virtual listener's head than the virtual conference participant positions of conference participants who speak less frequently.

According to some implementations, the cost function may be expressed as follows:

$$F(a)=F_{conv}(a)+F_{dt}(a)+F_{front}(a)+F_{dist}(a)+F_{int}(a) \quad \text{(Equation 1)}$$

In Equation 1, $F_{conv}$ represents the perceptual cost of violating the guideline that conversational participants who are engaged in a conversation should not be rendered at virtual conference participant positions that lie on or near a cone of confusion. In Equation 1, $F_{dt}$ represents the perceptual cost of violating the guideline that conversational participants who are engaged in doubletalk should not be rendered at virtual conference participant positions that lie on or near a cone of confusion. In Equation 1, $F_{front}$ represents the perceptual cost of violating the guideline that conversational participants who speak frequently should be rendered at virtual conference participant positions that are in front of the listener. In Equation 1, $F_{dist}$ represents the perceptual cost of violating the guideline that conversational participants who speak frequently should be rendered at virtual conference participant positions that are relatively closer to the listener than conversational participants who speak less frequently. In Equation 1, $F_{int}$ represents the perceptual cost of violating the guideline that conversational participants who offer only short interjections and/or speak infrequently should not be rendered at virtual conference participant positions that are in front of the listener.

In alternative implementations the cost function may include more, fewer and/or different terms. Some alternative implementations may omit the $F_{int}$ variable and/or one or more other terms of Equation 1.

In Equation 1, a represents a vector describing the D-dimensional virtual conference participant positions, in a virtual acoustic space, of each of N conference participants. For example, if a renderer has three degrees of freedom per position (such that D=3) and these are the polar (Euler angle) coordinates of azimuth angle ($\theta_i$), elevation angle ($\phi_i$) and distance ($d_i$) for a given source i (where 1≤i≤N) then the vector a could be defined as follows:

$$a = \begin{bmatrix} \theta_1 \\ \phi_1 \\ d_1 \\ \vdots \\ \theta_N \\ \phi_N \\ d_N \end{bmatrix} \quad \text{(Equation 2)}$$

However, in many cases one may obtain a simpler and more numerically stable solution by instead working in Cartesian coordinates. For example, we can define an (x,y,z)

coordinate system such as that shown in FIG. 9. In one such example, we could define $x_i$ to be the distance of source i (such as the sound source 925 of FIG. 9) from the center of the virtual listener's head along an axis extending outwards from the listener's nose in front of the listener. We can define $y_i$ to be the distance of source i from the center of the listener's head along an axis extending to the left of the listener, perpendicular to the first axis. Lastly we can define $z_i$ to be the distance of source i from the center of the listener's head along an axis extending upwards, perpendicular to both the other axes. The units of distance used may be arbitrary. However, in the following description we will assume that distances are normalized to suit the rendering system so that at a virtual distance of one unit from the listener, the listener's ability to localise the source will be maximized.

If we use the Cartesian coordinate system just described, then vector a could be defined as follows:

$$a = \begin{bmatrix} x_1 \\ y_1 \\ z_1 \\ \vdots \\ x_N \\ y_N \\ z_N \end{bmatrix} \quad \text{(Equation 3)}$$

The foregoing paragraphs provide an example of a perceptual cost function F(a), which describes the fitness (suitability) of a particular vector a of virtual conference participant positions according to various types of conversational dynamics data. We can now find a vector of source locations $a_{opt}$, which results in the minimum perceptual cost (in other words, the maximum fitness). Given the foregoing novel cost function, some implementations may involve applying known numerical optimisation techniques to find a solution, such as a gradient descent technique, a conjugate gradient technique, Newton's method, the Broyden-Fletcher-Goldfarb-Shanno algorithm; a genetic algorithm, an algorithm for simulated annealing, an ant colony optimization method and/or a Monte Carlo method. In some implementations, the solution may be a locally optimal solution, for which the above-mentioned example techniques are known to be well-suited.

In some embodiments, the input to a spatial optimization cost function may be a matrix V of VAD (voice activity detector) output. For example, the matrix may have one row for each discrete temporal analysis frame for the conference and may have N columns, one for each conference participant. In one such example, our analysis frame size might be 20 ms, which means that V contains the VAD's estimate of the probability that each 20 ms analysis frame of each source contains speech. In other implementations, the analysis frame may correspond with a different time interval. For the sake of simplicity, let us further assume that in the example described below, each VAD output may be either 0 or 1. That is, the VAD output indicates that each source either does, or does not, contain speech within each analysis frame.

To further simplify the discussion, we may assume that the optimized placement of virtual conference participant positions takes place after the conference recording is complete, so that the process may have random access to all of the analysis frames for the conference. However, in alternative examples, a solution may be generated for any portion of a conference, such as an incomplete recording of the conference, taking into account the VAD information generated for that portion of the conference.

In this example, the process may involve passing the matrix V through aggregation processes in order to generate aggregate features of the conference. According to some such implementations, the aggregate features may correspond to instances of doubletalk and turn-taking during the conference. According to one such example, the aggregate features correspond to a doubletalk matrix $C_{dt}$ and a turn-taking matrix $C_{turn}$.

For example, $C_{dt}$ may be a symmetric N×N matrix describing in row i, j the number of analysis frames during the conference that conference participants i and j simultaneously contained speech. The diagonal elements of $C_{dt}$ therefore describe the number of frames of speech from each conference participant and the other elements of the matrix describe the number of frames a particular pair of conference participants engaged in doubletalk during the conference.

In some implementations, an algorithm to compute $C_{dt}$ may proceed as follows. First, $C_{dt}$ may be initialized so that all elements are zero. Then, each row v of V (in other words, each analysis frame) may be considered in turn. For each frame, one may be added to each element $c_{ij}$ of $C_{dt}$ where columns i and j of v are both non-zero. Alternatively, $C_{dt}$ may be computed by matrix multiplication, e.g., as follows:

$$C_{dt} = V^T V \quad \text{(Equation 4)}$$

In Equation 4, $V^T$ represents the conventional matrix transpose operation applied to matrix V.

A normalized doubletalk matrix $N_{dt}$ may then be created by dividing $C_{dt}$ by the total amount of talk in the conference (in other words, the trace of the matrix $C_{dt}$), e.g., as follows:

$$N_{dt} = \frac{C_{dt}}{tr(C_{dt})} \quad \text{(Equation 5)}$$

In Equation 5, $tr(C_{dt})$ represents the trace of the matrix $C_{dt}$.

In order to compute $C_{turn}$, after initializing to zero, some implementations involve locating the onset of each talkspurt. For example, some implementations may involve considering each conference participant i in V, and finding each row r in V, where there is a zero in column i and a one in row r+1. Then, for each talkspurt, some such examples involve determining which conference participant j most recently spoke prior to that talkspurt. This will be an example of "turn-taking" involving conference participants i and j, which also may be referred to herein as an example of a "turn."

Such examples may involve looking backwards in time (in other words, looking in rows r and above) in order to identify which conference participant j most recently spoke prior to that talkspurt. In some such examples, a "1" may be added to row i, column j of $C_{turn}$ for each such instance of turn-taking found. $C_{turn}$ may, in general, be non-symmetrical because it retains information pertaining to temporal order.

Given the foregoing information, a normalized turn-taking matrix $N_{turn}$ may be created, e.g., by dividing $C_{turn}$ by the total number of turns in the conference (in other words, by the sum of all the elements in the matrix), for example as follows:

$$N_{turn} = \frac{C_{turn}}{\Sigma_i \Sigma_J C_{turn,ij}} \quad \text{(Equation 6)}$$

In Equation 6, $\Sigma_i\Sigma_j C_{turn,ij}$ represents the sum of all the elements in the $C_{turn}$ matrix. In alternative implementations, the matrices $C_{dt}$ and $C_{turn}$, as well as the normalization factors $\text{tr}(C_{dt})$ and $\Sigma_i\Sigma_j C_{turn,ij}$, may be computed by analyzing the VAD output one analysis frame at a time. In other words, it is not necessary to have the entire matrix V available at one time. In addition to $C_{dt}$, $C_{turn}$, $\text{tr}(C_{dt})$ and $\Sigma_i\Sigma_j C_{turn,ij}$, some such methods require only that the identity of the most recent talker be kept as state, as the process iteratively analyzes the VAD output one frame at a time.

In some implementations, the aggregate features $N_{dt}$ and $N_{turn}$ may form the input to the spatial optimization cost function, along with an initial condition for position vector a. Almost any set of initial virtual conference participant positions is suitable. However, it is preferable that any two sources are not initially co-located, e.g., in order to ensure that the gradient of the cost function is well-defined. Some implementations involve making all of the initial virtual conference participant positions behind the listener. In some such implementations, the cost function may not include the $F_{int}$ term or a corresponding term that tends to move the virtual conference participant positions of interjectors/infrequent talkers to positions behind the listener. In other words, two general options are as follows: (a) make all of the initial virtual conference participant positions behind the listener and omit the $F_{int}$ term or a corresponding term; or (b) include the $F_{int}$ term or a corresponding term and make the initial virtual conference participant positions at any convenient locations. $F_{front}$ may be small for interjectors because they talk infrequently. Therefore, implementations that involve option (a) may not have a strong tendency to move interjectors towards the front of the listener.

Figure 10:
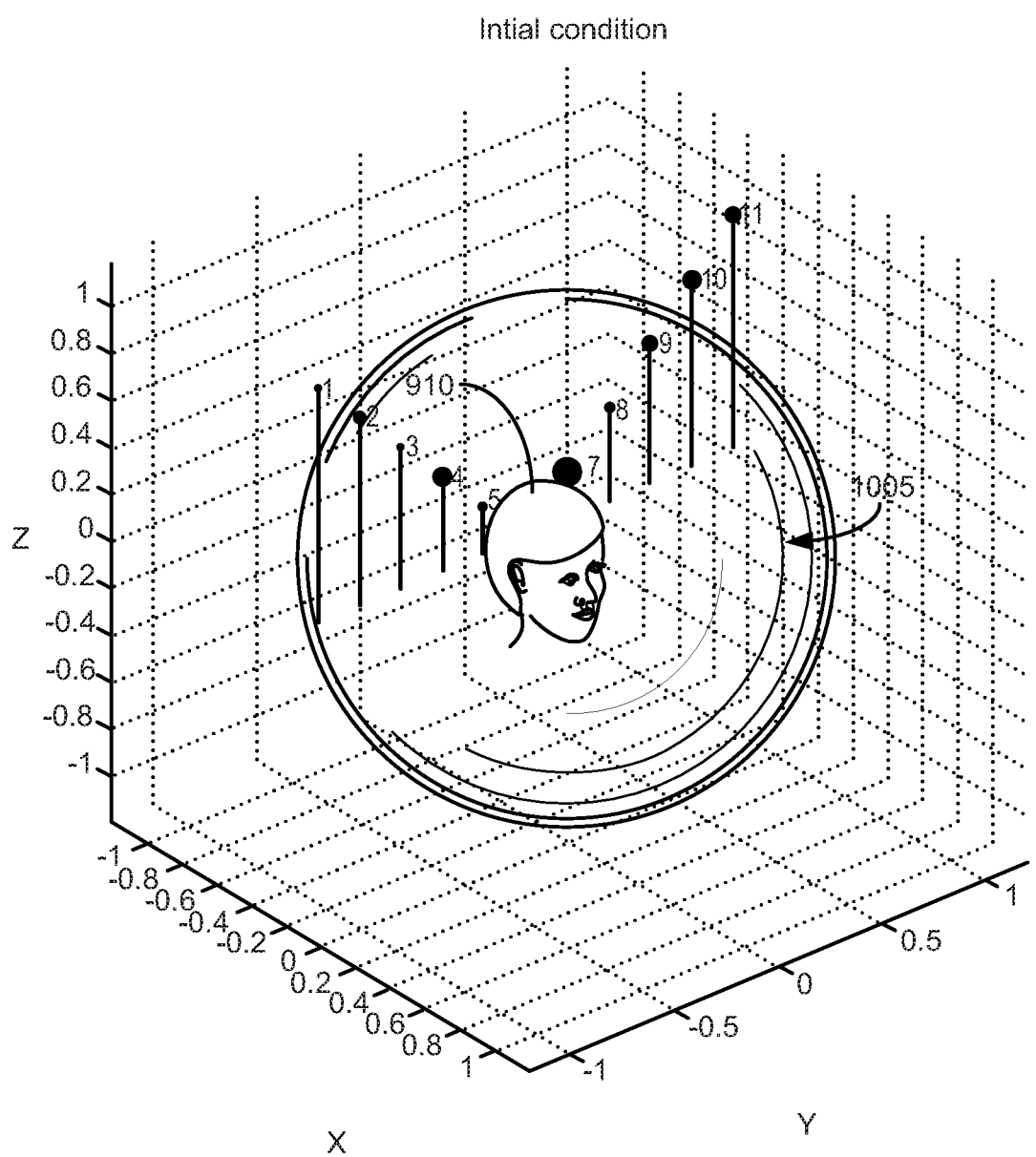
FIG. 10 shows an example of initial virtual conference participant positions in a virtual acoustic space.

FIG. 10 shows an example of initial virtual conference participant positions in a virtual acoustic space. The coordinate system of the virtual acoustic space shown in FIG. 10, like that shown in FIG. 9, is based on the position of the virtual listener's head 910. In this example, 11 initial virtual conference participant positions are shown, each of which has been determined according to the following:

$$x_i = -0.5 \quad \text{(Equation 7)}$$

$$y_i = -1 + \frac{2i}{N-1} \quad \text{(Equation 8)}$$

$$z_i = \left| -1 + \frac{2i}{N-1} \right| \quad \text{(Equation 9)}$$

In Equations 7-9, $x_i$, $y_i$ and $z_i$ represent the initial (x,y,z) coordinates of conversational participant i and N represents the total number of conversational participants. In FIG. 10, the numbered dots correspond to the virtual conference participant positions. The dot size indicates the relative amount of speech for the corresponding conference participant, with a larger dot indicating relatively more speech. The vertical lines attached to the dots indicate the distance above the horizontal plane, corresponding to the z coordinate for each virtual conference participant position. A unit sphere 1005, the surface of which is at a distance of one unit from the origin, is shown for reference.

In one example, a gradient descent optimization may be performed by applying the following formula (at iteration k) until a convergence criterion is reached:

$$a_{k+1} = a_k - \beta_k \nabla F(a_k) \quad \text{(Equation 10)}$$

In Equation 10, $\beta_k$ represents an appropriate step size, which is discussed in further detail below. In one example, one may count the number of successive optimisation steps n in which the following condition holds:

$$|F(a_{k+i}) - F(a_k)| < T \quad \text{(Equation 11)}$$

In Equation 11, T represents a constant, which may be set to an appropriately small value. A suitable example value for the constant T for some implementations is $10^{-5}$. In alternative implementations, T may be set to another value. However, in such alternative implementations, T may be orders of magnitude smaller than an average cost F(a), e.g., averaged over a large number of conference conditions. In some examples, a convergence criterion may be $n \geq 10$, indicating that the change in cost over the last 10 consecutive optimisation steps has been very small and we are now very close to a local minimum (or at least in a very "flat" region of the cost function where any further change is unlikely to be perceived by the listener).

For the sake of clarity in the following discussion, note that we can write the gradient expression from equation 10 in expanded form as follows:

$$\nabla F(a) = \begin{bmatrix} \frac{\partial F(a)}{\partial x_1} \\ \frac{\partial F(a)}{\partial y_1} \\ \frac{\partial F(a)}{\partial z_1} \\ \vdots \\ \frac{\partial F(a)}{\partial x_N} \\ \frac{\partial F(a)}{\partial y_N} \\ \frac{\partial F(a)}{\partial z_N} \end{bmatrix} \quad \text{(Equation 12)}$$

Figure 11:
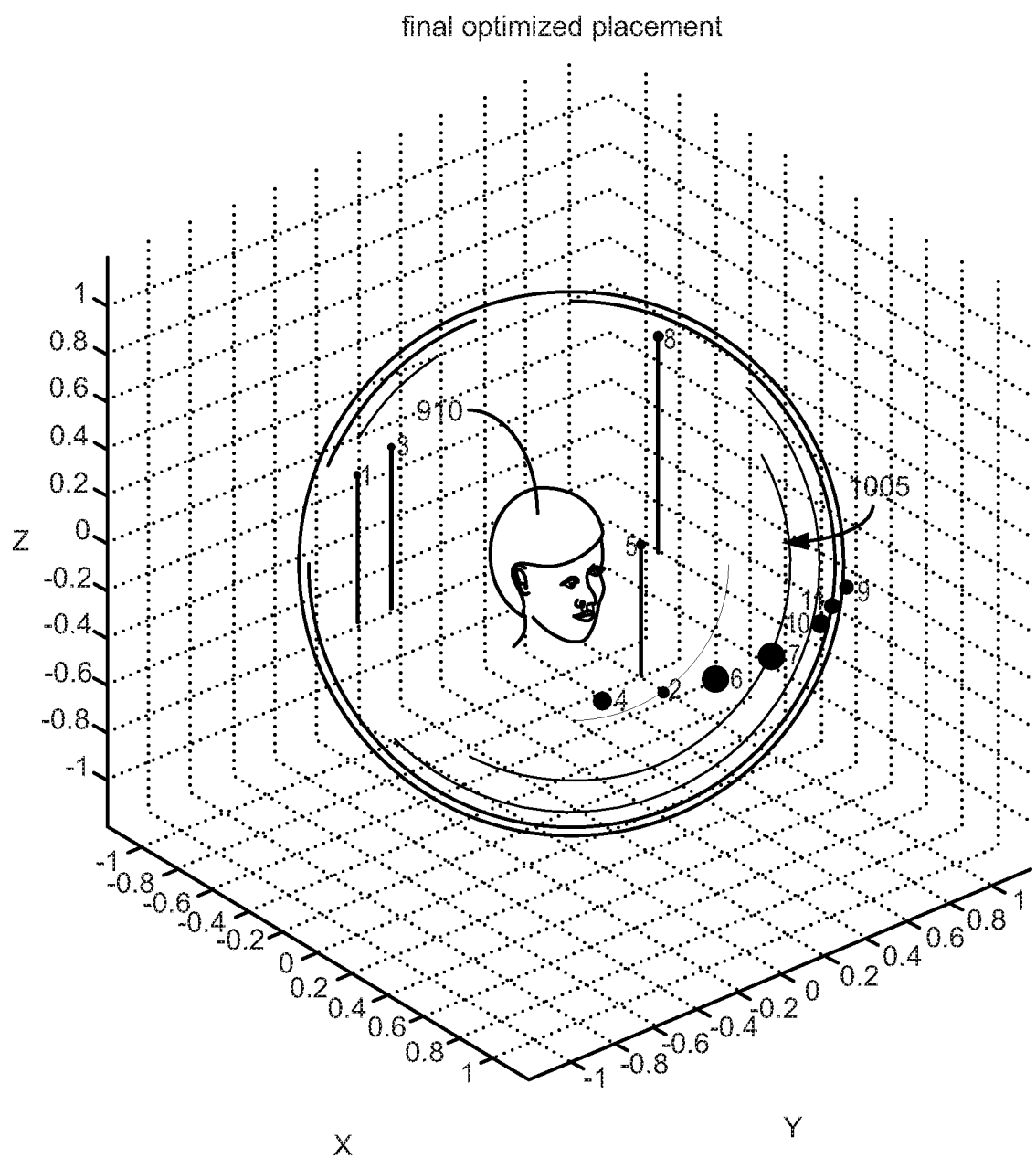
FIG. 11 shows examples of final virtual conference participant positions in a virtual acoustic space.

FIG. 11 shows examples of final virtual conference participant positions in a virtual acoustic space. FIG. 11 shows an example of applying the foregoing process for 11 conversational participants, given the initial virtual conference participant positions shown in FIG. 10. In this example, all of the final virtual conference participant positions are on or near the unit sphere 1005. In FIG. 11, all of the largest dots, which correspond with conversational participants who speak the most frequently, have been moved in front of the virtual listener's head 910. The small dots corresponding to conversational participants 1 and 3 are the smallest, indicating that these conversational participants speak the least frequently and have therefore remained behind the virtual listener's head 910. In this example, the dots corresponding to conversational participants 5 and 8 are small, but slightly larger than those of conversational participants 1 and 3, indicating that these conversational participants somewhat more frequently than conversational participants 1 and 3, but not as much as the other conversational participants. Therefore, the dots corresponding to conversational participants 5 and 8 have drifted forward from their initial positions behind the virtual listener's head 910 somewhat, but not very strongly. The virtual conference participant positions corresponding to conversational participants 5 and 8 remain above the virtual listener's head 910 due to the effect of $F_{dist}$, which tends, in this embodiment, to keep all of the virtual conference participant positions at a radius of one unit from the origin.

Following is a more detailed description of the terms of Equation 1, according to some implementations. In some examples, the term of Equation 1 that corresponds with conversational dynamics data involving conference participant conversations may be determined as follows:

$$F_{conv}(a) = \sum_{i=1}^{N} \sum_{j=1}^{N} F_{conv,ij}(a) \quad \text{(Equation 13)}$$

In Equation 13, $F_{conv,ij}(a)$ represents the component of cost contributed by the pair of sources i and j being near a cone of confusion. Since the sources are on a cone of confusion if their y coordinates are equal (assuming they lie on a unit sphere), in some examples, $F_{conv,ij}(a)$ may be determined as follows:

$$F_{conv,ij}(a) = \begin{cases} 0, & \text{if } i = j \\ \dfrac{K_{conv} N_{turn,ij}}{(y_i - y_j)^2 + \varepsilon}, & \text{otherwise} \end{cases} \quad \text{(Equation 14)}$$

In Equation 14, $K_{conv}$ and $\varepsilon$ represent constants. In some examples, both constants may be set to relatively small values, such as 0.001. In this example, $\varepsilon$ prevents the cost from reaching an infinite value when the sources lie exactly on a cone of confusion. $K_{conv}$ may be tuned with regard to the other parameters in order to achieve good separation while also allowing several sources to be in front. If $K_{conv}$ is set too high, $F_{conv}$ will tend to dominate all the other cost function elements and just spread the sources all around the sphere. Accordingly, while alternative values of $K_{conv}$ and $\varepsilon$ may be used in various implementations, these and other parameters are inter-related and can be jointly tuned to produce desired results.

An underlying assumption of Equation 14 is that the sources lie on a unit sphere, because $F_{dist}(a)$ (one example of which is more specifically defined below) will, in some implementations, reliably keep sources near the unit sphere. If $F_{dist}(a)$ is alternatively defined such that it does not reliably keep sources near the unit sphere, then it may be necessary to normalise the y coordinates prior to calculating $F_{conv,ij}(a)$, e.g., as follows:

$$\hat{y}_i = \dfrac{y_i}{\sqrt{x_i^2 + y_i^2 + z_i^2}} \quad \text{(Equation 15)}$$

$$F_{conv,ij}(a) = \begin{cases} 0, & \text{if } i = j \\ \dfrac{K_{conv} N_{turn,ij}}{(\hat{y}_i - \hat{y}_j)^2 + \varepsilon}, & \text{otherwise} \end{cases} \quad \text{(Equation 16)}$$

Some alternative examples may involve directly calculating a cost proportional to the reciprocal of the inter-aural time differences.

In some implementations, $F_{dt}(a)$ may be calculated as follows:

$$F_{dt}(a) = \sum_{i=1}^{N} \sum_{j=1}^{N} F_{dt,ij}(a) \quad \text{(Equation 17)}$$

In some examples, the term $F_{dt,ij}(a)$ of Equation 17 may be determined as follows:

$$F_{dt,ij}(a) = \begin{cases} 0 & \text{if } i = j \\ \dfrac{K_{dt} N_{dt,ij}}{(y_i - y_j)^2 + \varepsilon}, & \text{otherwise} \end{cases} \quad \text{(Equation 18)}$$

$$\dfrac{\partial F_{dt,ij}}{\partial y_i} = \dfrac{-2 K_{dt} N_{dt,ij}}{[(y_i - y_j)^2 + \varepsilon]^2} \quad \text{(Equation 19)}$$

$$\dfrac{\partial F_{dt,ij}}{\partial y_j} = \dfrac{2 K_{dt} N_{dt,ij}}{[(y_i - y_j)^2 + \varepsilon]^2} \quad \text{(Equation 20)}$$

In Equations 18-20, $K_{dt}$ and $\varepsilon$ represent constants. In some examples, $K_{dt}$ may be 0.002 and $\varepsilon$ may be 0.001. Although various other values of $K_{dt}$ and $\varepsilon$ may be used in alternative implementations, these and other parameters are inter-related and can be jointly tuned to produce desired results.

In some implementations, the variable $F_{front}(a)$ of Equation (1) imposes a penalty for not being in front of the listener which is proportional to the square of how much a conversational participant has participated in the conference. As a result, the virtual conference participant positions for conversational participants who talk relatively more end up relatively closer to a front, center position, relative to a virtual listener in the virtual acoustic space. In some such examples, $F_{front}(a)$ may be determined as follows:

$$F_{front}(a) = \sum_{i=1}^{N} F_{front,i}(a) \quad \text{(Equation 21)}$$

$$F_{front,i}(a) = K_{front} N_{dt,ii}^2 [(x_i - 1)^2 + y_i^2 + z_i^2] \quad \text{(Equation 22)}$$

In Equation 22, $K_{front}$ represents a constant, which in some examples may be 5. Although various other values of $K_{front}$ may be used in alternative implementations, this parameter may be inter-related with others. For example, $K_{front}$ should be large enough to pull the virtual conference participant positions for conversational participants who talk the most to the front, but not so large that $F_{front}$ consistently overpowers the contributions of $F_{conv}$ and $F_{dt}$. In some examples, the contribution to the gradient due to $F_{front}(a)$ may be determined as follows:

$$\dfrac{\partial F_{front,i}}{\partial x_i} = 2 K_{front} N_{dt,ii}^2 (x_i - 1) \quad \text{(Equation 23)}$$

$$\dfrac{\partial F_{front,i}}{\partial y_i} = 2 K_{front} N_{dt,ii}^2 y_i \quad \text{(Equation 24)}$$

$$\dfrac{\partial F_{front,i}}{\partial z_i} = 2 K_{front} N_{dt,ii}^2 z_i \quad \text{(Equation 25)}$$

In some implementations, the $F_{dist}(a)$ component of Equation 1 may impose a penalty for not placing virtual conference participant positions on the unit sphere. In some such examples, the penalty may be higher for conference participants who talk more. In some instances, $F_{dist}(a)$ may be determined as follows:

$$F_{dist}(a) = \sum_{i=1}^{N} F_{dist,i}(a) \quad \text{(Equation 26)}$$

-continued $$F_{dist,i}(a) = K_{dist}N_{dt,ii}[x_i^2 + y_i^2 + z_i^2 - 1]^2 \quad \text{(Equation 27)}$$

In Equation 27, $K_{dist}$ represents a constant, which in some examples may be 1. Although various other values of $K_{dist}$ may be used in alternative implementations, this parameter may be inter-related with others. For example, if $K_{dist}$ is made too small, the effect of $F_{dist}$ may be too weak and sources will tend to drift from the unit sphere. In some examples, the contribution to the gradient due to $F_{dist}(a)$ may be determined as follows:

$$\frac{\partial F_{dist,i}}{\partial x_i} = 4K_{dist}N_{dt,ii}x_i[x_i^2 + y_i^2 + z_i^2 - 1] \quad \text{(Equation 28)}$$

$$\frac{\partial F_{dist,i}}{\partial y_i} = 4K_{dist}N_{dt,ii}y_i[x_i^2 + y_i^2 + z_i^2 - 1] \quad \text{(Equation 29)}$$

$$\frac{\partial F_{dist,i}}{\partial z_i} = 4K_{dist}N_{dt,ii}z_i[x_i^2 + y_i^2 + z_i^2 - 1] \quad \text{(Equation 30)}$$

In some embodiments, the term $F_{int}(a)$ of Equation 1 may be set to zero. This may acceptable, for example, in implementations for which the initial conditions place sources behind the virtual listener's head. Because various implementations of $F_{front}(a)$ place only a weak penalty for sources that talk very little being behind the listener, they will tell to stay behind the virtual listener's head unless the convergence criterion is extremely tight. In some alternative embodiments a small penalty may be associated with any source that is not behind the virtual listener's head. In many implementations, this small penalty would tend to be dominated by $F_{front,i}(a)$ except in the case of conversational participants who talk very little.

Some more detailed examples of convergence criteria and processes will now be described. Referring again to Equation 10, some implementations involve adapting the step size $\beta_k$ as optimization proceeds by the use of a so-called line search. In some such implementations, the value of $\beta_{-1}$ may be initialized to 0.1. According to some such examples, at each step, $\beta_k$ may be adapted according to the following process:

1. Assume $\hat{\beta}_k = \varepsilon_{k-1}$.
2. Compute $F_1 = F(a_k - \hat{\beta}_k F(a_k))$, the new cost at step size $\hat{\beta}_k$.
3. If $F_1 > F(a_k)$, then stepping by $\hat{\beta}_k$ will overshoot the minimum, so halve $\hat{\beta}_k$ and return to step 2.
4. Compute $F_2 = F(a_k - 2\hat{\beta}_k \nabla F(a_k))$, the new cost at step size $2\hat{\beta}_k$.
5. If $F_1 > F_2$, then stepping by $2\hat{\beta}_k$ still undershoot the minimum, so double $\hat{\beta}_k$ and return to step 2.
6. A step size somewhere between $\hat{\beta}_k$ and $2\hat{\beta}_k$ should result in a value near the minimum. Some examples operate under the assumption that the shape of the cost function can be approximated by a quadratic in $\hat{\beta}_k$ through the points $(0, F(a_k))$, $(\hat{\beta}_k, F_1)$, $(2\hat{\beta}_k, F_2)$ and find the minimum as follows:

$$\beta_k = \hat{\beta}_k + \frac{F_2 - F(a_k)}{2F_1 - 3F(a_k) - F_2} \quad \text{(Equation 31)}$$

7. Then, clamp $\beta_k$ to ensure it lies in $[\hat{\beta}_k, 2\hat{\beta}_k]$.

In some embodiments, the spatial optimization cost function may take into account the perceptual distinctiveness of the conversational participants. It is well documented that simultaneous talkers are better understood when their voices are perceived to be very distinct. This has been observed when the traits that give rise to the distinctiveness of voices are described as categorical (e.g., if talkers are recognized as being male or female, or if a voice is perceived as "clean" or "noisy") or continuous (e.g., voice pitch, vocal tract length, etc.)

Accordingly, some implementations may involve determining which conference participants, if any, have perceptually similar voices. In some such implementations, a spatial optimization cost function may apply a penalty for placing conference participants with perceptually similar voices at virtual conference participant positions that are on, or within a predetermined angular distance from, a cone of confusion defined relative to a virtual listener's head. Some such implementations may involve adding another variable to Equation 1.

However, alternative implementations may involve modifying one of the variables of Equation 1. For example, while some implementations of $F_{conv}(a)$ and $F_{dt}(a)$ are designed to penalise locating conference participants who converse and doubletalk respectively in confusable spatial placements, some alternative implementations involve modifying $F_{conv}(a)$ and/or $F_{dt}(a)$ to further penalize such placements if the voices of the conference participants in question are perceptually similar.

Some such examples may involve a third N×N aggregate matrix $N_{dsim}$ which quantifies the dissimilarity of each pair of conference participants involved in a conference. To calculate $N_{dsim}$, some implementations first determine a "characteristic feature vector" s consisting of B characteristic features from each conference participant in a conference recording, where each characteristic feature $s[k]_i$ is a perceptually relevant measure of talker i. One example in which B=2 is as follows:

$$s_i = \begin{bmatrix} s[1]_i \\ s[2]_i \end{bmatrix} \quad \text{(Equation 32)}$$

In Equation 32, $s[1]_i$ represents the median voice pitch and $s[2]_i$ represents the estimated vocal tract length of conference participant i. The characteristic features may be estimated by aggregating information from many, possibly all, speech utterances the conference participant made during the conference. In other implementations other characteristic features, such as accents and speaking rate, may be used to quantify the dissimilarity of a pair of conference participants. Still other implementations may involve quantifying the similarity, rather than the dissimilarity, of a pair of conference participants.

In some implementations, the characteristic feature vector may be produced by a bank of B time-domain filters, each of which may be followed by an envelope detector with appropriate time constant. The characteristic feature vector may be produced by applying a discrete Fourier transform (DFT), which may be preceded by appropriate windowing and followed by an appropriate banding process. The banding process may group DFT bins into bands of approximately equal perceptual size. In some examples, Mel frequency cepstral coefficients may be calculated after the DFT and banding process. If the conference is stored in an encoded format that makes use of frequency domain coding (e.g., according to a modified discrete cosine transform (MDCT) process), some implementations may use the coding domain coefficients followed by appropriate banding.

In some implementations, the characteristic feature vector may be produced by linear prediction coefficients, such as those used in linear predictive coding (LPC) schemes. Some examples may involve perceptual linear prediction (PLP) methods, such as those used for speech recognition.

According to some implementations, after calculation of the characteristic feature vector a suitable distance metric may be applied between each pair of characteristic feature vectors $s_i$, $s_j$ to calculate each element in $N_{dsim}$. An example of such a distance metric is the mean square difference, which may be calculated as follows:

$$N_{dsim,ij} = \frac{1}{B}\sum_{k=1}^{B}(s_i(k)-s_j(k))^2 \qquad \text{(Equation 33)}$$

In Equation 33, k represents an index of one of the B characteristic features in s (in this example, s is a B-dimensional or B-feature vector). According to Equation 33, each of the features is considered, the difference between each two features is determined, that difference is squared and summed over all dimensions. For example, for the two-dimensional example given in Equation 32, B is 2 and the sum over the variable k takes on values k=1 and k=2, corresponding to the literal numbers 1 and 2 seen in Equation 32. Some implementations may involve computing a characteristic feature vector s for a particular conference participant based on information spanning multiple conferences. Some such implementations may involve determining a long-term average of based on audio data for multiple conferences.

In some implementations, there may be a priori knowledge of the gender of conference participants. For example, conference participants may be required or encouraged to specify whether they are male or female as part of a registration or enrolment process. When such knowledge is available to the playback system, an alternative example method for calculating $N_{dsim,ij}$ may be as follows:

$$N_{dsim,ij} = \begin{cases} K_{homo}, & \text{if talkers } i \text{ and } j \text{ are of the same sex} \\ K_{hetero}, & \text{if talkers } i \text{ and } j \text{ are of different sexes} \end{cases} \qquad \text{(Equation 34)}$$

In Equation 34, $K_{homo}$ and $K_{hetero}$ represent constants. In one example, $K_{homo}$ may equal 1.0 and $K_{hetero}$ may be, for example, in the range [0.1, 0.9]*$K_{homo}$, or equal to 0.5.

Based on any of the foregoing examples, one can redefine $F_{conv,ij}(a)$ and $F_{dt,ij}(a)$ to include the spectral similarity aggregate $N_{dsim, ij}$, e.g., as follows:

$$F_{conv,ij}(a) = \begin{cases} 0, & \text{if } i=j \\ \frac{K_{conv}N_{turn,ij}N_{dsim,ij}}{(y_i-y_j)^2+\varepsilon}, & \text{otherwise} \end{cases} \qquad \text{(Equation 35)}$$

$$F_{dt,ij}(a) = \begin{cases} 0, & \text{if } i=j \\ \frac{K_{dt}N_{dt,ij}N_{dsim,ij}}{(y_i-y_j)^2+\varepsilon}, & \text{otherwise} \end{cases} \qquad \text{(Equation 36)}$$

According to some embodiments, assigning a virtual conference participant position may involve selecting a virtual conference participant position from a set of predetermined virtual conference participant positions. In some such examples, each source may only be placed in one of a fixed set of virtual conference participant positions of size A. In such implementations, each cost function component may be calculated directly via table lookup rather than by calculation based on position coordinates. For example, each cost function component may be calculated as follows:

$$F_{conv,ij}(a)=K_{conv,ij}N_{turn,ij}N_{dsim,ij} \qquad \text{(Equation 37)}$$

In Equation 37, $K_{conv,ij}$ represents a fixed matrix (for example, a lookup table) that describes to what extent speech from position i will perceptually mask speech from position j. $K_{conv,ij}$ may be derived, for example, from large-scale subjective tests. In this example, the optimization process involves assigning each source to one of the A virtual conference participant positions. Because the search space is no longer continuous, in such examples discrete optimization techniques (such as simulated annealing and genetic algorithms) may be relatively more applicable than some other optimization techniques referred to herein.

Some implementations may involve a hybrid solution, in which some virtual conference participant positions are assigned to predetermined virtual conference participant positions and other virtual conference participant positions are determined without reference to predetermined virtual conference participant positions. Such implementations may be used, for example, when the number of virtual conference participant positions to be determined exceeds the number of predetermined virtual conference participant positions. In some such examples, if there are A predetermined virtual conference participant positions but more than A virtual conference participant positions to be determined, the predetermined virtual conference participant positions may be used for the A conference participants who talk the most and dynamic positions may be calculated for the remaining conference participants, e.g., by using a spatial optimization cost function such as that of Equation 1.

Some implementations disclosed herein allow a listener to play back and/or scan through a conference recording quickly, while maintaining the ability to attend to words, topics and talkers of interest. Some such implementations reduce playback time by taking advantage of spatial rendering techniques and of introducing (or changing) overlap between instances of conference participant speech according to a set of perceptually-motivated rules. Alternatively, or additionally, some implementations may involve speeding up the played-back conference participant speech.

Figure 12:
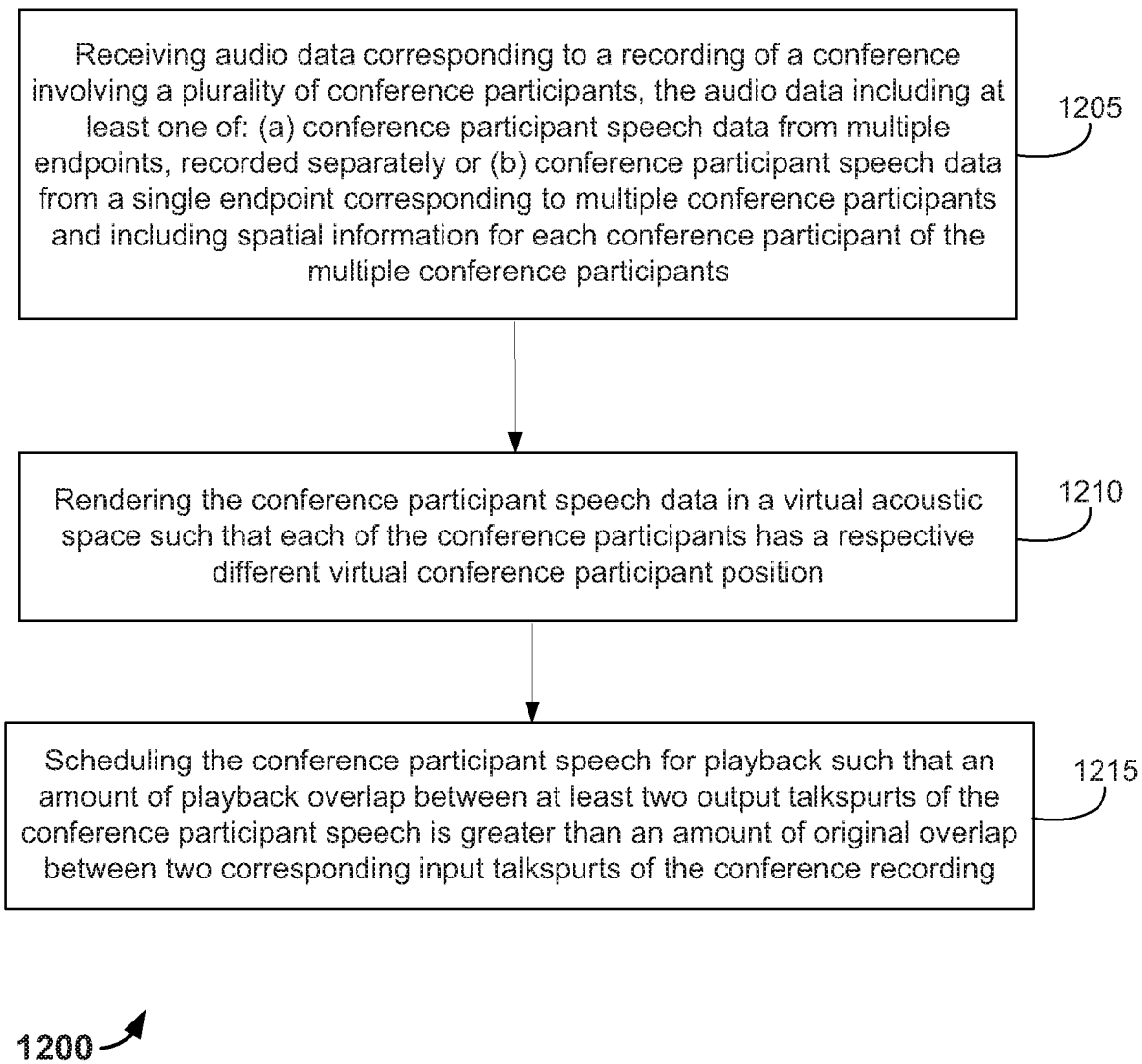
FIG. 12 is a flow diagram that outlines one example of a method according to some implementations of this disclosure.

FIG. 12 is a flow diagram that outlines one example of a method according to some implementations of this disclosure. In some examples, the method 1200 may be performed by an apparatus, such as the apparatus of FIG. 3A and/or one or more components of the playback system 609 of FIG. 6. In some implementations, the method 1200 may be performed by at least one device according to software stored on one or more non-transitory media. The blocks of method 1200, like other methods described herein, are not necessarily performed in the order indicated. Moreover, such methods may include more or fewer blocks than shown and/or described.

In this implementation, block 1205 involves receiving audio data corresponding to a recording of a conference involving a plurality of conference participants. In some implementations, in block 1205 a control system, such as the control system 330 of FIG. 3A, may receive the audio data via the interface system 325.

In some implementations, the conference may be a teleconference, whereas in other implementations the conference may be an in-person conference. In this example, the audio data may include audio data from multiple endpoints, recorded separately. Alternatively, or additionally, the audio data may include audio data from a single endpoint corresponding to multiple conference participants and including spatial information for each conference participant of the multiple conference participants. For example, the single endpoint may include a microphone array, such as that of a soundfield microphone or a spatial speakerphone. According to some examples, the audio data may correspond to a recording of a complete or a substantially complete conference.

In some implementations, the audio data may include output of a voice activity detection process. Accordingly, in some such implementations the audio data may include indications of speech and/or non-speech components. However, if the audio data does not include output of a voice activity detection process, in some examples method 1200 may involve identifying speech corresponding to individual conference participants. For implementations in which conference participant speech data from a single endpoint corresponding to multiple conference participants is received in block 1205, method 1200 may involve identifying speech corresponding to individual conference participants according to the output of a "speaker diarization" process of identifying the conference participant who uttered each instance of the speech.

In this example, block 1210 involves rendering the conference participant speech data for each of the conference participants to a separate virtual conference participant position in a virtual acoustic space. In some implementations, block 1210 may involve virtual conference participant positions as described elsewhere herein.

Accordingly, in some such implementations, block 1210 may involve analyzing the audio data to determine conversational dynamics data. In some instances, the conversational dynamics data may include data indicating the frequency and duration of conference participant speech, data indicating instances of conference participant doubletalk during which at least two conference participants are speaking simultaneously and/or data indicating instances of conference participant conversations. Some implementations may involve analyzing the audio data to determine other types of conversational dynamics data and/or the similarity of conference participant speech.

In some such implementations, block 1210 may involve applying the conversational dynamics data as one or more variables of a spatial optimization cost function. The spatial optimization cost function may be a function of a vector describing a virtual conference participant position for each of the conference participants in a virtual acoustic space. Positions within the virtual acoustic space may be defined relative to the position of a virtual listener's head. Block 1210 may involve applying an optimization technique to the spatial optimization cost function to determine a locally optimal solution and assigning the virtual conference participant positions in the virtual acoustic space based, at least in part, on the locally optimal solution.

However, in other implementations block 1210 may not involve a spatial optimization cost function. For example, in some alternative implementations, block 1210 may involve rendering the conference participant speech data for each of the conference participants to a separate one of multiple predetermined virtual conference participant positions. Some alternative implementations of block 1210 may involve determining the virtual conference participant positions without reference to conversational dynamics data.

In various implementations, method 1200 may involve playing back the conference participant speech according to a set of perceptually-motivated rules. In this example, block 1215 involves playing back the conference participant speech such that at least some of the conference participant speech that did not previously overlap in time is played back in an overlapped fashion, according to the set of perceptually-motivated rules.

According to methods such as method 1200, a listener may benefit from the binaural advantage offered by playing back audio data for each of multiple conference participants from various unique locations in space. For example, the listener may be able to tolerate significant overlap of speech from conference participants, rendered to different locations, and yet maintain the ability to attend to (without loss of generality) words, topics, sounds or talkers of interest. In some implementations, once a section of interest has been identified, the listener may have the option of switching to a non-overlapped playback mode to listen in more detail to that section, e.g., via interaction with one or more elements of a playback system such as the playback system 609 of FIG. 6.

The rules applied in method 1200, and in other methods provided herein, are referred to as "perceptually-motivated" because they are based on real-world listening experiences. For example, in some implementations the set of perceptually-motivated rules may include a rule indicating that two sections of speech of a single conference participant should not overlap in time. This rule is motivated by the observation that, while it is a natural part of human experience to hear multiple talkers speaking concurrently (for example, at a cocktail party); it is not a natural experience to hear two copies of the same talker speaking concurrently. In the real world humans may only utter a single stream of speech at a time and, generally, each human has a uniquely identifiable speaking voice.

Some implementations may involve one or more variants of the foregoing rule. For example, in some implementations the set of perceptually-motivated rules may include a rule indicating that two sections of speech should not overlap in time if the two sections of speech correspond to a single endpoint. In many instances, a single endpoint will correspond with only a single conference participant. In such instances, this variant is another way of expressing the foregoing rule against two sections of speech of a single conference participant overlapping in time. However, in some implementations this variant may be applied even for single endpoints that correspond with multiple conference participants.

In some implementations, the set of perceptually-motivated rules may seek to prevent the order of what is said, during discussions and/or interactions between multiple conference participants, from becoming disordered in an unnatural manner. For example, in the real world one conference participant may answer a question before another conference participant has finished articulating the question. However, one would generally not expect to hear a complete answer to a question, followed by the question itself.

Consider two consecutive input talkspurts A and B, wherein talkspurt A occurs before talkspurt B. According to some implementations, the set of perceptually-motivated rules may include a rule allowing the playback of an output talkspurt corresponding to B to begin before the playback of an output talkspurt corresponding to A is complete, but not before the playback of the output talkspurt corresponding to A has started.

In some implementations, an upper bound (sometimes referred to herein as T) may be imposed on the amount of overlap that is introduced between any two consecutive input talkspurts (such as A and B), in order to prevent a significant degree of acausality of playback during discussions and/or interactions between multiple conference participants. Therefore, in some examples the set of perceptually-motivated rules may include a rule allowing the playback of the output talkspurt corresponding to B to begin no sooner than a time T before the playback of the output talkspurt corresponding to A is complete.

In some instances, the recorded audio data may include input talkspurts that previously overlapped in time (during the original conference). In some implementations, the set of perceptually-motivated rules may include one or more rules indicating that output talkspurts corresponding to previously-overlapped input talkspurts should remain overlapped during playback. In some examples, the set of perceptually-motivated rules may include a rule allowing output talkspurts corresponding to previously-overlapped input talkspurts to be played back further overlapped in time. Such a rule may be subject to one or more other rules governing the amount of permissible overlap, such as those noted in the foregoing paragraphs.

In some implementations, at least some of the conference participant speech may be played back at a faster rate than the rate at which the conference participant speech was recoded. According to some such implementations, playback of the speech at the faster rate may be accomplished by using a WSOLA (Waveform Similarity Based Overlap Add) technique. In alternative implementations, playback of the speech at the faster rate may be accomplished by using other Time-Scale Modification (TSM) methods, such as Pitch Synchronous Overlap and Add (PSOLA) or phase vocoder methods.

Figure 13:
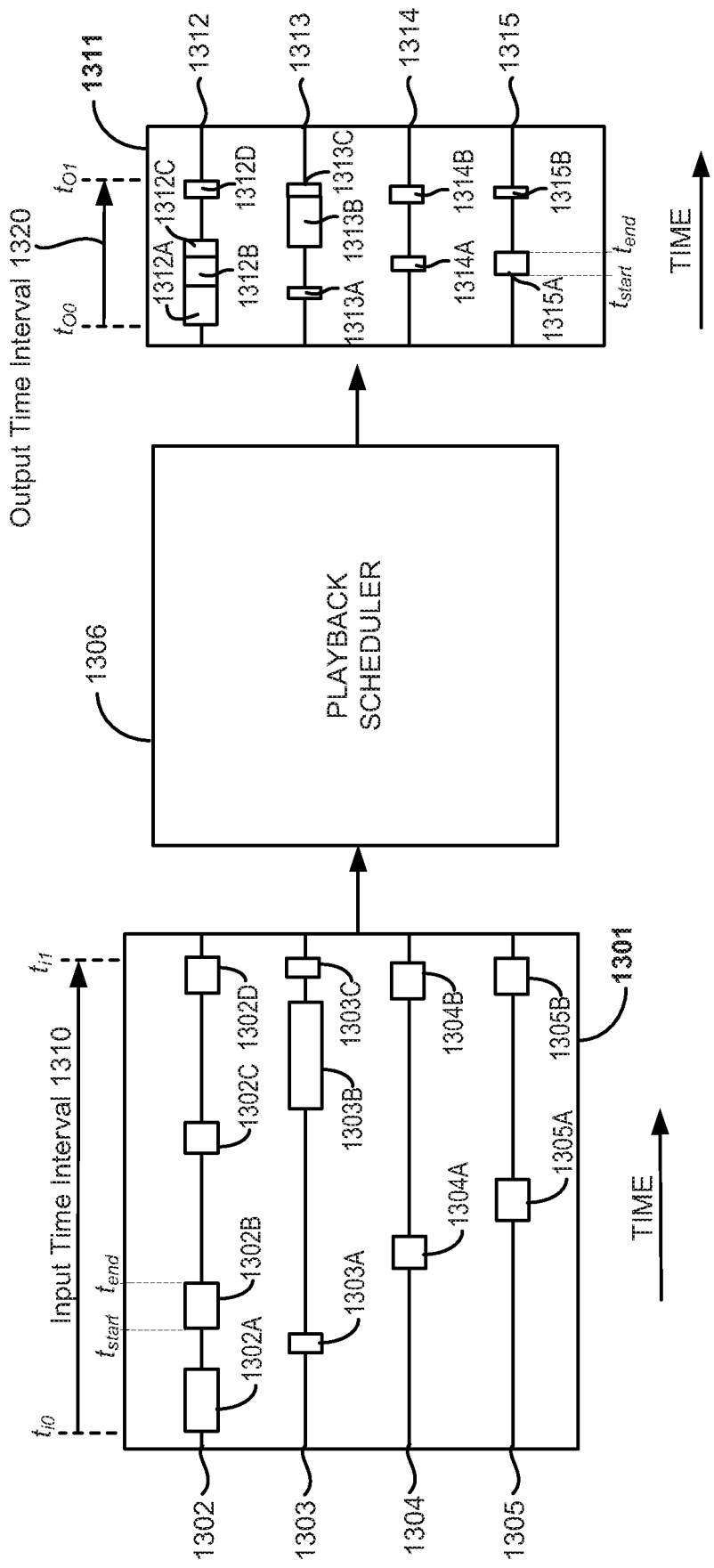
FIG. 13 is a block diagram that shows an example of scheduling a conference recording for playback during an output time interval that is less than an input time interval.

FIG. 13 is a block diagram that shows an example of scheduling a conference recording for playback during an output time interval that is less than an input time interval. The types and numbers of features shown in FIG. 13 are merely shown by way of example. Alternative implementations may include more, fewer and/or different features.

In the example shown in FIG. 13, a playback scheduler 1306 is shown receiving an input conference segment 1301 of a conference recording. In this example, the input time interval 1310 corresponds with a recording time interval of the input conference segment 1301. In FIG. 13, the input time interval 1310 starts at input time $t_{i0}$ and ends at input time $t_{i1}$. The playback scheduler 1306 outputs a corresponding output playback schedule 1311, which has a smaller output time interval 1320 relative to the input time interval 1310. Here, the output time interval 1320 starts at output time $t_{o0}$ and ends at output time $t_{o1}$.

The playback scheduler 1306 may be capable of performing, at least in part, various methods disclosed herein. For example, in some implementations the playback scheduler 1306 may be capable of performing, at least in part, method 1200 of FIG. 12. The playback scheduler 1306 may be implemented in a variety of hardware, software, firmware, etc., depending on the particular implementation. The playback scheduler 1306 may, for example, be an instance of an element of a playback system, such as the playback control module 605 of the playback system 609 shown in FIG. 6. In alternative examples, the playback scheduler 1306 may be implemented, at least in part, via another device and/or module, such as the playback control server 650 or the analysis engine 307, or may be a component of, or a module implemented via, another device, such as the control system 330 of FIG. 3A.

Accordingly, in some examples, the playback scheduler 1306 may include an interface system and a control system such as those shown in FIG. 3A. The interface system may include one or more network interfaces, one or more interfaces between the control system and a memory system and/or one or more an external device interfaces (such as one or more universal serial bus (USB) interfaces). The control system may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some examples, the playback scheduler 1306 may be implemented according to instructions (e.g., software) stored on non-transitory media. Such non-transitory media may include memory devices such as those described herein, including but not limited to random access memory (RAM) devices, read-only memory (ROM) devices, etc.

In the example shown in FIG. 13, the input conference segment 1301 includes input talkspurts from each of endpoints 1302-1305 of an input conference recording. In some implementations, each of the endpoints 1302-1305 may correspond to a telephone endpoint, such as the telephone endpoints 1 shown in FIG. 1A. In other implementations, each of the endpoints 1302-1305 may correspond to an in-person conference endpoint, such as the microphones 715a-715d shown in FIG. 7. Here, the input conference segment 1301 includes input talkspurts 1302A-1302D from endpoint 1302, input talkspurts 1303A-1303C from endpoint 1303, input talkspurts 1304A and 1304B from endpoint 1304 and input talkspurts 1305A and 1305B from endpoint 1305.

The horizontal axes of the input conference segment 1301 and the output playback schedule 1311 represent time. Accordingly, the horizontal dimensions of each of the talkspurts shown in FIG. 13 correspond to examples of talkspurt time intervals. Each input talkspurt has a start time $t_{start}$ and an end time $t_{end}$. For example, the input start time $t_{start}$ and the input end time $t_{end}$ of input talkspurt 1302B are shown in FIG. 13. Accordingly, according to some implementations an input conference segment may be described as a list $L_i$ of input talkspurts, each input talkspurt $T_i$ having an input start time $t_{start}(T_i)$ and an input end time $t_{end}(T_i)$ and being associated with an endpoint.

In this example, the output playback schedule 1311 indicates a plurality of spatial endpoint playback positions 1312-1315 and corresponding output talkspurts. In some implementations, each of the spatial endpoint playback positions may correspond with virtual conference participant positions for each of the conference participants in a virtual acoustic space, e.g., as described elsewhere herein. In this example, the output playback schedule 1311 includes: output talkspurts 1312A-D, which are associated with endpoint playback position 1312 and are based on input talkspurts 1302A-D, respectively; output talkspurts 1313A-C, which are associated with endpoint playback position 1313 and are based on input talkspurts 1303A-C, respectively; output talkspurts 1314A and 1314B, which are associated with endpoint playback position 1314 and are based on input talkspurts 1304A and 1304B, respectively; and output talkspurts 1315A and 1315B, which are associated with endpoint playback position 1315 and are based on input talkspurts 1305A and 1305B, respectively.

Each output talkspurt has a start time $t_{start}$ and an end time $t_{end}$. For example, the output start time $t_{start}$ and the output end time $t_{end}$ of output talkspurt 1315A are shown in FIG. 13. Accordingly, according to some implementations an output playback schedule may be described as a list $L_o$ of output talkspurts, each output talkspurt $T_o$ having an output start time $t_{start}(T_o)$ and an output end time $t_{end}(T_o)$ and being associated with an endpoint and a spatial endpoint playback position. Each output talkspurt also may be associated with a corresponding input talkspurt input($T_i$) and may be scheduled to play at output time $t_{start}(T_o)$.

The playback scheduler 1306 may make the output time interval 1320 smaller than the input time interval 1310 according to a variety of methods, depending on the particular implementation. For example, the output time interval 1320 may be made smaller than the input time interval 1310 at least in part by deleting audio data corresponding to non-speech intervals or "gaps" between at least some of the input talkspurts. Some alternative implementations also may involve deleting audio data corresponding to at least some conference participant vocalizations, such as laughter. By comparing the input conference segment 1301 with the output playback schedule 1311, it may be seen that the input talkspurts 1302A, 1302B and 1302C have gaps between them, but that the playback scheduler 1306 has removed the gaps between the corresponding output talkspurts 1303A-1303C.

Moreover, in the example shown in FIG. 13, at least some of the conference participant speech that did not previously overlap in time is scheduled to be played back in an overlapped fashion. For example, by comparing the input conference segment 1301 with the output playback schedule 1311, it may be seen that the input talkspurts 1302A and 1303A did not previously overlap in time, but that the playback scheduler 1306 has scheduled the corresponding output talkspurts 1312A and 1313A to be overlapped in time during playback.

In this example, the playback scheduler 1306 has scheduled various output talkspurts to be overlapped in time during playback according to a set of perceptually-motivated rules. In this implementation, the playback scheduler 1306 has scheduled output talkspurts to be played back such that two sections of speech that correspond to a single endpoint should not overlap in time. For example, although the playback scheduler 1306 has removed the gaps between the corresponding output talkspurts 1303A-1303C, all of which correspond to the endpoint 1302, the playback scheduler 1306 has not caused any of the output talkspurts 1303A-1303C to overlap.

Moreover, the playback scheduler 1306 has scheduled output talkspurts to be played back such that, given two consecutive input talkspurts A and B, A having occurred before B, the playback of an output talkspurt corresponding to B can begin before the playback of an output talkspurt corresponding to A is complete, but not before the playback of the output talkspurt corresponding to A has started. For example, consecutive input talkspurts 1302C and 1303B correspond to the overlapping output talkspurts 1312C and 1313B. Here, the playback scheduler 1306 has scheduled the output talkspurt 1313B to begin before the playback of the output talkspurt 1313C is complete, but not before the playback of the output talkspurt 1313C has started.

In some implementations, the playback scheduler 1306 may schedule output talkspurts to be played back at a speed factor S times the original speech rate. For example, it may be seen in FIG. 13 that the output talkspurts 1312A-1312D are scheduled to be played back during shorter time intervals than those of corresponding input talkspurts 1302A-1302D. In some implementations, the playback scheduler 1306 may cause the playback of speech at a faster rate according to a WSOLA method or by using another Time-Scale Modification (TSM) method, such as a PSOLA or phase vocoder method.

Given a list $L_i$ of input talkspurts, speed factor S, overlap time t over and output start time $t_{oO}$, according to some implementations the playback scheduler 1306 may operate as follows. The playback scheduler 1306 may initialize the latest input time, $t_{i1}$, to $t_{iO}$, the start time of the input segment. The playback scheduler 1306 may initialize the latest output time for each endpoint, $t_{out,e}$, to $t_{oO}$. The playback scheduler 1306 may initialize the output overlap time $t_{oover}$, $t_{oO}$. The playback scheduler 1306 may initialize the output end time $t_{o1}$ to $t_{oO}$. The playback scheduler 1306 may initialize a list $L_o$ of output talkspurts to an empty list.

Each input talkspurt $T_i$ may be considered in order of input start time. In some examples, for each input talkspurt $T_i$, the playback scheduler 1306 may determine a provisional starting playback time for output talkspurt $T_o$ for playback as follows:

$$t'_{start}(T_o) = \min\left(t_{oover}, t_{o1} - \frac{\max(t_{i1} - t_{start}(T_i), 0)}{S}\right) \quad \text{(Equation 38)}$$

In Equation 38, $t_{start}(T_o)$ represents a provisional starting playback time for output talkspurt $T_o$, $t_{start}(T_i)$ represents a start time for the input talkspurt $T_i$ and S represents a speed factor, which may be expressed as a multiple of the original speech rate at which output talkspurts are to be played back. In the example of Equation 38, the effect of the second argument to min( ) is to maintain, in the output playback schedule 1311, the temporal relationship between input talkspurt $T_i$ and the latest-finishing already-considered input talkspurt according to the following perceptually-motivated rules: (a) when considering two consecutive input talkspurts A and B for overlap, do not allow an output talkspurt corresponding to B to begin playback until a predetermined time after playback of an output talkspurt corresponding to A has begun; and (b) when two input talkspurts are overlapped in input time, the corresponding output talkspurts should remain overlapped, having an analogous temporal relationship in output time.

Figure 14:
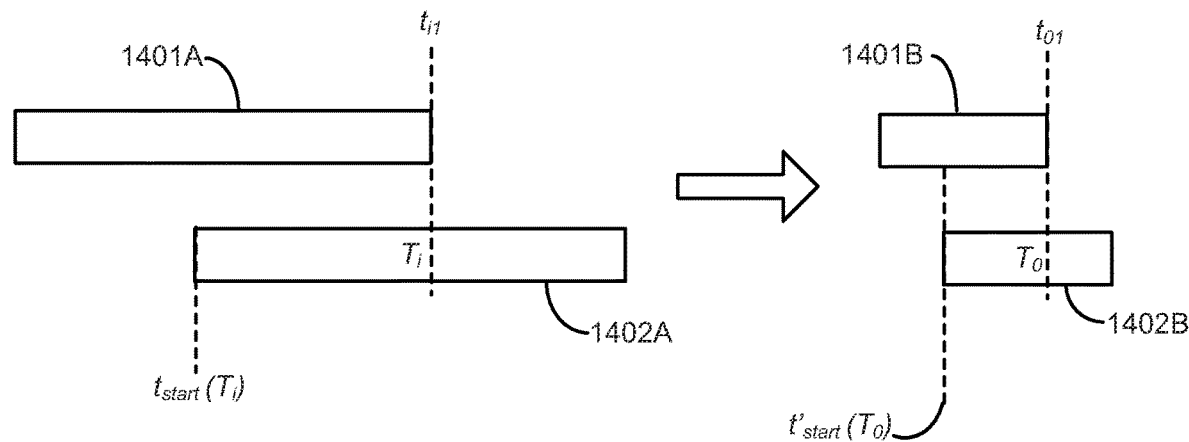
FIG. 14 shows an example of maintaining an analogous temporal relationship between overlapped input talkspurts and overlapped output talkspurts.

FIG. 14 shows an example of maintaining an analogous temporal relationship between overlapped input talkspurts and overlapped output talkspurts. In this example, the playback scheduler 1306 is evaluating input talkspurt 1402A. Accordingly, the input talkspurt 1402A is an example of an input talkspurt $T_i$. In this example, the latest-ending and already-considered input talkspurt 1401A, which overlaps in time with the input talkspurt 1402A, ends at input time $t_{i1}$. Here, the playback scheduler 1306 has already scheduled the output talkspurt 1401B, corresponding to the input talkspurt 1401A, to end at the output time $t_{o1}$.

In FIG. 14, the output talkspurt 1402B is an example of an output talkspurt $T_o$ corresponding with the input talkspurt $T_i$. In this example, the playback scheduler 1306 schedules the provisional starting playback time for the output talkspurt 1402B, according to Equation 38. By virtue of the second argument to min( ) in Equation 38, the output talkspurt 1402B has been scheduled to overlap 1401B by $(t_{o1} - t_{start}(T_o))$, which is equal to the amount of time that the input talkspurt 1402A overlaps the input talkspurt 1401A $((t_{i1} - t_{start}(T_i))$, scaled by the speed factor S.

The playback scheduler 1306 may implement other perceptually-motivated rules via Equation 38. One such perceptually-motivated rule may be that given two consecutive input talkspurts A and B, A having occurred before B, the playback of the output talkspurt corresponding to B may begin no sooner than a predetermined time before the playback of the output talkspurt corresponding to A is complete. In some examples, this perceptually-motivated rule may be applied even if input talkspurts A and B did not initially overlap.

Figure 15:
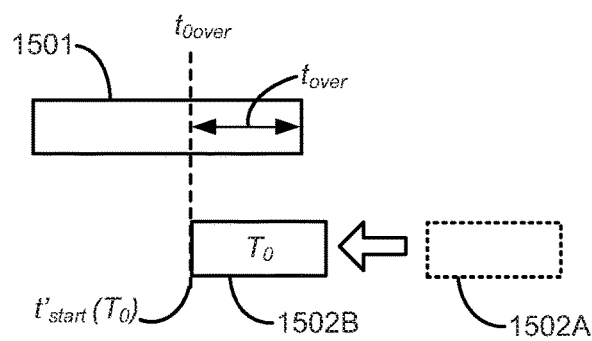
FIG. 15 shows an example of determining an amount of overlap for input talkspurts that did not overlap.

FIG. 15 shows an example of determining an amount of overlap for input talkspurts that did not overlap. In this implementation, the playback scheduler 1306 is determining an output time for an output talkspurt $T_o$ according to Equation 38. Here, output talkspurt 1501 is the latest-ending output talkspurt. In this example, the block 1502A corresponds with a provisional starting playback time for the output talkspurt $T_o$, according to the second argument to min( ) in Equation 38. However, in this example the starting playback time for the output talkspurt $T_o$ is provisionally set to at a time $t_{oover}$, as indicated by the block 1502B, in order to overlap output talkspurt 1501 by an overlap time $t_{over}$: in this example, due to the operation of the min( ) in Equation 38, $t'_{start}(T_o) = t_{oover}$.

Figure 16:
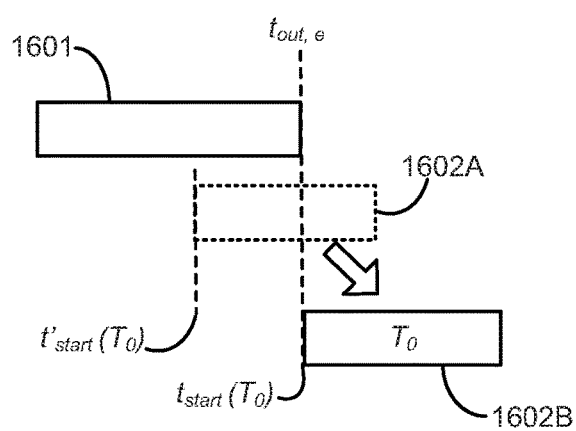
FIG. 16 is a block diagram that shows an example of applying a perceptually-motivated rule to avoid overlap of output talkspurts from the same endpoint.

The playback scheduler 1306 may implement other perceptually-motivated rules. FIG. 16 is a block diagram that shows an example of applying a perceptually-motivated rule to avoid overlap of output talkspurts from the same endpoint. In this example, a playback scheduler 1306 is implement this rule by ensuring that an output talkspurt $T_o$ will not overlap any already-scheduled output talkspurt from the same endpoint e as follows:

$$t_{start}(T_o) = \max(t'_{start}(T_o), t_{out,e})  \quad \text{(Equation 39)}$$

In the example shown in FIG. 16, by the operation of Equation 38 an initial candidate for a starting playback time for the output talkspurt $T_o$ has been set to $t'_{start}(T_o)$, as shown by the position of block 1602A. However, in this example output talkspurt 1601 from the same endpoint was already scheduled to be played back until time $t_{out,e}$, which is after $t'_{start}(T_o)$. Therefore, by the operation of Equation 39, the output talkspurt $T_o$ is scheduled to be played back starting at time $t_{start}(T_o)$, as shown by the position of block 1602B.

In some examples, the output end time for output talkspurt $T_o$ may be calculated as follows:

$$t_{end}(T_o) = t_{start}(T_o) + \frac{(t_{end}(T_i) - t_{start}(T_i))}{S} \quad \text{(Equation 40)}$$

In the example of Equation 40, $t_{end}(T_o)$ represents the output end time for the output talkspurt $T_o$. In this example, the time interval during which the output talkspurt $T_o$ is scheduled to be played back is reduced by dividing the input talkspurt time interval $(t_{end}(T_i) - t_{start}(T_i))$ by the speed factor S.

In some implementations, the output talkspurt $T_o$ may then be appended to output talkspurt list $L_o$. In some examples, the latest output time for the endpoint e of talkspurt $T_o$ may be updated according to:

$$t_{out,e} = t_{end}(T_o) \quad \text{(Equation 41)}$$

In some examples, the output overlap time may be updated according to:

$$t_{oover} = \max(t_{oover}, t_{end}(T_o) - t_{over}) \quad \text{(Equation 42)}$$

According to some implementations, the latest input end time may be updated according to:

$$t_{i1} = \max(t_{i1}, t_{start}(T_i)) \quad \text{(Equation 43)}$$

In some instances, the latest output end time may be updated according to:

$$t_{o1} = \max(t_{o1}, t_{end}(T_o)) \quad \text{(Equation 44)}$$

The foregoing process may be repeated until all input talkspurts have been processed. The scheduled output list $L_o$ may then be returned.

Some conferences may involve presentations by multiple conference participants. As used herein, a "presentation" may correspond to an extended time interval (which may, for example, be several minutes or more) during which a single conference participant is the primary speaker or, in some instances, the only speaker. In some implementations, the set of perceptually-motivated rules may include a rule allowing the concurrent playback of entire presentations from different conference participants. According to some such implementations, at least some of the conference participant speech may be played back at a faster rate than the rate at which the conference participant speech was recorded.

Figure 17:
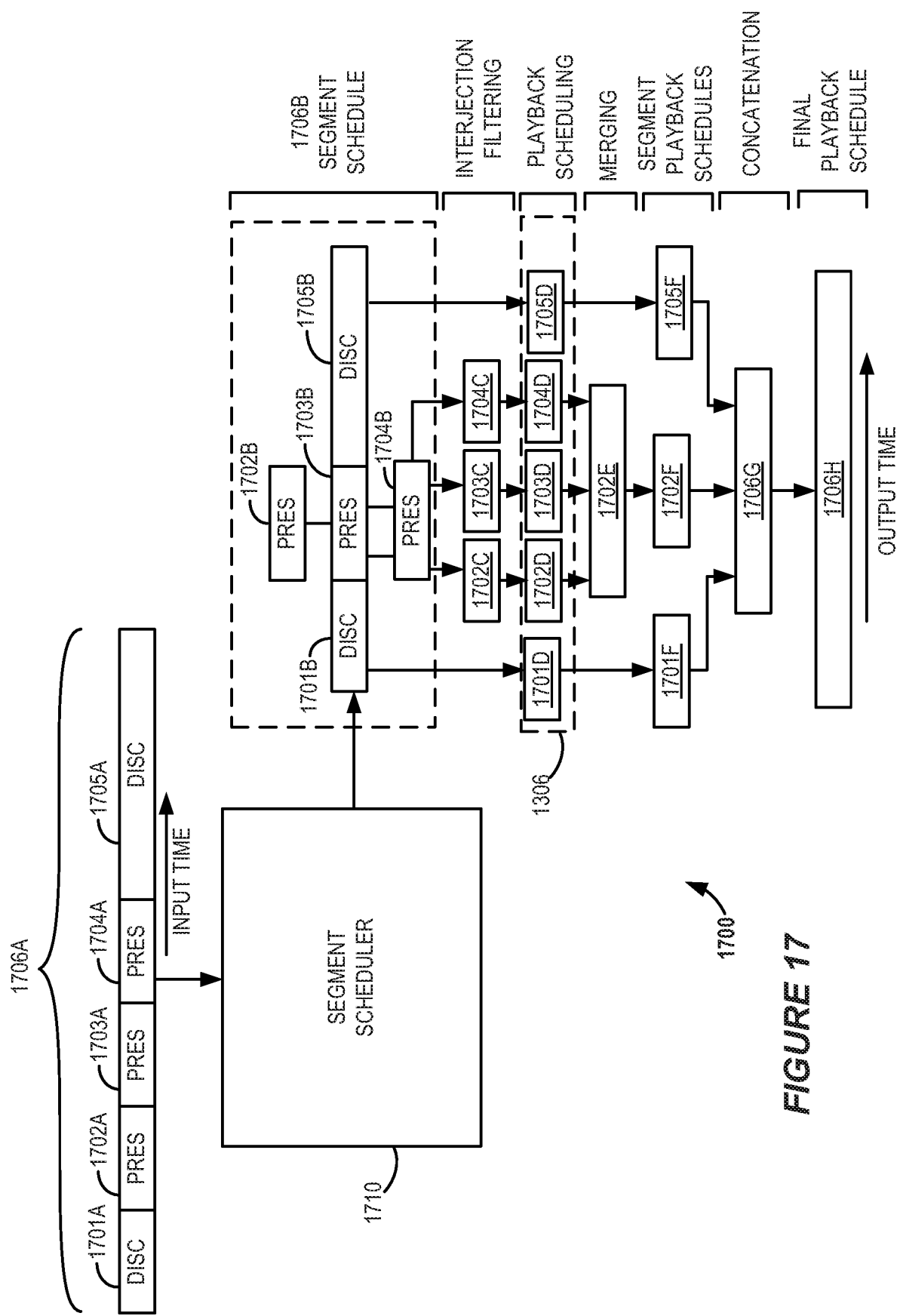
FIG. 17 is a block diagram that shows an example of a system capable of scheduling concurrent playback of entire presentations from different conference participants.

FIG. 17 is a block diagram that shows an example of a system capable of scheduling concurrent playback of entire presentations from different conference participants. The types and numbers of features shown in FIG. 17 are merely shown by way of example. Alternative implementations may include more, fewer and/or different features.

In the example shown in FIG. 17, the system 1700 includes a segment scheduler unit 1710, which is shown receiving a segmented conference recording 1706A. In some examples, the segmented conference recording 1706A may be segmented according to conversational dynamic data, to allow discussions, presentations and/or other types of conference segments to be identified. Some examples of conference segmentation according to conversational dynamic data are provided below. In this example, the segmented conference recording 1706A includes the discussion segment 1701A, followed by the presentation segments 1702A-1704A, followed by the discussion segment 1705A.

The segment scheduler unit 1710 and the other elements of system 1700 may be capable of performing, at least in part, various methods disclosed herein. For example, in some implementations the segment scheduler unit 1710 and the other elements of system 1700 may be capable of scheduling segments of a segmented conference recording for concurrent playback of presentations from different conference participants. The segment scheduler unit 1710 and the other elements of system 1700 may be implemented in a variety of hardware, software, firmware, etc., depending on the particular implementation. For example, the segment scheduler unit 1710 and/or the other elements of system 1700 may be implemented via a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some examples, the segment scheduler unit 1710 and/or the other elements of system 1700 may be implemented according to instructions (e.g., software) stored on non-transitory media. Such non-transitory media may include memory devices such as those described herein, including but not limited to random access memory (RAM) devices, read-only memory (ROM) devices, etc. The segment scheduler unit 1710 and/or the other elements of system 1700 may, for example, be components of the playback system 609, such as the playback control module 605 shown in FIG. 6. In alternative examples, the segment scheduler unit 1710 and/or the other elements of system 1700 may be implemented in another device or module, such as the playback control server 650 or the analysis engine 307, or may be implemented by a component of another device or module, such as the control system 330 of FIG. 3A.

In the example shown in FIG. 17, segment scheduler unit 1710 is capable of determining whether there are consecutive presentation segments, each presented by a different presenter that can be played in parallel. Here, the result of this process is the segment schedule 1706B. In this implementation, the segment schedule 1706B includes a discussion segment 1701B, which is based on the discussion segment 1701A and which will be played first, by itself. Here, the segment schedule 1706B includes presentation segments 1702B-1704B, which are based on the presentation segments 1702A-1704A, respectively. The presentation segments 1702B-1704B will be played concurrently and after the discussion segment 1701B in this implementation.

In this example, the interjection filtering modules 1702C-1704C are capable of removing interjections from the presentation segments 1702B-1704B. Here, the interjections are talkspurts that are not speech of a "presenter," a conference participant who is making a presentation. In some implementations, interjections may not be removed from a presentation segment, e.g., if the presentation segment is not scheduled to be played in parallel with another presentation segment. Accordingly, the interjection filtering modules 1702C-1704C may ensure that speech from the same endpoint is not played concurrently.

In this implementation, the system 1700 includes a playback scheduler unit 1306, such as that shown in FIG. 13. Here, playback scheduler unit 1306 includes modules 1701D-1705D, each of which is capable of independently scheduling one of the conference segments for playback. The modules 1701D and 1705D receive discussion segments 1701B and 1705B, respectively, and output corresponding discussion playback schedules 1701F and 1705F. The modules 1702D-1704D receive output from the interjection filtering modules 1702C-1704C, corresponding to presentation segments 1702B-1704B, and output corresponding independent presentation playback schedules. In some alternative implementations, a separate instance of the playback scheduler unit 1306 may be created for each segment. In some implementations, each segment may be passed to a scheduler function in turn, so that the scheduling process starts afresh for each segment.

In this example, the system 1700 also includes a merging unit 1702E. Here, the merging unit 1702E is capable of merging playback schedules (in output time) for segments that are to be played concurrently into a single playback schedule. In this implementation, the modules 1702D-1704D provide independent presentation playback schedules corresponding to presentation segments 1702B-1704B to the merging unit 1702E, which outputs a merged presentation playback schedule 1702F. In this example, the merged presentation playback schedule 1702F has a length equal to the maximum length of any of the input schedules.

In the implementation shown in FIG. 17, the system 1700 includes a concatenation unit 1706G. In this example, the concatenation unit 1706G is capable of concatenating the first discussion playback schedule 1701F, the merged presentation playback schedule 1702F and the second discussion playback schedule 1705F, and of outputting a single output playback schedule 1706H.

According to some implementations of the segment scheduler unit 1710, the output schedule 1076H may be initialized to an empty list. The scheduler unit 1710 may process each of the segments of a conference recording in order, considering each segment in turn. When the segment under consideration is not a presentation segment, it may be scheduled to produce a segment schedule (e.g., 1701F) and then concatenated to the output playback schedule 1076H with an appropriate output time offset, so that the segment is scheduled to start after the last talkspurt currently in the output playback schedule 1076H. The segment scheduler unit 1710 may then continue with the next segment.

When the segment under consideration is a presentation schedule, the segment scheduler unit 1710 also may consider following segments as long as they are presentations from different presenters. Once a run of presentation segments that may be played back in parallel has been discovered, each of the presentation segments may be filtered for interjections and then separately scheduled using the playback scheduler 605. The merging unit 1702E may then merge the schedules from each of the presentation segments by combining all of the corresponding output talkspurts into a single list that is sorted by output start time. The concatenation unit 1706G may then concatenate the merged presentation schedule to the output schedule 1076H with an appropriate output time offset so that they start after the last talkspurt content currently in the output schedule. The segment scheduler unit 1710 may then continue with the next segment.

It is often difficult for a listener to find regions of interest in a conference recording without listening to the entire recording. This is particularly true if the listener did not attend the conference. The present disclosure introduces various novel techniques to aid a listener in finding regions of interest within a conference recording.

Various implementations described herein involve dividing a conference recording into different segments based on the class of human interaction that seems to predominantly occur in each segment. The segments may correspond with a time interval and at least one segment classification corresponding with a class of human interaction. For example, if from time T1 to time T2, conference participant A seems to have been giving a presentation, a "Presentation" segment may be identified in the time interval from time T1 to time T2. The Presentation segment may be associated with conference participant A. If conference participant A seems to have been answering questions from his or her audience from time T2 to time T3, a "Question and Answer" or "Q&A" segment may be identified in the time interval from time T2 to time T3. The Q&A segment may be associated with conference participant A. If conference participant A seems to have been involved in a discussion with other conference participants during the remainder of the conference recording following time T3, a "Discussion" segment may be identified in the time interval after time T3. The Discussion segment may be associated with the conference participants involved in the discussion.

The resulting segmentation of a conference recording may be potentially useful in a variety of ways. Segmentation can supplement content-based search techniques such as keyword spotting and/or topic determination. For example, instead of searching for the term "helicopter" in an entire 3-hour conference recording, some implementations may allow a listener to search for the term "helicopter" in a particular 30-minute presentation from a particular conference participant within that recording. The ability to further refine a search in this manner can reduce the time it takes to find a particular region and/or event of interest in a teleconference recording.

Some playback system implementations disclosed herein provide a graphical user interface, which may include a visual depiction of conference segments. In such implementations, the visual depiction of conference segments may be useful for providing a visual overview to the user of the playback system of the events of a conference. This visual overview may aid the user in browsing through the conference content. For example, some implementations may allow a listener to browse through all discussion segments and/or all discussion segments that involved a particular conference participant.

Moreover, such conference segmentation may be useful in downstream annotation and search techniques. For example, once the meeting has been broken down into segments based on conversational dynamics, it may be possible to indicate to the user an idea of what topic was covered during that segment by making use of automatic speech recognition. For example, the listener may want to browse through all presentation segments or discussion segments involving a particular topic.

Figure 18A:
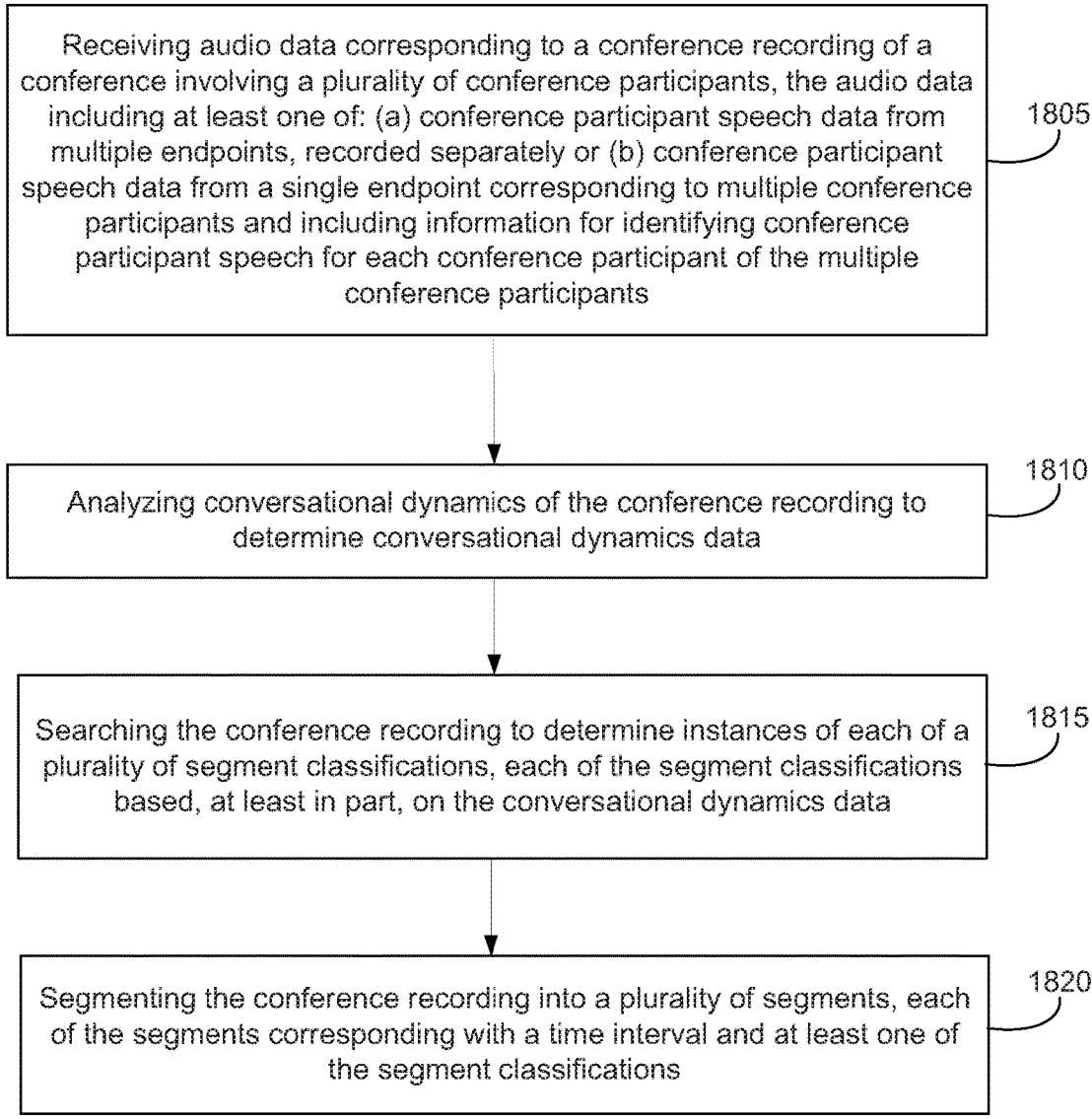
FIG. 18A is a flow diagram that outlines one example of a conference segmentation method.

FIG. 18A is a flow diagram that outlines one example of a conference segmentation method. In some examples, method 1800 may be performed by an apparatus, such as the apparatus of FIG. 3A and/or one or more components of the analysis engine 307 of FIG. 1A or FIG. 3C.

In some implementations, the method 1800 may be performed by at least one device according to software stored on one or more non-transitory media. The blocks of method 1800, like other methods described herein, are not necessarily performed in the order indicated. Moreover, such methods may include more or fewer blocks than shown and/or described.

In this implementation, block 1805 involves receiving audio data corresponding to a recording of a conference involving a plurality of conference participants. In this example, the audio data includes: (a) conference participant speech data from multiple endpoints, recorded separately; and/or (b) conference participant speech data from a single endpoint corresponding to multiple conference participants.

In some implementations, the audio data may include output of a voice activity detection process. Accordingly, in some such implementations the audio data includes indications of speech and/or non-speech components. However, if the audio data does not include output of a voice activity detection process, in some examples method 1800 may involve a voice activity detection process.

According to the example shown in FIG. 18A, conference participant speech data from a single endpoint that corresponds to multiple conference participants also includes information for identifying conference participant speech for each conference participant of the multiple conference participants. Such information may be output from a speaker diarization process. However, if the audio data does not include output from a speaker diarization process, in some examples method 1800 may involve a speaker diarization process.

In some implementations, in block 1805 a control system, such as the control system 330 of FIG. 3A, may receive the audio data via the interface system 325. In some examples, the control system may be capable of performing blocks 1805-1820 of method 1800. In some implementations, the control system may be capable of performing other segmentation-related methods disclosed herein, such as those described herein with reference to FIGS. 18B-23. In some examples, method 1800 may be performed, at least in part, by one or more components of the joint analysis module 306, such as the conversational dynamics analysis module 510 of FIG. 5. According to some such implementations, block 1805 may involve receipt of the audio data by the conversational dynamics analysis module 510.

In some implementations, the conference may be a teleconference, whereas in other implementations the conference may be an in-person conference. According to some examples, the audio data may correspond to a recording of a complete or a substantially complete conference.

In this example, block 1810 involves analyzing the audio data to determine conversational dynamics data. In some instances, the conversational dynamics data may include data indicating the frequency and duration of conference participant speech, doubletalk data indicating instances of conference participant doubletalk during which at least two conference participants are speaking simultaneously, etc. In some implementations, block 1810 may involve determining a doubletalk ratio, which may indicate a fraction of speech time, in a time interval, during which at least two conference participants are speaking simultaneously.

Some implementations described herein involve evaluating analyzing the audio data to determine other types of conversational dynamics data. For example, in some implementations the conversational dynamics data determined in block 1810 may include a speech density metric indicating a fraction of the time interval during which there is any conference participant speech. In some implementations, block 1810 may involve determining a dominance metric indicating a fraction of total speech uttered by a dominant conference participant during the time interval. The dominant conference participant may, for example, be a conference participant who spoke the most during the time interval.

In this implementation, block 1815 involves searching the conference recording to determine instances of each of a plurality of segment classifications. In this example, each of the segment classifications is based, at least in part, on the conversational dynamics data. Various examples are described below.

In some implementations, block 1815 may involve determining instances of Babble segments, which are segments during which at least two conference participants are talking concurrently. In some examples, Babble segments may be identified according to instances of doubletalk data, such as instances of doubletalk that continue during a threshold time interval and/or a fraction of a time interval during which there is doubletalk. Babble segments are often found at the start of a conference, particularly a conference that includes at least one multi-party endpoint, before a substantive discussion, presentation, etc.

According to some implementations, block 1815 may involve determining instances of Mutual Silence segments, which are time intervals during which there is a negligible amount (e.g., less than a mutual silence threshold amount) of speech. This may occur, for example, in teleconferences when one conference participant temporarily leaves his or her endpoint unattended while others await his or her return and/or when one conference participant is waiting for others to join a teleconference. In some implementations, Mutual Silence segments may be based, at least in part on a speech density metric, which may be determined in block 1810.

Due in part to their distinctive conversational dynamics characteristics, instances of Babble segments may be identified with a high level of confidence and instances of Mutual Silence segments may be identified with a very high level of confidence. Moreover, the start times and end times of Babble segments and Mutual Silence segments may be identified with a relatively high level of confidence. Because there is a relatively low likelihood that a Babble segment includes intelligible speech corresponding to a conference topic of interest and a very low likelihood that a Mutual Silence segment includes any speech corresponding to a conference topic of interest, a person reviewing the conference recording may be reasonably confident that he or she may safely omit review of such conference segments. Therefore, identifying Babble segments and Mutual Silence segments can result in time savings to a listener during playback of a conference recording.

In some implementations, block 1815 may involve determining instances of Presentation segments, which are segments during which one conference participant is doing the vast majority of the talking, while other conference participants remain substantially silent. According to some implementations, determining instances of Presentation segments may be based, at least in part, on a speech density metric and a dominance metric. Presentations generally involve very little doubletalk. Therefore, in some implementations determining instances of Presentation segments may be based, at least in part, on a doubletalk metric, such as a doubletalk ratio.

Due in part to their distinctive conversational dynamics characteristics, instances of Presentation segments may be identified with a relatively high level of confidence. In some implementations, the start times and end times of Presentation segments may be identified with a reasonably high level of confidence, but generally with a lower level of confidence than that with which the start times and end times of Babble segments and Mutual Silence segments may be identified. Because there is a high likelihood that a Presentation segment includes speech corresponding to a conference topic of interest, it may be advantageous to a reviewer to have such conference segments identified. Such potential advantages may be enhanced in implementations which provide additional information regarding conference segments, such as implementations which involve keyword identification, topic determination, etc. For example, a listener may choose to review only Presentation segments in which a particular word was uttered or during which a particular topic is discussed. Accordingly, identifying Presentation segments can result in time savings to a listener during playback of a conference recording.

In some implementations, block 1815 may involve determining instances of Discussion segments, which are segments during which multiple conference participants speak, but without any clear dominance from a single conference participant. According to some implementations, determining instances of Discussion segments may be based, at least in part, on a speech density metric and a dominance metric. Some discussions may involve a significant amount of doubletalk, but usually not as much doubletalk as a Babble segment. Therefore, in some implementations determining instances of Discussion segments may be based, at least in part, on a doubletalk metric, such as a doubletalk ratio.

In some implementations, block 1815 may involve determining instances of Q&A segments, which are segments that correspond with a time interval during which multiple conference participants ask questions and either a single conference participant replies or one participant replies from a smaller subset of conference participants. For example, a Q&A segment often may follow the conclusion of a presentation segment. After the presentation, the presenting conference participant may answer questions posed by other conference participants who were listening to the presentation. During question and answer sessions, a single conference participant often replies, so that conference participant may do more talking than any other conference participant. Accordingly, the dominance metric may be less than that for a presentation and greater than that for a discussion. Therefore, according to some implementations, determining instances of Q&A segments may be based, at least in part, on a speech density metric and a dominance metric. There may sometimes be a significant amount of doubletalk during a question and answer session (e.g., more doubletalk than there is during a presentation), but there may be less doubletalk during a question and answer session than during a discussion. Accordingly, in some implementations determining instances of Q&A segments may be based, at least in part, on a doubletalk metric, such as a doubletalk ratio.

In some implementations, Discussion segments and Q&A segments may not be identified with the same level of confidence as, for example, a Mutual Silence segment, a Babble segment or even a Presentation segment. In some implementations, the start times and end times of Discussion segments and Q&A segments may be identified with a moderate level of confidence, but generally with a lower level of confidence than that with which the start times and end times of Babble segments and Mutual Silence segments may be identified. However, because there is a reasonable likelihood that a Discussion segment or a Q&A segment may include speech corresponding to a conference topic of interest, it may be advantageous to a reviewer to have such conference segments identified. Such potential advantages may be enhanced in implementations which provide additional information regarding conference segments, such as implementations which involve keyword identification, topic determination, etc. For example, a listener may choose to review only Presentation segments, Discussion segments and/or Q&A segments in which a particular word was uttered or during which a particular topic is discussed. Accordingly, identifying Discussion segments and/or Q&A segments can result in time savings to a listener during playback of a conference recording.

Here, block 1820 involves segmenting the conference recording into a plurality of segments. In this example, each of the segments corresponds with a time interval and at least one of the segment classifications. A segment may correspond with additional information, such as the conference participant(s), if any, who speak during the segment.

According to some implementations, the searching and/or segmenting processes may be recursive. In some implementations, the analyzing, searching and segmenting processes may all be recursive. Various examples are provided below.

In the following description, it may be observed that several of the search processes may involve temporal thresholds (such as $t_{min}$ and $t_{snap}$), which will be described below. These temporal thresholds have the effect of limiting the size of a segment to be not smaller than a threshold time. According to some implementations, when the results of a segmentation process are displayed to a user (for example, when the playback system 609 of FIG. 6 causes a corresponding graphical user interface to be provided on a display), the user may be able to zoom in and out in time (for example, by interacting with a touch screen, by using a mouse or by activating zoom in or zoom out commands). In such a situation, it may be desirable to have performed the segmentation process multiple times at different timescales (which may involve applying different values of $t_{min}$ and During $t_{snap}$). During playback, it may be advantageous to switch dynamically between segmentation results at different time scales, the results of which may be displayed to the user based on the current zoom level. According to some examples, this process may involve choosing a segmentation timescale that will not contain segments that occupy less than X pixels in width at the current zoom level. The value of X may be based, at least in part, on the resolution and/or size of the display. In one example, X may equal 100 pixels. In alternative examples, X may equal 50 pixels, 150 pixels, 200 pixels, 250 pixels, 300 pixels, 350 pixels, 400 pixels, 450 pixels, 500 pixels, or some other number of pixels. The conversational dynamics data files 515a-515e, shown in FIG. 5, are examples of segmentation results at different time scales that may be used for quickly adjusting a display based on the current zoom level.

However, in other implementations blocks 1810-1820 may not be performed recursively, but instead may each be performed a predetermined number of times, such as only one time, only two times, etc. Alternatively, or additionally, in some implementations blocks 1810-1820 may be performed at only one time scale. The output of such implementations may not be as accurate or as convenient for a listener as recursive processes. However, some such implementations may be performed more rapidly than recursive implementations and/or implementations performed for multiple time scales. Alternatively, or additionally, such implementations may be simpler to implement than recursive implementations and/or implementations performed for multiple time scales.

In some implementations, the searching and segmenting processes (and, in some implementations, the analyzing process) may be based, at least in part, on a hierarchy of segment classifications. According to some implementations, the analyzing, searching and segmenting processes all may be based, at least in part, on a hierarchy of segment classifications. As noted above, different segment types, as well as the start and end times for different segment types, may be identified with varying degrees of confidence. Therefore, according to some implementations, the hierarchy of segment classifications is based, at least in part, upon a level of confidence with which segments of a particular segment classification may be identified, a level of confidence with which a start time of a segment may be determined and/or a level of confidence with which an end time of a segment may be determined.

For example, a first or highest level of the hierarchy of segment classifications may correspond with Babble segments or Mutual Silence segments, which may be identified with a high (or very high) level of confidence. The start and end times of Babble segments and Mutual Silence segments also may be determined with a high (or very high) level of confidence. Accordingly, in some implementations a first stage of the searching and segmenting processes (and, in some implementations, the analyzing process) may involve locating Babble segments or Mutual Silence segments.

Moreover, different segment types have different likelihoods of including subject matter of interest, such as conference participant speech corresponding to a conference topic, a keyword of interest, etc. It may be advantageous to identify which conference segments can be skipped, as well as which conference segments are likely to include subject matter of interest. For example, Babble segments and Mutual Silence segments have a low or very low likelihood of including conference participant speech corresponding to a conference topic, a keyword of interest, etc. Presentation segments may have a high likelihood of including conference participant speech corresponding to a conference topic, a keyword of interest, etc. Therefore, according to some implementations, the hierarchy of segment classifications is based, at least in part, upon a likelihood that a particular segment classification includes conference participant speech corresponding to a conference topic.

According to some implementations, the searching and segmenting processes (and, in some implementations, the analyzing process) may involve locating Babble segments first, then Presentation segments, then Q&A segments, then other segments. The processes may be recursive processes. Other implementations may involve locating segments in one or more different sequences.

Figure 18B:
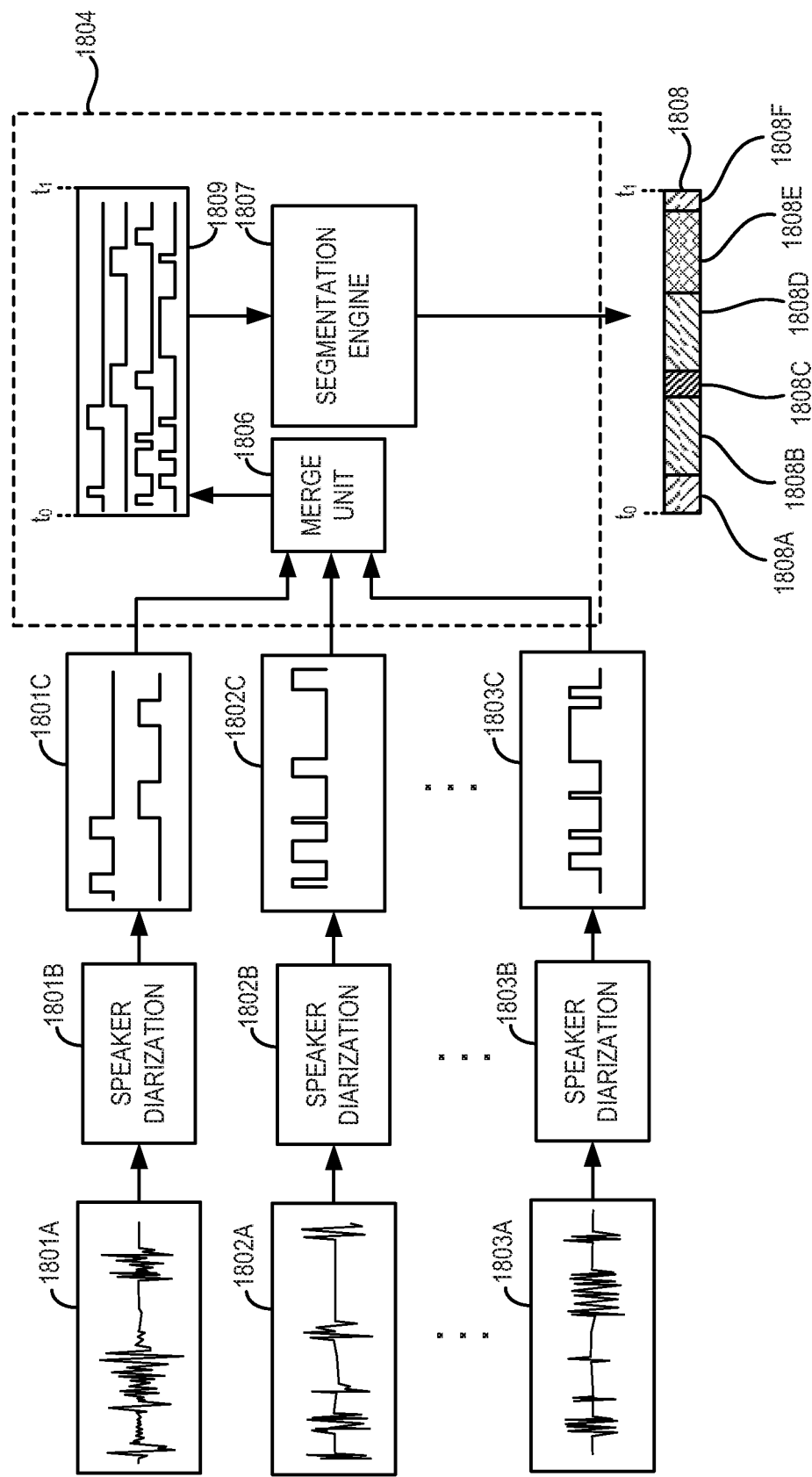
FIG. 18B shows an example of a system for performing, at least in part, some of the conference segmentation methods and related methods described herein.

FIG. 18B shows an example of a system for performing, at least in part, some of the conference segmentation methods and related methods described herein. As with other figures provided herein, the numbers and types of elements shown in FIG. 18B are merely shown by way of example. In this example, audio recordings 1801A-1803A are being received by speaker diarization units 1801B-1803B. The audio recordings 1801A-1803A may, in some implementations, correspond with the packet trace files 201B-205B described above with reference to FIGS. 3C and 4, each of which may correspond to one of the uplink data packet streams 201A-205A. The speaker diarization units 1801B-1803B may, in some implementations, be instances of the speaker diarization module 407 shown in FIG. 4.

In this example, each of the audio recordings 1801A-1803A is from a telephone endpoint. Here, audio recording 1801A is a recording from a multi-party endpoint (e.g., a speakerphone), while audio recordings 1802A and 1803A are recordings of single-party endpoints (e.g. standard telephones and/or headsets).

In this example, the speaker diarization units 1801B-1803B are capable of determining when speech was uttered by each conference participant. When processing audio data from a single-party endpoint, such as the audio recordings 1802B and 1803B, the speaker diarization units 1802B and 1803B may function as a voice activity detector. When processing audio data from a multi-party endpoint, such as the audio recording 1801A, the speaker diarization unit 1801C may estimate how many conference participants are present (e.g., how many conference participants are speaking during the conference) and may attempt to identify which of the conference participants uttered each talkspurt. In some implementations, the speaker diarization units 1801B-1803B may use methods known by those of ordinary skill in the art. For example, in some implementations the speaker diarization units 1801B-1803B may use a Gaussian mixture model to model each of the talkers and may assign the corresponding talkspurts for each talker according to a Hidden Markov model.

In the implementation shown in FIG. 18B, the speaker diarization units 1801B-1803B output the speaker activity documents 1801C-1803C. Here, each of the speaker activity documents 1801C-1803C indicates when speech was uttered by each conference participant at a corresponding endpoint. The speaker activity documents 1801C-1803C may, in some implementations, be instances of the uplink analysis results available for joint analysis 401-405 shown in FIG. 5.

In this example, the speaker activity documents 1801C-1803C are received by the segmentation unit 1804 for further processing. The segmentation unit 1804 produces a segmentation record 1808 that is based, at least in part, on the speaker activity documents 1801C-1803C. The segmentation unit 1804 may, in some implementations, be an instance of the conversational dynamics analysis module 510 of FIG. 5. In some such implementations, the segmentation record 1808 may be an instance of one of the conversational dynamics data files 515*a*-515*e* that are shown to be output by the conversational dynamics analysis module 510 in FIG. 5.

The segmentation unit 1804 and the speaker diarization units 1801B-1803B may, depending on the particular example, be implemented via hardware, software and/or firmware, e.g., via part of a control system that may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. In some examples, the segmentation unit 1804 and the speaker diarization units 1801A-1803B may be implemented according to instructions (e.g., software) stored on non-transitory media, such as random access memory (RAM) devices, read-only memory (ROM) devices, etc.

In this example, the segmentation unit 1804 includes a merge unit 1806, which is capable of combining the plurality of speaker activity documents 1801C-1803C into a global speaker activity map 1809. A global speaker activity map 1809 for the time interval from $t_0$ to $t_1$, which corresponds to an entire conference in this example, is shown in FIG. 18B. The global speaker activity map 1809 indicates which conference participants spoke during which time intervals and at which endpoint during the conference.

In this example, the segmentation unit 1804 includes a segmentation engine 1807, which is capable of performing analyzing, searching and segmenting processes such as those described above with reference to FIG. 18A. The analyzing, searching and segmenting processes may sometimes be collectively referred to herein as a "segmentation process." In this implementation, the segmentation engine 1807 is capable of performing a hierarchical and recursive segmentation process, starting with a process of locating Babble segments. In alternative implementations, the segmentation engine 1807 may start with a process of locating another classification of segment, such as Mutual Silence or Presentation segments.

In this example, the segmentation record 1808 is a list of segments 1808A-1808F found in the conference. Here, each of the segments 1808A-1808F has a start time, an end time and a segment classification identifier. In this example, the segment classification identifier will indicate that the segment is a Mutual Silence segment, a Babble segment, a Presentation segment, a Discussion segment or a Question and Answer (Q&A) segment. Other implementations may involve more or fewer segment classifications. In this example, the segments 1808A and 1808F are Babble segments, the segments 1808B and 1808D are Presentation segments, the segment 1808C is a Q&A segment and the segment 1808E is a Discussion segment.

Figure 19:
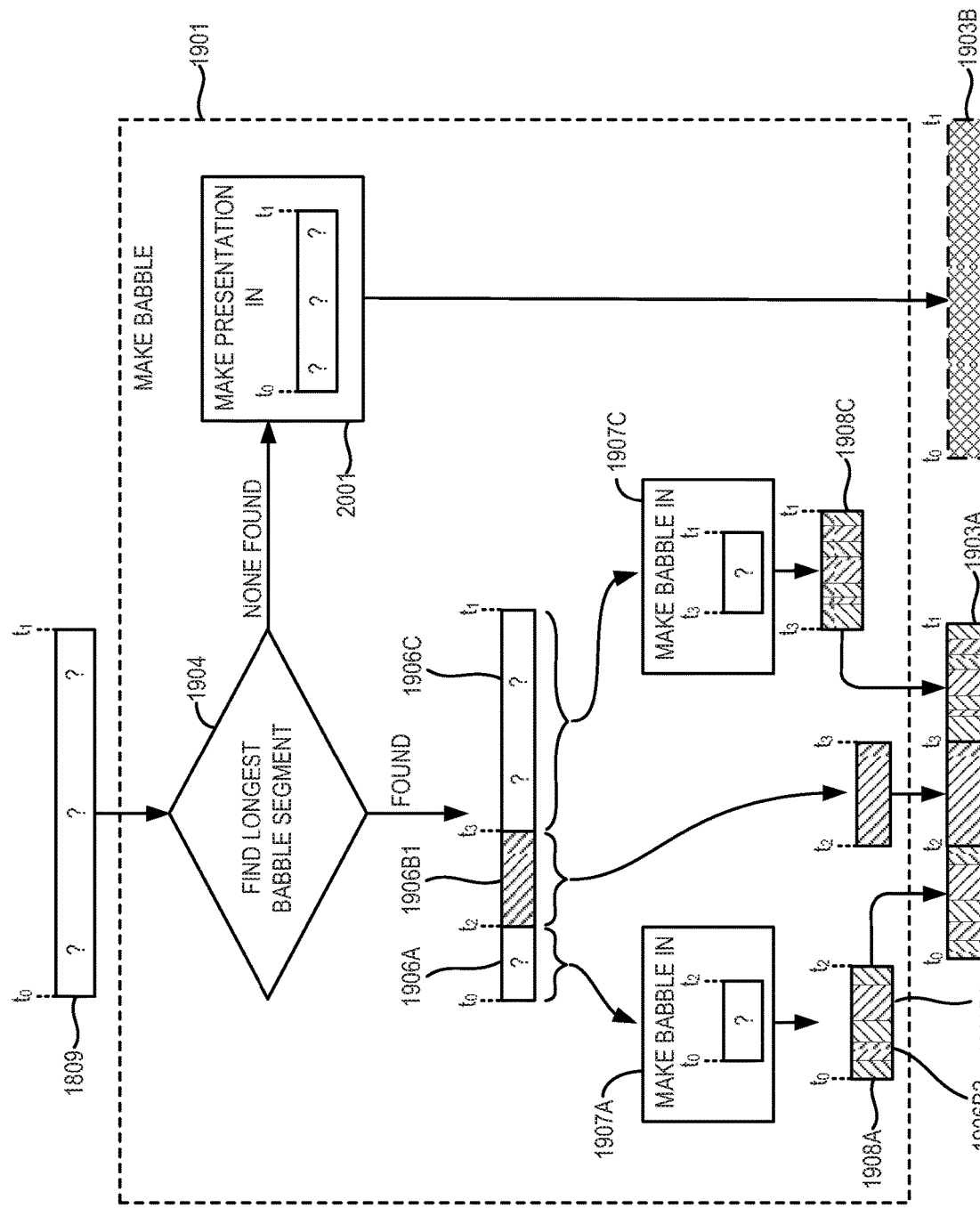
FIG. 19 outlines an initial stage of a segmentation process according to some implementations disclosed herein.

FIG. 19 outlines an initial stage of a segmentation process according to some implementations disclosed herein. According to some such implementations, all stages of the segmentation process may be performed, at least in part, by the segmentation engine 1807 of FIG. 18B. In this example, the segmentation engine 1807 is capable of performing a recursive segmentation process starting with a "Make Babble" process 1901. In this example, a function call has been made to a subroutine that includes instructions for the Make Babble process 1901. Here, the Make Babble process 1901 produces a partial segmentation record 1903A containing one or more Babble segments or a partial segmentation record 1903B containing no Babble segments, depending on the results of the Make Babble process 1901.

Here, because this is the first and highest-level part of the segmentation process, the speaker activity map input to the Make Babble process 1901 is the global speaker activity map 1809, which indicates speaker activity for the entire conference. Accordingly, in this example the time interval between times $t_0$ and $t_1$ includes the entire conference. However, in other examples the Make Babble process 1901 may receive a speaker activity map having a smaller time interval in order to generate partial segmentation records corresponding to a smaller time scale.

In this example, the Make Babble process 1901 includes a longest Babble segment search process 1904. In this example, the longest Babble segment search process 1904 is capable of searching the global speaker activity map 1809 to locate the longest Babble segment between times $t_0$ and $t_1$. If no suitable Babble segment can be located, the partial segmentation record 1903B containing no Babble segments is passed down to a Make Presentation process 2001, which is described below with reference to FIG. 20.

In this example, however, the longest Babble segment search process 1904 locates a longest Babble segment 1906B1, having start time $t_2$ and end time $t_3$, which is entered into the partial segmentation record 1903A. Here, the preceding speaker activity map 1906A is the remaining un-segmented portion of the input global speaker activity map 1809 during the time interval preceding that of the longest Babble segment 1906B1 (from time $t_0$ to time $t_2$). In this example, the subsequent speaker activity map 1906C is the remaining un-segmented portion of the input global speaker activity map 1809 during the time interval following the longest Babble segment 1906B1 (from time $t_3$ to time $t_1$). The preceding speaker activity map 1906A and the subsequent speaker activity map 1906C may be provided as input to one or more subsequent recursions of the Make Babble process 1901.

According to some implementations, however, the time intervals of the preceding speaker activity map 1906A and the subsequent speaker activity map 1906C may be evaluated to determine whether they are shorter than a threshold $t_{snap}$. If, for example, the time interval of the preceding speaker activity map 1906A is determined to be shorter than a threshold $t_{snap}$, the longest Babble segment 1906B1 will be "snapped" to span the time interval of the preceding speaker activity map 1906A by letting $t_2=t_0$. Otherwise, the preceding speaker activity map 1906A is input to the preceding speaker activity recursion 1907A. According to some such implementations, if the time interval of the subsequent speaker activity map 1906C is shorter than the threshold $t_{snap}$, the longest Babble segment 1906B1 will be "snapped" to span the time interval of the subsequent speaker activity map 1906C by letting $t_3=t_1$. Otherwise, the subsequent speaker activity map 1906C is input to the subsequent speaker activity recursion 1907C.

In the example shown in FIG. 19, the time intervals of the preceding speaker activity map 1906A and the subsequent speaker activity map 1906C are both longer than the threshold $t_{snap}$. Here, the preceding speaker activity recursion 1907A outputs a preceding partial segmentation record 1908A, which includes additional Babble segments 1906B2 and 1906B3, which are shown in FIG. 19 with the same type of fill as that of the longest Babble segment 1906B1. In this example, the subsequent speaker activity recursion 1907C outputs a subsequent partial segmentation record 1908C, which includes additional instances of Babble segments. These Babble segments are also shown in FIG. 19 with the same type of fill as that of the longest Babble segment 1906B1. In this example, the preceding partial segmentation record 1908A, the longest Babble segment 1906B1 and the subsequent partial segmentation record 1908C are concatenated to form the partial segmentation record 1903A.

According to some implementations, in order to initiate the longest Babble segment search process 1904, a list of doubletalk segments may be made. For example, list of doubletalk segments may be made in descending order of doubletalk segment length. A doubletalk segment is a segment of the conference that includes an instance of doubletalk, during which at least two conference participants are talking concurrently. Each of these doubletalk segments may be considered in turn (e.g., in descending order of length) as a root candidate Babble segment and the longest Babble segment search process 1904 may proceed for each. The longest Babble segment found starting from any root candidate is returned. In an alternative embodiment, the search may proceed from each root candidate in turn until any one of them returns a valid Babble segment. The first Babble segment found may be returned and the search may terminate. With either type of implementation, if no Babble segment is found after searching through each root candidate, then the longest Babble segment search process 1904 may report that no Babble segment can be found, e.g., by outputting a partial segmentation record 1903B containing no Babble segments.

Figure 22:
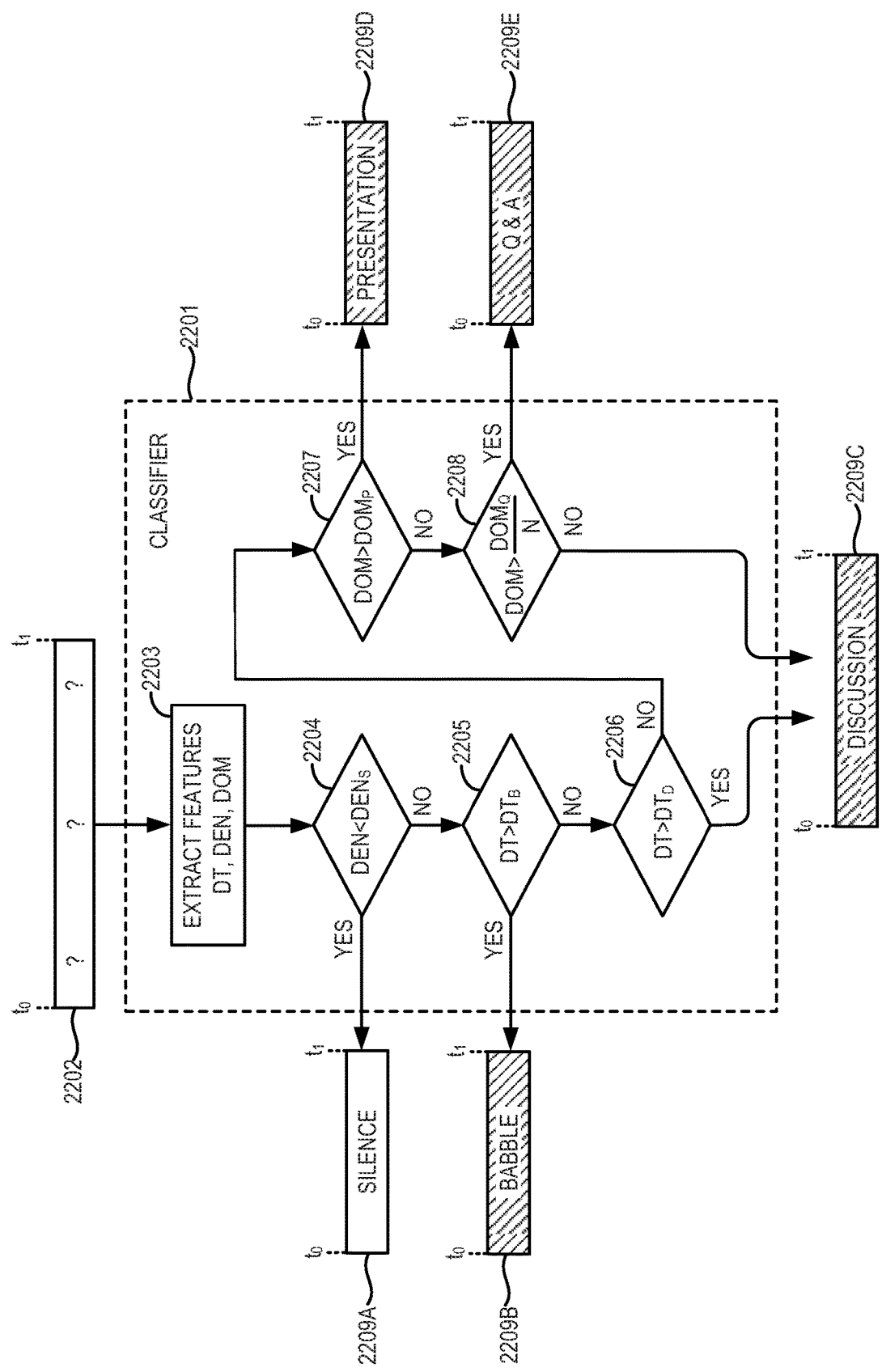
FIG. 22 outlines operations that may be performed by a segment classifier according to some implementations disclosed herein.

In some implementations, in order to be included in a candidate Babble segment, a talkspurt must be at least a threshold candidate segment time interval in duration (e.g., 600 ms long, 700 ms long, 800 ms long, 900 ms long, 1 second long, etc.) and must be classified as Babble (e.g., according to a determination of the classifier 2301 shown in FIG. 22). According to some examples, a candidate Babble segment may be classified as Babble according to a metric referred to herein as the "babble rate," which may be defined as the fraction of time within the candidate segment during which there is doubletalk. For example, for a candidate Babble segment starting at time 50 and ending at time 54 (4 seconds long), with a single talkspurt from time 51 to 53 classified as Babble (2 seconds long), the babble rate is 50%. Some such examples may require that a candidate Babble segment have at least a threshold babble rate (e.g., 40%, 45%, 50%, 55%, 60%, etc.) in order to be classified as a Babble segment.

Some implementations disclosed herein may make a distinction between the babble rate and a "doubletalk ratio," which is discussed in more detail below. In some such implementations, the doubletalk ratio is the fraction of speech time within a time interval (as opposed to the total time duration of the time interval) corresponding to the candidate segment during which there is double talk.

According to some implementations, the next Babble talkspurt that is at least the threshold candidate segment time in duration may be added to the previous candidate Babble segment to form one new candidate Babble segment. In some examples, the next Babble talkspurt must be within a threshold candidate segment time interval of the previous candidate Babble segment in order to be added to the previous candidate Babble segment.

Likewise, the previous Babble talkspurt that is at least the threshold candidate segment time interval in duration may be added to the previous candidate Babble segment to form a second new candidate Babble segment. In some examples, the previous Babble talkspurt must be within a threshold candidate segment time interval of the previous candidate Babble segment in order to be added to the previous candidate Babble segment. Thus, according to such implementations, zero, one or two candidate Babble segments may be generated at each step.

In alternative implementations, such as that described below with reference to FIG. 23, the next Babble talkspurt may be evaluated in one step and then the previous Babble talkspurt may be evaluated in a second step. According to such implementations, zero or one candidate Babble segments may be generated at each step.

Figure 20:
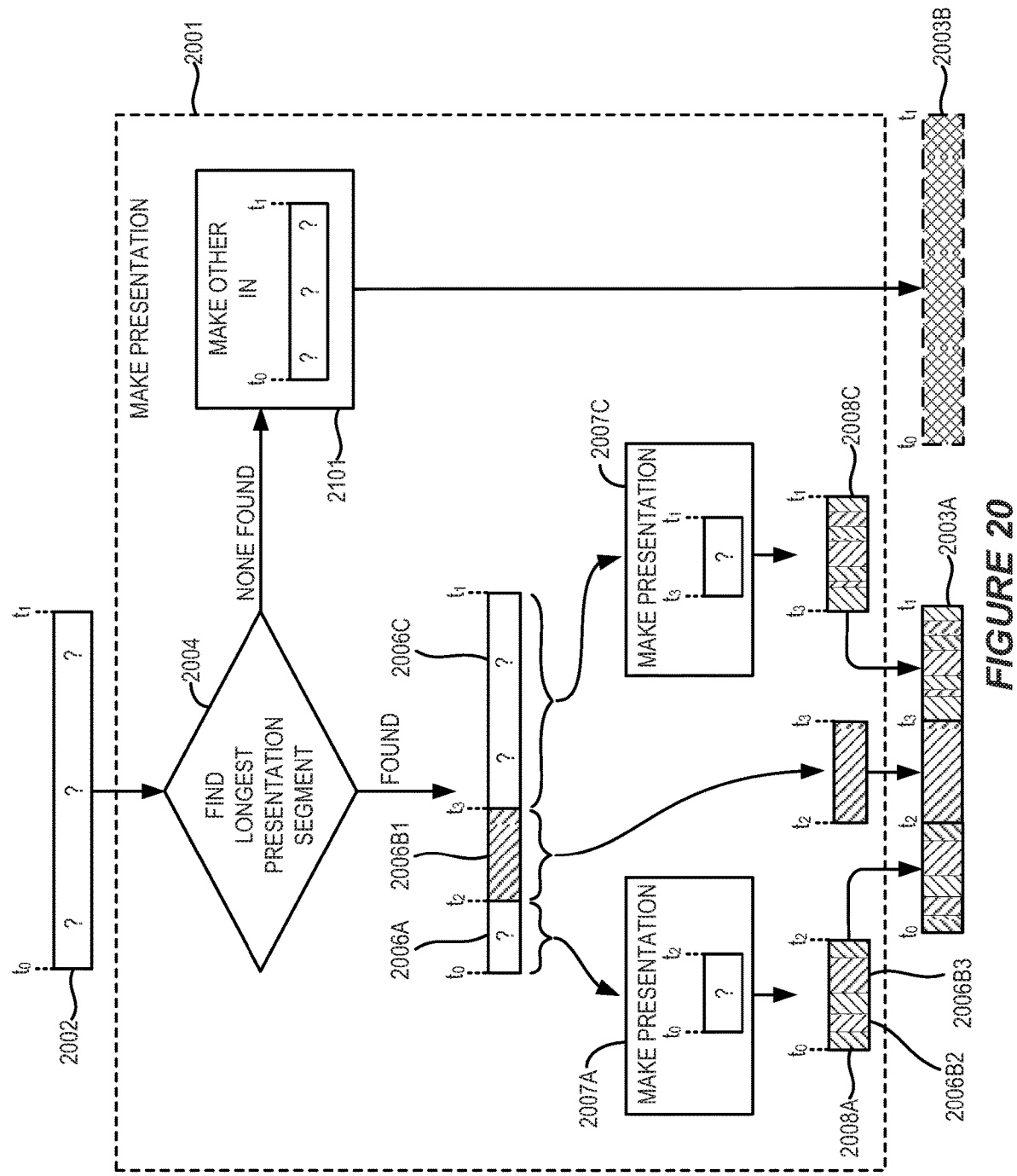
FIG. 20 outlines a subsequent stage of a segmentation process according to some implementations disclosed herein.

FIG. 20 outlines a subsequent stage of a segmentation process according to some implementations disclosed herein. In this example, a function call has been made to a subroutine that includes instructions for the Make Presentation process 2001. According to some implementations, the Make Presentation process 2001 may be similar to the Make Babble process 1901. Here, the Make Presentation process 2001 produces a partial segmentation record 2003A containing one or more Presentation segments or a partial segmentation record 2003B containing no Presentation segments, depending on the results of the Make Presentation process 2001.

The input speaker activity map 2002 to the Make Presentation process 2001 may depend on the particular implementation. In some implementations, the input speaker activity map 2002 may be the global speaker activity map 1809, which indicates speaker activity for the entire conference, or a speaker activity map corresponding to a smaller time interval. However, in some implementations the Make Presentation process 2001 may receive input from the Make Babble process indicating which time intervals of the conference (or which time intervals of a portion or the conference) correspond to Babble segments. According to some such implementations, the input speaker activity map 2002 may correspond to a time interval that does not correspond to Babble segments.

In this example, the Make Presentation process 2001 includes a longest Presentation segment search process 2004. In this example, the longest Presentation segment search process 2004 is capable of searching the input speaker activity map 2002 to locate the longest Presentation segment between times $t_0$ and $t_1$. If no suitable Presentation segment is found, the segmentation process may continue to a subsequent process, such as the Make Other process 2101, which is described below with reference to FIG. 21.

In this example, however, the longest Presentation segment search process 2004 locates a longest Presentation segment 2006B1, having start time $t_2$ and end time $t_3$, which is entered into the partial segmentation record 2003A. Here, the preceding speaker activity map 2006A is the remaining un-segmented portion of the input global speaker activity map 1809 during the time interval preceding that of the longest Presentation segment 2006B1 (from time $t_0$ to time $t_2$). In this example, the subsequent speaker activity map 2006C is the remaining un-segmented portion of the input global speaker activity map 1809 during the time interval following the longest Presentation segment 2006B1 (from time $t_3$ to time $t_1$). The preceding speaker activity map 2006A and the subsequent speaker activity map 2006C may be provided as input to one or more subsequent recursions of the Make Presentation process 2001.

According to some implementations, however, the time intervals of the preceding speaker activity map 2006A and the subsequent speaker activity map 2006C may be evaluated to determine whether they are shorter than a threshold $t_{snap}$. If, for example, the time interval of the preceding speaker activity map 2006A is determined to be shorter than a threshold $t_{snap}$, the longest Presentation segment 2006B1 will be "snapped" to span the time interval of the preceding speaker activity map 2006A by letting $t_2=t_0$. Otherwise, the preceding speaker activity map 2006A is input to the preceding speaker activity recursion $t_{snap}$, 2007A. According to some such implementations, if the time interval of the subsequent speaker activity map 2006C is shorter than the threshold t the longest Presentation segment 2006B1 will be "snapped" to span the time interval of the subsequent speaker activity map 2006C by letting $t_3=t_1$. Otherwise, the subsequent speaker activity map 2006C is input to the subsequent speaker activity recursion 2007C.

In the example shown in FIG. 20, the time intervals of the preceding speaker activity map 2006A and the subsequent speaker activity map 2006C are both longer than the threshold $t_{snap}$. Here, the preceding speaker activity recursion 2007A outputs a preceding partial segmentation record 2008A, which includes additional Presentation segments 2006B2 and 2006B3, which are shown in FIG. 20 with the same type of fill as that of the longest Presentation segment 2006B1. In this example, the subsequent speaker activity recursion 2007C outputs a subsequent partial segmentation record 2008C, which includes additional instances of Presentation segments. These Presentation segments are also shown in FIG. 20 with the same type of fill as that of the longest Presentation segment 2006B1. In this example, the preceding partial segmentation record 2008A, the longest Presentation segment 2006B1 and the subsequent partial segmentation record 2008C are concatenated to form the partial segmentation record 2003A.

In some examples, when searching for Presentation segments, each root candidate segment may be a segment corresponding to an individual talkburst. Searching may begin at each root candidate segment in turn (for example, in descending order of length) until all root candidates are searched and the longest presentation returned.

In an alternative embodiment, the search may proceed from each root candidate in turn until any one of them returns a valid Presentation segment. The first presentation segment found may be returned and the search may terminate. If no Presentation segment is found after searching through each root candidate, the longest Presentation segment search process 2004 may report that no Presentation segment can be found (e.g., by outputting a partial segmentation record 2003B containing no Presentation segments).

According to some implementations, generating candidate Presentation segments in the longest Presentation segment search process 2004 may involve generating up to two new candidate Presentation segments in each step. In some examples, the first new candidate Presentation segment may be generated by taking the existing candidate Presentation segment and making the end time later to include the next talkspurt uttered by the same participant within a time interval being evaluated, which also may be referred to herein as a "region of interest." The second new candidate Presentation segment may be generated by taking the existing candidate Presentation segment and making the start time earlier to include the previous talkspurt uttered by the same participant within the region of interest. If there is no next or previous talkspurt uttered by the same participant within the region of interest, one or both of the new candidate Presentation segments may not be generated. An alternative method of generating candidate Presentation segments will be described below with reference to FIG. 23.

In some examples, the longest Presentation segment search process 2004 may involve evaluating one or more acceptance criteria for new candidate Presentation segments. According to some such implementations, a dominance metric may be calculated for each new candidate Presentation segment. In some such implementations, the dominance metric may indicate a fraction of total speech uttered by a dominant conference participant during a time interval that includes the new candidate Presentation segment. The dominant conference participant may be the conference participant who spoke the most during the time interval. In some examples, a new candidate Presentation segment having a dominance metric that is greater than a dominance threshold will be added to the existing candidate Presentation segment. In some implementations, the dominance threshold may be 0.7, 0.75, 0.8, 0.85, etc. Otherwise, the search may terminate.

In some implementations, a doubletalk ratio and/or a speech density metric may be evaluated during the Make Presentation process 2001, e.g., during the longest Presentation segment search process 2004. Some examples will be described below with reference to FIG. 22.

Figure 21:
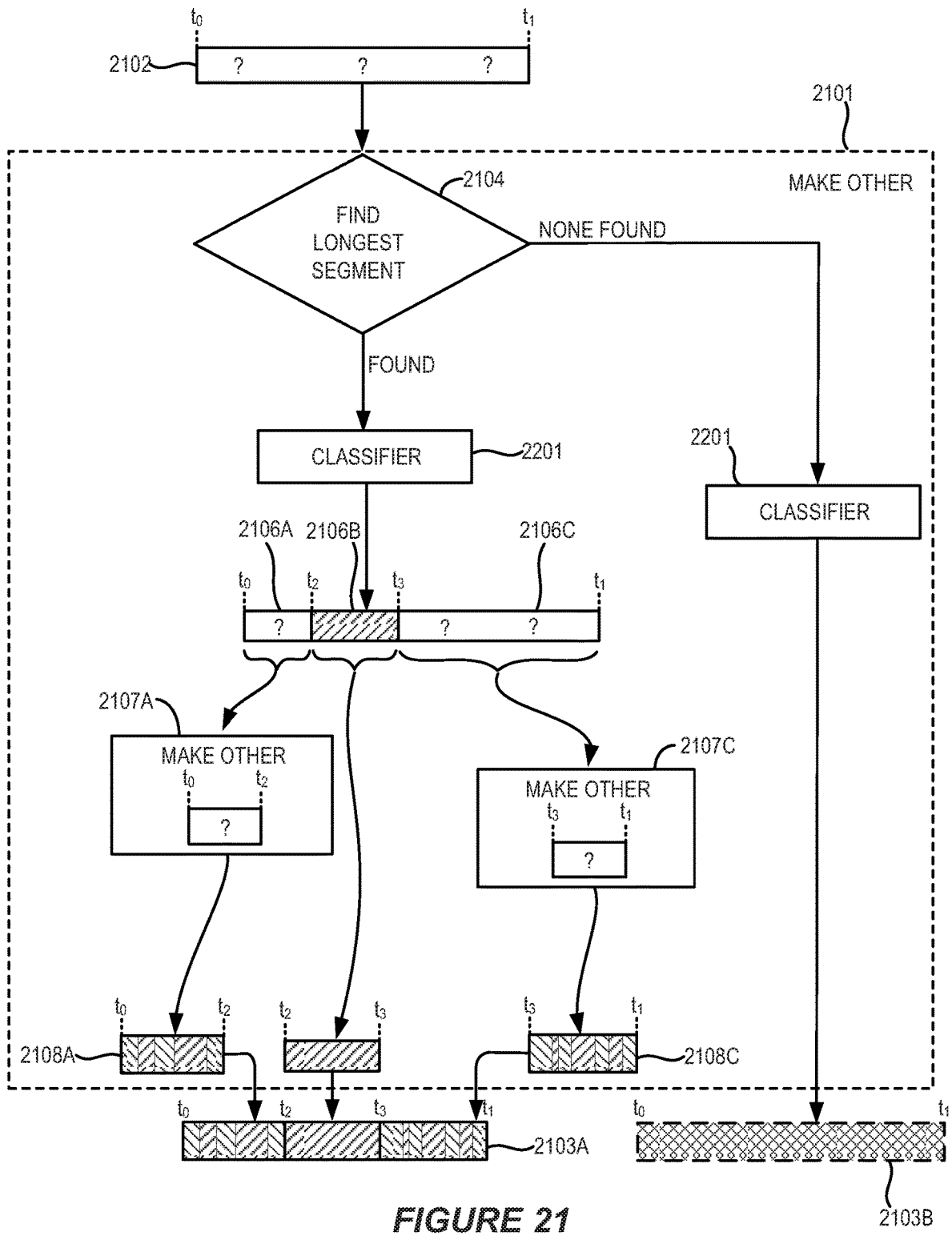
FIG. 21 outlines a subsequent stage of a segmentation process according to some implementations disclosed herein.

FIG. 21 outlines a subsequent stage of a segmentation process according to some implementations disclosed herein. In this example, a function call has been made to a subroutine that includes instructions for the Make Other process 2101.

The input speaker activity map 2102 to the Make Other process 2101 may depend on the particular implementation. In some implementations, the input speaker activity map 2102 may be the global speaker activity map 1809, which indicates speaker activity for the entire conference, or a speaker activity map corresponding to a smaller time interval. However, in some implementations the Make Other process 2101 may receive input from one or more previous phases of the segmentation process, such as the Make Babble process 1901 and/or the Make Presentation process 2001, indicating which time intervals of the conference (or which time intervals of a portion or the conference) correspond to previously-identified segments (such as previously-identified Babble segments or Presentation segments). According to some such implementations, the input speaker activity map 2102 may correspond to a time interval that does not correspond to that of the previously-identified segments.

In this example, the Make Other process 2101 includes a longest segment search process 2104, which may be capable of locating the longest segment in the region of interest containing speech from one conference participant. Here, the Make Other process 2101 produces a partial segmentation record 2103A containing one or more classified segments or a partial segmentation record 2103B containing a single classified segment, depending on the results of the longest segment search process 2104. In some examples, if the Make Other process 2101 produces a partial segmentation record 2103B it will be input to a classifier, such as the classifier 2201 that is described below with reference to FIG. 22. The Make Other process 2101 may involve an iterative process of performing the segment search process 2104 for each conference participant whose speech has been identified in the region of interest.

In this example, a root candidate segment may be generated substantially as described above with reference to the longest Presentation segment search process 2004. For each root candidate talkspurt, some implementations involve searching through the all of the talkspurts in the region of interest uttered by the same conference participant as the root candidate. Some examples involve building a candidate segment that includes of the longest run of such talkspurts containing the root candidate.

Some such examples involve applying one or more acceptance criteria. In some implementations, one such criterion is that no two talkspurts may be separated by more than a threshold candidate segment time interval $t_{window}$. An example setting for $t_{window}$ is $t_{min}/2$, wherein $t_{min}$ represents the threshold candidate segment time (a minimum time duration for a candidate segment). Other implementations may apply a different threshold candidate segment time interval and/or other acceptance criteria. Some implementations may involve building a candidate segment by evaluating the next talkspurt by the same conference participant and/or the previous talkspurt by the same conference participant, e.g. as described above or as described below with reference to FIG. 23.

After the search is complete, the longest candidate segment (after analyzing all root candidates) may be classified. In this example, the longest candidate segment is passed to the classifier 2201, which returns a classified longest segment 2106B. In the example shown in FIG. 21, the preceding speaker activity map 2106A is input to the preceding speaker activity recursion 2107A, which outputs the preceding partial segmentation record 2108A. Here, the subsequent speaker activity map 2106C is input to the subsequent speaker activity recursion 2107C, which outputs the subsequent partial segmentation record 1908C.

FIG. 22 outlines operations that may be performed by a segment classifier according to some implementations disclosed herein. In this example, given a speaker activity map 2202 for times $t_0$ to $t_1$ as input; the classifier 2201 is capable of determining an instance of one of the segment classifications 2209A-2209E. In this example, the speaker activity map 2202 includes a portion of the global speaker activity map 1809 and is limited to contain information only in a temporal region of interest between times $t_0$ and $t_1$. In some implementations, the classifier 2201 may be used in conjunction with one or more of the recursive segmentation processes described elsewhere herein. However, in alternative implementations, the classifier 2201 may be used in a non-recursive segmentation process. According to some such implementations, the classifier 2201 may be used to identify segments in each of a plurality of time intervals (e.g., of sequential time intervals) of a conference recording, or a part thereof.

In this implementation, the classifier 2201 includes a feature extractor 2203, which is capable of analyzing conversational dynamics of the speaker activity map 2202 and identifying conversational dynamics data types DT, DEN and DOM, which in this example correspond to a doubletalk ratio, a speech density metric and a dominance metric, respectively. Here, the classifier 2201 is capable of determining instances of the segment classifications according to a set of rules, which in this example are based on one or more of the conversational dynamics data types identified by the feature extractor 2203.

In this example, the set of rules includes a rule that classifies a segment as a Mutual Silence segment 2209A if the speech density metric DEN is less than a mutual silence threshold $DEN_s$. Here, this rule is applied by the Mutual Silence determination process 2204. In some implementations, the mutual silence threshold $DEN_s$ may be 0.1, 0.2, 0.3, etc.

In this example, if the Mutual Silence determination process 2204 determines that the speech density metric is greater than or equal to the mutual silence threshold, the next process is the Babble determination process 2205. Here, the set of rules includes a rule that classifies a segment as a Babble segment if the speech density metric is greater than or equal to the mutual silence threshold and the doubletalk ratio DT is greater than a babble threshold $DT_B$. In some implementations, the babble threshold $DT_B$ may be 0.6, 0.7, 0.8, etc. Accordingly, if the Babble determination process 2205 determines that the doubletalk ratio is greater than the babble threshold, the Babble determination process 2205 classifies the segment as a Babble segment 2209B.

Here, if the Babble determination process 2205 determines that the doubletalk ratio is less than or equal to the babble threshold, the next process is the Discussion determination process 2206. Here, the set of rules includes a rule that classifies a segment as a Discussion segment if the speech density metric is greater than or equal to the silence threshold and if the doubletalk ratio is less than or equal to the babble threshold but greater than a discussion threshold $DT_D$. In some implementations, the discussion threshold $DT_D$ may be 0.2, 0.3, 0.4, etc. Therefore, if the Discussion determination process 2206 determines that the doubletalk ratio is greater than the discussion threshold $DT_D$, classifies a segment as a Discussion segment 2209C.

In this implementation, if the Discussion determination process 2206 determines that the doubletalk ratio is not greater than the discussion threshold $DT_D$, the next process is the Presentation determination process 2207. Here, the set of rules includes a rule that classifies a segment as a Presentation segment if the speech density metric is greater than or equal to the silence threshold, if the doubletalk ratio is less than or equal to the discussion threshold and if the dominance metric DOM is greater than a presentation threshold $DOM_P$. In some implementations, the presentation threshold $DOM_P$ may be 0.7, 0.8, 0.9, etc. Accordingly, if the Presentation determination process 2207 determines that the dominance metric DOM is greater than the presentation threshold $DOM_E$, the Presentation determination process 2207 classifies the segment as a Presentation segment 2209D.

In this example, if the Presentation determination process 2207 determines that the dominance metric DOM is not greater than a presentation threshold $DOM_P$, the next process is the question and answer determination process 2208. Here, the set of rules includes a rule that classifies a segment as a Question and Answer segment if the speech density metric is greater than or equal to the silence threshold, if the doubletalk ratio is less than or equal to the discussion threshold and if the dominance metric is less than or equal to the presentation threshold but greater than a question and answer threshold.

In some implementations, the question and answer threshold may be a function of the number N of total conference participants, or of conference participants whose speech has been identified in the region of interest. According to some examples, the question and answer threshold may be $DOM_Q/N$, wherein $DOM_Q$ represents a constant. In some examples, $DOM_Q$ may equal 1.5, 2.0, 2.5, etc.

Therefore, if the question and answer determination process 2208 determines that the dominance metric is greater than the question and answer threshold, in this example the segment will be classified as a Q&A segment 2209E. If not, in this example the segment will be classified as a Discussion segment 2209C.

Figure 23:
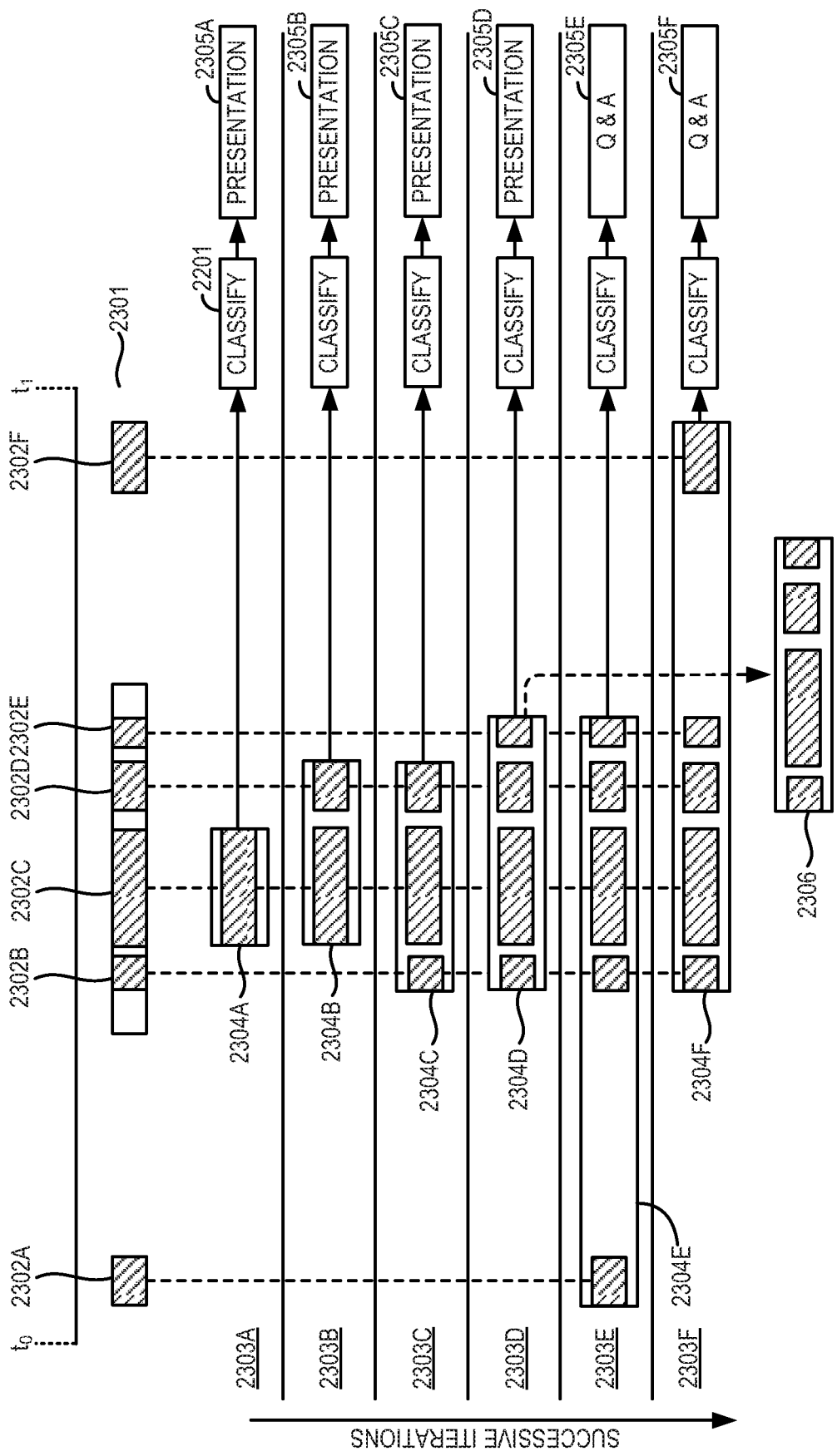
FIG. 23 shows an example of a longest segment search process according to some implementations disclosed herein.

FIG. 23 shows an example of a longest segment search process according to some implementations disclosed herein. According to some implementations, such as those described above, the Make Babble, Make Presentation and Make Other processes each contain a corresponding longest segment search process. In some such implementations, the longest segment search process may proceed as follows. This example will involve a longest Presentation segment search process.

Here, a list of candidate seed talkbursts 2302A-2302F, included in an input speaker activity map 2301, is evaluated. In some examples, as here, the list of candidate seed talkbursts may be sorted in descending order of length, even though the list of candidate seed talkbursts is arranged in FIG. 23 according to start and end times. Next, each of the candidate seed talkbursts may be considered in turn. In this example, the longest candidate seed talkburst (2302C) is considered first. For each candidate seed talkburst, a candidate segment may be designated. Here, the candidate segment 2304A is initially designated for candidate seed talkburst 2302C.

In this implementation, a first iteration 2303A involves classifying the candidate segment 2304A (here, by the classifier 2201) to ensure that its conversational dynamics data types (for example, the DEN, DT and/or DOM conversational dynamics data types described above) do not preclude the candidate segment 2304A from belonging to the particular segment classification being sought in the longest segment search process. In this example, the candidate segment 2304A includes only the candidate talkburst 2302C, which is classified as a Presentation segment (2305A). Because this is the segment classification being sought in the longest segment search process, the longest segment search process continues.

In this example, the second iteration 2303B of the longest segment search process involves adding the following talkburst 2302D to the candidate segment 2304A, to create the candidate segment 2304B, and classifying the candidate segment 2304B. In some implementations, preceding and/or following talkbursts may need to be within a threshold time interval of the candidate segment in order to be eligible for being added to the candidate segment. If adding the following talkburst precludes classification as the segment classification being sought, the following talkburst may not be included in the candidate segment. However, in this example, the candidate segment 2304B is classified as a Presentation segment (2305B), so the candidate segment 2304B is kept and iteration continues.

In this implementation, the third iteration 2303C of the longest segment search process involves adding the preceding talkburst 2302B to the candidate segment 2304B, to create the candidate segment 2304C, and classifying the candidate segment 2304C. In this example, the candidate segment 2304C is classified as a Presentation segment (2305C), so the candidate segment 2304C is kept and iteration continues.

In this example, the fourth iteration 2303D of the longest segment search process involves adding the following talkburst 2302E to the candidate segment 2304C, to create the candidate segment 2304D, and classifying the candidate segment 2304D. In this example, the candidate segment 2304D is classified as a Presentation segment (2305D) so the candidate segment 2304D is kept and iteration continues.

Following and/or preceding talkbursts may continue to be added to the candidate segment until adding either talkburst would mean that the candidate segment is no longer of the sought class. Here, for example, the fifth iteration 2303E of the longest segment search process involves adding the preceding talkburst 2302A to the candidate segment 2304D, to create the candidate segment 2304E, and classifying the candidate segment 2304E. In this example, the candidate segment 2304E is classified as a Q&A segment (2305E) so the candidate segment 2304E is not kept.

However, in this example, the process continues in order to evaluate the following talkburst. In the example shown in FIG. 23, the sixth iteration 2303F of the longest segment search process involves adding the following talkburst 2302F to the candidate segment 2304D, to create the candidate segment 2304E, and classifying the candidate segment 2304F. In this example, the candidate segment 2304F is classified as a Q&A segment (2305E) so the candidate segment 2304C is not kept and the iterations cease.

If the resulting candidate segment is not shorter than a threshold candidate segment time $t_{min}$, the candidate segment may be designated as the longest segment. Otherwise, the longest segment search process may report that no suitable segment exists. As noted elsewhere herein, the threshold candidate segment time $t_{min}$ may vary according to the timescale, which may correspond to the time interval of the region of interest. In this example, the candidate segment 2304D is longer than the threshold candidate segment time $t_{min}$, so the longest segment search process outputs the Presentation segment 2306.

Conference recordings typically include a large amount of audio data, which may include a substantial amount of babble and non-substantive discussion. Locating relevant meeting topics via audio playback can be very time-consuming. Automatic speech recognition (ASR) has sometimes been used to convert meeting recordings to text to enable text-based search and browsing.

Unfortunately, accurate meeting transcription based on automatic speech recognition has proven to be a challenging task. For example, the leading benchmark from the National Institute of Standards and Technology (NIST) has shown that although the word error rate (WER) for ASR of various types of speech has declined substantially in recent decades, the WER for meeting speech has remained substantially higher than the WER for other types of speech. According to a NIST report published in 2007, the WER for meeting speech was typically more than 25%, and frequently more than 50%, for meetings involving multiple conference participants. (Fiscus, Jonathan G., et al., "The Rich Transcription 2007 Meeting Recognition Evaluation" (NIST 2007).)

Despite the known high WER for meeting speech, prior attempts to generate meeting topics automatically were typically based on the assumption that ASR results of conference recordings produced a perfect transcript of words spoken by conference participants. This disclosure includes various novel techniques for determining meeting topics. Some implementations involve word cloud generation, which may be interactive during playback. Some examples enable efficient topic mining while addressing the challenges provided by ASR errors.

According to some implementations, many hypotheses for a given utterance (e.g., as described in a speech recognition lattice) may contribute to a word cloud. In some examples, a whole-conference (or a multi-conference) context may be introduced by compiling lists of alternative hypotheses for many words found in an entire conference and/or found in multiple conferences. Some implementations may involve applying a whole-conference (or a multi-conference) context over multiple iterations to re-score the hypothesized words of speech recognition lattices (e.g., by de-emphasizing less-frequent alternatives), thereby removing some utterance-level ambiguity.

In some examples, a "term frequency metric" may be used to sort primary word candidates and alternative word hypotheses. In some such examples, the term frequency metric may be based, at least in part, on a number of occurrences of a hypothesized word in the speech recognition lattices and the word recognition confidence score reported by the speech recognizer. In some examples, the term frequency metric may be based, at least in part, on the frequency of a word in the underlying language and/or the number of different meanings that a word may have. In some implementations, words may be generalized into topics using an ontology that may include hypernym information.

Figure 24:
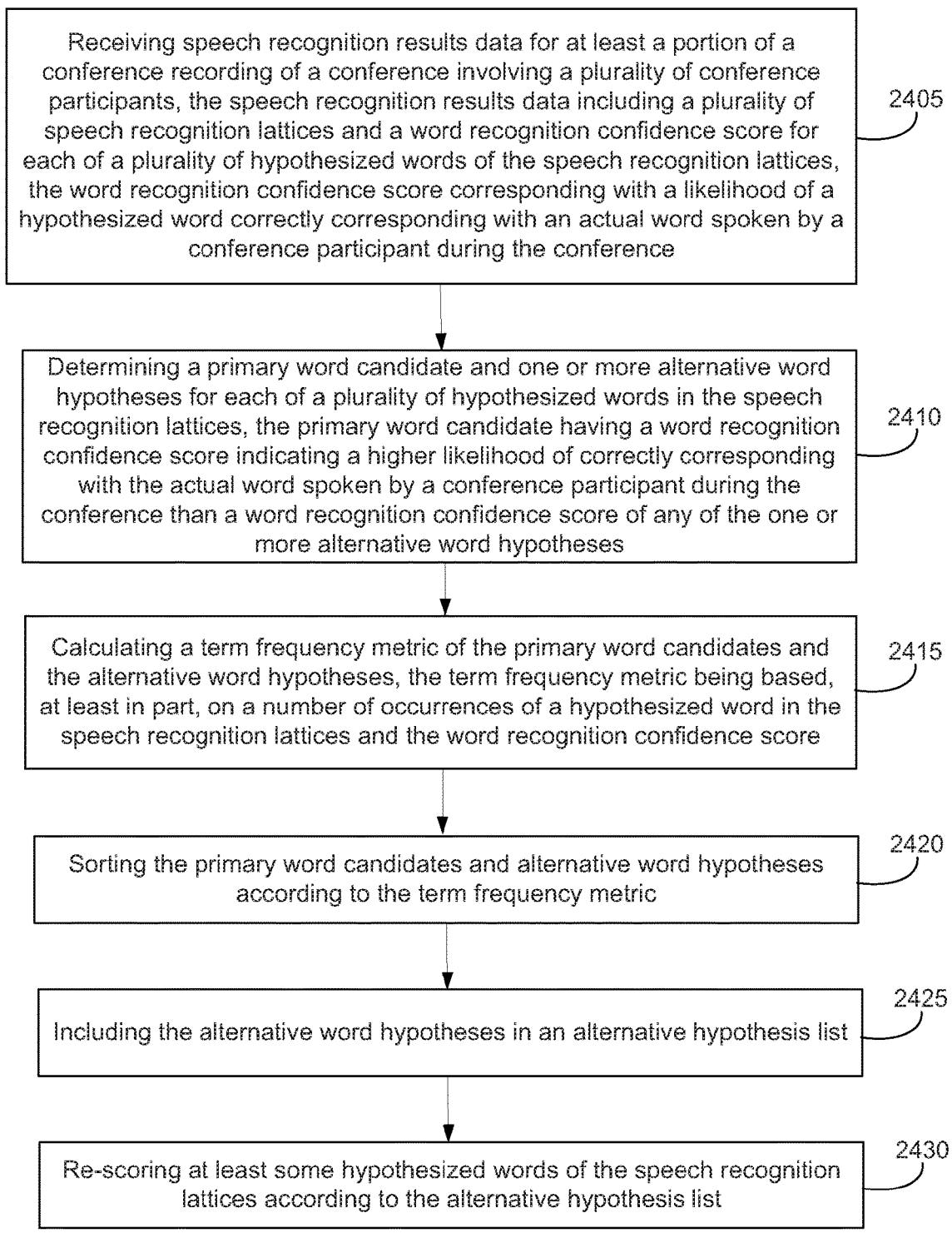
FIG. 24 is a flow diagram that outlines blocks of some topic analysis methods disclosed herein.

FIG. 24 is a flow diagram that outlines blocks of some topic analysis methods disclosed herein. The blocks of method 2400, like other methods described herein, are not necessarily performed in the order indicated. Moreover, such methods may include more or fewer blocks than shown and/or described.

In some implementations, method 2400 may be implemented, at least in part, via instructions (e.g., software) stored on non-transitory media such as those described herein, including but not limited to random access memory (RAM) devices, read-only memory (ROM) devices, etc. In some implementations, method 2400 may be implemented, at least in part, by an apparatus such as that shown in FIG. 3A. According to some such implementations, method 2400 may be implemented, at least in part, by one or more elements of the analysis engine 307 shown in FIGS. 3C and 5, e.g., by the joint analysis module 306. According to some such examples, method 2400 may be implemented, at least in part, by the topic analysis module 525 of FIG. 5.

In this example, block 2405 involves receiving speech recognition results data for at least a portion of a conference recording of a conference involving a plurality of conference participants. In some examples, speech recognition results data may be received by a topic analysis module in block 2405. Here, the speech recognition results data include a plurality of speech recognition lattices and a word recognition confidence score for each of a plurality of hypothesized words of the speech recognition lattices. In this implementation, the word recognition confidence score corresponds with a likelihood of a hypothesized word correctly corresponding with an actual word spoken by a conference participant during the conference. In some implementations, speech recognition results data from two or more automatic speech recognition processes may be received in block 2405. Some examples are described below.

In some implementations, the conference recording may include conference participant speech data from multiple endpoints, recorded separately. Alternatively, or additionally the conference recording may include conference participant speech data from a single endpoint corresponding to multiple conference participants and including information for identifying conference participant speech for each conference participant of the multiple conference participants.

In the example shown in FIG. 24, block 2410 involves determining a primary word candidate and one or more alternative word hypotheses for each of a plurality of hypothesized words in the speech recognition lattices. Here, the primary word candidate has a word recognition confidence score indicating a higher likelihood of correctly corresponding with the actual word spoken by a conference participant during the conference than a word recognition confidence score of any of the alternative word hypotheses.

In this implementation, block 2415 involves calculating a "term frequency metric" for the primary word candidates and the alternative word hypotheses. In this example, the term frequency metric is based, at least in part, on a number of occurrences of a hypothesized word in the speech recognition lattices and on the word recognition confidence score.

According to some examples, the term frequency metric may be based, at least in part, on a "document frequency metric." In some such examples, the term frequency metric may be inversely proportional to the document frequency metric. The document frequency metric may, for example, correspond to an expected frequency with which a primary word candidate will occur in the conference.

In some implementations, the document frequency metric may correspond to a frequency with which the primary word candidate has occurred in two or more prior conferences. The prior conferences may, for example, be conferences in the same category, e.g., business conferences, medical conferences, engineering conferences, legal conferences, etc. In some implementations, conferences may be categorized by sub-category, e.g., the category of engineering conferences may include sub-categories of electrical engineering conferences, mechanical engineering conferences, audio engineering conferences, materials science conferences, chemical engineering conferences, etc. Likewise, the category of business conferences may include sub-categories of sales conferences, finance conferences, marketing conferences, etc. In some examples, the conferences may be categorized, at least in part, according to the conference participants.

Alternatively, or additionally, the document frequency metric may correspond to a frequency with which the primary word candidate occurs in at least one language model, which may estimate the relative likelihood of different words and/or phrases, e.g., by assigning a probability to a sequence of words according to a probability distribution. The language model(s) may provide context to distinguish between words and phrases that sound similar. A language model may, for example, be a statistical language model such as a unigram model, an N-gram model, a factored language model, etc. In some implementations, a language model may correspond with a conference type, e.g., with the expected subject matter of a conference. For example, a language model pertaining to medical terms may assign higher probabilities to the words "spleen" and "infarction" than a language model pertaining to non-medical speech.

According to some implementations, conference category, conference sub-category, and/or language model information may be received with the speech recognition results data in block 2405. In some such implementations, such information may be included with the conference metadata 210 received by the topic analysis module 525 of FIG. 5.

Various alternative examples of determining term frequency metrics are disclosed herein. In some implementations, the term frequency metric may be based, at least in part, on a number of word meanings. In some such implementations, the term frequency metric may be based, at least in part, on the number of definitions of the corresponding word in a standard reference, such as a particular lexicon or dictionary.

In the example shown in FIG. 24, block 2420 involves sorting the primary word candidates and alternative word hypotheses according to the term frequency metric. In some implementations, block 2420 may involve sorting the primary word candidates and alternative word hypotheses in descending order of the term frequency metric.

In this implementation block 2425 involves including the alternative word hypotheses in an alternative hypothesis list. In some implementations, iterations of at least some processes of method 2400 may be based, at least in part, on the alternative hypothesis list. Accordingly, some implementations may involve retaining the alternative hypothesis list during one or more such iterations, e.g., after each iteration.

In this example, block 2430 involves re-scoring at least some hypothesized words of the speech recognition lattices according to the alternative hypothesis list. In other words, a word recognition confidence score that is received for one or more hypothesized words of the speech recognition lattices in block 2405 may be changed during one or more such iterations of the determining, calculating, sorting, including and/or re-scoring processes. Further details and examples are provided below.

In some examples, method 2400 may involve forming a word list that includes primary word candidates and a term frequency metric for each of the primary word candidates. In some examples, the word list also may include one or more alternative word hypotheses for each primary word candidate. The alternative word hypotheses may, for example, be generated according to a language model.

Some implementations may involve generating a topic list of conference topics based, at least in part, on the word list. The topic list may include one or more words of the word list. Some such implementations may involve determining a topic score. For example, such implementations may determine whether to include a word on the topic last based, at least in part, on the topic score. According to some implementations, the topic score may be based, at least in part, on the term frequency metric.

In some examples, the topic score may be based, at least in part, on an ontology for topic generalization. In linguistics, a hyponym is a word or phrase whose semantic field is included within that of another word, known as its hypernym. A hyponym shares a "type-of" relationship with its hypernym. For example, "robin," "starling," "sparrow," "crow" and "pigeon" are all hyponyms of "bird" (their hypernym); which, in turn, is a hyponym of "animal."

Accordingly, in some implementations generating the topic list may involve determining at least one hypernym of one or more words of the word list. Such implementations may involve determining a topic score based, at least in part on a hypernym score. In some implementations, the hypernyms need not have been spoken by a conference participant in order to be part of the topic score determination process. Some examples are provided below.

According to some implementations, multiple iterations of a least some processes of method 2400 may include iterations of generating the topic list and determining the topic score. In some such implementations, block 2425 may involve including alternative word hypotheses in the alternative hypothesis list based, at least in part, on the topic score. Some implementations are described below, following some examples of using hypernyms as part of a process of determining a topic score.

In some examples, method 2400 may involve reducing at least some hypothesized words of a speech recognition lattice to a canonical base form. In some such examples, the reducing process may involve reducing nouns of the speech recognition lattice to the canonical base form. The canonical base form may be a singular form of a noun. Alternatively, or additionally, the reducing process may involve reducing verbs of the speech recognition lattice to the canonical base form. The canonical base form may be an infinitive form of a verb.

Figure 25:
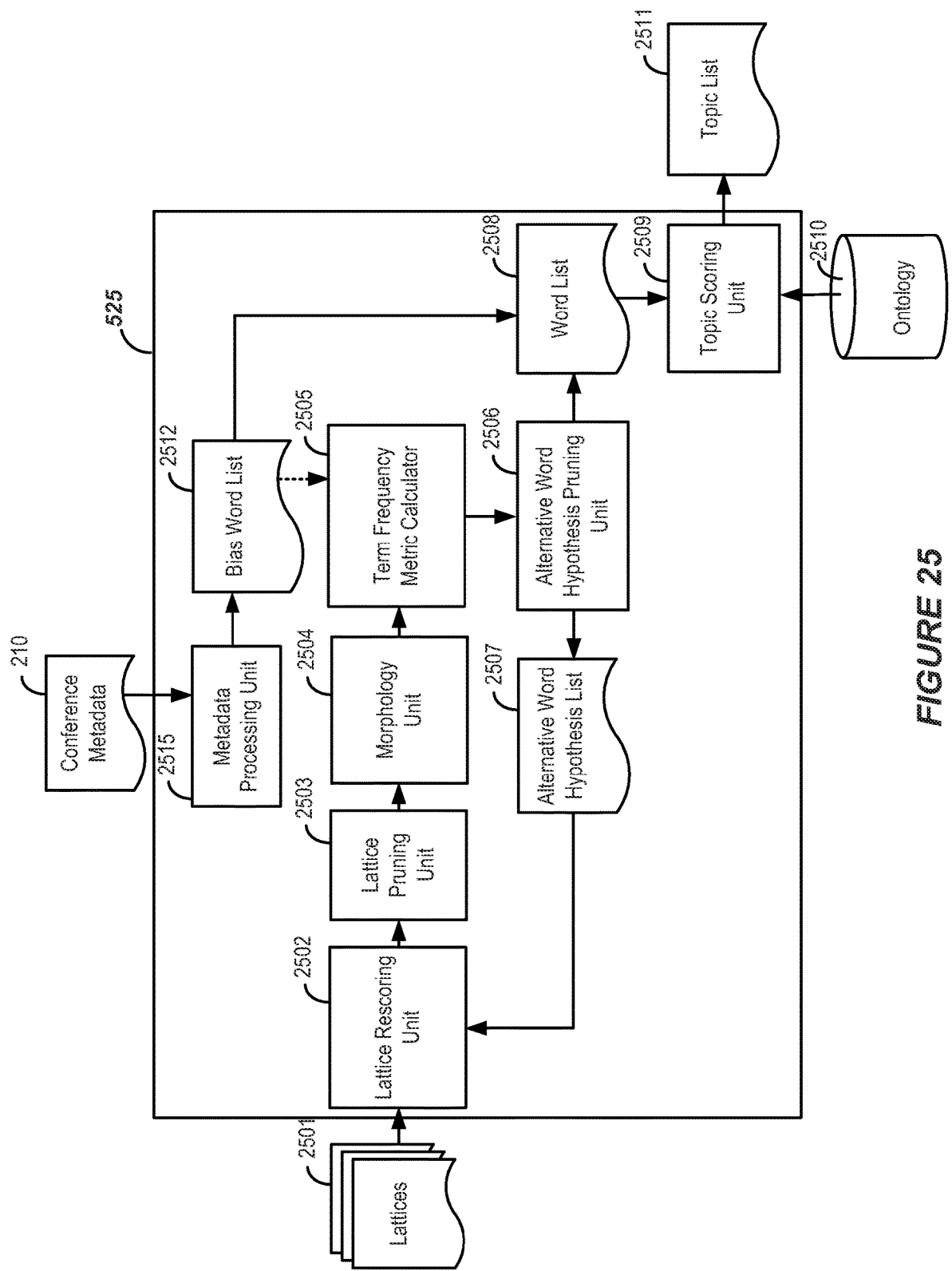
FIG. 25 shows examples of topic analysis module elements.

FIG. 25 shows examples of topic analysis module elements. As with other implementations disclosed herein, other implementations of the topic analysis module 525 may include more, fewer and/or other elements. The topic analysis module 525 may, for example, be implemented via a control system, such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. In some implementations, the topic analysis module 525 may be implemented via instructions (e.g., software) stored on non-transitory media such as those described herein, including but not limited to random access memory (RAM) devices, read-only memory (ROM) devices, etc.

In this example, the topic analysis module 525 is shown receiving speech recognition lattices 2501. The speech recognition lattices 2501 may, for example, be instance of speech recognition results such as the speech recognition results 401F-405F that are described above with reference to FIGS. 4 and 5. Some examples of speech recognition lattices are described below.

This example of the topic analysis module 525 includes a lattice rescoring unit 2502. In some implementations, the lattice rescoring unit 2502 may be capable of re-scoring at least some hypothesized words of the speech recognition lattices 2501 according to the alternative hypothesis list. For example, the lattice rescoring unit 2502 may be capable of changing the word recognition confidence score of hypothesized words that are found in the alternative hypothesis list 2507 such that these hypothesized words are de-emphasized. This process may depend on the particular metric used for the word recognition confidence score. For example, in some implementations a word recognition confidence score may be expressed in terms of a cost, the values of which may be a measure of how unlikely a hypothesized word is to be correct. According to such implementations, de-emphasizing such hypothesized words may involve increasing a corresponding word recognition confidence score.

According to some implementations, the alternative hypothesis list 2507 may initially be empty. If so, the lattice rescoring unit 2502 may perform no re-scoring until a later iteration.

In this example, the topic analysis module 525 includes a lattice pruning unit 2503. The lattice pruning unit 2503 may, for example, be capable of performing one or more types of lattice pruning operations (such as beam pruning, posterior probability pruning and/or lattice depth limiting) in order to reduce the complexity of input the speech recognition lattices 2501.

Figure 26:
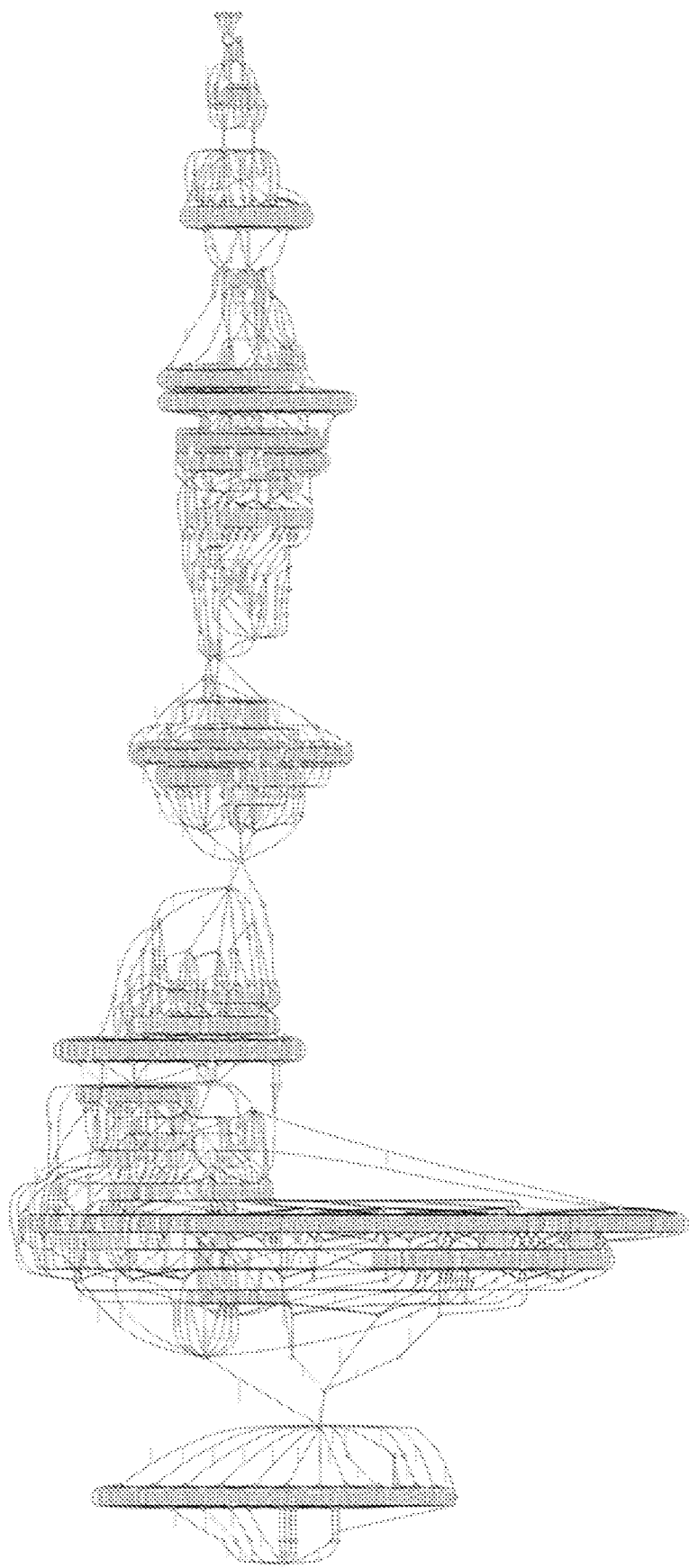
FIG. 26 shows an example of an input speech recognition lattice.

FIG. 26 shows an example of an input speech recognition lattice. As shown in FIG. 26, un-pruned speech recognition lattices can be quite large. The circles in FIG. 26 represent nodes of the speech recognition lattice. The curved lines or "arcs" connecting the nodes correspond with hypothesized words, which may be connected via the arcs to form hypothesized word sequences.

Figure 27A:
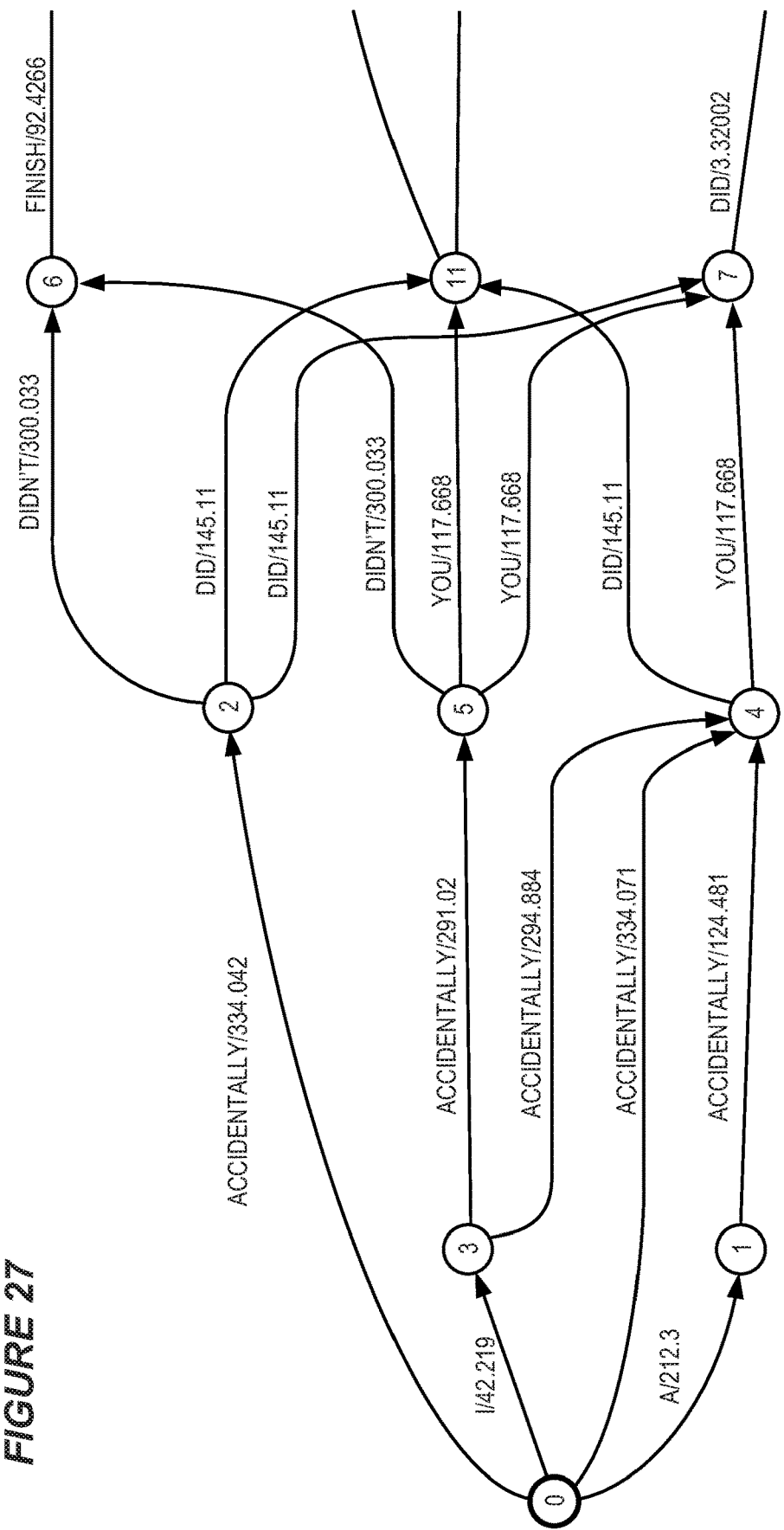
FIGS. 27A and 27B, shows an example of a portion of a small speech recognition lattice after pruning.
Figure 27B:
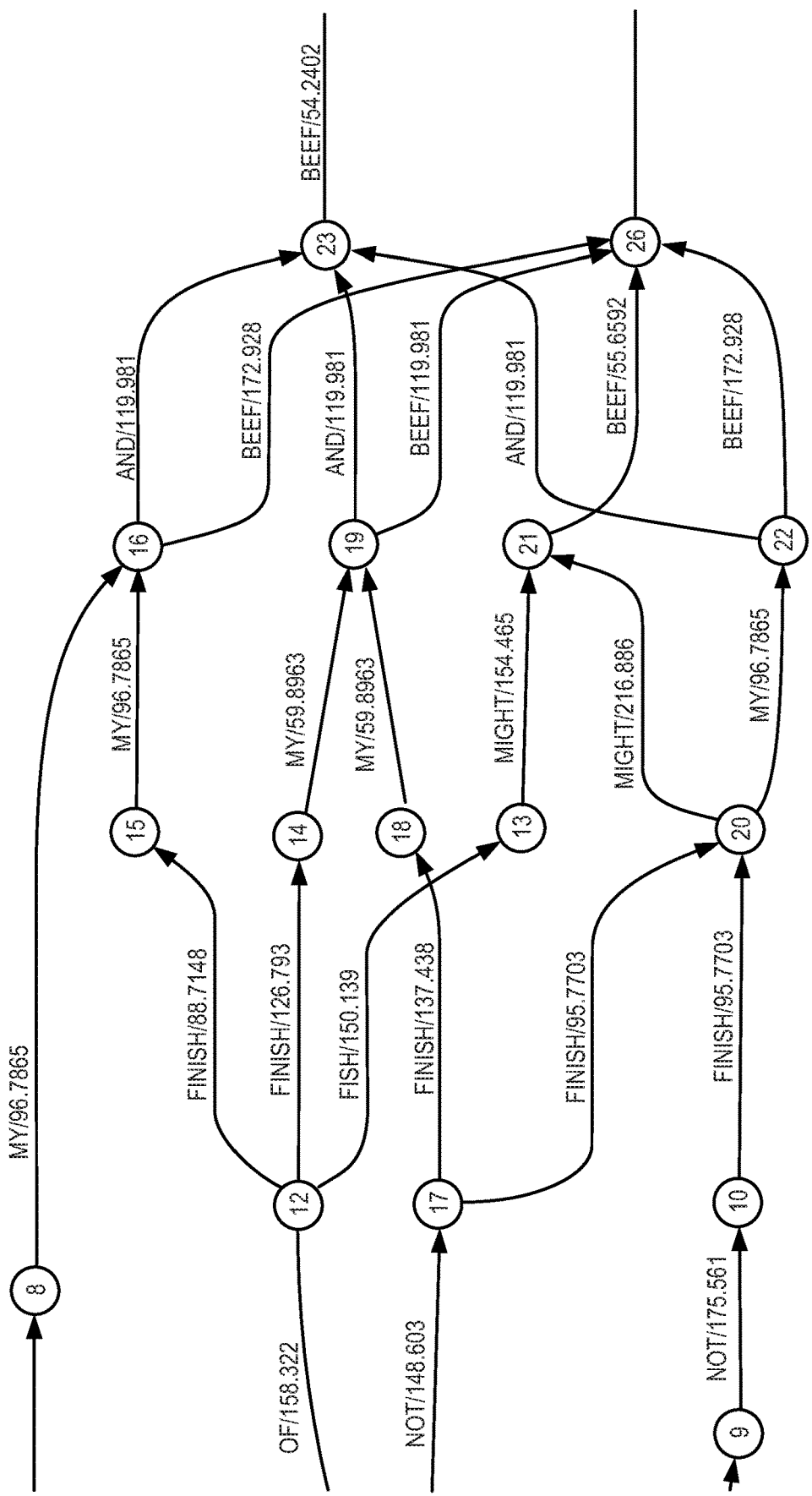

FIG. 27, which includes FIGS. 27A and 27B, shows an example of a portion of a small speech recognition lattice after pruning. In this example, the pruned speech recognition lattice corresponds to a first portion of the utterance "I accidentally did not finish my beef jerky coming from San Francisco to Australia." In this example, alternative word hypotheses for the same hypothesized word are indicated on arcs between numbered nodes. Different arcs of the speech recognition lattice may be traversed to form alternative hypothesized word sequences. For example, the hypothesized word sequence "didn't finish" is represented by arcs connecting nodes 2, 6 and 8. The hypothesized word sequence "did of finish" is represented by arcs connecting nodes 5, 11, 12 and 15. The hypothesized word sequence "did of finished" is represented by arcs connecting nodes 5, 11, 12 and 14. The hypothesized word sequence "did not finish" is represented by arcs connecting nodes 5, 11 and 17-20. The hypothesized word sequence "did not finished" is represented by arcs connecting nodes 5, 11, 17 and 18. All of the foregoing hypothesized word sequences correspond to the actual sub-utterance "did not finish."

In some speech recognition systems, the speech recognizer may report a word recognition confidence score in terms of a logarithmic acoustic cost $C_A$, which is a measure of how unlikely this hypothesized word on this path through the lattice is to be correct, given the acoustic input features to the speech recognizer. The speech recognizer also may report a word recognition confidence score in terms of a logarithmic language cost $C_L$, which is a measure of how unlikely this hypothesized word on this path through the lattice is to be correct given the language model. The acoustic and language costs may be reported for each arc in the lattice.

For each arc in the lattice portion shown in FIG. 27, for example, the combined acoustic and language cost ($C_A+C_L$) for that arc is shown next to each hypothesized word. In this example, the best hypothesized word sequence through the speech recognition lattice corresponds with the path from the start node to an end node that has the lowest sum of arc costs.

In the example shown in FIG. 25, the topic analysis module 525 includes a morphology unit 2504. The morphology unit 2504 may be capable of reducing hypothesized words to a canonical base form. For example, in some implementations that involve reducing nouns of the speech recognition lattice to the canonical base form, the morphology unit 2504 may be capable of reducing plural forms of a noun to singular forms (for example, reducing "cars" to "car"). In some implementations that involve reducing verbs of the speech recognition lattice to the canonical base form, the morphology unit 2504 may be capable of reducing a verb to an infinitive form (for example, reducing "running," "ran," or "runs" to "run").

Alternative implementations of the morphology unit 2504 may include a so-called "stemmer," such as a Porter Stemmer. However, a basic stemmer of this type may not be capable of accurately transforming irregular noun or verb forms (such as reducing "mice" to "mouse"). A more accurate morphology implementation may be needed for such transformations, such as the WordNet morphology described in Miller, George A, *WordNet: A Lexical Database for English*, in Communications of the ACM Vol. 38, No. 11, pages 39-41 (1995).

The topic analysis module 525 of FIG. 25 includes a term frequency metric calculator 2505. In some implementations, the term frequency metric calculator 2505 may be capable of determining a term frequency metric for hypothesized words of the speech recognition lattices 2501. In some such implementations, the term frequency metric calculator 2505 may be capable of determining a term frequency metric for each noun observed in the input lattices (for example, the morphology unit 2504 may be capable of determining which hypothesized words are nouns).

In some implementations, the term frequency metric calculator 2505 may be capable of determining a term frequency metric according to a Term Frequency/Inverse Document Frequency (TF-IDF) function. In one such example, each time a hypothesized word with index x of a lexicon is detected in the input speech recognition lattices, the term frequency metric $TF_x$ may be determined as follows:

$$TFx = TFx' + \frac{C}{N \cdot \max(\ln DF_x, MDF)} \quad \text{(Equation 45)}$$

In Equation 45, $TF_x'$ represents the previous term frequency metric for the word x. If this is the first time that the word x has been encountered during the current iteration, the value of $TF_x'$ may be set to zero. In Equation 45, $DF_x$ represents a document frequency metric and ln indicates the natural logarithm. As noted above, the document frequency metric may correspond to an expected frequency with which a word will occur in the conference. In some examples, the expected frequency may correspond to a frequency with which the word has occurred in two or more prior conferences. In the case of a general business teleconference system, the document frequency metric may be derived by counting the frequency with which this word appears across a large number of business teleconferences.

Alternatively, or additionally, the expected frequency may correspond to a frequency with which the primary word candidate occurs in a language model. Various implementations of methods disclosed herein may be used in conjunction with a speech recognizer, which may apply some type of word frequency metric as part of its language model. Accordingly, in some implementations a language model used for speech recognition may provide the document frequency metric used by the term frequency metric calculator 2505. In some implementations, such information may be provided along with the speech recognition lattices or included with the conference metadata 210.

In Equation 45, MDF represents a selected constant that indicates a minimum logarithmic document frequency. In some implementations, MDF values may be integers in the range of −10 to −4, e.g., −6.

In Equation 45, C represents a word recognition confidence score in the range [0-1] as reported by the speech recognizer in the input lattice. According to some implementations, C may be determined according to:

$$C = \exp(-C_A - C_L) \quad \text{(Equation 46)}$$

In Equation 46, $C_A$ represents logarithmic acoustic cost and $C_L$ represents the logarithmic language cost, both of which are represented using the natural logarithm.

In Equation 45, N represents a number of word meanings. In some implementations, the value of N may be based on the number of definitions of the word in a standard lexicon, such as that of a particular dictionary.

According to some alternative implementations, the term frequency metric $TF_x$ may be determined as follows:

$$TFx = TFx' + \frac{\alpha C + (1 - \alpha)}{N \cdot \max(\ln DF_x, MDF)} \quad \text{(Equation 47)}$$

In Equation 47, α represents a weight factor that may, for example, have a value in the range of zero to one. In Equation 45, the recognition confidence C is used in an un-weighted manner. In some instances, an un-weighted recognition confidence C could be non-optimal, e.g., if a hypothesized word has a very high recognition confidence but appears less frequently. Therefore, adding the weight factor α may help to control the importance of recognition confidence. It may be seen that when α=1, the Equation 47 is equivalent to Equation 45. However, when α=0, recognition confidence is not used and the term frequency metric may be determined according the inverse of the terms in the denominator.

In the example shown in FIG. 25, the topic analysis module 525 includes an alternative word hypothesis pruning unit 2506. As the word list 2508 is created, the system notes a set of alternative word hypotheses for each word by analyzing alternative paths through the lattice for the same time interval.

For example, if the actual word spoken by a conference participant was the word pet, the speech recognizer may have reported put and pat as alternative word hypotheses. For a second instance of the actual word pet, the speech recognizer may have reported pat, pebble and parent as alternative word hypotheses. In this example, after analyzing all the speech recognition lattices corresponding to all the utterances in the conference, the complete list of alternative word hypotheses for the word pet may include put, pat, pebble and parent. The word list 2508 may be sorted in descending order of $TF_x$.

In some implementations of the alternative word hypothesis pruning unit 2506, alternative word hypotheses appearing further down the list (for example, having a lower value of $TF_x$) may be removed from the list. Removed alternatives may be added to the alternative word hypothesis list 2507. For example, if the hypothesized word pet has a higher $TF_x$ than its alternative word hypotheses, the alternative word hypothesis pruning unit 2506 may remove the alternative word hypotheses pat, put, pebble and parent from the word list 2508 and add the alternative word hypotheses pat, put, pebble and parent to the alternative word hypothesis list 2507.

In this example, the topic analysis module 525 stores an alternative word hypothesis list 2507 in memory, at least temporarily. The alternative word hypothesis list 2507 may be input to the lattice rescoring unit 2502, as described elsewhere, over a number of iterations. The number of iterations may vary according to the particular implementation and may be, for example, in the range 1 to 20. In one particular implementation, 4 iterations produced satisfactory results.

In some implementations, the word list 2508 may be deleted at the start of each iteration and may be re-compiled during the next iteration. According to some implementations, the alternative word hypothesis list 2507 may not be deleted at the start of each iteration, so the alternative word hypothesis list 2507 may grow in size as the iterations continue.

In the example shown in FIG. 25, the topic analysis module 525 includes a topic scoring unit 2509. The topic scoring unit 2509 may be capable of determining a topic score for words in the word list 2508.

In some examples, the topic score may be based, at least in part, on an ontology 2510 for topic generalization, such as the WordNet ontology discussed elsewhere herein. Accordingly, in some implementations generating the topic list may involve determining at least one hypernym of one or more words of the word list 2508. Such implementations may involve determining a topic score based, at least in part, on a hypernym score. In some implementations, the hypernyms need not have been spoken by a conference participant in order to be part of the topic score determination process.

For example, a pet is an example of an animal, which is a type of organism, which is a type of living thing. Therefore, the word "animal" may be considered a first-level hypernym of the word "pet." The word "organism" may be considered a second-level hypernym of the word "pet" and a first-level hypernym of the word "animal." The phrase "living thing" may be considered a third-level hypernym of the word "pet," a second-level hypernym of the word "animal" and a first-level hypernym of the word "organism."

Therefore, if the word "pet" is on the word list 2508, in some implementations the topic scoring unit 2509 may be capable of determining a topic score according to one of more of the hypernyms "animal," "organism" and/or "living thing." According to one such example, for each word on the word list 2508, the topic scoring unit 2509 may traverse up the hypernym tree N levels (here, for example, N=2), adding each hypernym to the topic list 2511 if not already present and adding the term frequency metric of the word to the topic score associated with the hypernym. For example, if pet is present on the word list 2508 with a term frequency metric of 5, then pet, animal and organism will be added to the topic list with a term frequency metric of 5. If animal is also on the word list 2508 with term frequency metric of 3, then the topic score of animal and organism will have 3 added for a total topic score of 8, and living thing will be added to the word list 2508 with a term frequency metric of 3.

According to some implementations, multiple iterations of a least some processes of method 2400 may include iterations of generating the topic list and determining the topic score. In some such implementations, block 2525 of method 2400 may involve including alternative word hypotheses in the alternative hypothesis list based, at least in part, on the topic score. For example, in some alternative implementations, the topic analysis module 525 may be capable of topic scoring based on the output of the term frequency metric calculator 2505. According to some such implementations, the alternative word hypothesis pruning unit 2506 may perform alternative hypothesis pruning of topics, in addition to alternative word hypotheses.

For example, suppose that the topic analysis module 525 had determined a conference topic of "pets" due to a term frequency metric of 15 for one or more instances of "pet," a term frequency metric of 5 for an instance of "dog" a term frequency metric of 4 for an instance of "goldfish." Suppose further that there may be a single utterance of "cat" somewhere in the conference, but there is significant ambiguity as to whether the is actual word spoken was "cat," "mat," "hat," "catamaran," "catenary," "caterpillar," etc. If the topic analysis module 525 had only been considering word frequencies in the feedback loop, then the word list 2508 would not facilitate a process of disambiguating these hypotheses, because there was only one potential utterance of "cat." However, because "cat" is a hyponym of "pet," which was identified as a topic by virtue of other words spoken, then the topic analysis module 525 may potentially be better able to disambiguate that potential utterance of "cat."

In this example, the topic analysis module 525 includes a metadata processing unit 2515. According to some implementations, the metadata processing unit 2515 may be capable of producing a bias word list 2512 that is based, at least in part, on the conference metadata 210 received by the topic analysis module 525. The bias word list 2512 may, for example, be capable of including a list of words that may be inserted directly into the word list 2508 with a fixed term frequency metric. The metadata processing unit 2515 may, for example, derive the bias word list 2512 from a priori information pertaining to the topic or subject of the meeting, e.g., from a calendar invitation, from email, etc. A bias word list 2512 may bias a topic list building process to be more likely to contain topics pertaining to a known subject of the meeting.

In some implementations, the alternative word hypotheses may be generated according to multiple language models. For example, if the conference metadata were to indicate that a conference may involve legal and medical issues, such as medical malpractice issues corresponding to a lawsuit based on a patient's injury or death due to a medical procedure, the alternative word hypotheses may be generated according to both medical and legal language models.

According to some such implementations, multiple language models may be interpolated internally by an ASR process, so that the the speech recognition results data received in block 2405 of method 2400 and/or the speech recognition lattices 2501 received in FIG. 25 are based on multiple language models. In alternative implementations, the ASR process may output multiple sets of speech recognition lattices, each set corresponding to a different language model. A topic list 2511 may be generated for each type of input speech recognition lattice. Multiple topic lists 2511 may be may be merged into a single topic list 2511 according to the resulting topic scores.

According to some implementations disclosed herein, the topic list 2511 may be used to facilitate a process of playing back a conference recording, searching for topics in a conference recording, etc. According to some such implementations, the topic list 2511 may be used to provide a "word cloud" of topics corresponding to some or all of the conference recording.

Figure 28A:
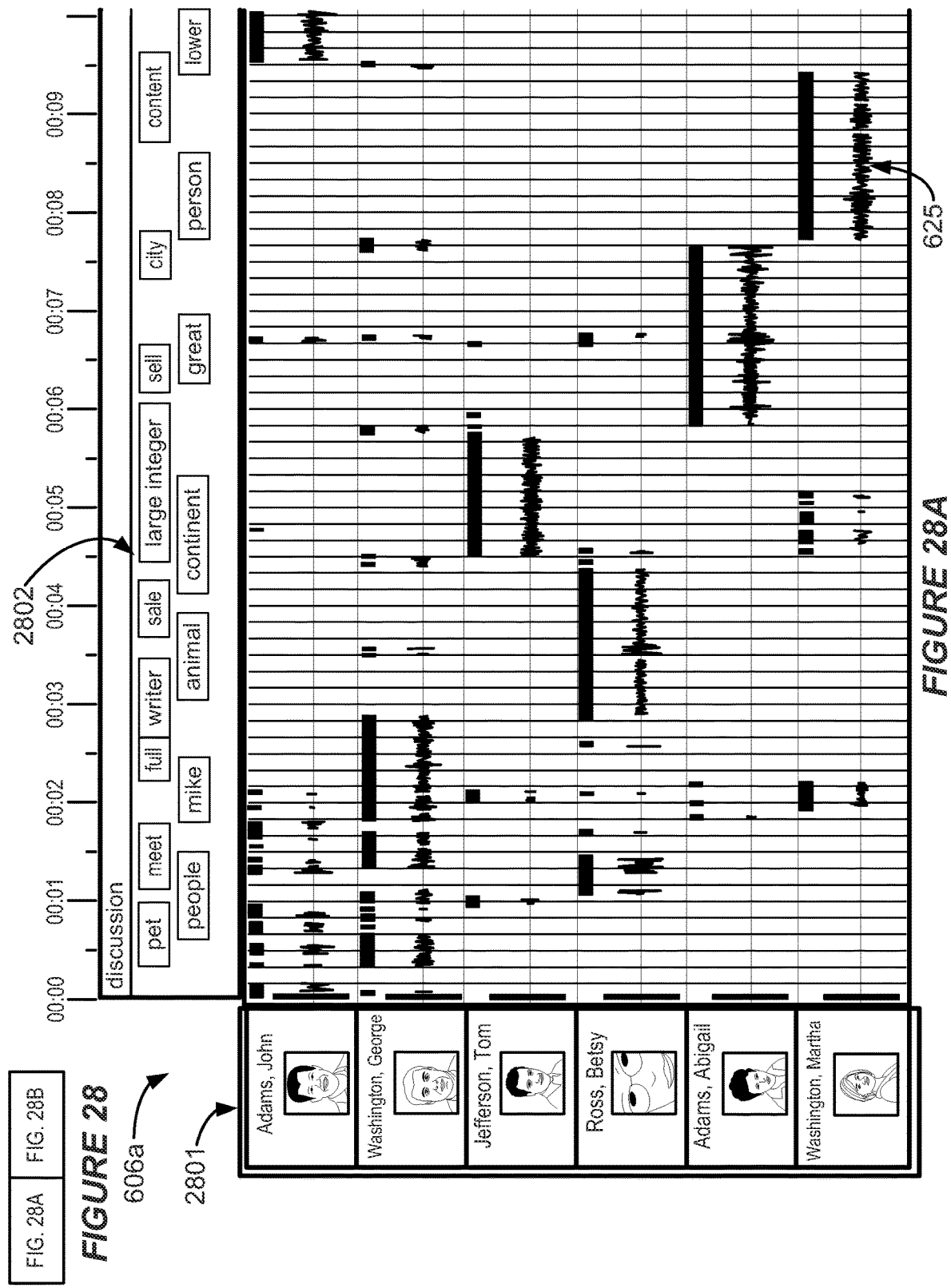
FIGS. 28A and 28B, shows an example of a user interface that includes a word cloud for an entire conference recording.
Figure 28B:
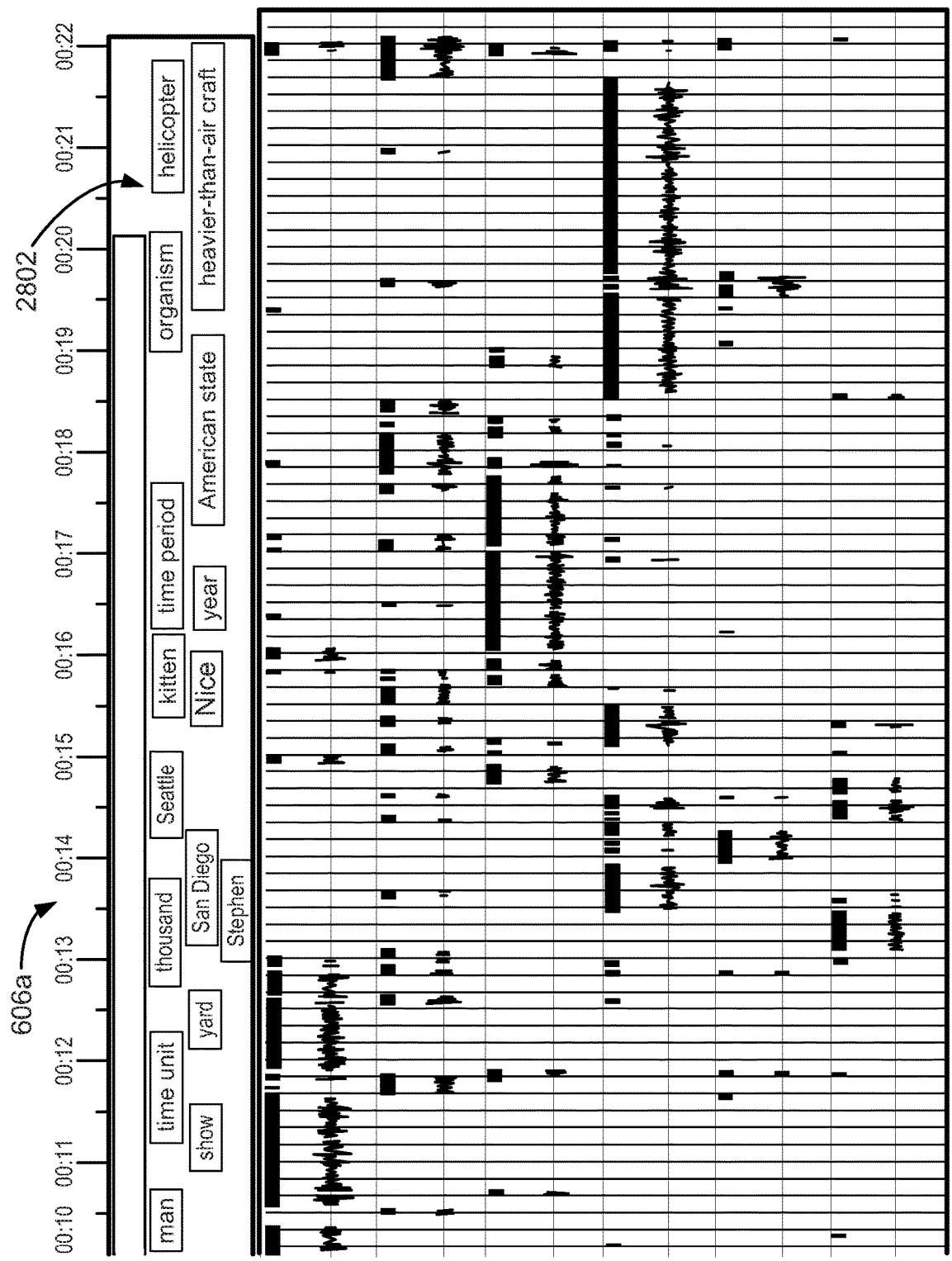

FIG. 28, which includes FIGS. 28A and 28B, shows an example of a user interface that includes a word cloud for an entire conference recording. The user interface 606a may be provided on a display and may be used for browsing the conference recording. For example, the user interface 606a may be provided on a display of a display device 610, as described above with reference to FIG. 6.

In this example, the user interface 606a includes a list 2801 of conference participants of the conference recording. Here, the user interface 606a shows waveforms 625 in time intervals corresponding to conference participant speech.

In this implementation, the user interface 606a provides a word cloud 2802 for an entire conference recording. Topics from the topic list 2511 may be arranged in the word cloud 2802 in descending order of topic frequency (e.g., from right to left) until no further room is available, e.g., given a minimum font size.

According to some such implementations, a topic placement algorithm for the word cloud 2802 may be re-run each time the user adjusts a zoom ratio. For example, a user may be able to interact with the user interface 606a (e.g., via touch, gesture, voice command, etc.) in order to "zoom in" or enlarge at least a portion of the graphical user interface 606, to show a smaller time interval than that of the entire conference recording. According to some such examples, the playback control module 605 of FIG. 6 may access a different instance of the conversational dynamics data files 515a-515n, which may have been previously output by the conversational dynamics analysis module 510, that more closely corresponds with a user-selected time interval.

Figure 29A:
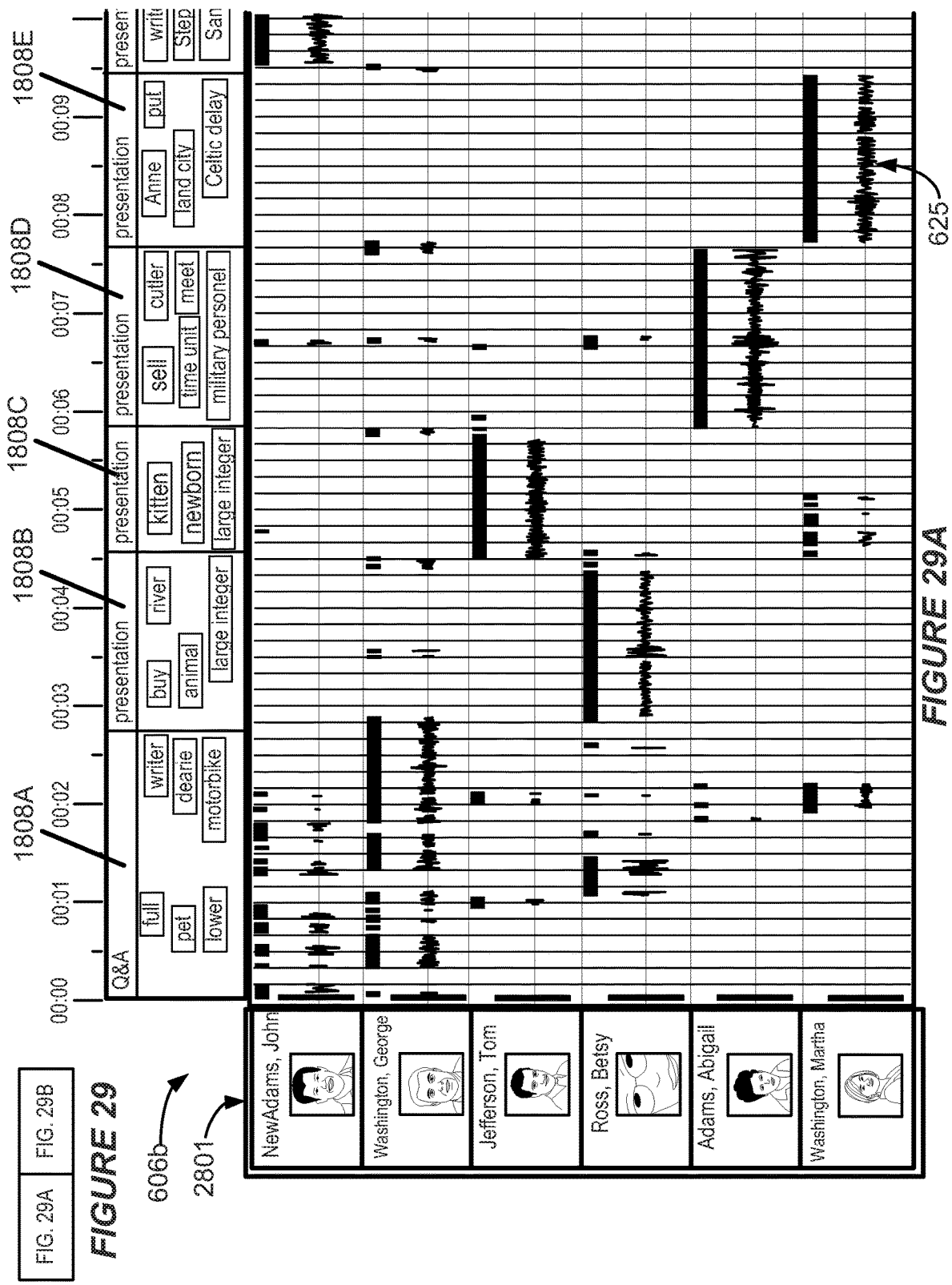
FIGS. 29A and 29B, shows an example of a user interface that includes a word cloud for each of a plurality of conference segments.
Figure 29B:
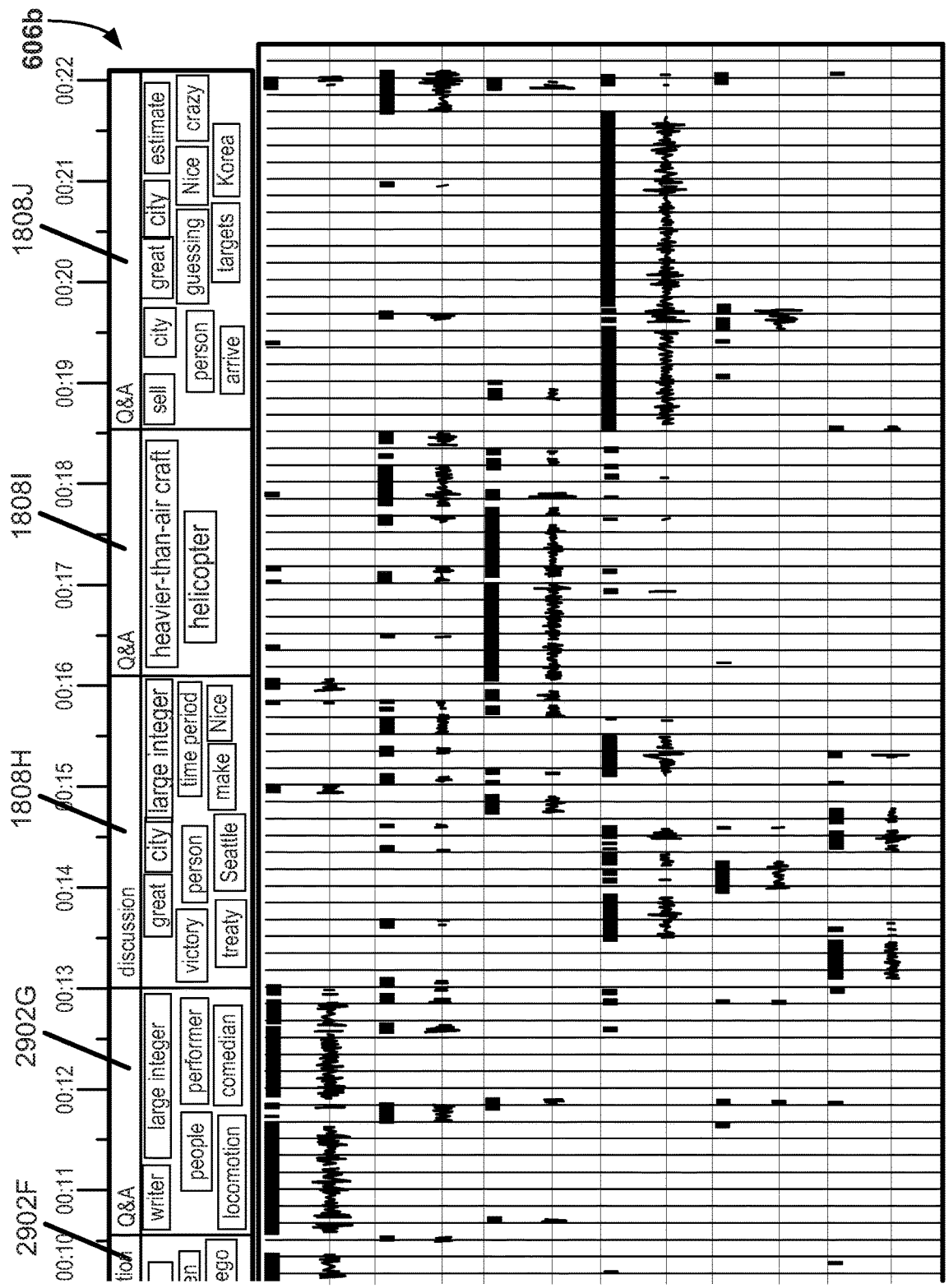

FIG. 29, which includes FIGS. 29A and 29B, shows an example of a user interface that includes a word cloud for each of a plurality of conference segments. As in the previous example, the user interface 606b includes a list 2801 of conference participants and shows waveforms 625 in time intervals corresponding to conference participant speech.

However, in this implementation, the user interface 606b provides a word cloud for each of a plurality of conference segments 1808A-1808J. According to some such implementations, the conference segments 1808A-1808J may have previously been determined by a segmentation unit, such as the segmentation unit 1804 that is described above with reference to FIG. 18B. In some implementations, the topic analysis module 525 may be invoked separately for each segment 1808 of the conference (for example, by using only the speech recognition lattices 2501 corresponding to utterances from one segment 1808 at a time) to generate a separate topic list 2511 for each segment 1808.

In some implementations, the size of the text used to render each topic in a word cloud may be made proportional to the topic frequency. In the implementation shown in FIG. 29A, for example, the topics "kitten" and "newborn" are shown in a slightly larger font size than the topic "large integer," indicating that the topics "kitten" and "newborn" were discussed more than the topic "large integer" in the segment 1808C. However, in some implementations the text size of a topic may be constrained by the area available for displaying a word cloud, a minimum font size (which may be user-selectable), etc.

Figure 30:
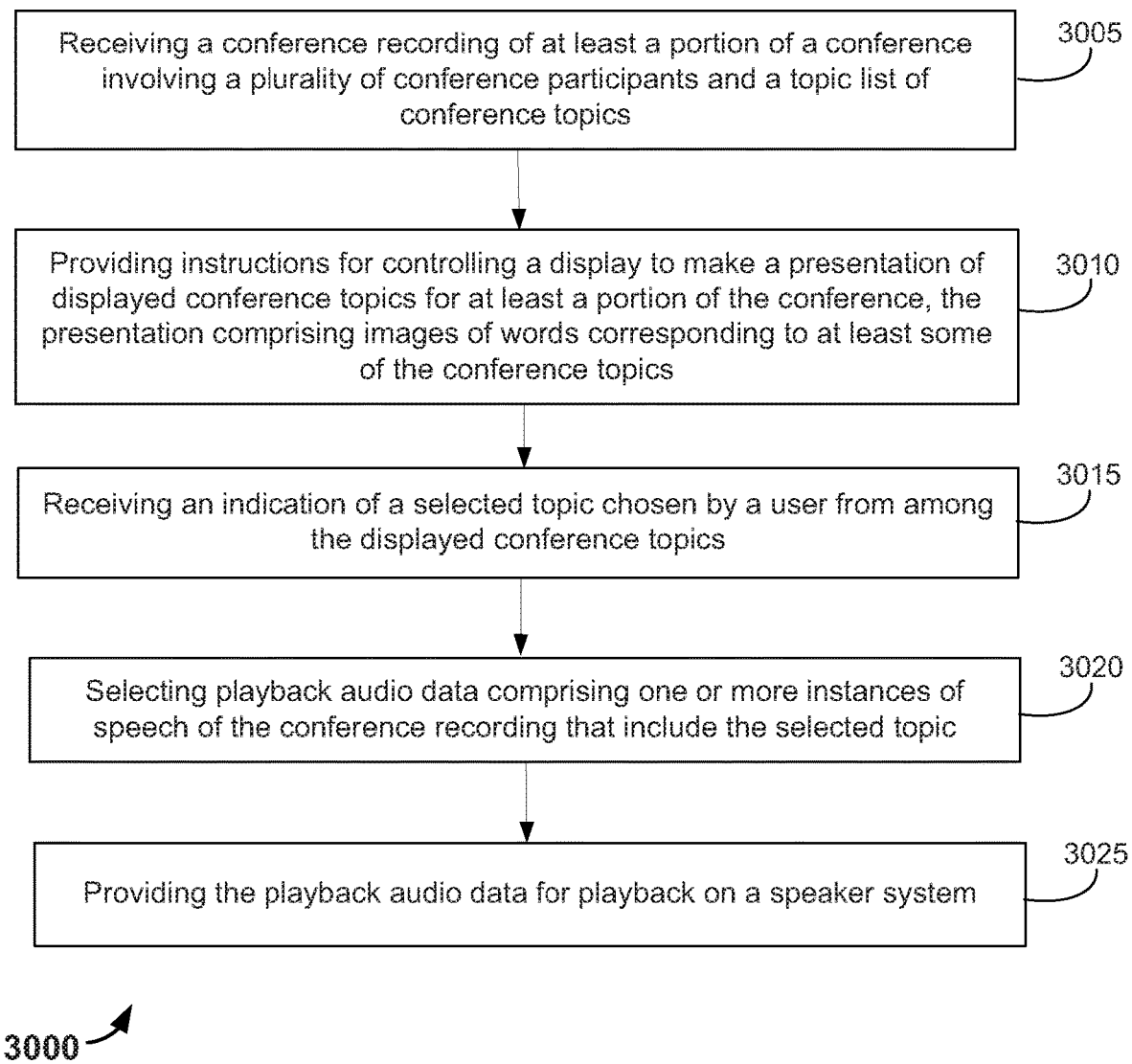
FIG. 30 is a flow diagram that outlines blocks of some playback control methods disclosed herein.

FIG. 30 is a flow diagram that outlines blocks of some playback control methods disclosed herein. The blocks of method 3000, like other methods described herein, are not necessarily performed in the order indicated. Moreover, such methods may include more or fewer blocks than shown and/or described.

In some implementations, method 3000 may be implemented, at least in part, via instructions (e.g., software) stored on non-transitory media such as those described herein, including but not limited to random access memory (RAM) devices, read-only memory (ROM) devices, etc. In some implementations, method 3000 may be implemented, at least in part, by an apparatus such as that shown in FIG. 3A. According to some such implementations, method 3000 may be implemented, at least in part, by one or more elements of the playback system 609 shown in FIG. 6, e.g., by the playback control module 605.

In this example, block 3005 involves receiving a conference recording of at least a portion of a conference involving a plurality of conference participants and a topic list of conference topics. In some implementations, as shown in FIG. 6, block 3005 may involve receipt by the playback system 609 of individual playback streams, such as the playback streams 401B-403B. According to some such implementations, block 3005 may involve receiving other data, such as the playback stream indices 401A-403A, the analysis results 301C-303C, the segment and word cloud data 309, the search index 310 and/or the meeting overview information 311 received by the playback system 609 of FIG. 6. Accordingly, in some examples block 3005 may involve receiving conference segment data including conference segment time interval data and conference segment classifications.

According to some implementations, block 3005 may involve receiving the conference recording and/or other information via an interface system. The interface system may include a network interface, an interface between a control system and a memory system, an interface between the control system and another device and/or an external device interface.

Here, block 3010 involves providing instructions for controlling a display to make a presentation of displayed conference topics for at least a portion of the conference. In this example, the presentation includes images of words corresponding to at least some of the conference topics, such as the word cloud 2802 shown in FIG. 28. In some implementations, the playback control module 605 may provide such instructions for controlling a display in block 3010. For example, block 3010 may involve providing such instructions to a display device, such as the display device 610, via the interface system.

The display device 610 may, for example, be a laptop computer, a tablet computer, a smart phone or another type of device that is capable of providing a graphical user interface that includes a word cloud of displayed conference topics, such as the graphical user interface 606*a* of FIG. 28 or the graphical user interface 606*b* of FIG. 29, on a display. For example, the display device 610 may be capable of executing a software application or "app" for providing the graphical user interface according to instructions from the playback control module 605, receiving user input, sending information to the playback control module 605 corresponding to received user input, etc.

In some instances, the user input received by the playback control module 605 may include an indication of a selected conference recording time interval chosen by a user, e.g., according to user input corresponding to a "zoom in" or a "zoom out" command. In response to such user input, the playback control module 605 may provide, via the interface system, instructions for controlling the display to make the presentation of displayed conference topics correspond with the selected conference recording time interval. For example, the playback control module 605 may select a different instance of a conversational dynamics data file (such as one of the conversational dynamics data files 515*a*-515*e* that are shown to be output by the conversational dynamics analysis module 510 in FIG. 5) that most closely corresponds to the selected conference recording time interval chosen by the user and provide corresponding instructions to the display device 610.

If block 3005 involves receiving conference segment data, the display device 610 may be capable of controlling the display to present indications of one or more conference segments and to make the presentation of displayed conference topics indicate conference topics discussed in the one or more conference segments, e.g., as shown in FIG. 29. The display device 610 may be capable of controlling the display to present waveforms corresponding to instances of conference participant speech and/or images corresponding to conference participants, such as those shown in FIGS. 28 and 29.

Figure 31:
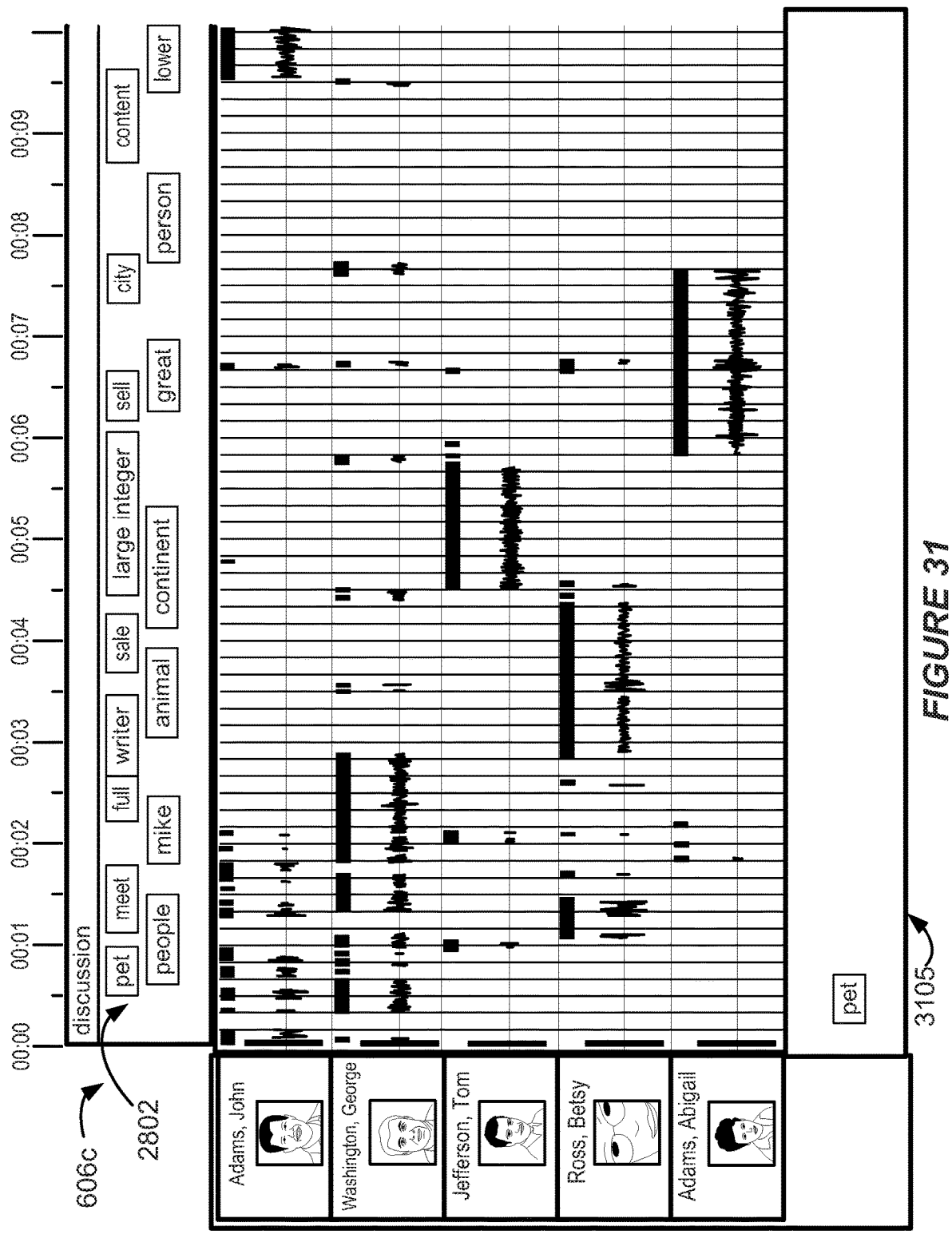
FIG. 31 shows an example of selecting a topic from a word cloud.

In the example shown in FIG. 30, block 3015 involves receiving an indication of a selected topic chosen by a user from among the displayed conference topics. In some examples, block 3015 may involve receiving, by the playback control module 605 and via the interface system, user input from the display device 610. The user input may have been received via user interaction with a portion of the display corresponding to the selected topic, e.g., an indication from a touch sensor system of a user's touch in an area of a displayed word cloud corresponding to the selected topic. Another example is shown in FIG. 31 and described below. In some implementations, if a user causes a cursor to hover over a particular word in a displayed word cloud, instances of conference participant speech associated with that word may be played back. In some implementations, the conference participant speech may be spatially rendered and/or played back in an overlapped fashion.

In the example shown in FIG. 30, block 3020 involves selecting playback audio data comprising one or more instances of speech of the conference recording that include the selected topic. For example, block 3020 may involve selecting instances of speech corresponding to the selected topic, as well as at least some words spoken before and/or after the selected topic, in order to provide context. In some such examples, block 3020 may involve selecting utterances that include the selected topic.

In some implementations, block 3020 may involve selecting at least two instances of speech, including at least one instance of speech uttered by each of at least two conference participants. The method may involve rendering the instances of speech to at least two different virtual conference participant positions of a virtual acoustic space to produce rendered playback audio data, or accessing portions of previously-rendered speech that include the selected topic. According to some implementations, the method may involve scheduling at least a portion of the instances of speech for simultaneous playback.

Figure 32:
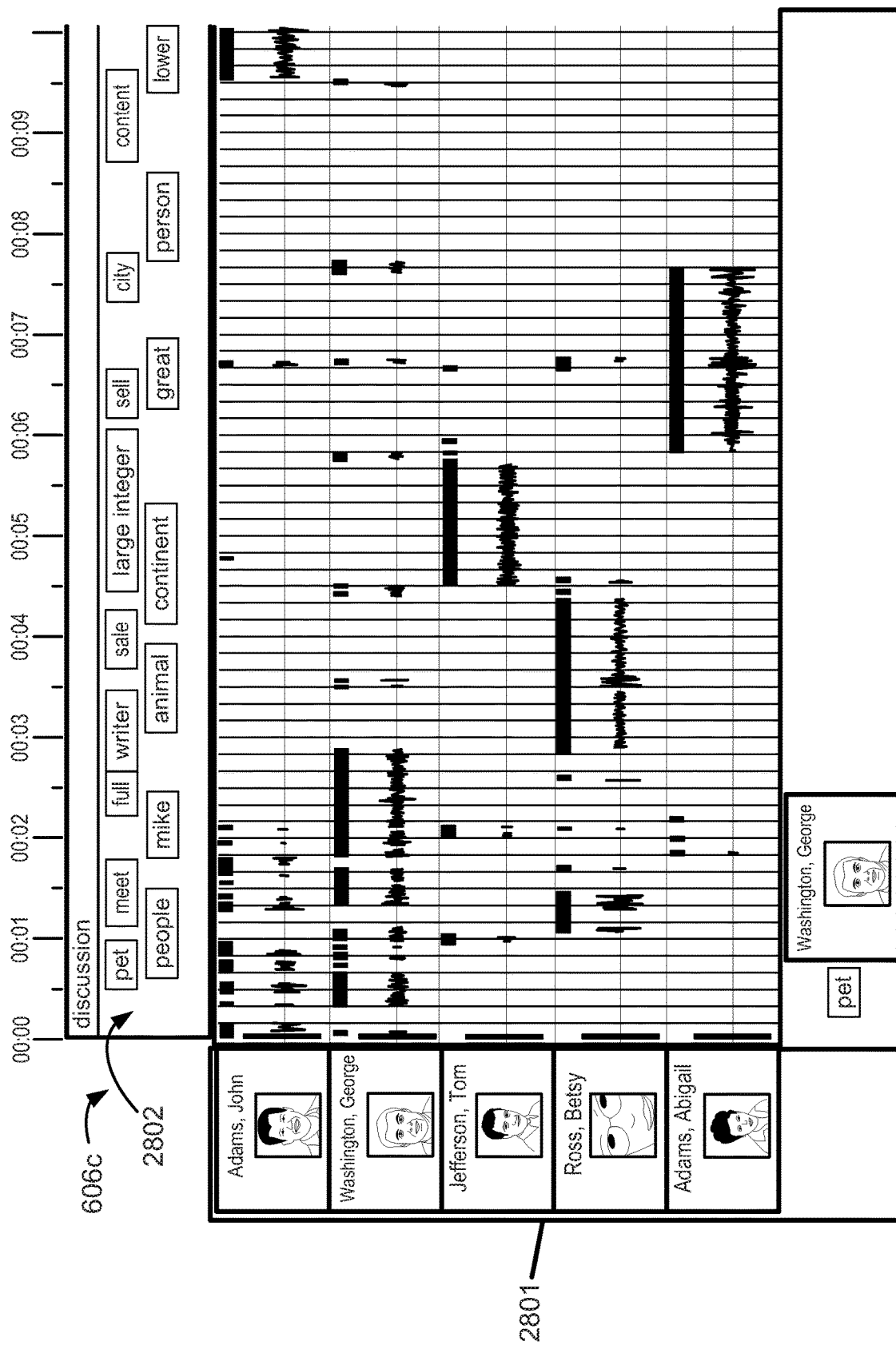
FIG. 32 shows an example of selecting both a topic from a word cloud and a conference participant from a list of conference participants.

According to some implementations, block 3015 may involve receiving an indication of a selected conference participant chosen by a user from among the plurality of conference participants. One such example is shown in FIG. 32 and described below. In some such implementations, block 3020 may involve selecting playback audio data that includes one or more instances of speech of the conference recording that include speech by the selected conference participant regarding the selected topic.

Here, block 3025 involves providing the playback audio data for playback on a speaker system. For example, the playback system 609 may provide mixed and rendered playback audio data, via the interface system, to the display device 610 in block 3025. Alternatively, the playback system 609 may provide the playback audio data directly to a speaker system, such as the headphones 607 and/or the speaker array 608, in block 3025.

FIG. 31 shows an example of selecting a topic from a word cloud. In some implementations, a display device 610 may provide the graphical user interface 606*c* on a display. In this example, a user has selected the word "pet" from the word cloud 2802 and has dragged a representation of the word to the search window 3105. In response, the display device may send an indication of the selected topic "pet" to the playback control module 605. Accordingly, this is an example of the "indication of a selected topic" that may be received in block 3015 of FIG. 30. In response, the display device 610 may receive playback audio data corresponding to one or more instances of speech that involve the topic of pets.

FIG. 32 shows an example of selecting both a topic from a word cloud and a conference participant from a list of conference participants. As noted above, a display device 610 may be providing the graphical user interface 606*c* on a display. In this example, after the user has selected the word "pet" from the word cloud 2802, the user has dragged a representation of the conference participant George Washington to the search window 3105. The display device 610 may send an indication of the selected topic "pet" and the conference participant George Washington to the playback control module 605. In response, the playback system 609 may send the display device 610 playback audio data corresponding to one or more instances of speech by the conference participant George Washington regarding the topic of pets.

When reviewing large numbers of teleconference recordings, or even a single recording of a long teleconference, it can be time-consuming to manually locate a part of a teleconference that one remembers. Some systems have been previously described by which a user may search for keywords in a speech recording by entering the text of a keyword that he or she wishes to locate. These keywords may be used for a search of text produced by a speech recognition system. A list of results may be presented to the user on a display screen.

Some implementations disclosed herein provide methods for presenting conference search results that may involve playing excerpts of the conference recording to the user very quickly, but in a way which is designed to allow the listener to attend to those results which interest him or her. Some such implementations may be tailored for memory augmentation. For example, some such implementations may allow a user to search for one or more features of a conference (or multiple conferences) that the user remembers. Some implementations may allow a user to review the search results very quickly to find one or more particular instances that the user is looking for.

Some such examples involve spatial rendering techniques, such as rendering the conference participant speech data for each of the conference participants to a separate virtual conference participant position. As described in detail elsewhere herein, some such techniques may allow the listener to hear a large amount of content quickly and then select portions of interest for more detailed and/or slower playback. Some implementations may involve introducing or changing overlap between instances of conference participant speech, e.g., according to a set of perceptually-motivated rules. Alternatively, or additionally, some implementations may involve speeding up the played-back conference participant speech. Accordingly, such implementations can make use of the human talent of selecting attention to ensure that a desired search term is found, while minimizing the time that the search process takes.

Accordingly, instead of returning a few results which are very likely to be relevant to the user's search terms and asking the user to individually audition each result (for example, by clicking on each result in a list, in turn, to play it), some such implementations may return many search results that the user can audition quickly (for example, in a few seconds) using spatial rendering and other fast playback techniques disclosed herein. Some implementations may provide a user interface that allows the user to further explore (for example, audition at 1:1 playback speed) selected instances of the search results.

However, some examples disclosed herein may or may not involve spatial rendering, introducing or changing overlap between instances of conference participant speech or speeding up the played-back conference participant speech, depending on the particular implementation. Moreover, some disclosed implementations may involve searching other features of one or more conferences in addition to, or instead of, the content. For example, in addition to searching for particular words in one or more teleconferences, some implementations may involve performing a concurrent search for multiple features of a conference recording. In some examples, the features may include the emotional state of the speaker, the identity of the speaker, the type of conversational dynamics occurring at the time of an utterance (e.g. a presentation, a discussion, a question and answer session, etc.), an endpoint location, an endpoint type and/or other features.

A concurrent search involving multiple features (which may sometimes be referred to herein as a multi-dimensional search) can increase search accuracy and efficiency. For example, if a user could only perform a keyword search, e.g., for the word "sales" in a conference, the user might have to listen to many results before finding a particular excerpt of interest that the user may remember from the conference. In contrast, if the user were to perform a multi-dimensional search for instances of the word "sales" spoken by the conference participant Fred Jones, the user could have potentially reduced the number results that the user would need to review before finding an excerpt of interest.

Accordingly, some disclosed implementations provide methods and devices for efficiently specifying multi-dimensional search terms for one or more teleconference recordings and for efficiently reviewing the search results to locate particular excerpts of interest.

Figure 33:
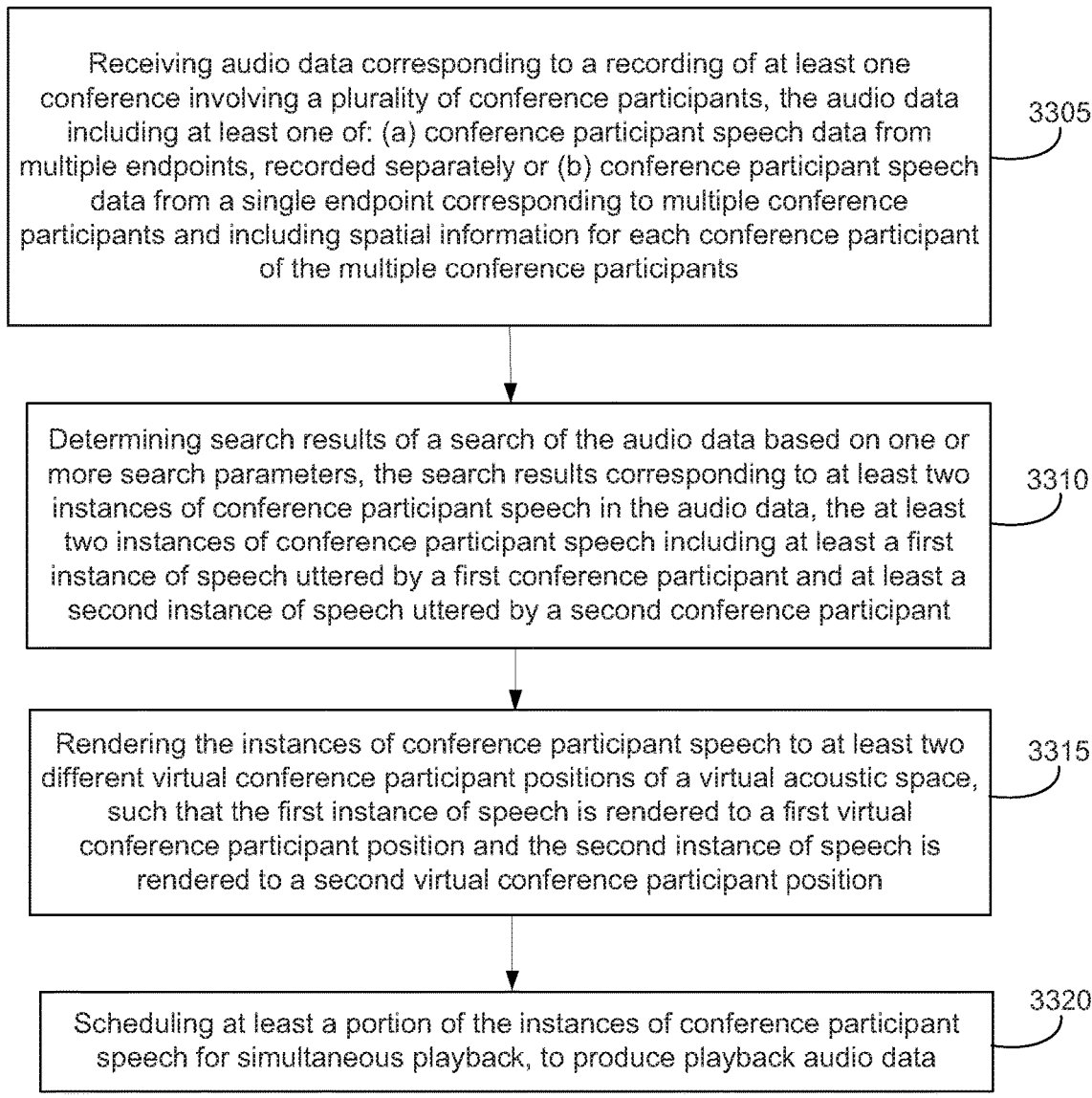
FIG. 33 is a flow diagram that outlines blocks of some topic analysis methods disclosed herein.

FIG. 33 is a flow diagram that outlines blocks of some topic analysis methods disclosed herein. The blocks of method 3300, like other methods described herein, are not necessarily performed in the order indicated. Moreover, such methods may include more or fewer blocks than shown and/or described.

In some implementations, method 3300 may be implemented, at least in part, via instructions (e.g., software) stored on non-transitory media such as those described herein, including but not limited to random access memory (RAM) devices, read-only memory (ROM) devices, etc. In some implementations, method 3300 may be implemented, at least in part, by a control system, e.g., by a control system of an apparatus such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. According to some such implementations, method 3300 may be implemented, at least in part, by one or more elements of the playback system 609 shown in FIG. 6, e.g., by the playback control module 605.

In this example, block 3305 involves receiving audio data corresponding to a recording of at least one conference involving a plurality of conference participants. In this example, the audio data includes conference participant speech data from multiple endpoints, recorded separately and/or conference participant speech data from a single endpoint corresponding to multiple conference participants and including spatial information for each conference participant of the multiple conference participants.

In the example shown in FIG. 33, block 3310 involves determining search results of a search of the audio data based on one or more search parameters. According to some examples, determining the search results may involve receiving search results. For example, in some implementations one or more elements of a playback system, such as the playback system 609 shown in FIG. 6, may perform some processes of method 3300 and another device, such as a server, may perform other processes of method 3300. According to some such implementations, the playback control server 650 may perform a search and may provide the search results to the playback system 609, e.g., to the playback control module 605.

In other examples, determining the search results in block 3310 may involve actually performing a search. For example, in some such implementations the playback system 609 may be capable of performing a search. As described in more detail below, the playback system 609 and/or another device may be capable of performing the search according to user input, which may in some examples be received via a graphical user interface provided on a display device.

In some implementations, block 3310 may involve performing a concurrent search for multiple features of the audio data received in block 3305. Being able to perform a concurrent search for multiple features of the audio data can provide many potential advantages, in part because conference participants will often remember many different aspects of a particular meeting experience. One example described above involves a multi-dimensional search for instances of the word "sales" spoken by the conference participant Fred Jones. In a more detailed example, a conference participant may remember that Fred Jones was speaking about "sales" while giving a presentation sometime during a three-week time interval. The conference participant may have been able to determine from the tone of Fred Jones' voice that he was excited about the topic. The conference participant may remember that Fred Jones was talking on a headset from his office in San Francisco. Each of these individual search features may not be very specific when used by itself, but when combined together they may be very specific and could provide a very focused search.

In some examples, the features may include words, which may be determined according to a keyword spotting index from a speech recognition program's internal speech recognition lattice structures, some examples of which are described in detail below. Such implementations may allow very fast searching of many of the concurrent hypotheses that a speech recognizer provided regarding which words were uttered in the conference. Alternatively, or additionally, the words used in a search may correspond to conference topics determined from the speech recognition lattices, e.g. by using the "word cloud" methods described above.

Various methods are disclosed herein of determining conference segments, which may be based on conversational dynamics. In some implementations, a multi-dimensional search may be based, at least in part, on searching one or more types of conference segments.

In some implementations, a multi-dimensional search may be based, at least in part, on conference participant identity. For a single-party endpoint such as a mobile phone or a PC-based soft client, some implementations may involve recording the name of each conference participant from the device ID. For Voice over Internet Protocol (VoIP) soft-client systems, a user is often prompted to enter his or her name to enter the conference. The names may be recorded for future reference. For speakerphone devices it may be possible to use voiceprint analysis to identify each speaker around the device from among those people invited to the meeting (if the list of invitees is known by the recording/analysis system, e.g., based on a meeting invitation). Some implementations may allow a search based on a general classification regarding conference participant identity, e.g., based on the fact that a conference participant is a male speaker of U.S. English.

In some examples, time may be a searchable feature. For example, if conference recordings are stored along with their start and end times and dates, some implementations may allow a user to search multiple conference recordings within a specified range of dates and/or times.

Some implementations may allow a user to search one or more conference recordings based on conference participant emotion. For example, the analysis engine 307 may have performed one of more types of analyses on the audio data to determine conference participant mood features (See, e.g., Bachorowski, J.-A., & Owren, M. J. (2007). Vocal expressions of emotion. Lewis, M., Haviland-Jones, J. M., & Barrett, L. F. (Eds.), *The handbook of emotion*, 3rd Edition. New York: Guilford. (in press), which is hereby incorporated by reference) such as excitement, aggression or stress/ cognitive load from an audio recording. (See, e.g., Yap, Tet Fei., *Speech production under cognitive load: Effects and classification*, Dissertation, The University of New South Wales (2012), which is hereby incorporated by reference.) In some implementations, the results may be indexed, provided to the playback system 609 and used as part of a multi-dimensional search.

In some examples, endpoint location may be a searchable feature. For example, for endpoints that are installed in a particular room, the location may be known a priori. Some implementations may involve logging a mobile endpoint location based on location information provided by an onboard GPS receiver. In some examples, a location of a VoIP client may be located based on the endpoint's IP address.

Some implementations may allow a user to search one or more conference recordings based on endpoint type. If the meeting recording notes information about the type of telephony device used by each participant (e.g., the make and/or model of a telephone, the User Agent string for a web-based soft client, the class of a device (headset, handset or speakerphone), etc.), in some implementations this information may be stored as conference metadata, provided to the playback system 609 and used as part of a multi-dimensional search.

In some examples, block 3310 may involve performing a search of audio data that corresponds to recordings of multiple conferences. Some examples are described below.

In this example, the search results determined in block 3310 correspond to at least two instances of conference participant speech in the audio data. Here, the at least two instances of conference participant speech include at least a first instance of speech uttered by a first conference participant and at least a second instance of speech uttered by a second conference participant.

In this implementation, block 3315 involves rendering the instances of conference participant speech to at least two different virtual conference participant positions of a virtual acoustic space, such that the first instance of speech is rendered to a first virtual conference participant position and the second instance of speech is rendered to a second virtual conference participant position.

According to some such implementations, one or more elements of a playback system, such as the mixing and rendering module 604 of the playback system 609, may perform the rendering operations of block 3315. However, in some implementations the rendering operations of block 3315 may be performed, at least in part, by another device, such as the rendering server 660 shown in FIG. 6.

In some examples, whether the playback system 609 or another device (such as the rendering server 660) performs the rendering operations of block 3315 may depend, at least in part, on the complexity of the rendering process. If, for example, the rendering operations of block 3315 involve selecting a virtual conference participant position from a set of predetermined virtual conference participant positions, block 3315 may not involve a large amount of computational overhead. According to some such implementations, block 3315 may be performed by the playback system 609.

However, in some implementations the rendering operations may be more complex. For example, some implementations may involve analyzing the audio data to determine conversational dynamics data. The conversational dynamics data may include data indicating the frequency and duration of conference participant speech, data indicating instances of conference participant doubletalk (during which at least two conference participants are speaking simultaneously) and/or data indicating instances of conference participant conversations.

Some such examples may involve applying the conversational dynamics data as one or more variables of a spatial optimization cost function of a vector describing the virtual conference participant position for each of the conference participants in the virtual acoustic space. Such implementations may involve applying an optimization technique to the spatial optimization cost function to determine a locally optimal solution and assigning the virtual conference participant positions in the virtual acoustic space based, at least in part, on the locally optimal solution.

In some such implementations, determining the conversational dynamics data, applying the optimization technique to the spatial optimization cost function, etc., may be performed by a module other than the the playback system 609, e.g., by the playback control server 650. In some implementations, at least some of these operations may have previously been performed, e.g., by the playback control server 650 or by the joint analysis module 306. According to some such implementations, block 3315 may involve receiving the output of such a process, e.g., receiving, by the mixing and rendering module 604, assigned virtual conference participant positions and rendering the instances of conference participant speech to at least two different virtual conference participant positions.

In the example shown in FIG. 33, block 3320 involves scheduling at least a portion of the instances of conference participant speech for simultaneous playback, to produce playback audio data. In some implementations, the scheduling may involve scheduling the instances of conference participant speech for playback based, at least in part, on a search relevance metric. For example, instead of scheduling conference participant speech for playback according to, e.g., the start time of each of the instances of conference participant speech, some such implementations may involve scheduling conference participant speech having a relatively higher search relevance metric for playback earlier than conference participant speech having a relatively lower search relevance metric. Some examples are described below.

According to some implementations, block 3320 may involve scheduling an instance of conference participant speech that did not previously overlap in time to be played back overlapped in time and/or scheduling an instance of conference participant speech that was previously overlapped in time to be played back further overlapped in time. In some instances, such scheduling may be performed according to a set of perceptually-motivated rules, e.g., as disclosed elsewhere herein.

For example, the set of perceptually-motivated rules may include a rule indicating that two talkspurts of a single conference participant should not overlap in time and/or a rule indicating that two talkspurts should not overlap in time if the two talkspurts correspond to a single endpoint. In some implementations, the set of perceptually-motivated rules may include a rule wherein, given two consecutive input talkspurts A and B, A having occurred before B, the playback of an output talkspurt corresponding to B may begin before the playback of an output talkspurt corresponding to A is complete, but not before the playback of the output talkspurt corresponding to A has started. In some examples, the set of perceptually-motivated rules may include a rule allowing the playback of an output talkspurt corresponding to B to begin no sooner than a time T before the playback of an output talkspurt corresponding to A is complete, wherein T is greater than zero.

According to some implementations, method 3300 may involve providing the playback audio data to a speaker system. Alternatively, or additionally, method 3300 may involve providing the playback audio data to another device, such as the display device 610 of FIG. 6, which may be capable of providing the playback audio data to a speaker system (e.g., the headphones 607, ear buds, the speaker array 608, etc.).

Figure 34:
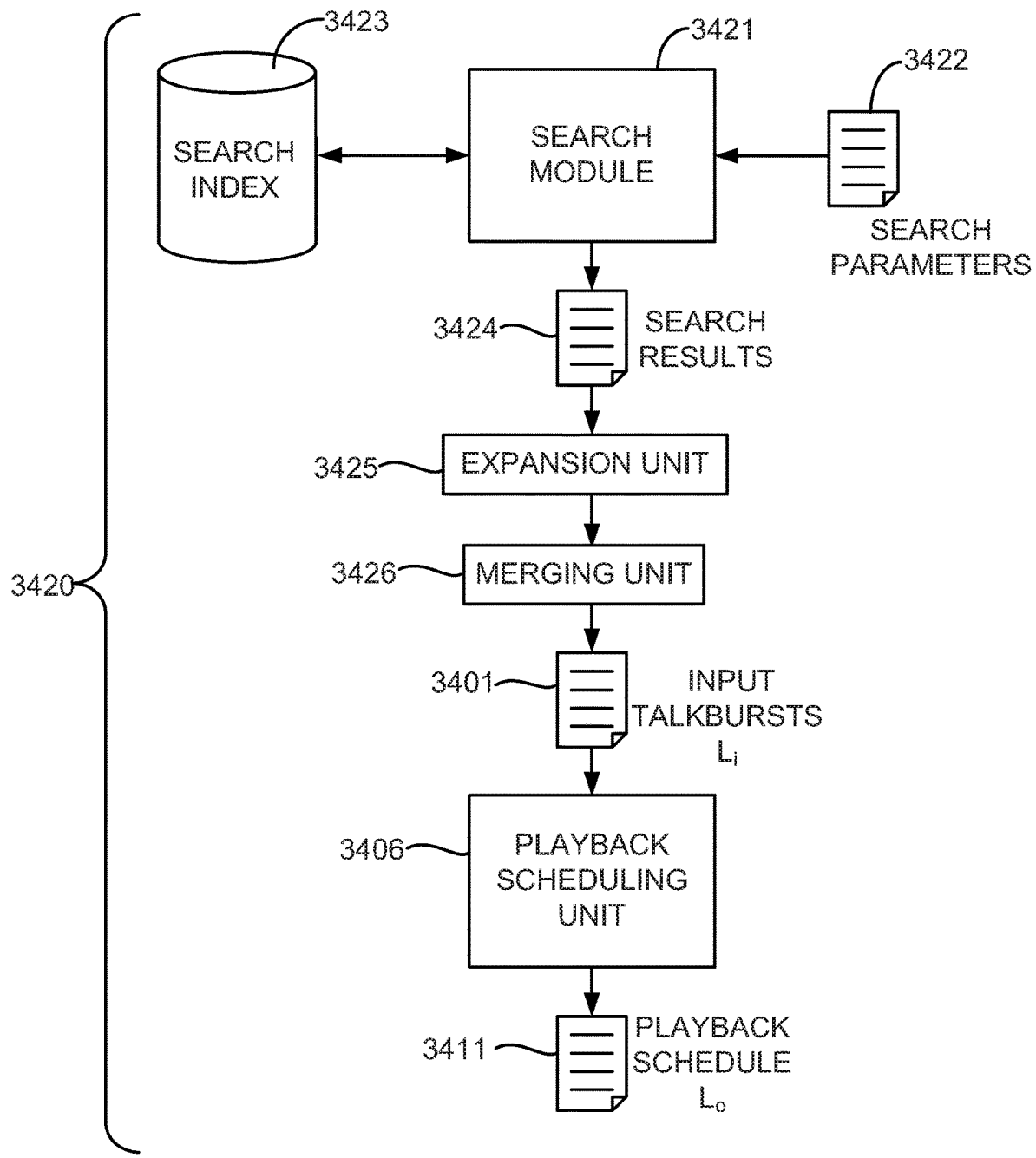
FIG. 34 is a block diagram that shows examples of search system elements.

FIG. 34 is a block diagram that shows examples of search system elements. In this implementation, the search system 3420 includes a search module 3421, an expansion unit 3425, a merging unit 3426 and a playback scheduling unit 3406. In some implementations, the search module 3421, the expansion unit 3425, the merging unit 3426 and/or the playback scheduling unit 3406 may be implemented, at least in part, via instructions (e.g., software) stored on non-transitory media such as those described herein, including but not limited to random access memory (RAM) devices, read-only memory (ROM) devices, etc. In some implementations, the search module 3421, the expansion unit 3425, the merging unit 3426 and/or the playback scheduling unit 3406 may be implemented, at least in part, as elements of a control system, e.g., by a control system of an apparatus such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. According to some implementations, the search module 3421, the expansion unit 3425, the merging unit 3426 and/or the playback scheduling unit 3406 may be implemented, at least in part, by one or more elements of the playback system 609 shown in FIG. 6, e.g., by the playback control module 605.

In this example, the search module 3421 is capable of receiving one or more search parameters 3422 and performing a search process according to a search index 3423, to produce a list of search results 3424. According to some implementations, the search index 3423 may be comparable to the search index 310 that is output by the keyword spotting and indexing module 505 of FIG. 5. Additional examples of search indices are provided below. In some implementations, the search process may be a multi-stage search process, e.g., as described below.

In some examples, the search module 3421 may capable of performing conventional "keyword spotting" functionality, such as that as described in D. Can and M. Saraçlar, "Lattice Indexing for Spoken Term Detection," IEEE TRANSACTIONS ON AUDIO, SPEECH, AND LANGUAGE PROCESSING, Vol. 19, No. 8, November 2011 ("the Lattice Indexing publication"), which is hereby incorporated by reference. Alternatively, or additionally, the search module 3421 may capable of performing a multi-dimensional search involving multiple features. Such features may include words, conference segments, time, conference participant emotion, endpoint location, and/or endpoint type. Various examples are provided herein.

In FIG. 34, the search module 3421 is shown receiving a list of search parameters 3422, which may be derived from user input. In one example, if the user enters pet animal the search parameters will include pet and animal, meaning that the user wants to find instances of the word pet or of the word animal. These and/or other search definitions and procedures known to those of ordinary skill in the art of search systems may be implemented by the search module 3421. For example "san francisco" could be searched as a bigram if entered in quotes and may correspond to a single entry of the parameter list 3422. Accordingly, the intersection of the search parameters could be taken by the search module 3421 instead of the union. In some implementations, the search parameters may include other types of features, e.g., a search parameter indicating that the search should be restricted to a particular type of conference segment, to speech by a particular conference, to a particular date or date range, etc.

The search index 3423 may allow high-speed matching of the search parameters 3422 with corresponding parameters found in one or more conference recordings. In some examples, the search index 3423 may allow the search module 3421 to implement a finite state transducer approach, such as that described in the Lattice Indexing publication. In some implementations, the search index 3423 may have a simpler search index data structure, such as that of a hash table or a binary tree. For implementations in which the search module 3421 implements a "keyword spotting" search, the search index 3423 may allow the user to find words from input speech recognition lattices describing the speech recognition engine's hypotheses for each of the utterances detected in the conference. For implementations in which the search module 3421 implements a multi-dimensional search as disclosed herein, the search index may also provide an accelerated way to find other features, such as conference segments.

In this example, the search results 3424 may include a list of conference excerpts hypothesized to be relevant to the search parameters. The conference excerpts may include instances of conference participant speech that correspond with one or more words included in the search parameters. For example, the search results 3424 may include a list of hypothesized words and an estimated word recognition confidence score for each hypothesized word. In some implementations, each entry on the list may include an endpoint identifier, the start time of an excerpt (e.g., relative to a conference start time) and the end time of the excerpt. If the search index contains multiple conferences, each entry on the list may include a conference identifier.

In some implementations, the word recognition confidence score may correspond with a search relevance metric. However, some implementations may involve other types of relevance evaluation, e.g., as described above with reference to the conference topic determination and word cloud generation implementations. In some embodiments the relevance metric may be constrained to be in the range from zero to one. In other embodiments the relevance metric may be constrained within a different numerical range. For example, the relevance metric may take the form of a logarithmic cost, which may be similar to the costs $C_A$ and $C_L$ discussed above. In still other examples, the relevance metric may be an unconstrained quantity, which may be useful only for comparing two results. In some examples, the search results 3424 may be ordered in descending order of relevance. The playback scheduling unit 3406 may schedule the most relevant results to be played back first.

In some implementations, the search system 3420 may be capable of modifying a start time or an end time of one or more of the instances of conference participant speech included in the search results 3424. In this example, the expansion unit 3425 is capable of expanding a time interval corresponding to an instance of conference participant speech, thereby providing more context. For example, if the user is searching for the word "pet," the expansion unit 3425 may be capable of ensuring that some words before and/or after instances of the word "pet" are included in the corresponding instances of conference participant speech. Instead of only indicating the word "pet," the resulting instances of conference participant speech may, for example, include contextual words such as "I don't have many pets," "I have a pet dog named Leo," etc. Therefore, a user listening to such instances of conference participant speech may be better able to determine which instances are relatively more or relatively less likely to be of interest and may be able to decide more accurately which instances are worth listening to in more detail.

In some implementations, the expansion unit 3425 may be capable of subtracting a fixed offset (for example 2 seconds) from the start time of an instance of conference participant speech, under the constraint that the start time of the excerpt may not be earlier the start time of the talkspurt that contains it. In some implementations, the expansion unit 3425 may be capable of adding a fixed offset (for example 2 seconds) to the end time of an instance of conference participant speech, under the constraint that the end time of the excerpt may not be later than the end time of the talkspurt that contains it.

In this implementation, the search system 3420 includes a merging unit 3426 that is capable of merging two or more instances of conference participant speech, corresponding with a single conference endpoint, that overlap in time after expansion. Accordingly, the merging unit 3426 may ensure that the same instance of conference participant speech is not heard multiple times when reviewing the search results. In some examples, when instances of conference participant speech are merged, the merged result is assigned the highest (most relevant) of all the input relevance scores of the merged instances.

In this example, the modified search results list produced by the merging unit 3426 forms the list of input talkspurts 3401 that is input to the playback scheduler 3406. In some implementations, the list of input talkspurts 3401 may be comparable to the conference segment 1301 that is described above with reference to FIG. 13.

In this implementation, the playback scheduling unit 3406 is capable of scheduling instances of conference participant speech for playback. In some implementations, the playback scheduling unit 3406 may be capable of scheduling an instance of conference participant speech having a relatively higher search relevance metric for playback earlier than an instance of conference participant speech having a relatively lower search relevance metric.

According to some examples, the playback scheduling unit 3406 may be capable of providing functionality that is like that of the playback scheduler 1306, which is described above with reference to FIG. 13. Similarly, the playback schedule 3411 may, in some implementations, be comparable to the output playback schedule 1311 that is described above with reference to FIG. 13. Accordingly, the playback scheduling unit 3406 may be capable of scheduling an instance of conference participant speech that did not previously overlap in time to be played back overlapped in time and/or scheduling an instance of conference participant speech that was previously overlapped in time to be played back further overlapped in time. In some instances, such scheduling may be performed according to a set of perceptually-motivated rules, e.g., as disclosed elsewhere herein.

Figure 35:
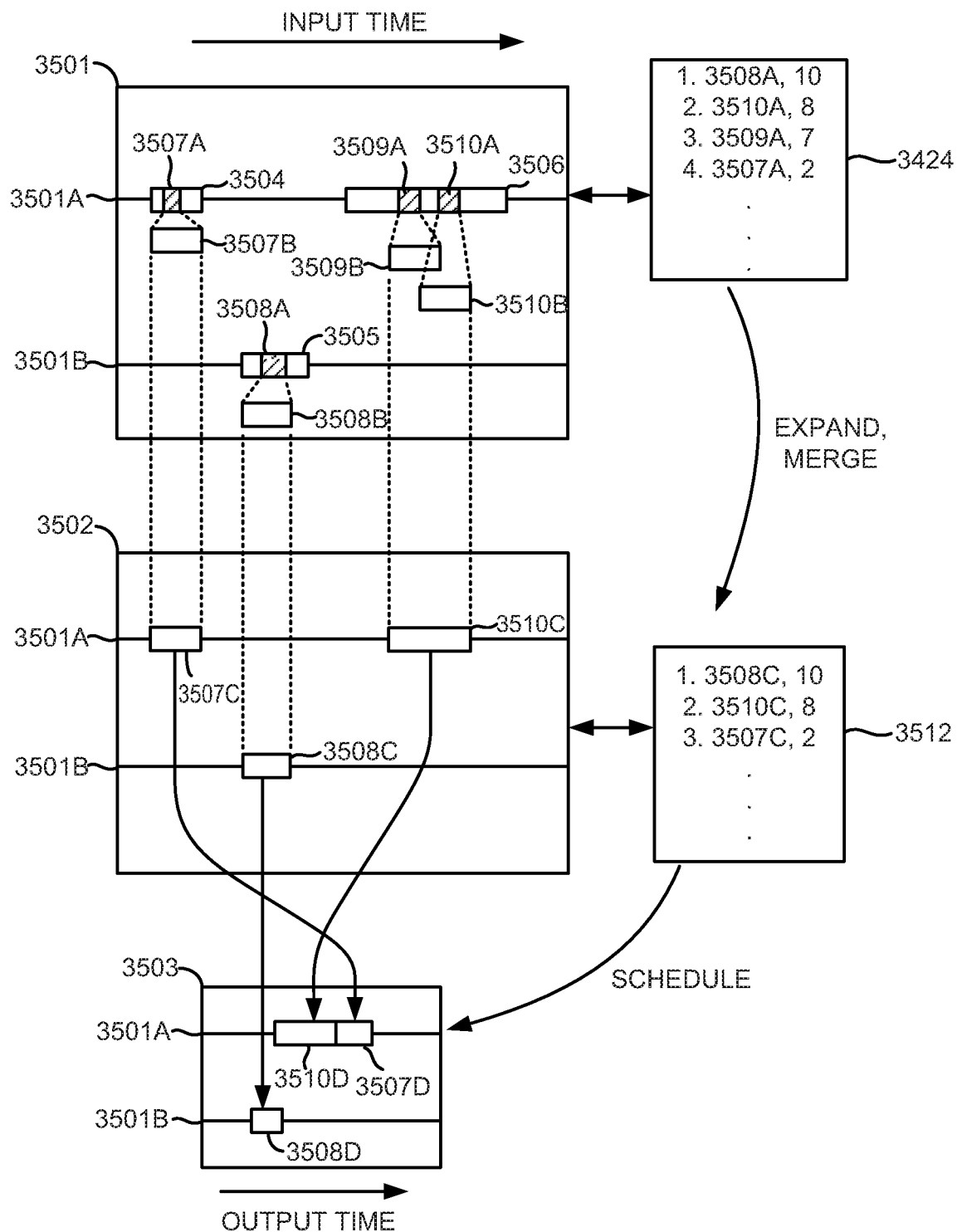
FIG. 35 shows example playback scheduling unit, merging unit and playback scheduling unit functionality.

FIG. 35 shows examples of playback scheduling unit, merging unit and playback scheduling unit functionality. In this example, a search results portion 3501 of the search results 3424 is shown with instances of conference participant speech 3507A-3510A arranged in input time. The instances are actually sorted in descending order of relevance in this example, as shown in the search results 3424, each instance being shown with a corresponding search relevance metric. In this example, the search relevance metric values range from zero to ten. Here, the underlying search involved a single conference recording and the endpoints 3501A and 3501B are two different example endpoints within the same conference for which the search module 3421 has returned results.

In this implementation, the search results portion 3501 includes talkspurts 3504-3506 of the conference. In this example, the talkspurts 3504 and 3506 were uttered at endpoint 3501A and the talkspurt 3505 was uttered at endpoint 3501B.

In this example, the instance of conference participant speech 3507A is a part (e.g., one word) of the talkspurt 3504 (e.g., one sentence) uttered at the endpoint 3501A. The instance of conference participant speech 3507A has a search relevance metric of 2. Here, the instance of conference participant speech 3508A is a part of the talkspurt 3505 uttered at the endpoint 3501B. The instance of conference participant speech 3508A has a search relevance metric of 10. The instances of conference participant speech 3509A and 3510A are different parts (e.g., two different instances of a word in the sentence) of the talkspurt 3506, uttered at the endpoint 3501A. The instances of conference participant speech 3509A and 3510A have search relevance metrics of 7 and 8, respectively.

In this example, the search results portion 3501 also shows instances of conference participant speech after expansion, e.g., after processing by the expansion unit 3425 of FIG. 34. In this example, the expanded instances of conference participant speech 3507B-3510B are shown. The start times and end times have been expanded, while ensuring that the resulting expanded instances of conference participant speech 3507B-3510B do not extend beyond their corresponding talkspurts (for example, the expanded instance of conference participant speech 3507B does not start before the start time of the talkspurt 3504).

The block 3502 shows the modified example search results after expansion and merging, shown for clarity in input time. The instances of conference participant speech are actually sorted in descending order of relevance, as shown in the modified search results list 3512. In this example, the instances of conference participant speech 3507C, 3508C and 3510C are output from the expansion and merging processes. Here, the instance 3507C is the same as the instance 3507B, because no merging has occurred after expansion. Likewise, in this example the instance 3508C is the same as the instance 3507C, because no merging has occurred after expansion. However, the instances 3509B and 3510B have been merged together, to form the instance 3510C. Here, the instances 3509B and 3510B have been merged because these two instances of conference participant speech are from the same endpoint and overlap in time. In this example, the higher of the two search relevance metrics (8) is assigned to the resulting instance 3510C.

In this example, the block 3503 shows a portion of a resulting output playback schedule 3411 after a playback scheduling process. Because the search results 3511 and the modified search results 3512 are sorted in descending order of relevance, the instances of conference participant speech 3507D, 3508D and 3510D are scheduled in output time such that the listener hears the output in descending order of relevance. In this example, each of the instances of conference participant speech 3507D, 3508D and 3510D are scheduled to be played back at a higher rate of speed than the input instances of conference participant speech 3507C, 3508C and 3510C, so the corresponding time intervals have been shortened.

Moreover, in this example overlap has been introduced between the instances of conference participant speech 3508D and 3510D. In this example, the instance 3510D is scheduled to start before the instance 3508D is scheduled to complete. This may be permitted according to a perceptually-motivated rule that allows such overlap for instances of conference participant speech from different endpoints. In this example, the instance 3507D is scheduled to start when the instance 3508D is scheduled to complete, in order to eliminate the intervening time interval. However, the instance 3507D is not scheduled to start before the instance 3508D is scheduled to complete, because both instances are from the same endpoint.

Various implementations disclosed herein involve providing instructions for controlling a display to provide a graphical user interface. Some such methods may involve receiving input corresponding to a user's interaction with the graphical user interface and processing audio data based, at least in part, on the input. In some examples, the input may correspond to one or more parameters and/or features for performing a search of the audio data.

According to some such implementations, the instructions for controlling the display may include instructions for making a presentation of conference participants. The one or more parameters and/or features for performing the search may include an indication of a conference participant. In some examples, the instructions for controlling the display may include instructions for making a presentation of conference segments. The one or more parameters and/or features for performing the search may include an indication of a conference segment. According to some implementations, the instructions for controlling the display may include instructions for making a presentation of a display area for search features. The one or more parameters and/or features for performing the search may include words, time, conference participant emotion, endpoint location and/or endpoint type. Various examples are disclosed herein.

Figure 36:
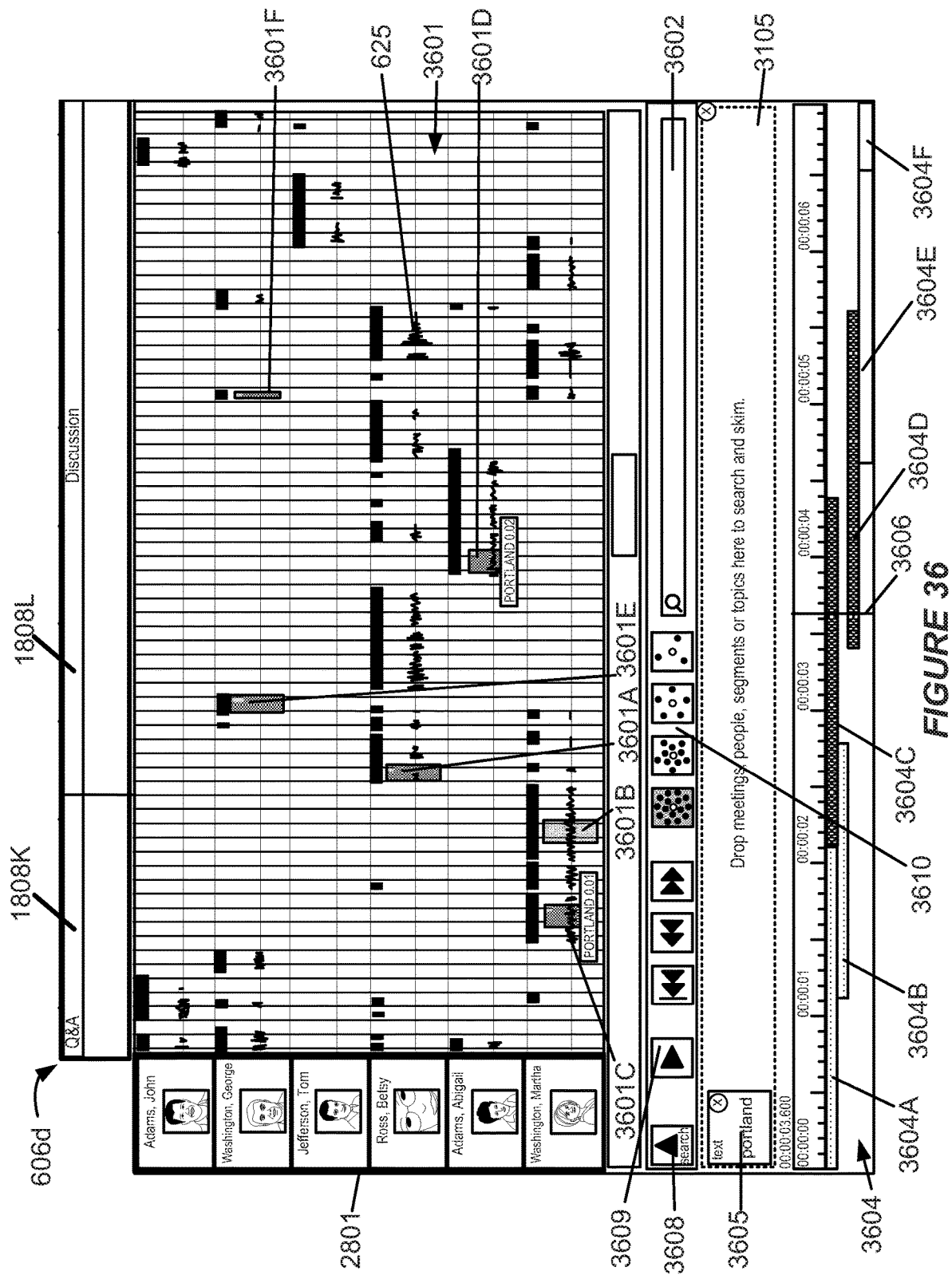
FIG. 36 shows an example of a graphical user interface that may be used to implement some aspects of this disclosure.

FIG. 36 shows an example of a graphical user interface that may be used to implement some aspects of this disclosure. In some implementations, the user interface 606*d* may be presented on a display based, at least in part, on information provided by a playback system, such as the playback system 609 shown in FIG. 6. According to some such implementations, the user interface 606*d* may be presented on a display of a display device, such as the display device 610 shown in FIG. 6.

In this implementation, the user interface 606*d* includes a list 2801 of conference participants. In this example, the list 2801 of conference participants corresponds with a plurality of single-party endpoints and indicates a name and picture of each corresponding conference participant. In this example, the user interface 606*d* includes a waveform display area 3601, which is showing speech waveforms 625 over time for each of the conference participants. In this implementation, the time scale of the waveform display area 3601 is indicated by the vertical lines within the waveform display area 3601 and corresponds with the time scale of the conference recording. This time scale may be referred to herein as "input time."

Here, the user interface 606*d* also indicates conference segments 1808K and 1808L, which correspond to a question and answer segment and a discussion segment, respectively. In this example, the user interface 606*d* also includes a play mode control 3608, which a user can toggle between linear (input time) playback and non-linear (scheduled output time) playback. When playing back the scheduled output, in this implementation clicking the play mode control 3608 allows the user to review a result in more detail (e.g., at a slower speed, with additional context).

Here, the user interface 606*d* includes transport controls 3609, which allow the user to play, pause, rewind or fast-forward through the content. In this example, the user interface 606*d* also includes various quantity filters 3610, which control the number of search results returned. In this example, the more dots indicated on the quantity filter 3610, the larger number of search results that may potentially be returned.

In this implementation, the user interface 606*d* includes a search window 3105 and a text field 3602 for entering search parameters. In some examples, a user may "drag" one or more displayed features (such as a conference segment or a conference participant) into the search window 3105 and/or type text in the text field 3602 in order to indicate that the feature(s) should be used for a search of the conference recording. In this example, block 3605 of the search window 3105 indicates that the user has already initiated a text-based search for instances of the keyword "Portland."

In this example, the user interface 606*d* also includes a scheduled output area 3604, which has a time scale in output time (which may also be referred to herein as "playback time") in this example. Here, the line 3606 indicates the current playback time. Accordingly, in this example, the instances of conference participant speech 3604A and 3604B (which have the highest and second-highest search relevance metric, respectively) have already been played back. In this implementation, the instances of conference participant speech 3604A and 3604B in the scheduled output area 3604 correspond with the instances of conference participant speech 3601A and 3601B shown in the waveform display area 3601.

In this example, the instances of conference participant speech 3604C and 3604D are currently being played back. Here, the instances of conference participant speech 3604C and 3604D correspond with the instances of conference participant speech 3601C and 3601D shown in the waveform display area 3601. In this implementation, the instances of conference participant speech 3604E and 3604F have not yet been played back. In this example, the instances of conference participant speech 3604E and 3604F correspond with the instances of conference participant speech 3601E and 3601F shown in the waveform display area 3601.

In this example, the instances of conference participant speech 3604A and 3604B, as well as the instances of conference participant speech 3604C and 3604D, were scheduled to be overlapped in time during playback. According to some implementations, this is acceptable pursuant to a perceptually-motivated rule that indicating that two talkspurts of a single conference participant or a single endpoint should not overlap in time, but which allows overlapped playback otherwise. However, because the instances of conference participant speech 3604E and 3604F are from the same endpoint and the same conversational participant, the instances of conference participant speech 3604E and 3604F have not been scheduled for overlapped playback.

Figure 37:
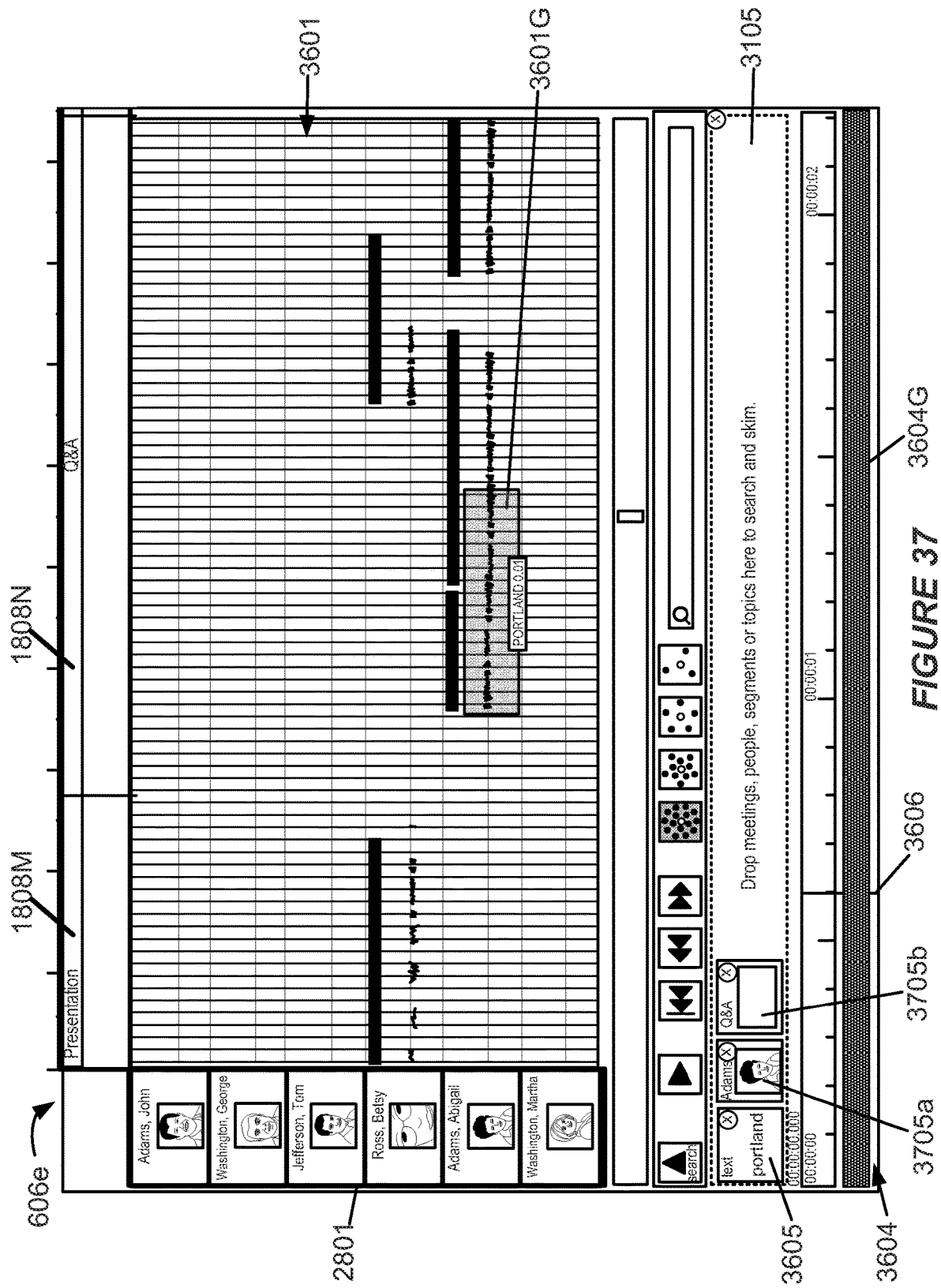
FIG. 37 shows an example of a graphical user interface being used for a multi-dimensional conference search.

FIG. 37 shows an example of a graphical user interface being used for a multi-dimensional conference search. As in the example shown in FIG. 36, block 3605 indicates a user's selection of a conference search based, at least in part, on a search for the keyword "Portland." However, in this example the user also has dragged blocks 3705*a* and 3705*b* into the search window 3105. The block 3705*a* corresponds with the conference participant Abigail Adams and the block 3705*b* corresponds with a Q&A conference segment. Accordingly, a multi-dimensional conference search has been performed for instances of the word "Portland" spoken by conference participant Abigail Adams during a Q&A conference segment.

In this example, the multi-dimensional conference search has returned a single instance of conference participant speech. This instance is shown in the waveform display area 3601 as the instance of conference participant speech 3601G and is shown in the scheduled output area 3604 as the instance of conference participant speech 3604G.

Figure 38A:
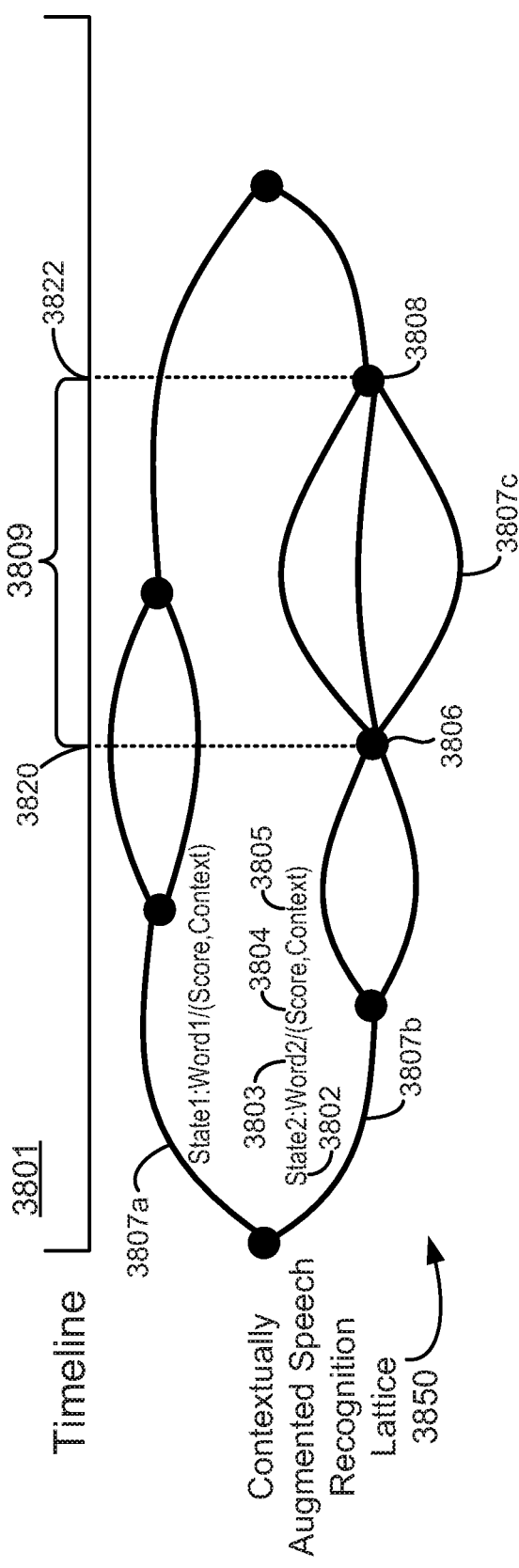
FIG. 38A shows an example portion of a contextually augmented speech recognition lattice.
Figure 38B:
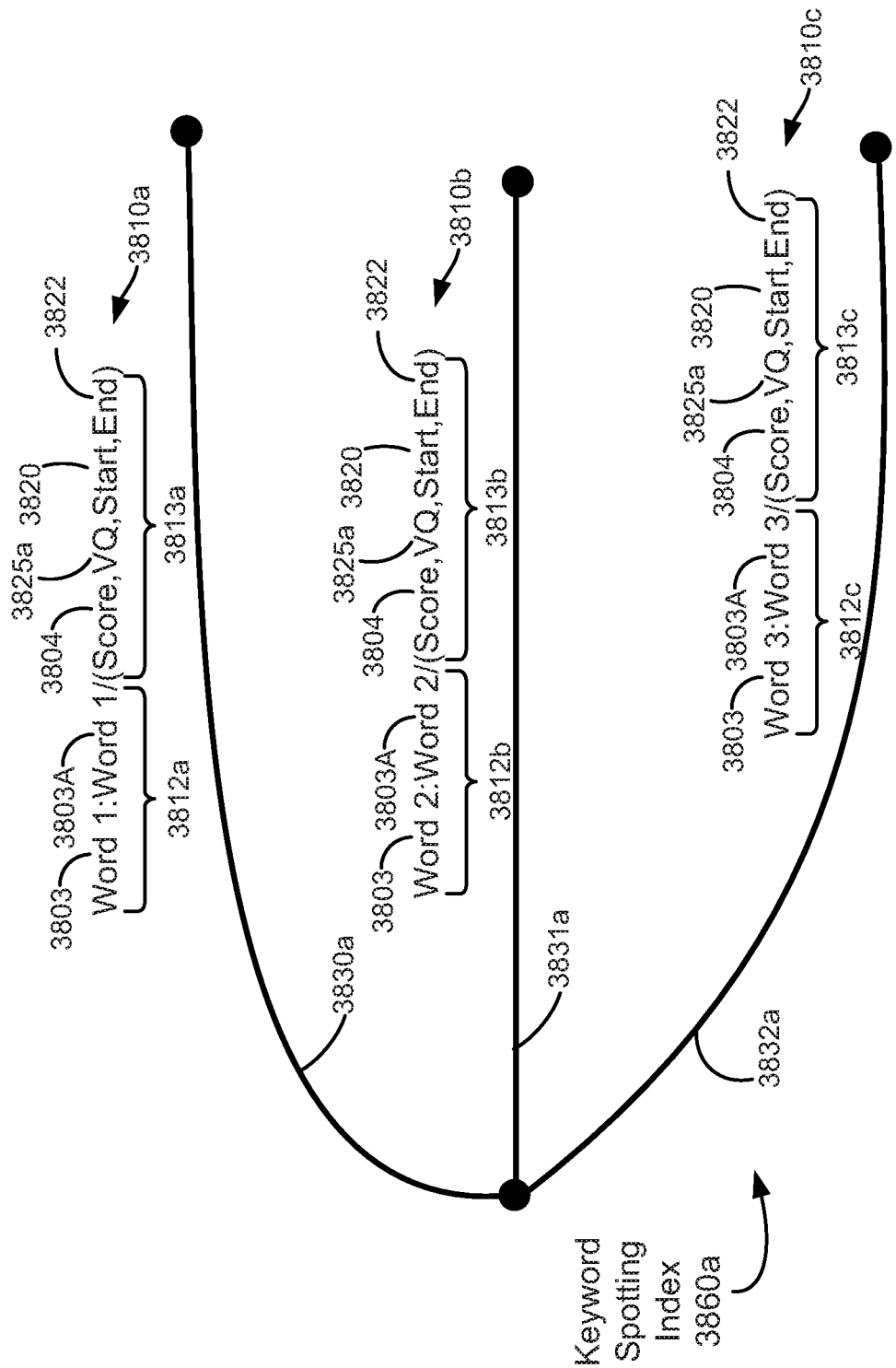
FIGS. 38B and 38C show examples of keyword spotting index data structures that may be generated by using a contextually augmented speech recognition lattice such as that shown in FIG. 38A as input.
Figure 38C:
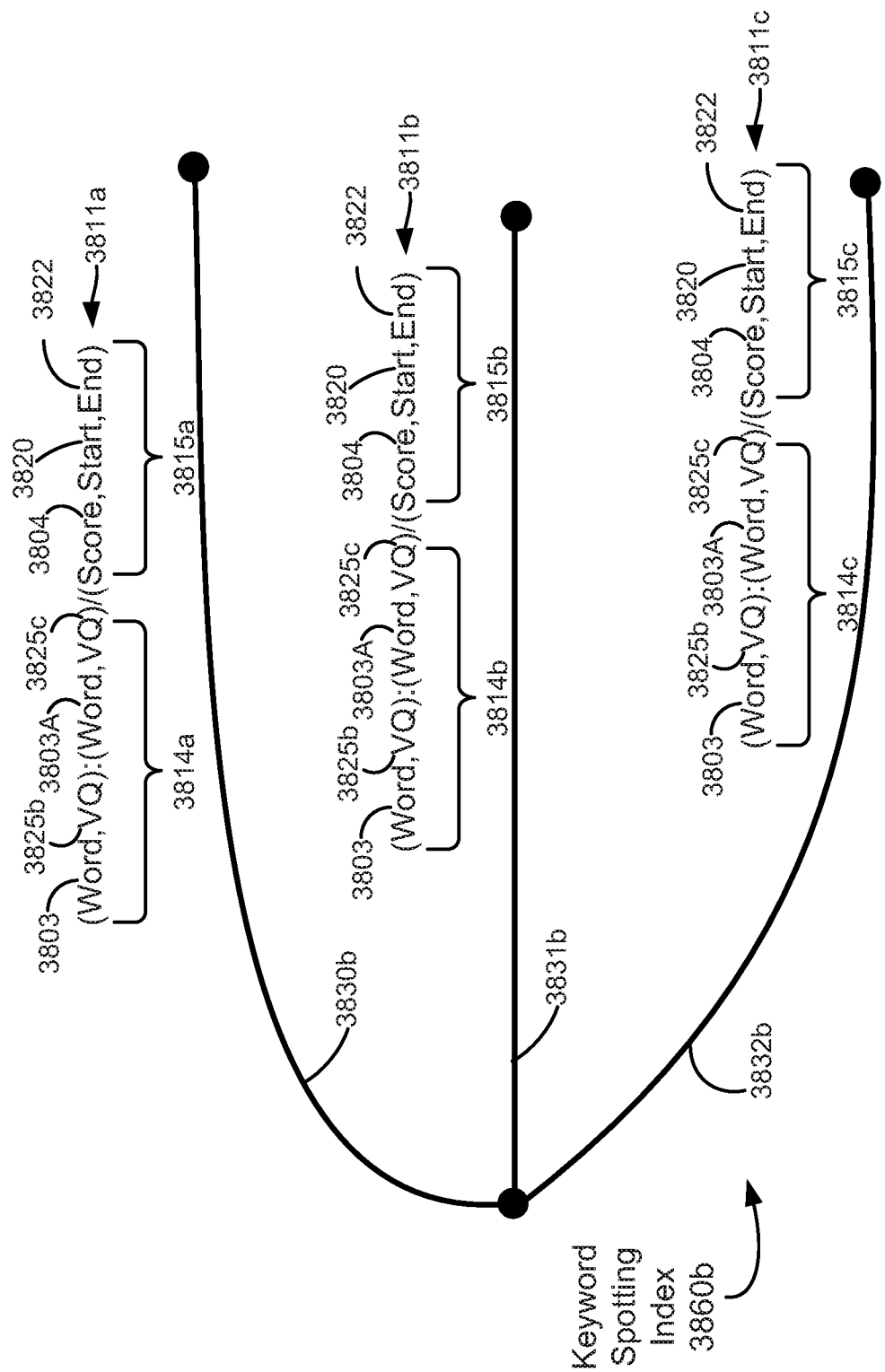

FIG. 38A shows an example portion of a contextually augmented speech recognition lattice. FIGS. 38B and 38C show examples of keyword spotting index data structures that may be generated by using a contextually augmented speech recognition lattice such as that shown in FIG. 38A as input. The examples of data structures shown for the keyword spotting indices 3860*a* and 3860*b* may, for example, be used to implement searches that involve multiple conferences and/or multiple types of contextual information. In some implementations, the keyword spotting index 3860 may be output by the keyword spotting and indexing module 505, shown in FIG. 5, e.g., by using the results of a speech recognition process (e.g., the speech recognition results 401F-405F) as input. Accordingly, the keyword spotting indices 3860*a* and 3860*b* may be instances of the search index 310. In some examples, the contextually augmented speech recognition lattice 3850 may be an instance of the speech recognition results output by the automatic speech recognition module 405, shown in FIG. 4. In some implementations, the contextually augmented speech recognition lattice 3850 may be generated by a large vocabulary continuous speech recognition (LVCSR) process based on a weighted finite state transducer (WFST).

In FIG. 38A, times of the contextually augmented speech recognition lattice 3850 are indicated with reference to the timeline 3801. The arcs shown in FIG. 38 link nodes or "states" of the contextually augmented speech recognition lattice 3850. For example, the arc 3807*c* links the two states 3806 and 3808. The start time 3820 and end time 3822 correspond with the time span 3809 of the arc 3807*c*, as shown in the timeline 3801.

In some examples, the contextually augmented speech recognition lattice 3850 may include information in the format of "input:output/weight" for each arc. In some examples, the input term may correspond with state identification information, as shown by the state identification data 3802 for the arc 3807*b*. The state identification data 3802 may be a context-dependent Hidden Markov Model state ID in some implementations. The output term may correspond with word identification information, as shown by the word identification data 3803 for arc 3807*b*. In this example, the "weight" term includes a word recognition confidence score such as described elsewhere herein, an example of which is the score 3804 for arc 3807*b*.

In this example, the weight term of the contextually augmented speech recognition lattice 3850 also includes contextual information, an example of which is the contextual information 3805 shown for the arc 3807*b*. During a conference, whether an in-person conference or a teleconference, a conference participant may observe and recall contextual information in addition to spoken words and phrases. In some examples, the contextual information 3805 may, for example, include audio scene information obtained from a front-end acoustic analysis. The contextual information 3805 may be retrieved in different time granularities and by various modules. Some examples are shown in the following table:

TABLE 1

| Contextual information | Time granularity | Module |
| --- | --- | --- |
| Endpoint type | Conference | System hardware |
| Speaker | Conference | Speaker identification |
| Gender | Conference | Gender identification |
| Location | Conference | On-board GPS receiver, IP |
| Meeting segment | Segment | segmentation unit 1804 |
| Emotion | Segment | analysis engine 307 |
| Visual cues | Segment | Video & Screen analyzer |
| Distance | Frame | Audio scene analysis |
| Angle | Frame | Audio scene analysis |
| Diffuseness | Frame | Audio scene analysis |
| Signal-to-noise ratio | Frame | Frontend processing |

In some implementations, not only the score 3804 but also the contextual information 3805 may be stored for each arc, e.g., in the form of a "tuple" containing multiple entries. A value may be assigned based on the score and the contextual information within a corresponding time span. In some such implementations, such data may be collected for an entire conference or for multiple conferences. These data may be input to a statistical analysis in order to obtain a priori knowledge of factors such as context distribution. In some examples, these contextual features may be normalized and clustered, and the results may be coded via a vector quantization (VQ) process.

Two examples of data structures for a keyword spotting index 3860 are shown in FIGS. 38B and 38C. In both examples, the state identification data 3802/word identification data 3803 pairs for each arc of a contextually augmented speech recognition lattice have been transformed to word identification data 3803/word identification data 3803A pairs for each arc of a corresponding keyword spotting index. FIGS. 38B and 38C each show very small portions of a keyword spotting index: in these examples, the portions may be used to spot 3 unigrams.

In the first example, shown in FIG. 38B, the word identification data 3803/word identification data 3803A pairs are included in word identity fields 3812a-3812c of the corresponding indexed units 3810a-3810c, shown in corresponding arcs 3830a-3832a. In this example, the score 3804, the start time 3820, the end time 3822 and quantized contextual information (the VQ index 3825a in this example) are stored in multi-dimensional weight field 3813. A VQ index may sometimes be referred to herein as a "VQ ID." This structure, which may be referred to as a "Type I" data structure herein, has at least three potential advantages. First, multi-dimensional contextual information is transformed into a one-dimensional VQ index 3825a, which can reduce the amount of storage space required for storing the keyword spotting index 3860. Second, the indexing structure may be stored with both input and output terms in the word identity fields 3812a-3812c, instead of, e.g., word and position terms. This feature of the word identity fields 3812a-3812c has the potential advantage of reducing search complexity. A third advantage is that this type of data structure (as well as the "Type 2" data structure shown in FIG. 38C) facilitates searches that include recordings of multiple conferences and/or searches that may involve concurrent searches for multiple types of contextual information.

One potential disadvantage of the Type 1 data structure is that, in some examples, an additional post-filtering process to search words may be followed by a process of filtering the qualified scenarios by the VQ index. In other words, a search based on a keyword spotting index 3860a having a Type 1 data structure may be a two-stage process. The first stage may involve determining the desired conference(s) for searching, e.g., according to time parameters of a search query, such as start time and end time information. The second stage may involve retrieving search results according to other search parameters, which may include context-based queries.

The Type 2 data structure shown in FIG. 38C may facilitate faster searches. In this example, the indexed units 3811a-3811c include corresponding word and VQ fields 3814a-3814c, which include word/VQ tuples. In this example, the word and VQ fields 3814a-3814c include a first word/VQ tuple that includes the word identification data 3803 and a corresponding VQ index 3825b, as well as a second word/VQ tuple that includes the word identification data 3803A and a corresponding VQ index 3825c.

In this implementation, each of the indexed units 3811a-3811c includes a weight and time field 3815, which includes the score 3804, the start time 3820 and the end time 3822. A keyword spotting index 3860b having a Type 2 data structure can provide relatively faster searches than a keyword spotting index 3860a having a Type 1 data structure. However, a keyword spotting index 3860b having a Type 2 data structure may require more storage space than a keyword spotting index 3860a having a Type 1 data structure.

Figure 39:
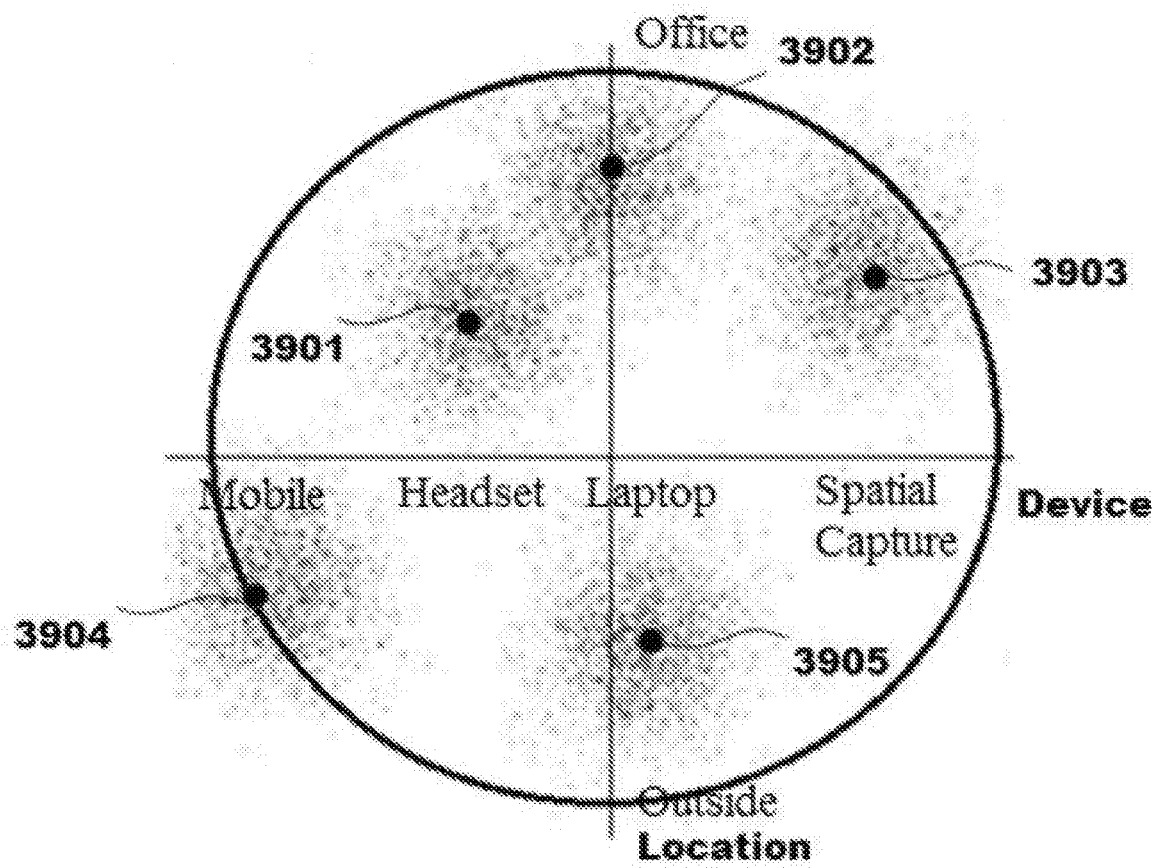
FIG. 39 shows an example of clustered contextual features.

FIG. 39 shows examples of clustered contextual features. This example shows a relationship between two salient contextual features, device type and location. In this example, the vertical axis indicates location, with outside locations corresponding to the area below the "Device" axis and inside locations corresponding to the area below the Device axis. The Device axis indicates areas corresponding to mobile devices, headsets, laptops and spatial capture devices (e.g., spatial conferencing telephones). In FIG. 39, the cluster 3901 corresponds with conference participants using headsets in an indoor location, whereas the clusters 3902 and 3905 correspond with indoor and outdoor conference participants, respectively, using laptops. Here, the cluster 3903 corresponds with indoor conference participants using spatial conferencing telephones, whereas the cluster 3904 corresponds with outdoor conference participants using mobile devices.

In some implementations, time information may be removed during a process of contextual indexing, in part because time is a special contextual dimension that is sequential. Moreover, it may be challenging to build a large index, e.g., including audio data for many conferences, that includes global timestamps. As additional conferences are recorded and the corresponding audio data are processed, it may not be feasible to rebuild the previous index using global time, because the process would introduce additional computations for each additional conference recording.

Figure 40:
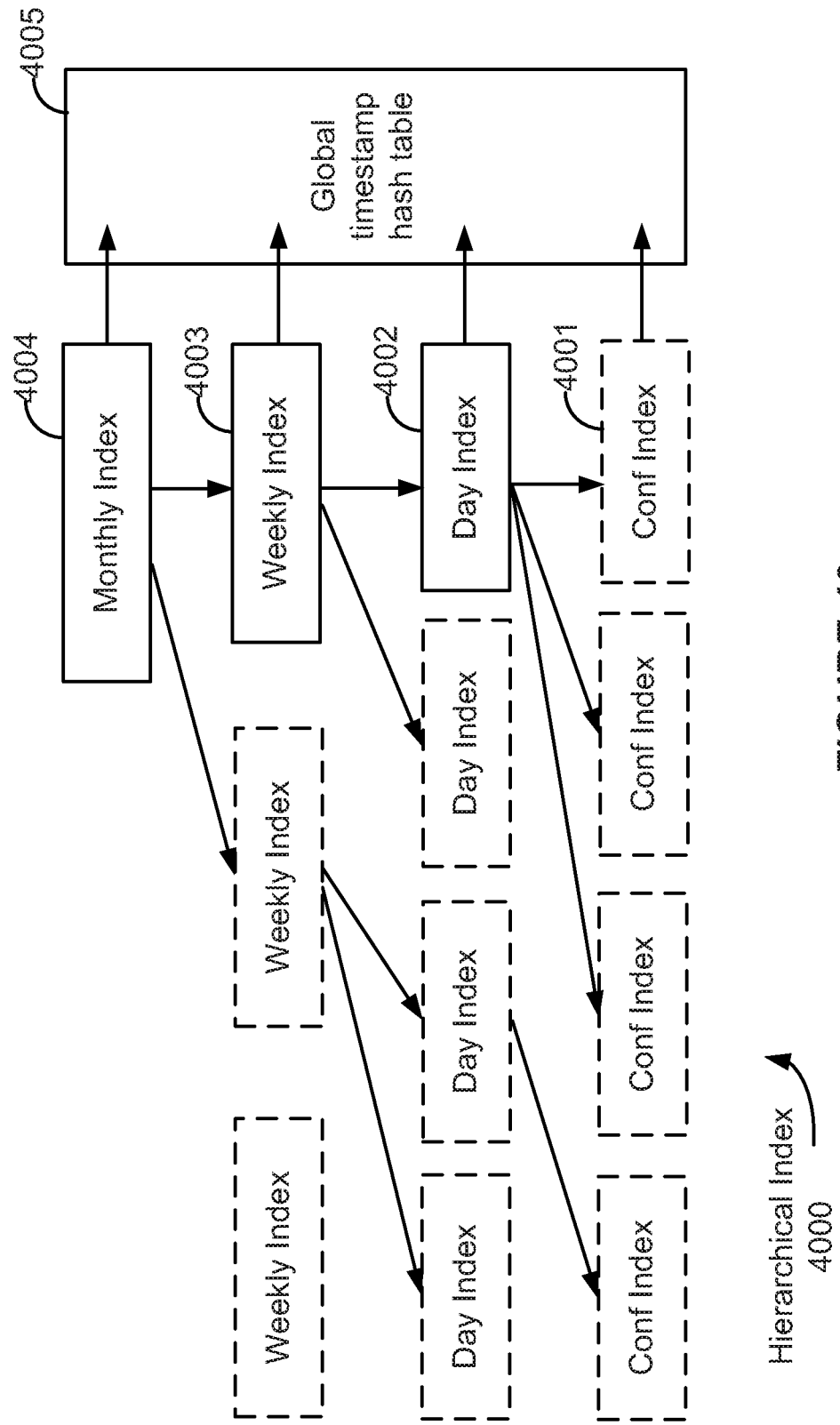
FIG. 40 is a block diagram that shows an example of a hierarchical index that is based on time.

FIG. 40 is a block diagram that shows an example of a hierarchical index that is based on time. FIG. 40 shows a hierarchical index 4000 in which each conference recording has a conference index 4001. There may be multiple conference recordings in one day, and therefore multiple conference indices 4001 are indicated for a single day index 4002. Likewise, multiple day indices 4002 are indicated for a single weekly index 4003 and multiple weekly indices 4003 are indicated for a single monthly index 4004. Some implementations may include additional hierarchical levels, e.g., yearly indices, fewer hierarchical levels and/or different hierarchical levels.

As shown in FIG. 40, whenever a time interval for any level of the hierarchical index 4000 ends a corresponding index is built, which will be hashed by a global timestamp hash table 4005. For example, at the end of each conference, a conference index 4001 is built in the lowest level of the hierarchical index 4000. If, for example, during a specific day there are three conferences, the corresponding day index 4002 may be created by assembling the keyword spotting indices from each of the three conferences. At the end of the week a weekly index 4003 may be made. A monthly index 4004 may be created at the end of the month. According to some implementations, the start and end times may be maintained by the global timestamp hash table 4005 in a hierarchy. For example, an upper-level timestamp hash table entry (e.g., for a weekly index 4003) may include a pointer to each of one or more lower-level indices (e.g., to day indices 4002). With interrelated time context information included in each layer, the hierarchical index 4000 can facilitate fast searching across multiple conference recordings.

Figure 41:
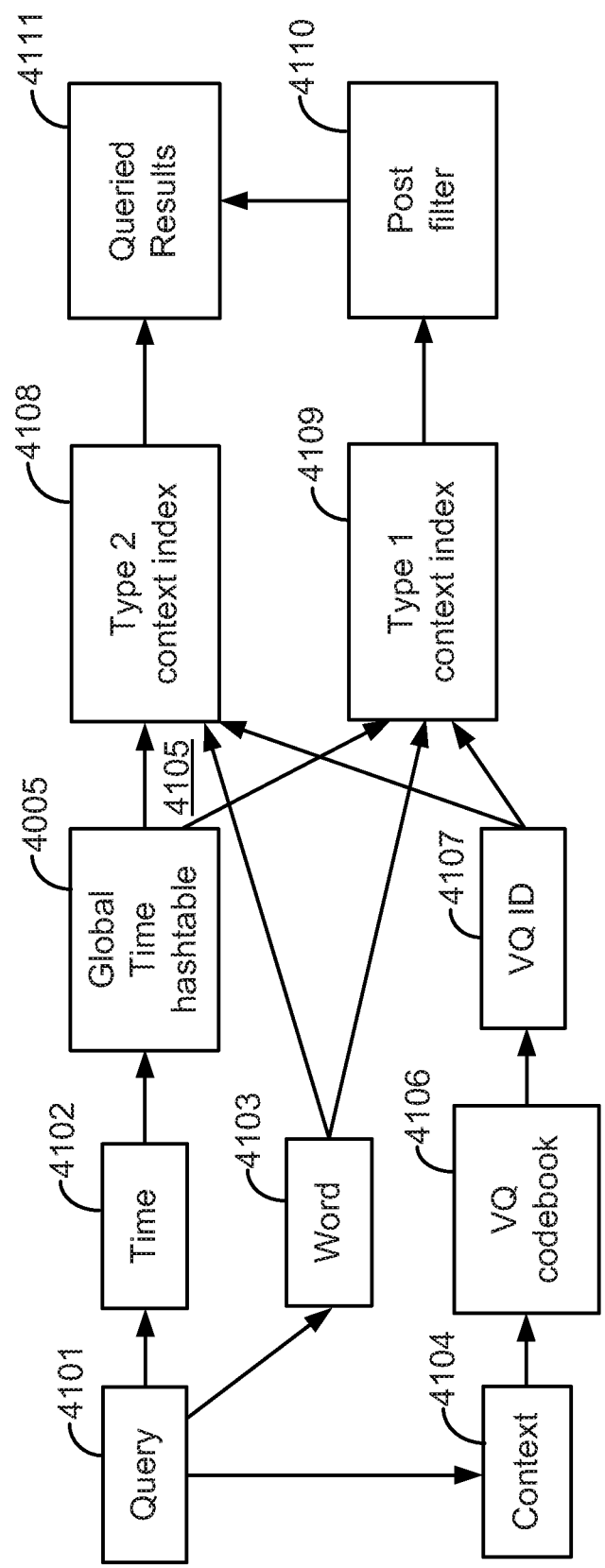
FIG. 41 is a block diagram that shows an example of contextual keyword searching.

FIG. 41 is a block diagram that shows an example of contextual keyword searching. In some implementations, the processes described with reference to FIG. 41 may be performed, at least on part, by a search module such as the search module 3421 shown in FIG. 34 and described above. In this example, a received query 4101 is split into a word component 4103, a time component 4102 and a contextual component 4104. In some instances, the word component 4103 may include one or more words or phrases. The contextual component 4104 may include one or more types of contextual information, including but not limited to the examples shown in Table 1, above.

The time component 4102 may, in some examples, indicate time information corresponding to a single conference, whereas in other examples the time component 4102 may indicate time information corresponding to multiple conferences. In this example, time information of the time component 4102 is used in a process (shown as process 4105 in FIG. 41) of filtering a corresponding index via a global timestamp hash table 4005, such as that described above with reference to FIG. 40. An example of the process 4105 is described below with reference to FIG. 42.

In this example, a contextual index will be determined according to the information in the contextual component 4104. Based on the contextual index, contextual input may be searched via a VQ codebook 4106 to retrieve a set of qualifying candidate contextual VQ IDs 4107. In some implementations, one or more constraints, such as a distance limit (e.g. Euclidean distance), may be applied to the contextual input search.

In this example, there may be different types of contextual index units depending on the keyword spotting index data structure, which may be Type 1 or Type 2 data structures as shown in FIG. 38. A contextual index unit for a Type 1 data structure may have a word-based factor transducer index, which corresponds with the data structure of the word identity field 3812 of a Type 1 data structure. Accordingly, a word-based factor transducer index may be used for the Type 1 context index 4109. A contextual index unit for a Type 2 data structure may have a (word, VQ ID) tuple-based factor transducer index, which corresponds with the data structure of the word and VQ field 3814 of a Type 2 data structure. Accordingly, a (word, VQ ID) tuple-based factor transducer index be used for the Type 2 context index 4108. In some implementations, the retrieval process may involve a Finite State Transducer composition operation.

Figure 42:
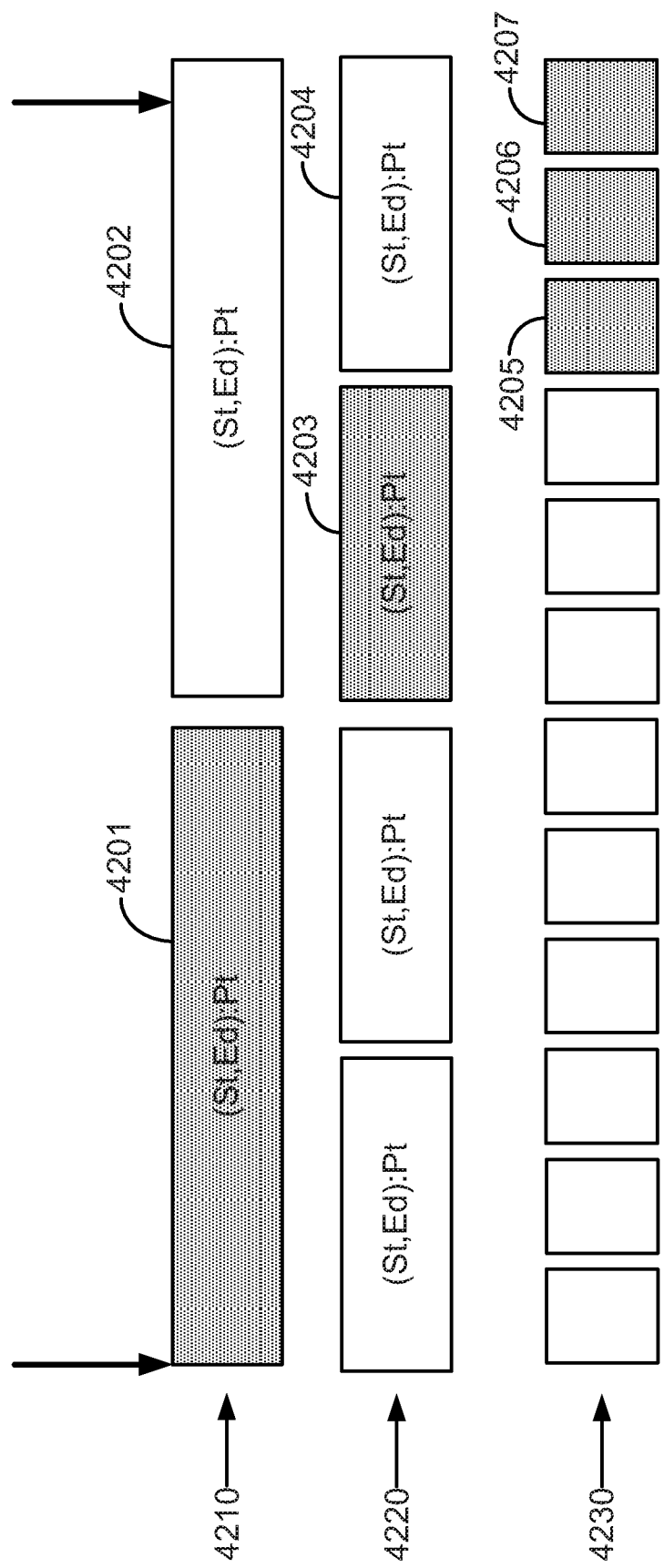
FIG. 42 shows an example of a top-down timestamp-based hash search.

FIG. 42 shows an example of a top-down timestamp-based hash search. The example shown in FIG. 42 may be an instance of the process 4105 that is referenced above in the discussion of FIG. 41. In FIG. 42, each level of the hierarchy corresponds to a different time interval corresponding to a timestamp tuple of (St,Ed), which corresponds to a start time and an end time. Each block also includes a pointer "Pt" to one or more blocks at a different level. In this example, level 4210 is the highest level of the hierarchy.

In this implementation, each block of level 4210 corresponds to a 1-month time interval, whereas each block of level 4220 corresponds to a 1-day time interval. Accordingly, it may be observed that the widths of the blocks in FIG. 42 do not accurately represent the corresponding time intervals. The blocks of level 4230 correspond to individual conferences in this example. In some such examples, the time intervals of blocks in level 4230 may vary according to the time interval for each conference. In this example, if a queried time interval (e.g., as indicated by the time component 4102 of a received query 4101), does not span the entire time interval of a higher-level block, the search will proceed to a lower level to retrieve a corresponding index with more detailed time resolution.

For instance, suppose that a received query 4101 were to include a time component 4102 corresponding to conferences that occurred in the time interval from Oct. 1, 2014 to Nov. 2, 2014 at 2 p.m. PST. In this example, block 4201 corresponds to October of 2014 and block 4202 corresponds to November of 2014. Therefore, the time interval of block 4201 would be completely encompassed by the time interval of received query 4101. However, the time interval of block 4202 would not be completely encompassed by the time interval of the received query 4101.

Therefore, in this example a search engine (e.g., the search module 3421) will extract the value to a hash key for block 4202 to obtain the pointer Pt to a lower level index, which is the level 4220 in this implementation. In this example, block 4203 corresponds to Nov. 1, 2104 and block 4204 corresponds to Nov. 2, 2014. Therefore, the time interval of block 4203 would be completely encompassed by the time interval of the received query 4101, but the time interval of block 4204 would not be completely encompassed by the time interval of the received query 4101.

Accordingly, in this example the search engine will extract the value to a hash key for block 4204 to obtain the pointer Pt to a lower level index, which is the level 4230 in this implementation. In this example, the time intervals of the first two conferences of Nov. 2, 2014 (corresponding to blocks 4205 and 4206) are completely encompassed by the time interval of received query 4101. In this instance, the time interval of the third conference of Nov. 2, 2014 (corresponding to block 4207) is from 1 p.m. to 3 p.m. and would therefore not be completely encompassed by the time interval of received query 4101. However, because the lowest level of the hierarchy corresponds to individual conferences in the example, the index corresponding to block 4207 would still be utilized. Then, the entire selected index will be employed as the index (the Type 1 context index 4109 or the Type 2 context index 4108) database on which keyword spotting can be performed.

As noted above, in some implementations the retrieval process may involve a Finite State Transducer composition operation. According to some such examples, after results are obtained the weight component from each factor transducer arc may be retrieved (e.g., from the multi-dimensional weight field 3813 of the indexed units 3810 or from the weight and time field 3815 of the indexed units 3811). As shown in FIG. 41, some examples may include an additional post-filtering process 4110 for Type 1 contextual indexing based retrieval to filter the qualified context via selecting results with qualified contextual IDs. When using Type 2 contextual indexing based retrieval, the post-filtering process is not necessary and therefore the retrieval speed may be faster.

Many of the above-described implementations that pertain to conference searching may be particularly useful for later review by a conference participant. Various implementations will now be described that may be particularly useful for a person who did not participate in a conference, e.g., for a person who was unable to attend. For example, a person reviewing a conference recording may wish to obtain a high-level overview of the conference to determine as quickly as possible whether any material of interest to the listener was likely to have been discussed. If so, a more thorough review of the conference recording (or at least portions thereof) may be warranted. If not, no further review may be needed. The listener may, for example, wish to determine who participated in the conference, what topics were discussed, who did most of the speaking, etc.

Accordingly, some implementations may involve selecting only a portion of the total conference participant speech for playback. The "portion" may include one or more instances of conference participant speech, e.g., one or more talkspurts and/or talkspurt excerpts. In some examples, the selection process may involve a topic selection process, a talkspurt filtering process and/or an acoustic feature selection process. Some examples may involve receiving an indication of a target playback time duration. Selecting the portion of audio data may involve making a time duration of the playback audio data within a threshold time difference of the target playback time duration. In some examples, the selection process may involve keeping only a fraction of some talkspurts and/or removing short talkspurts, e.g., talkspurts having a time duration that is below a threshold time duration.

Figure 43:
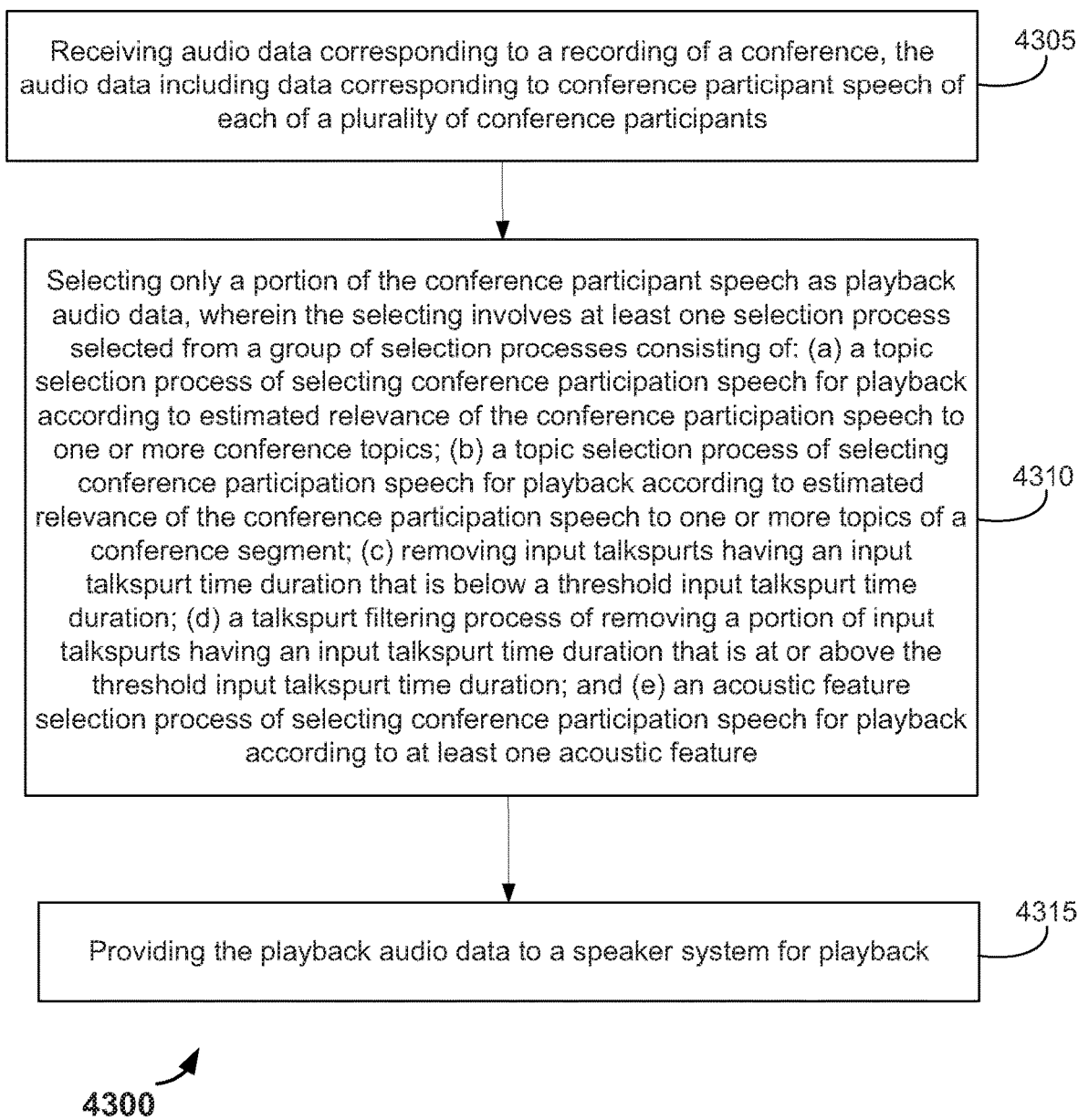
FIG. 43 is a flow diagram that outlines blocks of some methods of selecting only a portion of conference participant speech for playback.

FIG. 43 is a flow diagram that outlines blocks of some methods of selecting only a portion of conference participant speech for playback. The blocks of method 4300, like other methods described herein, are not necessarily performed in the order indicated. Moreover, such methods may include more or fewer blocks than shown and/or described.

In some implementations, method 4300 may be implemented, at least in part, via instructions (e.g., software) stored on non-transitory media such as those described herein, including but not limited to random access memory (RAM) devices, read-only memory (ROM) devices, etc. In some implementations, method 4300 may be implemented, at least in part, by a control system, e.g., by a control system of an apparatus such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. According to some such implementations, method 4300 may be implemented, at least in part, by one or more elements of the playback system 609 shown in FIG. 6, e.g., by the playback control module 605. Alternatively, or additionally, method 4300 may be implemented, at least in part, by one or more servers.

In this example, block 4305 involves receiving audio data corresponding to a conference recording. In this example, the audio data includes data corresponding to conference participant speech of each of a plurality of conference participants.

In the example shown in FIG. 43, block 4310 involves selecting only a portion of the conference participant speech as playback audio data. In some implementations, one or more elements of the playback system 609 shown in FIG. 6, such as the playback control module 605, may perform the selection process of block 4310. However, in some implementations another device, such as a server, may perform the selection processes of block 4310. According to some such implementations, the playback control server 650 may perform, at least in part, the selection process of block 4310. In some such examples, the playback control server 650 may provide the results of the selection process to the playback system 609, e.g., to the playback control module 605.

In this example, block 4310 involves one or more of the following: (a) a topic selection process of selecting conference participation speech for playback according to estimated relevance of the conference participation speech to one or more conference topics; (b) a topic selection process of selecting conference participation speech for playback according to estimated relevance of the conference participation speech to one or more topics of a conference segment; (c) removing input talkspurts having an input talkspurt time duration that is below a threshold input talkspurt time duration; (d) a talkspurt filtering process of removing a portion of input talkspurts having an input talkspurt time duration that is at or above the threshold input talkspurt time duration; and (e) an acoustic feature selection process of selecting conference participation speech for playback according to at least one acoustic feature. As noted in various examples discussed below, in some implementations the selecting may involve an iterative process.

A listener may wish to scan conference participant speech involving what are estimated to be the most important conference topics. For example, some implementations that include a topic section process may involve receiving a topic list of conference topics and determining a list of selected conference topics. The topic list may, for example, have previously been generated by the topic analysis module 525, as described above. The list of selected conference topics may be a subset of the topic list. Determining the list of selected conference topics may involve a topic ranking process. For example, some such methods may involve receiving topic ranking data indicating the estimated relevance of each conference topic on the topic list. In some examples, the topic ranking data may be based on a term frequency metric, such as the term frequency metrics disclosed elsewhere herein. Determining the list of selected conference topics may be based, at least in part, on the topic ranking data. Some implementations may involve a topic ranking process for each of a plurality of conference segments.

Alternatively, or additionally, some implementations may include one or more types of talkspurt filtering processes. In some implementations, a talkspurt filtering process may involve removing an initial portion of at least some input talkspurts. The initial portion may be a time interval from an input talkspurt start time to an output talkspurt start time. In some implementations, the initial portion may be one second, two seconds, etc. Some such implementations may involve removing an initial portion of speech near the start of long talkspurts, e.g., talkspurts having at least a threshold time duration.

Such implementations may potentially be beneficial because people often start talkspurts with "filled pauses" such as "um," "err," etc. The inventors have empirically determined that if the process of selecting conference participant speech is biased to throw away the initial portion of each talkburst, the resulting digest tends to contain more relevant content and fewer filled pauses than if the selection process keeps speech starting at the beginning of each talkburst.

In some implementations, a talkspurt filtering process may involve calculating an output talkspurt time duration based, at least in part, on an input talkspurt time duration. According to some such implementations, if it is determined that the output talkspurt time duration exceeds an output talkspurt time threshold, the talkspurt filtering process may involve generating multiple instances of conference participant speech for a single input talkspurt. In some implementations, at least one of the multiple instances of conference participant speech has an end time that corresponds with an input talkspurt end time. Various examples of talkspurt filtering processes are described in more detail below.

Some implementations that involve an acoustic feature selection process may involve selecting conference participation speech for playback according to pitch variance, speech rate and/or loudness. Such acoustic features may indicate conference participant emotion, which may correspond with the perceived importance of the subject matter being discussed at the time of the corresponding conference participation speech. Accordingly, selecting conference participation speech for playback according to such acoustic features may be a useful method of selecting noteworthy portions of conference participant speech.

As noted elsewhere herein, in some implementations the analysis engine 307 may perform one of more types of analyses on the audio data to determine conference participant mood features (See, e.g., Bachorowski, J.-A., & Owren, M. J. (2007). Vocal expressions of emotion. Lewis, M., Haviland-Jones, J. M., & Barrett, L. F. (Eds.), *The handbook of emotion*, 3rd Edition. New York: Guilford. (in press), which is hereby incorporated by reference) such as excitement, aggression or stress/cognitive load from an audio recording. (See, e.g., Yap, Tet Fei., *Speech production under cognitive load: Effects and classification*, Dissertation, The University of New South Wales (2012), which is hereby incorporated by reference.) In some implementations, the analysis engine 307 may perform such analyses prior to the playback stage. The results of one or more such analyses may be indexed, provided to the playback system 609 and used as part of a process of selecting conference participation speech for playback.

According to some implementations, method 4300 may be performed, at least in part, according to user input. The input may, for example, be received in response to a user's interaction with a graphical user interface. In some examples, the graphical user interface may be provided on a display, such as a display of the display device 610 shown in FIG. 6, according to instructions from the playback control module 605. The playback control module 605 may be capable of receiving input corresponding to a user's interaction with the graphical user interface and of processing audio data for playback based, at least in part, on the input.

In some examples, the user input may relate to the selection process of block 4310. In some instances, a listener may desire to place a time limit on the playback time of the selected conference participant speech. For example, the listener may only have a limited time within which to review the conference recording. The listener may wish to scan the highlights of the conference recording as quickly as possible, perhaps allowing some additional time to review portions of interest. According to some such implementations, method 4300 may involve receiving user input that includes an indication of a target playback time duration.

The target playback time duration may, for example, be a time duration necessary to scan the conference participant speech selected and output as playback audio data in block 4310. In some examples, the target playback time duration may not include additional time that a listener may require to review items of interest in detail. The user input may, for example, be received in response to a user's interaction with a graphical user interface.

In some such examples, the selection process of block 4310 may involve selecting conference participation speech for playback according to the target playback time duration. The selection process may, for example, involve making a time duration of the playback audio data within a threshold time difference of the target playback time duration. For example, the threshold time difference may be 10 seconds, 20 seconds, 30 seconds, 40 seconds, 50 seconds, one minute, 2 minutes, 3 minutes, etc. In some implementations, the selection process may involve making a time duration of the playback audio data within a threshold percentage of the target playback time duration. For example, the threshold percentage may be 1%, 5%, 10%, etc.

In some instances, the user input may relate to one or more search parameters. Such implementations may involve selecting conference participation speech for playback and/or scheduling instances of conference participant speech for playback based, at least in part, on a search relevance metric.

In this example, block 4315 involves providing the playback audio data to a speaker system (e.g., to headphones, ear buds, a speaker array, etc.) for playback. In some examples, block 4315 may involve providing the playback audio data directly to a speaker system, whereas in other implementations block 4315 may involve providing the playback audio data to a device, such as the display device 610 shown in FIG. 6, which may be capable of communication with the speaker system.

Some implementations of method 4300 may involve introducing (or changing) overlap between instances of conference participant speech. For example, some implementations may involve scheduling an instance of conference participant speech that did not previously overlap in time with another instance of conference participant speech to be played back overlapped in time and/or scheduling an instance of conference participant speech that was previously overlapped in time with another instance of conference participant speech to be played back further overlapped in time.

In some such implementations, the scheduling may be performed according to a set of perceptually-motivated rules. For example, the set of perceptually-motivated rules may include a rule indicating that two talkspurts of a single conference participant should not overlap in time and/or a rule indicating that two talkspurts should not overlap in time if the two talkspurts correspond to a single endpoint. In some implementations, the set of perceptually-motivated rules may include a rule wherein, given two consecutive input talkspurts A and B, A having occurred before B, the playback of an instance of conference participant speech corresponding to B may begin before the playback of an instance of conference participant speech corresponding to A is complete, but not before the playback of the instance of conference participant speech corresponding to A has started. In some examples, the set of perceptually-motivated rules may include a rule allowing the playback of an instance of conference participant speech corresponding to B to begin no sooner than a time T before the playback of an instance of conference participant speech corresponding to A is complete, wherein T is greater than zero.

Some implementations of method 4300 may involve reducing playback time by taking advantage of spatial rendering techniques. For example, the audio data may include conference participant speech data from multiple endpoints, recorded separately and/or conference participant speech data from a single endpoint corresponding to multiple conference participants and including spatial information for each conference participant of the multiple conference participants. Some such implementations may involve rendering the playback audio data in a virtual acoustic space such that each of the conference participants whose speech is included in the playback audio data has a respective different virtual conference participant position.

However, in some implementations the rendering operations may be more complex. For example, some implementations may involve analyzing the audio data to determine conversational dynamics data. The conversational dynamics data may include data indicating the frequency and duration of conference participant speech, data indicating instances of conference participant doubletalk (during which at least two conference participants are speaking simultaneously) and/or data indicating instances of conference participant conversations.

Some such examples may involve applying the conversational dynamics data as one or more variables of a spatial optimization cost function of a vector describing the virtual conference participant position for each of the conference participants in the virtual acoustic space. Such implementations may involve applying an optimization technique to the spatial optimization cost function to determine a locally optimal solution and assigning the virtual conference participant positions in the virtual acoustic space based, at least in part, on the locally optimal solution.

Alternatively, or additionally, some implementations may involve speeding up the played-back conference participant speech. In some implementations, the time duration of the playback audio data is determined, at least in part, by multiplying a time duration of at least some selected portions of the conference participant speech by an acceleration coefficient. Some implementations may involve multiplying all selected portions of the conference participant speech by an acceleration coefficient. The selected portions may correspond to individual talkspurts, portions of talkspurts, etc. In some implementations, the selected portions may correspond to all selected conference participant speech of a conference segment. Some examples are described below.

Figure 44:
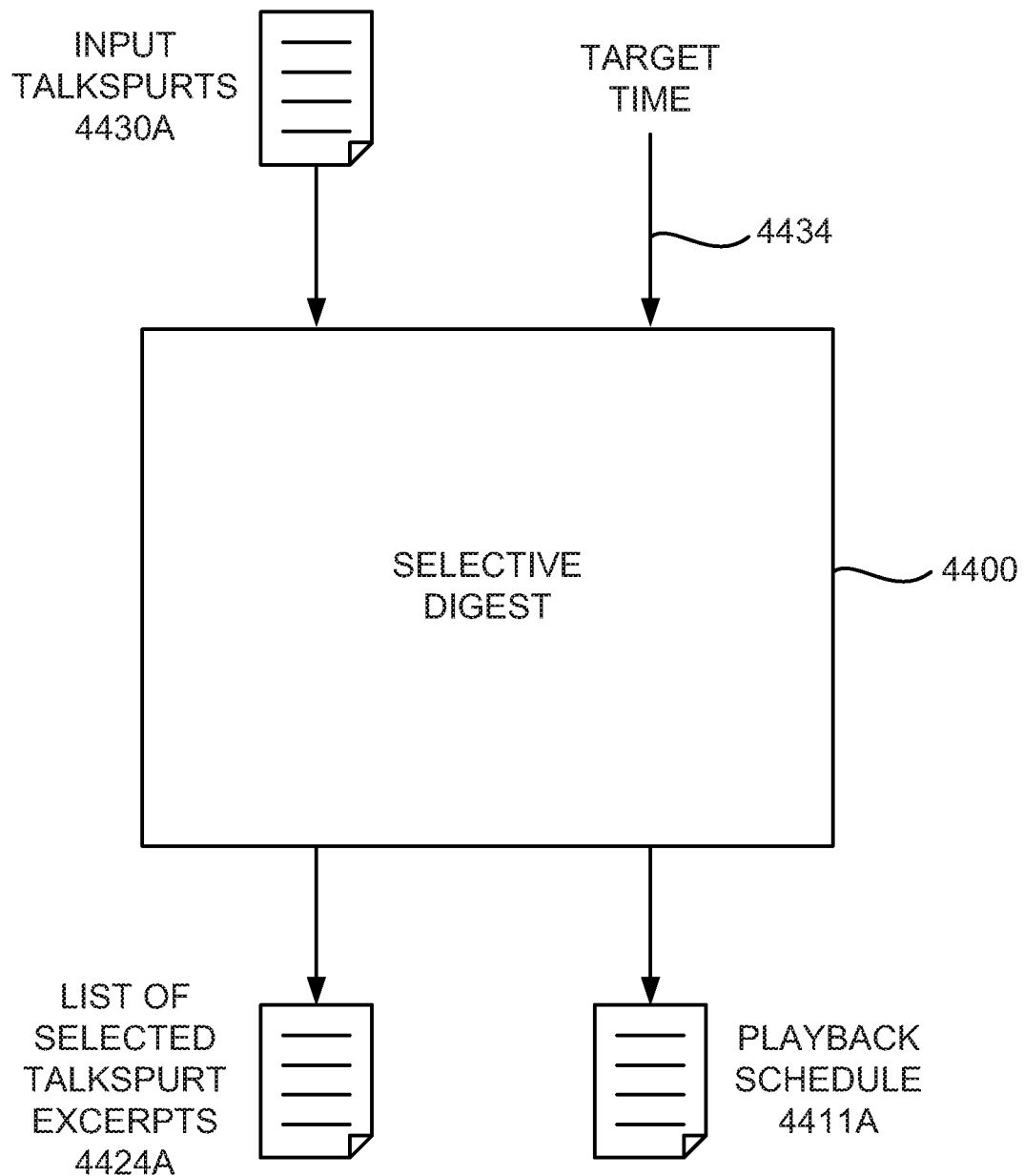
FIG. 44 shows an example of a selective digest module.

FIG. 44 shows an example of a selective digest module. The selective digest module 4400 may be capable of performing, at least in part, the operations described above with reference to FIG. 43. In some implementations, the selective digest module 4400 may be implemented, at least in part, via instructions (e.g., software) stored on non-transitory media such as those described herein, including but not limited to random access memory (RAM) devices, read-only memory (ROM) devices, etc. In some implementations, the selective digest module 4400 may be implemented, at least in part, by a control system, e.g., by a control system of an apparatus such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. According to some such implementations, the selective digest module 4400 may be implemented, at least in part, by one or more elements of the playback system 609 shown in FIG. 6, e.g., by the playback control module 605. Alternatively, or additionally, the selective digest module 4400 may be implemented, at least in part, by one or more servers.

The selective digest module 4400 may, for example, be capable of selecting only a portion of the conference participant speech contained in the received audio data corresponding to a recording of one or more conferences. In this example, the selective digest module 4400 is capable of adaptively selecting instances of conference participant speech from a received list of input talkspurts 4430A such that, when scheduled, a time duration of the playback audio data corresponding to the selected instances of conference participant speech will be close to a received indication of a target playback time duration 4434. The instances of conference participant speech may, for example, include talkspurts and/or portions of talkspurts, the latter of which also may be referred to herein as "talkspurt excerpts." In some implementations, the selective digest module 4400 may be capable of making the time duration of the playback audio data within a threshold time difference or a threshold time percentage of the target playback time duration 4434.

In some examples, the list of input talkspurts 4430A may include a list of all of the talkspurts in a conference. In alternative examples, the list of input talkspurts 4430A may include a list of all of the talkspurts in a particular temporal region of a conference. The temporal region of the conference may, in some implementations, correspond with a conference segment. In some examples, the list of input talkspurts 4430A may include, for each talkspurt, endpoint identification data, a start time and an end time.

In the example of FIG. 44, the selective digest 4400 is shown outputting a list of selected talkspurt excerpts 4424A. In some implementations, the list of selected talkspurt excerpts 4424A may include, for each selected excerpt, endpoint identification data, a start time and an end time. Various examples described herein involve outputting a list of selected talkspurt excerpts for playback, in part because such talkspurt excerpts may be reviewed more quickly and may, in some examples, include the most salient portion(s) of the corresponding talkspurts. However, some implementations involve outputting a list of selected instances of conference participant speech which may include talkspurts and/or talkspurt excerpts.

In this example, the selective digest 4400 is also capable of scheduling the list of selected talkspurt excerpts 4424A for playback. Accordingly, the selective digest 4400 is also shown outputting a playback schedule 4411A. In this example, the playback schedule 4411A describes how to play back a selective digest (a list of selected instances of conference participant speech) of a conference or a temporal region of a teleconference (e.g., a conference segment). The playback schedule 4411A may, in some examples, be similar to the output playback schedule 3411 shown in FIG. 34 and described above with reference to FIGS. 34 and 35.

Figure 45:
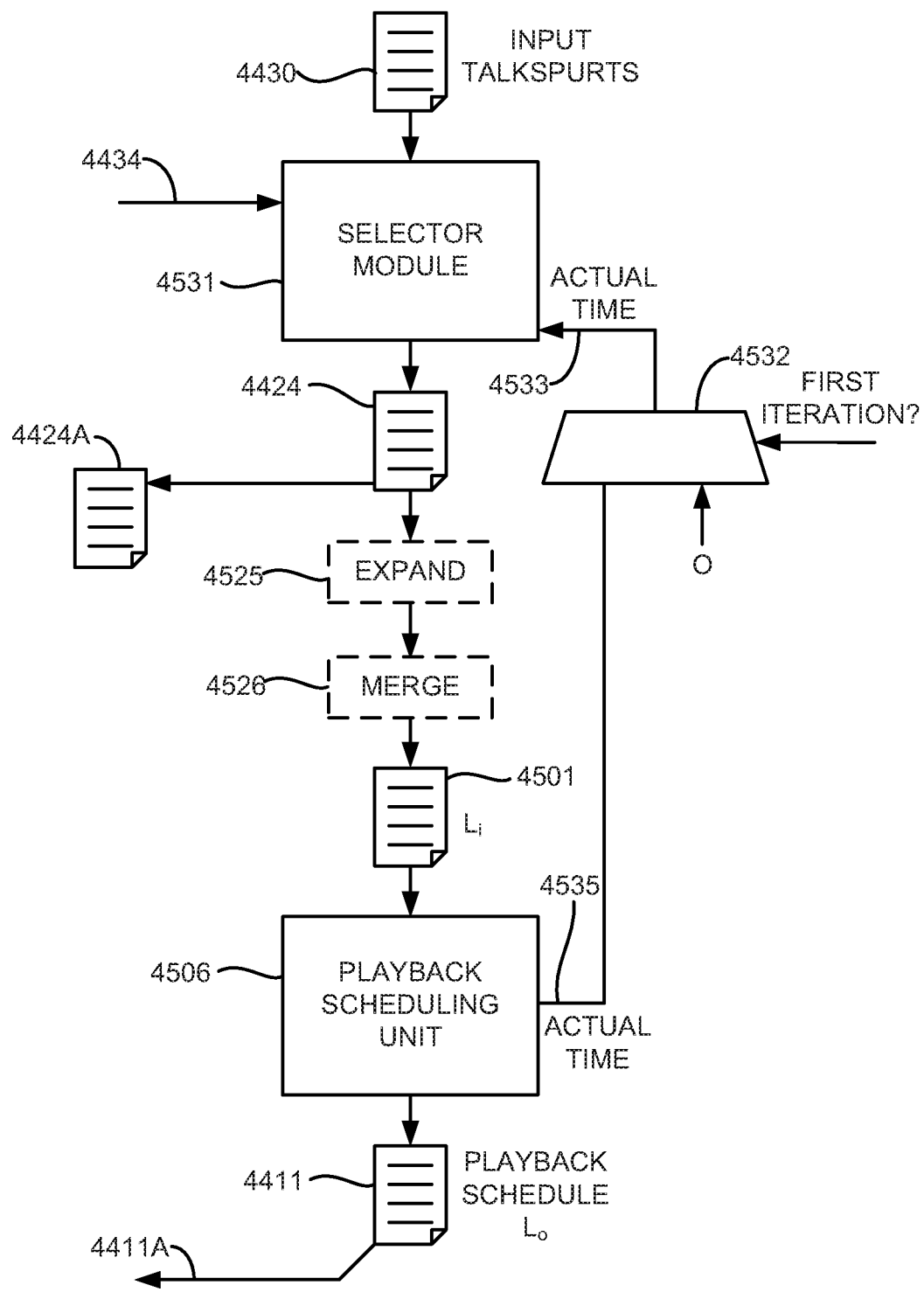
FIG. 45 shows examples of elements of a selective digest module.

FIG. 45 shows examples of elements of a selective digest module. In this example, the selective digest module 4400 includes a selector module 4531 and a playback scheduling unit 4506. In this particular implementation, the selective digest module 4400 includes an expansion unit 4525 and a merging unit 4526. However, alternative implementations of the selective digest module 4400 may or may not include an expansion unit 4525 and/or a merging unit 4526.

Here, the selector module 4531 is shown receiving a list of input talkspurts 4430 and an indication of a target playback time duration 4434. In this example, the selector module 4531 is capable of producing a candidate list of selected talkspurt excerpts 4424 from the list of input talkspurts 4430 based, at least in part, on the target playback time duration 4434 and a scheduled playback time duration 4533 provided by an actual duration multiplexer 4532.

In this implementation, the actual duration multiplexer 4532 determines whether the current iteration is a first iteration and provides a corresponding scheduled playback time duration. In some implementations, the scheduled playback time duration 4533 is set to zero during the first iteration of the operations of the selective digest module 4400. This allows at least one iteration during which the expansion unit 4525, the merging unit 4526 and the playback scheduling unit 4506 (or, in alternative implementations that may not include an expansion unit 4525 and/or a merging unit 4526, at least the playback scheduling unit 4506) may operate on excerpts of talkspurts selected by the selector module 4531. In this example, during subsequent iterations the scheduled playback time duration 4533 provided to the selector module 4531 by the actual duration multiplexer 4532 is the value of the actual scheduled playback time duration 4535 after scheduling by the playback scheduling unit 4506. Here, the actual scheduled playback time duration 4535 corresponds with the above-mentioned "time duration of the playback audio data."

According to this example, when the scheduled playback time duration 4533 is within a threshold range of the target playback time duration 4434, the candidate list of selected talkspurt excerpts 4424 is returned as a final list of selected talkspurt excerpts 4424A. In one such example, the threshold range may be +/−10%, meaning that the scheduled playback time duration 4533 must be less than or equal to 110% of the target playback time duration 4434 and greater than or equal to 90% of the target playback time duration 4434. However, in alternative examples the threshold range may be a different percentage, such as 1%, 2%, 4%, 5%, 8%, 12%, 15%, etc. In other implementations, the threshold range may be a threshold time difference, such as 10 seconds, 20 seconds, 30 seconds, 40 seconds, 50 seconds, one minute, 2 minutes, 3 minutes, etc.

In this example, the expansion unit 4525 is capable of modifying the start and/or end times of the talkspurt excerpts in the candidate list of selected talkspurt excerpts 4424 to provide additional context. Accordingly, in this example the expansion unit 4525 is capable of providing functionality like that of the expansion unit 3425 that is described above with reference to FIG. 34. Therefore, a user listening to such instances of conference participant speech may be better able to determine which instances are relatively more or relatively less likely to be of interest and may be able to decide more accurately which instances are worth listening to in more detail. According to some implementations, the expansion unit 4525 may be capable of subtracting a fixed offset $t_{ex}$ (for example, 1 second, 2 seconds, etc.) from the start time of a talkspurt excerpt under the constraint that the start time of the talkspurt excerpt may not be earlier the start time of the talkspurt that contains it. According to some examples, the expansion unit 4525 may be capable of adding a fixed offset $t_{ex}$ (for example, 1 second, 2 seconds, etc.) to the end time of a talkspurt excerpt under the constraint that the end time of the talkspurt excerpt may not be later than the end time of the talkspurt that contains it.

In this implementation, the merging unit 4526 is capable of merging two or more instances of conference participant speech, corresponding with a single conference endpoint and/or conference participant, that overlap in time after expansion. Accordingly, the merging unit 4526 may ensure that the same instance of conference participant speech is not heard multiple times when reviewing the search results.

In this example the merging unit 4526 is capable of providing functionality like that of the merging unit 3426 that is described above with reference to FIG. 34. The list of modified talkspurt excerpts to schedule 4501 produced by the merging unit 4526 is asserted to the playback scheduler 4506 in this example.

According to some implementations, the playback scheduling unit 4506 may be capable of providing functionality such as that of the playback scheduler 1306, which is described above with reference to FIG. 13, and/or the playback scheduling unit 3406, which is described above with reference to FIGS. 34 and 35. Accordingly, the playback scheduling unit 4506 may be capable of scheduling an instance of conference participant speech (in this example, a modified talkspurt excerpt) that did not previously overlap in time with another instance of conference participant speech to be played back overlapped in time, or scheduling an instance of conference participant speech that was previously overlapped in time with another instance of conference participant speech to be played back further overlapped in time. For example, the playback scheduling unit 4506 may be capable of scheduling modified talkspurt excerpts for playback according to a set of perceptually-motivated rules.

In this example, the playback scheduling unit 4506 is capable of generating a candidate output playback schedule 4411. The candidate output playback schedule 4411 may, for example, be comparable to output playback schedule 1311 that is described above with reference to FIG. 13 and/or the output playback schedule 3411 that is described above with reference to FIGS. 34 and 35. In this implementation, when the scheduled playback time duration 4533 is within a threshold range of the target playback time duration 4434, the candidate output playback schedule 4411 is returned as the final output playback schedule 4411A.

In the example shown in FIG. 45, the playback scheduling unit 4506 returns the actual scheduled playback time duration 4535, which corresponds with a time for playback of the modified talkspurt excerpts after scheduling by the playback scheduling unit 4506. In alternative implementations, the actual scheduled playback time duration 4535 may be determined outside of the playback scheduling unit 4506, e.g., by comparing the output start time of the first entry on the candidate output playback schedule 4411 with the output end time of the last entry.

Figure 46:
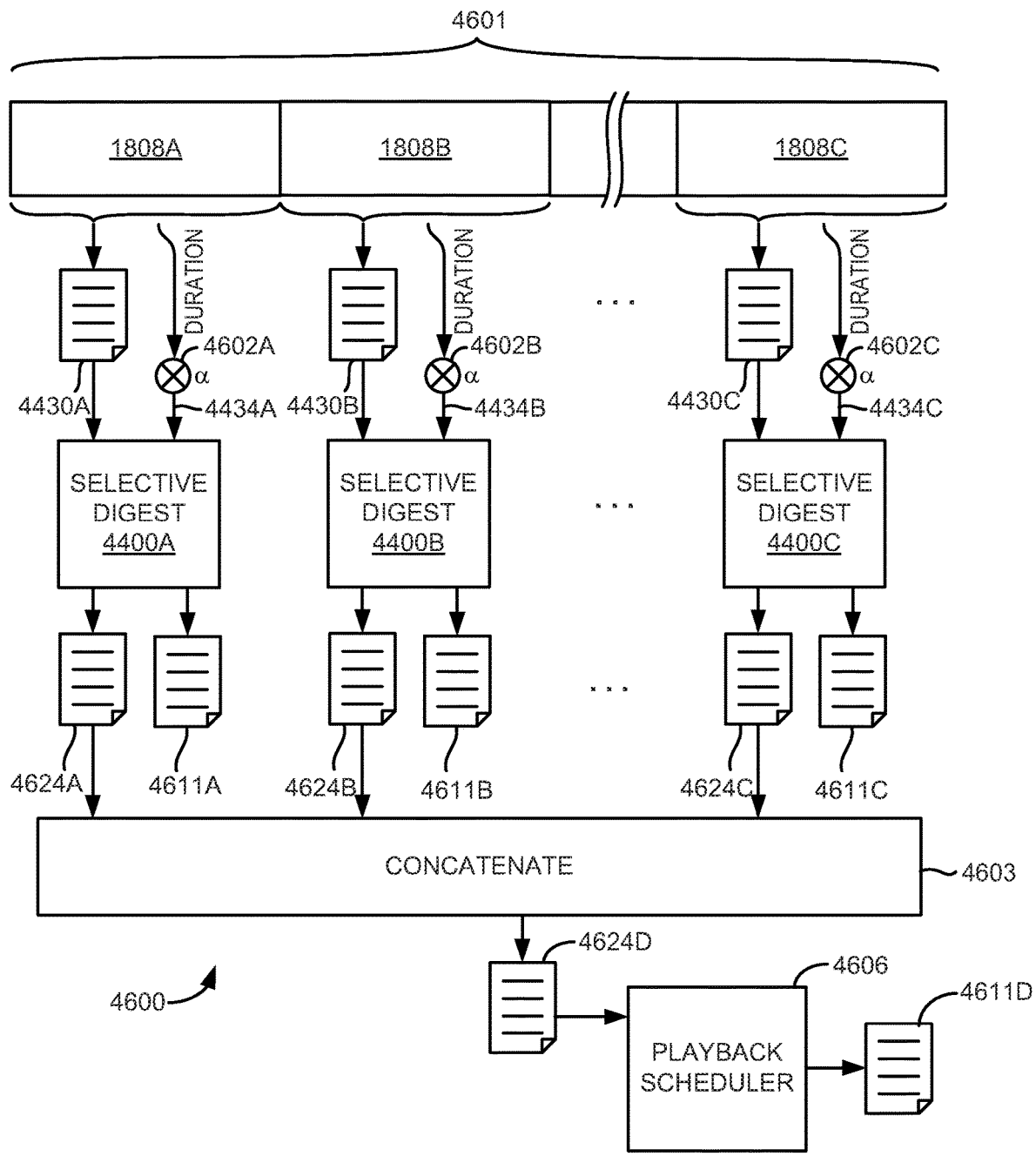
FIG. 46 shows an example of a system for applying a selective digest method to a segmented conference.

FIG. 46 shows an example of a system for applying a selective digest method to a segmented conference. In some implementations, the selective digest system 4600 may be implemented, at least in part, via instructions (e.g., software) stored on non-transitory media such as those described herein, including but not limited to random access memory (RAM) devices, read-only memory (ROM) devices, etc. In some implementations, the selective digest system 4600 may be implemented, at least in part, by a control system, e.g., by a control system of an apparatus such as that shown in FIG. 3A. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. According to some such implementations, the selective digest system 4600 may be implemented, at least in part, by one or more elements of the playback system 609 shown in FIG. 6, e.g., by the playback control module 605. Alternatively, or additionally, the selective digest system 4600 may be implemented, at least in part, by one or more servers.

In some implementations, the selective digest system 4600 may include more or fewer elements than are shown in FIG. 46. For example, in this implementation the selective digest system 4600 includes a plurality of selective digest modules 4400A-4400C, one for each conference segment. However, in some alternative implementations, audio data corresponding to some segments, such as Babble and/or Silence segments, will not be processed and there will be no corresponding selective digest modules 4400. In this example, audio data from only three conference segments is shown being processed, but the break between the representations of conference segments 1808B and 1808C is intended to represent one or more additional conference segments. Accordingly, in this example the input audio data 4601 represents audio data for an entire conference recording. Other examples may involve processing more or fewer conference segments, or processing an entire conference without segmentation.

In this example, each of the selective digest modules 4400A-4400C receives a corresponding one of the lists of input talkspurts 4430A-4430C, each of which corresponds to one of the conference segments 1808A-1808C. Here, each of the selective digest modules 4400A-4400C outputs a corresponding one of the per-segment lists of selected talkspurt excerpts 4624A-C, one for each conference segment. Moreover, each of the selective digest modules 4400A-4400C outputs a corresponding one of the per-segment output playback schedules 4611A-4611C. Segmentation information may or may not be included in the output of the selective digest modules 4400A-4400C, depending on the particular implementation.

In this implementation, the selective digest system 4600 includes time multipliers 4602A-4602C, one for each conference segment for which audio data are being processed. In some examples, the target playback time for each segment is calculated by multiplying the input duration of each segment by a coefficient α, reflecting the desired factor by which playback is to be accelerated. In some examples, a may be in the range from zero to one. Some example values of a that have successfully been used in experimental prototypes include 0.5, 0.333, 0.25 and 0.1, corresponding to 2×, 3×, 5× and 10× speed-up in playback rate, respectively. According to some implementations, the value of a may correspond with user input regarding a desired speed-up in playback rate, or a user's indication of a maximum tolerable speed-up in playback rate.

In this example, the selective digest system 4600 includes a concatenation unit 4603. Here, the concatenation unit 4603 is capable of concatenating the per-segment lists of selected talkspurt excerpts 4624A-C (e.g., in order of the start times of each conference segment) into a final list of selected talkspurt excerpts 4624D. In some implementations, the per-segment output playback schedules 4611A-4611C may be discarded, whereas in other implementations the per-segment output playback schedules 4611A-4611C may be retained. Segmentation information may or may not be included in the output of the concatenation unit 4603, depending on the particular implementation.

In this implementation, the selective digest system 4600 includes a final playback scheduling unit 4606. In some implementations, the final playback scheduling unit 4606 may be capable of functionality similar to that of the system 1700, which includes the segment scheduler unit 1710 and is described above with reference to FIG. 17. Accordingly, the final playback scheduling unit 4606 may be capable of scheduling the selected talkspurt excerpts from consecutive segments to overlap in time.

In some examples, the final playback scheduling unit 4606 may be capable of functionality similar to that of the playback scheduling unit 4506, which is described above with reference to FIG. 45. In some such examples, the final playback scheduling unit 4606 may be capable of scheduling the selected talkspurt excerpts of each segment to follow each other in output time. Although some talkspurt excerpts may be scheduled for overlapping playback, such implementations may not involve scheduling the selected talkspurt excerpts of entire conference segments for overlapping playback.

In this example, the final playback scheduling unit 4606 outputs a final playback schedule 4611D, which is a schedule for all selected talkspurt excerpts of the conference in this example. In some implementations, the final playback schedule 4611D corresponds with a scheduled playback time duration that is approximately proportional to the input duration of the teleconference multiplied by the coefficient α. However, in alternative implementations (such as those involving simultaneous playback of conference segments), the scheduled playback time duration may not be proportional to the input duration of the teleconference multiplied by the coefficient α.

Figure 47:
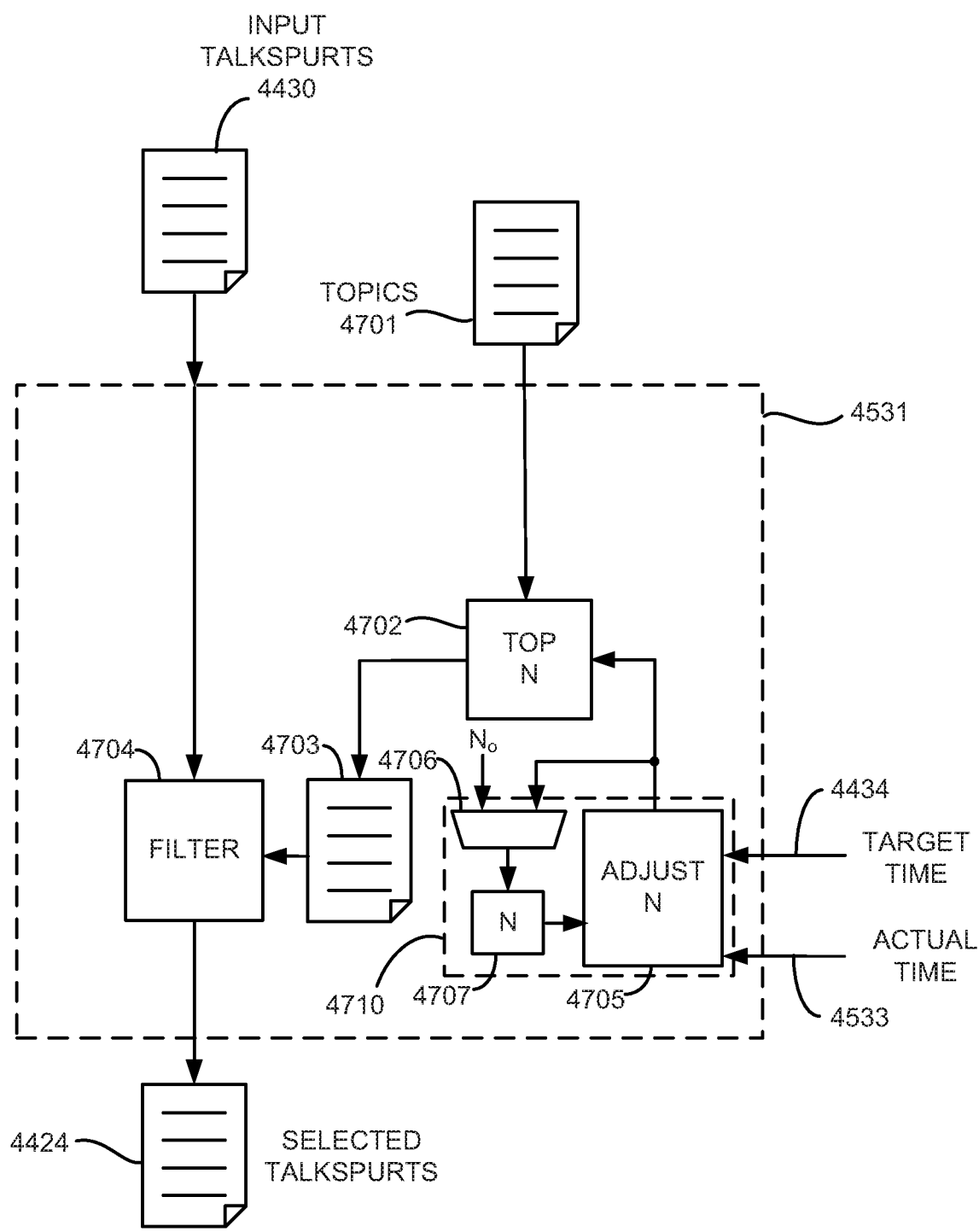
FIG. 47 shows examples of blocks of a selector module according to some implementations.

FIG. 47 shows examples of blocks of a selector module according to some implementations. In this example, the selector module 4531 is capable of providing topic selection functionality. For example, the selector module 4531 may be capable of determining which instances of conference participant speech to select based on estimated relevance to the overall topics of the conference or segment.

In this example, the selector module 4531 is shown receiving a list of input talkspurts 4430 and a topic list 4701. In some implementations, the list of input talkspurts 4430 and the topic list 4701 may correspond to an entire conference, whereas in other implementations the list of input talkspurts 4430 and the topic list 4701 may correspond to a conference segment. The topic list 4701 may, for example, correspond to the topic list 2511 that is described above with reference to FIG. 25. In some implementations, topics in the topic list 4701 may be stored in descending order of estimated importance, e.g., according to a term frequency metric. For each topic on the topic list 4701, there may be one or more instances of conference participant speech. Each of the instances of conference participant speech may have an endpoint indication, a start time and an end time.

In this implementation, the selector module 4531 is shown receiving a target playback time duration 4434 and a scheduled playback time duration 4533. The target playback time duration 4434 may be received according to user input from a user interface, e.g., as described above with reference to FIGS. 43 and 44. The scheduled playback time duration 4533 may be received from a playback scheduling unit 4506, e.g. as described above with reference to FIG. 45. In this example, the selector module 4531 is capable of operating in an iterative process to adjust the number N of words to keep from the topic list 4701 until the scheduled playback time duration 4533 is within a predetermined range (e.g., a percentage or an absolute time range) of the target playback time duration 4434. As noted above, the term "word" as used herein may also include phrases, such as "living thing." (In one example described above, the phrase "living thing" is described as a third-level hypernym of the word "pet," a second-level hypernym of the word "animal" and a first-level hypernym of the word "organism.")

In this example, the selector module 4531 includes a top N word selector 4702 that is capable of selecting the N most important words of the topic list 4701, e.g., as estimated according to a term frequency metric. The top N word selector 4702 may, for example, proceed through the topic list 4701 in descending order of estimated importance. For each topic encountered, the top N word selector 4702 may take words in descending order until a list 4703 of the top N words has been compiled.

In this implementation, the final value of N is determined by according to an iterative process performed by an adjustment module 4710, which includes a search adjustment unit 4705 and an N initializer 4706. For the first iteration, the N initializer 4706 sets N to an appropriate initial value $N_o$. In this example, a state variable 4707 is shown within adjustment module 4710, which is a variable value of N that is stored and updated from iteration to iteration.

In this example, the search adjustment unit 4705 is capable of producing an updated estimate of N based on the previous value of N and the difference between the target playback time duration 4434 and the scheduled playback time duration 4533. If the scheduled playback time duration 4533 is too low, the search adjustment unit 4705 may add more content (in other words, the value of N may be raised), whereas if the scheduled playback time duration 4533 is too high, the search adjustment unit 4705 may remove content (in other words, the value of N may be lowered).

The search adjustment unit 4705 may adjust the value of N according to different methods, depending on the particular implementation. In some examples, the search adjustment unit 4705 may perform a linear search. For example, the search adjustment unit 4705 may start with $N(0)=N_0=0$. On each iteration, the search adjustment unit 4705 may increase N by a fixed amount (e.g., by 5 or 10) until the difference between the target playback time duration 4434 and the scheduled playback time duration 4533 is within a predetermined range.

In some implementations, the search adjustment unit 4705 may perform a different type of linear search. For example, the search adjustment unit 4705 may start with $N(0)=N_0=0$. For each iteration, the search adjustment unit 4705 may increase N such that all the words from the next topic on the topic list 4701 are included. The search adjustment unit 4705 may repeat this process until the difference between the target playback time duration 4434 and the scheduled playback time duration 4533 is within a predetermined range.

In alternative implementations, the search adjustment unit 4705 may perform a binary search. For example, during each iteration the search adjustment unit 4705 may maintain $N_{min}$, a lower bound for N and $N_{max}$, an upper bound for N. For example, the search adjustment unit 4705 may start with $N_{min}(0)=0$, $N_{max}(0)=N_{total}$, $N(0)=N_0=\alpha \cdot N_{total}$, where $N_{total}$ represents the total number of words included by all topics of the topic list 4701. For each iteration k, if the scheduled playback time duration 4533 is below the target playback time duration 4434, the search adjustment unit 4705 may set $N_{min}$ and $N_{max}$ as follows:

$$N_{min}(k) = N(k-1), N_{max}(k) = N_{max}(k-1),$$
$$N(k) = \left\lfloor \frac{N_{min}(k) + N_{max}(k)}{2} \right\rfloor.$$

However, if the scheduled playback time duration 4533 is above the target playback time duration 4434, the search adjustment unit 4705 may set $N_{min}$ and $N_{max}$ as follows:

$$N_{min}(k) = N_{min}(k-1), N_{max}(k) = N(k-1),$$
$$N(k) = \left\lfloor \frac{N_{min}(k) + N_{max}(k)}{2} \right\rfloor.$$

The search adjustment unit 4705 may repeat this process until the difference between the target playback time duration 4434 and the scheduled playback time duration 4533 is within a predetermined range.

After the final value of N has been determined by the adjustment module 4710, the final value of N may be provided to the top N word selector 4702. In this example, the top N word selector 4702 is capable of selecting the N most important words of the topic list 4701 and outputting the list 4703 of the top N words.

In this implementation, the list 4703 of the top N words is provided to a talkspurt filter 4704. In this example, the talkspurt filter 4704 retains only excerpts of talkspurts that are present both in the list of input talkspurts 4430 and the list 4703 of the top N words. Retained words may, for example, be returned in the list of selected talkspurt excerpts 4424 in the order they were specified in the list of input talkspurts 4430, e.g., in temporal order. Although not shown in FIG. 47, in some examples the list of selected talkspurt excerpts 4424 may be processed by an expansion unit 4525 in order to provide more context to talkspurt excerpts. In some implementations, the list of selected talkspurt excerpts 4424 also may be processed by a merging unit 4526.

Figure 48A:
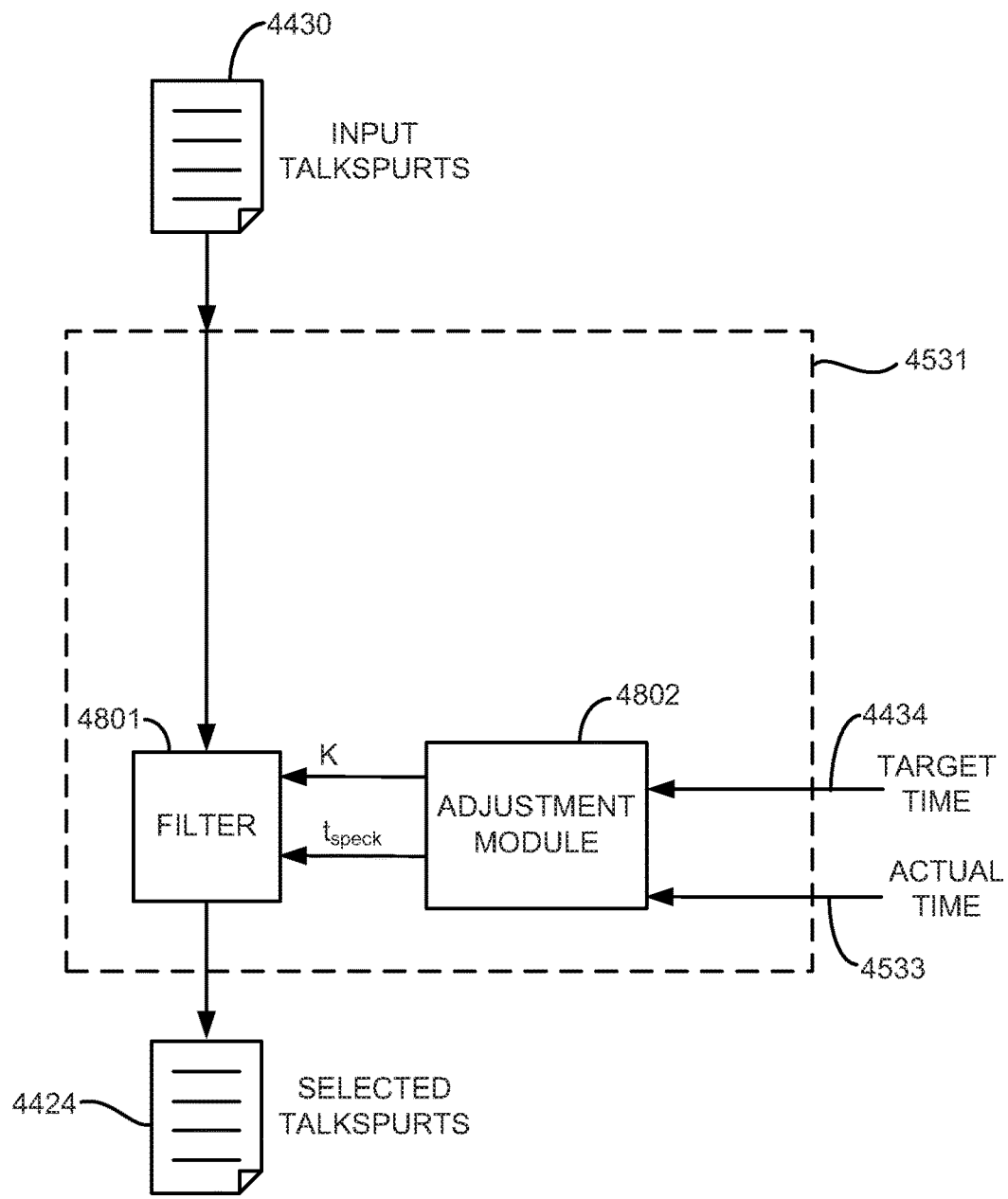
FIGS. 48A and 48B show examples of blocks of a selector module according to some alternative implementations.
Figure 48B:
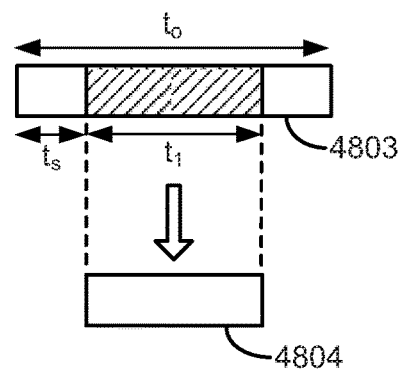

FIGS. 48A and 48B show examples of blocks of a selector module according to some alternative implementations. In this example, the selector module 4531 is capable of providing heuristic selection functionality. For example, the selector module 4531 may be capable of removing input talkspurts having an input talkspurt time duration that is below a threshold input talkspurt time duration. Alternatively, or additionally, the selector module 4531 may be capable of removing a portion of at least some input talkspurts that have an input talkspurt time duration that is at or above the threshold input talkspurt time duration. In some implementations, the selector module 4531 may be capable of keeping only part of every other talkspurt, of every third talkspurt, of every fourth talkspurt, etc. In some implementations, the selector module 4531 may be capable of providing heuristic selection functionality without information regarding conference topics.

Some implementations of the selector module 4531 that are capable of providing heuristic selection functionality also may include an expansion unit 4525. In some such implementations, when the selector module 4531 is providing heuristic selection functionality, the effect of the expansion unit 4525 may be limited or negated, e.g., by setting $t_{ex}$ to zero or to a small value (e.g., 0.1 seconds, 0.2 seconds, 0.3 seconds, etc.). According to some such implementations, the minimum size of a talkspurt excerpt may be controlled by the $t_{speck}$ parameter that is described below.

In this example, the selector module 4531 is shown receiving a list of input talkspurts 4430. In some implementations, the list of input talkspurts 4430 may correspond to an entire conference, whereas in other implementations the list of input talkspurts 4430 and the topic list 4701 may correspond to a conference segment. In this implementation, the selector module 4531 is also shown receiving a target playback time duration 4434 and a scheduled playback time duration 4533. The target playback time duration 4434 may be received according to user input from a user interface, e.g., as described above with reference to FIGS. 43 and 44. The scheduled playback time duration 4533 may be received from a playback scheduling unit 4506, e.g. as described above with reference to FIG. 45.

In this implementation, the selector module 4531 is capable of applying an iterative heuristic selection process to adjust the playback time of selected talkspurts until the scheduled playback time duration 4533 of the output list of selected talkspurt excerpts 4424 is within a predetermined range (e.g., a percentage or an absolute time range) of the target playback time duration 4434.

In this example, the selector module 4531 includes a filter 4801 and an adjustment module 4802. In some implementations, the filter 4801 may apply two parameters, K and $t_{speck}$. In some such implementations, K may represent a parameter, e.g., in the range of zero to one, which represents the fraction of each talkspurt that should be kept. According to some such implementations, $t_{speck}$ may represent a time duration threshold (e.g., a minimum time duration for a talkspurt or a talkspurt excerpt) that may, for example, be measured in seconds.

According to some examples, for each iteration k, the adjustment module 4802 may determine new values for the parameters K(k) and $t_{speck}$(k), based on the previous values K(k−1) and $t_{speck}$(k−1) and the difference between the scheduled playback time duration 4533 and target playback time duration 4434. In some such examples, talkspurt excerpts that are shorter than $t_{speck}$ (after scaling by K) may be removed by the filter 4801.

In some implementations, the adjustment module 4802 may apply the following set of heuristic rules. On the first iteration, K may be set to a maximum value (e.g., 1) and $t_{speck}$ may be set to zero seconds, such that all content is kept. On subsequent iterations, the value of K may be reduced and/or the value of $t_{speck}$ may be increased, thereby removing progressively more content until the difference between the scheduled playback time duration 4533 and target playback time duration 4434 is within a predetermined range, e.g., according to the following heuristic rules. First, if $t_{speck}$ is less than a threshold (for example, 3 seconds, 4 seconds, 5 seconds, etc.), some implementations involve increasing the value of $t_{speck}$ (for example, by 0.1 seconds, 0.2 seconds or 0.3 seconds, etc., per iteration). According to some such implementations, short talkspurts (those below a threshold time duration) will be removed before a process of removing portions of long talkspurts.

If, after removing talkspurts below a threshold time duration, the difference between the scheduled playback time duration 4533 and target playback time duration 4434 is still not within the predetermined range, some implementations involve reducing the value of K. In some examples, the value of K may be reduced by applying the formula K(k)=β*K(k−1), where β is in the range (0,1) (for example, 0.8, 0.85, 0.9, 0.95, etc.). According to such examples, content will be removed until the difference between the scheduled playback time duration 4533 and target playback time duration 4434 is within the predetermined range.

According to some implementations, talkspurts from the list of input talkspurts 4430 may be presented to the filter 4801 in sequence, e.g., in temporal order. As shown in FIG. 48B, for a given input talkspurt 4803, having an initial time duration $t_0$, in some examples the filter 4801 either produces a corresponding output talkspurt excerpt 4804, which is added to the list of selected talkspurt excerpts 4424, or consumes the input talkspurt 4803 without producing a corresponding output talkspurt excerpt 4804.

According to some examples, the heuristic rules that govern such operations of the filter 4801 are as follows. In some such examples, the filter 4801 will calculate the output time duration, $t_1$, of a candidate output talkspurt according to $t_1 = Kt_0$. According to some such examples, if $t_1 < t_{speck}$, the filter 4801 will not produce an output talkspurt. In some examples, the filter 4801 may calculate the start time is of the candidate output talkspurt relative to the start time of the input talkspurt (4803) according to:

$$t_s = \begin{bmatrix} t_{um}, & \text{if } (t_{um} + t_1) \le t_0 \\ t_0 - t_1, & \text{otherwise} \end{bmatrix} \quad \text{(Equation 48)}$$

In Equation 48, $t_{um}$ represents a coefficient, which may be in the range [0, 2] seconds in some examples. In some implementations, the value of $t_{um}$ may be chosen such that speech near the start of long talkspurts is generally kept, but not speech that is at the very beginning of long talkspurts. The motivation for this choice is that people often start talkspurts with filled pauses such as "um", "err," and the like. The inventors determined via experimentation that the resulting digest contained more relevant content and fewer filled pauses if the selector was biased to omit speech that is at the very beginning of long talkspurts (e.g., during the first 1 second of each talkspurt, during the first 1.5 seconds of each talkspurt, during the first 2 seconds of each talkspurt, etc.) than if the selector module 4531 kept speech starting at the very beginning of each talkspurt.

In some implementations, the filter 4801 may generate multiple talkspurt excerpts for a single input talkspurt 4803. According to some such implementations, at least one of the multiple talkspurt excerpts may have an end time that corresponds with an input talkspurt end time.

In some such examples, when the time duration of a candidate output talkspurt $t_1$ exceeds a first threshold $t_2$ (e.g., 8 seconds, 10 seconds, 12 seconds, etc.) but is less than a threshold $t_3$ (e.g., 15 seconds, 20 seconds, 25 seconds, 30 seconds, etc.), the filter 4801 may generate two output talkspurt excerpts. For example, the first output talkspurt excerpt may start at time $t_s$ with respect to the start time of the input talkspurt and may have a time duration $t_1/2$. In some such examples, the second output talkspurt excerpt also may have a time duration $t_1/2$ and may start at a time that is $t_1/2$ before the end of the input talkspurt 4803, such that the end time of the second output talkspurt excerpt corresponds with the input talkspurt's end time.

According to some such implementations, when the length of the candidate output talkspurt $t_1$ exceeds the threshold $t_3$, the filter 4801 may generate three output talkspurt excerpts. For example, the first output talkspurt excerpt may start at time $t_s$ with respect to the start time of the input talkspurt and may have a time duration $t_1/3$. The third output talkspurt excerpt may also have a time duration $t_1/3$ and may start at a time that is $t_1/3$ before the end of the input talkspurt 4803, such that the end time of the third output talkspurt excerpt corresponds with the input talkspurt's end time. According to some such examples, the second output talkspurt excerpt also may have a time duration $t_1/3$ and may start at time $((t_0+t_s)-t_1/3))/2$. Accordingly, the start time of the second output talkspurt excerpt may be chosen so that second output talkspurt excerpt is midway between the first and third output talkspurt excerpts.

In some implementations, the filter 4801 may generate four or more output talkspurt excerpts. According to some such implementations, at least one of the multiple output talkspurt excerpts may have an end time that corresponds with an input talkspurt end time. In some such examples, the output talkspurt excerpts may correspond to samples taken at regular intervals from the input talkspurt 4803, so that speech of long input talkspurts 4803 is regularly sampled.

Figure 49:
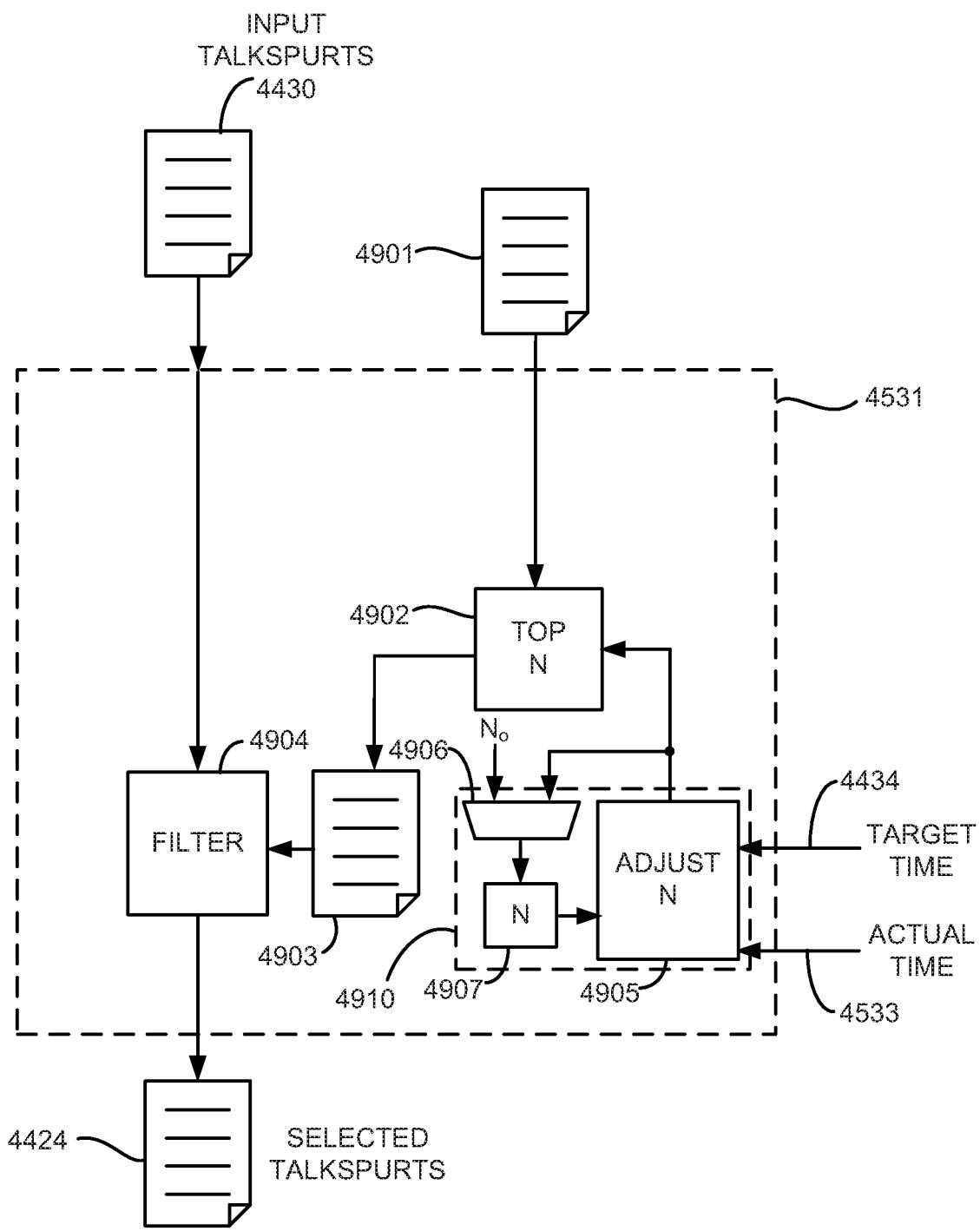
FIG. 49 shows examples of blocks of a selector module according to other alternative implementations.

FIG. 49 shows examples of blocks of a selector module according to other alternative implementations. In this example, the selector module 4531 is capable of providing acoustic feature selection functionality. For example, the selector module 4531 may be capable of determining which instances of conference participant speech to select based on acoustic features calculated for each talkspurt (such as pitch variance, speech rate, loudness, etc.), which may indicate which talkspurts are relatively more exciting. Such functionality is based on empirical observations indicating that when a talker is more excited about a topic, there are corresponding acoustic features that can be used to detect such excitement. We may assume that when a talker is more excited, the topic may also be more interesting to the listener.

In this example, the selector module 4531 is shown receiving a list of input talkspurts 4430 and an acoustic feature list 4901. In some implementations, the list of input talkspurts 4430 and the acoustic feature list 4901 may correspond to an entire conference, whereas in other implementations the list of input talkspurts 4430 and the acoustic feature list 4901 may correspond to a conference segment. For example, the analysis engine 307 may have previously performed one of more types of analyses on the audio data of a conference recording to determine conference participant mood features such as excitement, aggression or stress/cognitive load. Some examples are described above. The acoustic feature list 4901 may be a result of such analysis. Each entry on the acoustic feature list 4901 may be an instance of conference participant speech, such as a talkspurt or a talkspurt excerpt. Each of the instances of conference participant speech may have an endpoint indication, a start time and an end time.

In some implementations, the acoustic feature list 4901 may be stored in descending order of estimated importance, e.g., according to an excitement metric. The excitement metric may, for example, be a function of pitch variance, speech rate and/or loudness. However, some types of "excited speech," such as laughter, may be easy to detect and may not necessarily correspond to topics of importance. Instead, laughter may correspond to personal comments, off-topic banter, etc. Accordingly, some implementations may involve assigning a relatively low level of importance (e.g., by assigning a relatively lower excitement metric) to detected instances of conference participant laughter.

According to some implementations, for long talkspurts where the acoustic feature may vary greatly, the talkspurt may be split into several separate entries, each ranked according to a local acoustic feature. For example, talkspurts having a time duration of more than 20 seconds may be split into a series of talkspurts no more than 10 seconds long, each with separately-calculated acoustic features.

In some examples, the acoustic feature list 4901 may be based on pitch variance. In one example, the excitement metric may be a calculated as follows. A fundamental frequency estimate (F0) may be extracted for each audio frame using a known pitch tracking technique, such as the root cepstrum technique. Then, the values of F0 may be converted to semitones, in order to eliminate the variation between male and female talkers. The standard deviation of the semitone values may be calculated for each talkspurt or talkspurt excerpt. The standard deviation may be used as the excitement metric for that talkspurt or talkspurt excerpt. The acoustic feature list 4901 may be created by sorting the talkspurts and/or talkspurt excerpts in descending order, according to the excitement metric.

In this implementation, the selector module 4531 is shown receiving a target playback time duration 4434 and a scheduled playback time duration 4533. The target playback time duration 4434 may be received according to user input from a user interface, e.g., as described above with reference to FIGS. 43 and 44. The scheduled playback time duration 4533 may be received from a playback scheduling unit 4506, e.g. as described above with reference to FIG. 45. In this example, the selector module 4531 is capable of operating in an iterative process to adjust the number N of talkspurts (or talkspurt excerpts) to keep from the acoustic feature list 4901 until the scheduled playback time duration 4533 is within a predetermined range (e.g., a percentage or an absolute time range) of the target playback time duration 4434.

In this example, the selector module 4531 includes a top N talkspurt selector 4902 that is capable of selecting the N most important talkspurts (or talkspurt excerpts) of the acoustic feature list 4901, e.g., as estimated according to a term frequency metric. The top N talkspurt selector 4902 may, for example, proceed through the acoustic feature list 4901 in descending order of estimated importance until a list 4903 of the top N talkspurts (or talkspurt excerpts) has been compiled.

In this implementation, the final value of N is determined by according to an iterative process performed by an adjustment module 4910, which includes a search adjustment unit 4905 and an N initializer 4906. The adjustment module 4910 may, in some implementations, be capable of functionality such as that described above with reference to the adjustment module 4710 of FIG. 47. For the first iteration, the N initializer 4906 may set N to an appropriate initial value $N_0$. In this example, a state variable 4907 is shown within adjustment module 4910, which is a variable value of N that is stored and updated from iteration to iteration.

In this example, the search adjustment unit 4905 is capable of producing an updated estimate of N based on the previous value of N and the difference between the target playback time duration 4434 and the scheduled playback time duration 4533. Generally speaking, if the scheduled playback time duration 4533 is too low, the search adjustment unit 4905 may add more content (in other words, the value of N may be raised), whereas if the scheduled playback time duration 4533 is too high, the search adjustment unit 4905 may remove content (in other words, the value of N may be lowered).

The search adjustment unit 4905 may adjust the value of N according to different methods, depending on the particular implementation. In some examples, the search adjustment unit 4905 may perform a linear search or a binary search, e.g., as described above with reference to the search adjustment unit 4705 of FIG. 47.

After the final value of N has been determined by the adjustment module 4910, the final value of N may be provided to the top N talkspurt selector 4902. In this example, the top N talkspurt selector 4902 is capable of selecting the N most important talkspurts (or talkspurt excerpts) of the acoustic feature list 4901 and output the list 4903 of the top N talkspurts (or talkspurt excerpts).

In this implementation, the list 4903 is provided to a talkspurt filter 4904. In this example, the talkspurt filter 4904 retains only talkspurts (or talkspurt excerpts) that are present both in the list of input talkspurts 4430 and the list 4903. Retained talkspurts (or talkspurt excerpts) may, for example, be returned in the list 4424 of selected talkspurts (or talkspurt excerpts), in the order they were specified in the list of input talkspurts 4430, e.g., in temporal order. Although not shown in FIG. 49, talkspurt excerpts may be processed by an expansion unit 4525 in order to provide more context. In some implementations, talkspurt excerpts also may be processed by a merging unit 4526.

Various modifications to the implementations described in this disclosure may be readily apparent to those having ordinary skill in the art. The general principles defined herein may be applied to other implementations without departing from the scope of this disclosure. For example, some alternative implementations do not involve determining a term frequency metric according to a TF-IDF algorithm. Some such implementations may involve using a parsimonious language model to generate a topic list.

Some implementations may involve combining a talkspurt filtering process with an acoustic feature selection process. According to some such implementations, a talkspurt filtering process that is based, at least in part, on talkspurt time duration may be combined with an acoustic feature selection process that is based, at least in part, on pitch variation. For example, if K were 0.5 (corresponding to an example in which half of an input talkspurt is retained), the half talkspurt having the greater pitch variation may be retained.

In another such implementation that involves combining a talkspurt filtering process with an acoustic feature selection process, ranks for the input talkspurts based on pitch variations and talkspurt length may be identified and a combined rank may be generated by using a weighting factor. In one such example, equal weight (0.5) may be assigned for pitch variation and talkspurt length. The rank threshold may be located at which the desired compression ratio is achieved (in other words, the threshold at which the difference between the target playback time duration 4434 and the scheduled playback time duration 4533 is within a predetermined range). The talkspurt that has a combined rank below the threshold may be removed.

Alternatively, or additionally, some implementations may involve combining a topic selection process with an acoustic feature selection process. According to some such implementations, instances of conference participant speech pertaining to the same topic may be ranked according to an acoustic feature selection process, e.g., according to an excitement metric such as pitch variation. In other implementations, ranks for the input talkspurts may be based on an acoustic feature selection process and a topic selection process. A combined ranking according to both processes may be generated by using a weighting factor.

Some implementations may involve combining conversational dynamics analysis with an acoustic feature selection process. According to some such implementations, instances of conference participant speech corresponding to excited responses to an utterance may be identified according to a sudden increase in an excitement metric (such as pitch variation) and/or by a sudden increase in doubletalk after the utterance. In some examples, instances of conference participant speech corresponding to a "stunned silence" after an utterance may be identified by a time interval of silence after the utterance and/or by a sudden increase in an excitement metric and/or by a sudden increase in doubletalk after the time interval of silence.

Thus, the claims are not intended to be limited to the implementations shown herein, but are to be accorded the widest scope consistent with this disclosure, the principles and the novel features disclosed herein.

What is claimed is:

1. A method of processing audio data, the method comprising:

receiving audio data corresponding to a recording of at least one conference involving a plurality of conference participants, the audio data including at least one of: (a) conference participant speech data from multiple endpoints, recorded separately or (b) conference participant speech data from a single endpoint corresponding to multiple conference participants and including spatial information for each conference participant of the multiple conference participants;

determining search results of a search of the audio data based on one or more search parameters, the search results corresponding to at least two instances of conference participant speech in the audio data, the at least two instances of conference participant speech including at least a first instance of speech uttered by a first conference participant and at least a second instance of speech uttered by a second conference participant;

rendering the instances of conference participant speech to at least two different virtual conference participant positions of a virtual acoustic space, such that the first instance of speech is rendered to a first virtual conference participant position and the second instance of speech is rendered to a second virtual conference participant position; and scheduling at least a portion of the instances of conference participant speech that includes the first instance of speech uttered by the first conference participant and the second instance of speech uttered by the second conference participant for simultaneous playback, to produce playback audio data, wherein the scheduling is performed according to one or more rules including at least one of: a rule indicating that two talkspurts of a single conference participant should not overlap in time; a rule indicating that two talkspurts should not overlap in time if the two talkspurts correspond to a single endpoint; a rule wherein, given two consecutive input talkspurts A and B, A having occurred before B, the playback of an output talkspurt corresponding to B may begin before the playback of an output talkspurt corresponding to A is complete, but not before the playback of the output talkspurt corresponding to A has started; or a rule allowing the playback of an output talkspurt corresponding to B to begin no sooner than a time T before the playback of an output talkspurt corresponding to A is complete, wherein T is greater than zero.

2. The method of claim 1, wherein determining the search results involves receiving search results or performing a search.

3. The method of claim 1, wherein determining the search results involves performing a concurrent search of the audio data regarding multiple features.

4. The method of claim 3, wherein the multiple features include at least two of: words; conference segments; time; conference participant emotion; or endpoint type.

5. The method of claim 1, wherein determining the search results involves performing a search of audio data that corresponds to recordings of multiple conferences.

6. The method of claim 1, wherein the scheduling involves scheduling the instances of conference participant speech for playback based, at least in part, on a search relevance metric.

7. The method of claim 1, further comprising modifying a start time or an end time of at least one of the instances of conference participant speech.

8. The method of claim 7, wherein the modifying involves expanding a time interval corresponding to an instance of conference participant speech.

9. The method of claim 8, wherein the modifying involves merging two or more instances of conference participant speech, corresponding with a single conference endpoint, that overlap in time after the expanding.

10. The method of claim 1, wherein the scheduling involves at least one of scheduling an instance of conference participant speech that did not previously overlap in time to be played back overlapped in time, or scheduling an instance of conference participant speech that was previously overlapped in time to be played back further overlapped in time.

11. The method of claim 1, further comprising:
analysing the audio data to determine conversational dynamics data that includes at least one of: data indicating the frequency and duration of conference participant speech; data indicating instances of conference participant doubletalk during which at least two conference participants are speaking simultaneously; or data indicating instances of conference participant conversations;
applying the conversational dynamics data as one or more variables of a spatial optimization cost function of a vector describing the virtual conference participant position for each of the conference participants in the virtual acoustic space;
applying an optimization technique to the spatial optimization cost function to determine a locally optimal solution; and
assigning the virtual conference participant positions in the virtual acoustic space based, at least in part, on the locally optimal solution.

12. The method of claim 1, further comprising providing the playback audio data to a speaker system.

13. The method of claim 1, further comprising providing instructions for controlling a display to provide a graphical user interface.

14. The method of claim 13, further comprising:
receiving input corresponding to a user's interaction with the graphical user interface; and
processing the audio data based, at least in part, on the input.

15. The method of claim 14, wherein the input corresponds to one or more features for performing a search of the audio data.

16. The method of claim 1, wherein determining the search results involves searching a keyword spotting index having a data structure that includes pointers to contextual information.

17. An apparatus, comprising:
an interface system; and
a control system capable of:
receiving, via the interface system, audio data corresponding to a recording of at least one conference involving a plurality of conference participants, the audio data including at least one of: (a) conference participant speech data from multiple endpoints, recorded separately or (b) conference participant speech data from a single endpoint corresponding to multiple conference participants and including spatial information for each conference participant of the multiple conference participants;
determining search results of a search of the audio data based on one or more search parameters, the search results corresponding to at least two instances of conference participant speech in the audio data, the at least two instances of conference participant speech including at least a first instance of speech uttered by a first conference participant and at least a second instance of speech uttered by a second conference participant;
rendering the instances of conference participant speech to at least two different virtual conference participant positions of a virtual acoustic space, such that the first instance of speech is rendered to a first virtual conference participant position and the second instance of speech is rendered to a second virtual conference participant position; and
scheduling at least a portion of the instances of conference participant speech that includes the first instance of speech uttered by the first conference participant and the second instance of speech uttered by the second conference participant for simultaneous playback, to produce playback audio data, wherein the scheduling is performed according to one or more rules including at least one of: a rule indicating that two talkspurts of a single conference participant should not overlap in time; a rule indicating that two talkspurts should not overlap in time if the two talkspurts correspond to a single endpoint; a rule wherein, given two consecutive input talkspurts A and B, A having occurred before B, the playback of an output talkspurt corresponding to B may begin before the playback of an output talkspurt corresponding to A is complete, but not before the playback of the output talkspurt corresponding to A has started; or a rule allowing the playback of an output talkspurt corresponding to B to begin no sooner than a time T before the playback of an output talkspurt corresponding to A is complete, wherein T is greater than zero.

18. A non-transitory medium having software stored thereon, the software including instructions for controlling one or more devices for:
receiving audio data corresponding to a recording of at least one conference involving a plurality of conference participants, the audio data including at least one of: (a) conference participant speech data from multiple endpoints, recorded separately or (b) conference participant speech data from a single endpoint corresponding to multiple conference participants and including spatial information for each conference participant of the multiple conference participants;
determining search results of a search of the audio data based on one or more search parameters, the search results corresponding to at least two instances of conference participant speech in the audio data, the at least two instances of conference participant speech including at least a first instance of speech uttered by a first conference participant and at least a second instance of speech uttered by a second conference participant;
rendering the instances of conference participant speech to at least two different virtual conference participant positions of a virtual acoustic space, such that the first instance of speech is rendered to a first virtual conference participant position and the second instance of speech is rendered to a second virtual conference participant position; and
scheduling at least a portion of the instances of conference participant speech that includes the first instance of speech uttered by the first conference participant and the second instance of speech uttered by the second conference participant for simultaneous playback, to produce playback audio data, wherein the scheduling is performed according to one or more rules including at least one of: a rule indicating that two talkspurts of a single conference participant should not overlap in time; a rule indicating that two talkspurts should not overlap in time if the two talkspurts correspond to a single endpoint; a rule wherein, given two consecutive input talkspurts A and B, A having occurred before B, the playback of an output talkspurt corresponding to B may begin before the playback of an output talkspurt corresponding to A is complete, but not before the playback of the output talkspurt corresponding to A has started; or a rule allowing the playback of an output talkspurt corresponding to B to begin no sooner than a time T before the playback of an output talkspurt corresponding to A is complete, wherein T is greater than zero.

* * * * *